US012515982B2

(12) United States Patent
Lepicard et al.

(10) Patent No.: US 12,515,982 B2
(45) Date of Patent: Jan. 6, 2026

(54) HIGH-INDEX BORATE GLASSES

(71) Applicant: CORNING INCORPORATED, Corning, NY (US)

(72) Inventors: Antoine Marie Joseph Lepicard, Melun (FR); Jian Luo, Painted Post, NY (US); Lina Ma, Corning, NY (US); Alexander I Priven, Sejong-si (KR); Adam Robert Sarafian, Corning, NY (US)

(73) Assignee: Corning Incorporated, Corning, NY (US)

( * ) Notice: Subject to any disclaimer, the term of this patent is extended or adjusted under 35 U.S.C. 154(b) by 982 days.

(21) Appl. No.: 17/683,527

(22) Filed: Mar. 1, 2022

(65) Prior Publication Data

US 2022/0306517 A1 Sep. 29, 2022

Related U.S. Application Data

(60) Provisional application No. 63/163,269, filed on Mar. 19, 2021.

(30) Foreign Application Priority Data

May 20, 2021 (NL) ..................................... 2028260

(51) Int. Cl.
*C03C 3/068* (2006.01)
*C03C 3/155* (2006.01)

(52) U.S. Cl.
CPC .............. *C03C 3/068* (2013.01); *C03C 3/155* (2013.01)

(58) Field of Classification Search
CPC ......... C03C 3/064; C03C 3/066; C03C 3/068; C03C 3/155
See application file for complete search history.

(56) References Cited

U.S. PATENT DOCUMENTS

| | | | |
|---|---|---|---|
| 4,213,786 A | 7/1980 | Faulstich et al. |
| 4,268,312 A | 5/1981 | Ishibashi et al. |
| 4,584,279 A | 4/1986 | Grabowski et al. |
| 4,612,295 A | 9/1986 | Sagara |
| 4,732,876 A | 3/1988 | Nagamine et al. |
| 5,288,669 A | 2/1994 | Grateau et al. |
| 6,187,702 B1 | 2/2001 | Morishita |
| 6,797,659 B2 | 9/2004 | Susumu |
| 7,091,145 B2 | 8/2006 | Wolff et al. |
| 7,232,779 B2 | 6/2007 | Kasuga et al. |
| 7,482,293 B2 | 1/2009 | Tsai et al. |
| 7,490,485 B2 | 2/2009 | Endo |
| 7,560,405 B2 | 7/2009 | Hayashi et al. |
| 7,598,193 B2 | 10/2009 | Endo |
| 7,615,507 B2 | 11/2009 | Endo |
| 7,655,585 B2 | 2/2010 | Hayashi |
| 7,737,064 B2 | 6/2010 | Fu |
| 7,827,823 B2 | 11/2010 | Kasuga et al. |
| 7,855,158 B2 | 12/2010 | Fujiwara |
| 7,884,041 B2 | 2/2011 | Uehara |
| 7,897,532 B2 | 3/2011 | Onoda et al. |
| 7,955,998 B2 | 6/2011 | Hayashi et al. |
| 8,077,406 B2 | 12/2011 | Hachitani et al. |
| 8,357,624 B2 | 1/2013 | Hayashi et al. |
| 8,361,916 B2 | 1/2013 | Tomeno et al. |
| 8,367,575 B2 | 2/2013 | Kuang et al. |
| 8,377,835 B2 | 2/2013 | Tomeno et al. |
| 8,404,606 B2 | 3/2013 | Wolff et al. |
| 8,466,075 B2 | 6/2013 | Shimizu |
| 8,476,177 B2 | 7/2013 | Ritter et al. |
| 8,486,536 B2 | 7/2013 | Zou et al. |
| 8,575,047 B2 | 11/2013 | Fujiwara et al. |
| 8,575,048 B2 | 11/2013 | Negishi et al. |
| 8,609,560 B2 | 12/2013 | Negishi |
| 8,647,994 B2 | 2/2014 | Fujiwara |
| 8,647,996 B2 | 2/2014 | Takazawa |
| 8,661,853 B2 | 3/2014 | Negishi et al. |
| 8,716,157 B2 | 5/2014 | Fujiwara et al. |
| 8,728,963 B2 | 5/2014 | Negishi et al. |
| 8,741,795 B2 | 6/2014 | Zou et al. |
| 8,741,796 B2 | 6/2014 | Negishi et al. |

(Continued)

FOREIGN PATENT DOCUMENTS

CN 1935717 A 3/2007
CN 101134641 A 3/2008

(Continued)

OTHER PUBLICATIONS

Ahrens H., et al, "Determination of the Judd-Ofelt paratemers of the optical transitions of Sm3+ in litiumborate tungstate glasses", J.Luminescence, vol. 82, No. 3, 1999, pp. 177-186.
Imaoka M., et al, "Refractive index and Abbes number of glass of lanthanum borate system", J.Ceram. Assoc. Japan, vol. 70, No. 5, 1962, pp. 115-123.
Nasu H., et al, "Third-order optical non-linearity of Bi2O3-based glasses", J. Non-Cryst. Solids, vol. 204, No. 1, 1996, pp. 78-82.
Roy J. S., et al, "Formation and optical properties of new glasses within Sb2O3—WO3—ZnO ternary system", Journal of Materials Science: Materials in Electronics, vol. 30, No. 18, 2019, pp. 16798-16805.
Salem S.M., et al, "A study on the optical, structural, electrical conductivity and dielectric properties of a lithium bismuth germanium tungsten glasses", J. Alloys Compounds, vol. 513, 2012, pp. 35-43.
Strimple J.H., et al, "Glass formation and properties of glasses in the system Na2O—B2O3—SiO2—TiO2.", J. Am. Ceram. Soc., vol. 41, No. 7, 1958, pp. 231-237.
Wang Jun, et al, "Effect of WO3 on the spectroscopic properties in Er3+/Yb3+ co-doped bismuth-borate glasses", Physica B, vol. 400, No. 1-2, 2007, pp. 224-228.
NL Search report 2028260; dated Mar. 16, 2022; 7 pages; European Patent Office.

*Primary Examiner* — Elizabeth A. Bolden
(74) *Attorney, Agent, or Firm* — Kevin L. Bray

(57) ABSTRACT

Glass compositions include boron oxide ($B_2O_3$), lanthanum oxide ($La_2O_3$), titania ($TiO_2$) and niobia ($Nb_2O_5$) as essential components and may optionally include silica ($SiO_2$), tungsten oxide ($WO_3$), zirconia ($ZrO_2$), yttria ($Y_2O_3$), bismuth oxide ($Bi_2O_3$), barium oxide (BaO), $TeO_2$ and other components. The glasses may be characterized by high refractive index at 587.56 nm at comparably low liquidus temperature.

34 Claims, 13 Drawing Sheets

(56) References Cited

U.S. PATENT DOCUMENTS

| | | |
|---|---|---|
| 8,835,336 B2 | 9/2014 | Taguchi |
| 8,859,444 B2 | 10/2014 | Yamaguchi et al. |
| 8,883,664 B2 | 11/2014 | Negishi |
| 8,945,713 B2 | 2/2015 | Satou et al. |
| 8,956,988 B2 | 2/2015 | Fujiwara |
| 9,169,152 B2 | 10/2015 | Kuang |
| 9,255,028 B2 | 2/2016 | Negishi et al. |
| 9,302,930 B2 | 4/2016 | Negishi et al. |
| 9,346,704 B2 | 5/2016 | Kuang |
| 9,394,194 B2 | 7/2016 | Negishi |
| 9,487,432 B2 | 11/2016 | Kuang |
| 9,643,880 B2 | 5/2017 | Negishi |
| 10,259,738 B2 | 4/2019 | Sun |
| 10,287,205 B2 | 5/2019 | Sun |
| 2009/0197754 A1 | 8/2009 | Uehara et al. |
| 2011/0105294 A1 | 5/2011 | Negishi et al. |
| 2015/0119228 A1* | 4/2015 | Negishi ................ C03C 3/068 65/102 |
| 2015/0225282 A1 | 8/2015 | Kuang |

FOREIGN PATENT DOCUMENTS

| | | |
|---|---|---|
| CN | 101215082 A | 7/2008 |
| CN | 101466647 A | 6/2009 |
| CN | 102219374 A | 10/2011 |
| CN | 102910816 A | 2/2013 |
| CN | 103708724 A | 4/2014 |
| CN | 107879620 A | 4/2018 |
| CN | 108290768 A | 7/2018 |
| CN | 104583142 B | 1/2019 |
| CN | 109790060 A | 5/2019 |
| CN | 110963706 A | 4/2020 |
| CN | 111018343 A | 4/2020 |
| CN | 111253064 A | 6/2020 |
| CN | 111320384 A | 6/2020 |
| CN | 112028472 A | 12/2020 |
| CN | 112028473 A | 12/2020 |
| DE | 2653581 A1 | 6/1977 |
| DE | 3201344 A1 | 7/1983 |
| DE | 3201346 A1 | 7/1983 |
| HK | 1029098 A1 | 3/2001 |
| JP | 50-018509 A | 2/1975 |
| JP | 52-129716 A | 10/1977 |
| JP | 53-004023 A | 1/1978 |
| JP | 60-122745 A | 7/1985 |
| JP | 61-232243 A | 10/1986 |
| JP | 09-278480 A | 10/1997 |
| JP | 2000-128570 A | 5/2000 |
| JP | 2000-159537 A | 6/2000 |
| JP | 2001-072432 A | 3/2001 |
| JP | 2002-012443 A | 1/2002 |
| JP | 2002-362939 A | 12/2002 |
| JP | 2004-175632 A | 6/2004 |
| JP | 2005-047732 A | 2/2005 |
| JP | 2005-330154 A | 12/2005 |
| JP | 2006-182577 A | 7/2006 |
| JP | 2007-015904 A | 1/2007 |
| JP | 2007-112697 A | 5/2007 |
| JP | 2008-105863 A | 5/2008 |
| JP | 2008-214135 A | 9/2008 |
| JP | 2009-102215 A | 5/2009 |
| JP | 2009-167025 A | 7/2009 |
| JP | 2009-173520 A | 8/2009 |
| JP | 2009-203083 A | 9/2009 |
| JP | 2009-263191 A | 11/2009 |
| JP | 2010-052954 A | 3/2010 |
| JP | 2020-059629 A | 4/2020 |
| JP | 2020-073453 A | 5/2020 |
| SU | 1728144 A1 | 4/1992 |
| TW | 201711973 A | 4/2017 |
| TW | 201713602 A | 4/2017 |
| TW | 201900572 A | 1/2019 |
| WO | 2005/121039 A1 | 12/2005 |
| WO | 2006/022438 A1 | 3/2006 |
| WO | 2012/014839 A1 | 2/2012 |
| WO | 2012/046833 A1 | 4/2012 |
| WO | 2012/099168 A1 | 7/2012 |
| WO | 2013/084706 A1 | 6/2013 |
| WO | 2014/187132 A1 | 11/2014 |
| WO | 2015/046509 A1 | 4/2015 |
| WO | 2017/110304 A1 | 6/2017 |
| WO | 2019/017205 A1 | 1/2019 |
| WO | 2019/058617 A1 | 3/2019 |
| WO | 2019/131123 A1 | 7/2019 |
| WO | 2020/034210 A1 | 2/2020 |
| WO | 2020/034215 A1 | 2/2020 |
| WO | 2020/045417 A1 | 3/2020 |
| WO | 2020/062009 A1 | 4/2020 |

* cited by examiner

HIGH-INDEX BORATE GLASSES

This application claims the benefit of priority to Dutch Patent Application No. 2028260 filed on May 20, 2021, which claims priority from U.S. Provisional Patent Application Ser. No. 63/163,269 filed on Mar. 19, 2021, the content of which is relied upon and incorporated herein by reference in its entirety.

FIELD

The present disclosure generally relates to borate and silicoborate glasses having a high refractive index and low density.

BACKGROUND

Glass is used in a variety of optical devices, examples of which include augmented reality devices, virtual reality devices, mixed reality devices, eye wear, etc. Desirable properties for this type of glass often include a high refractive index and a low density. Additional desirable properties may include high transmission in the visible and near-ultraviolet (near-UV) range of the electromagnetic spectrum and/or low optical dispersion. It can be challenging to find glasses having the desired combination of these properties and which can be formed from compositions having good glass-forming ability. For example, generally speaking, as the refractive index of a glass increases, the density also tends to increase. Species such as $TiO_2$ and $Nb_2O_5$ are often added to increase the refractive index of a glass without increasing the density of the glass. However, these materials often absorb blue and UV light, which can undesirably decrease the transmittance of light in this region of the spectrum by the glass. Often, attempts to increase the refractive index of a glass while maintaining a low density, and without decreasing transmittance in the blue and UV region of the spectrum, can result in a decrease in the glass-forming ability of the material. For example, crystallization and/or liquid-liquid phase separation can occur during cooling of the glass melt at cooling rates that are generally acceptable in the industry. Typically, the decrease in glass-forming ability appears as the amount of certain species, such as $ZrO_2$, $Y_2O_3$, $Sc_2O_3$, BeO, etc. increases.

Low density, high refractive index glasses often belong to one of two types of chemical systems, based on the glass formers used: (a) silicoborate or borosilicate glasses in which $SiO_2$ and/or $B_2O_3$ are used as the main glass formers and (b) phosphate glasses in which $P_2O_5$ is used as a main glass former. Glasses which rely on other oxides as main glass formers, such as $GeO_2$, $TeO_2$, $Bi_2O_3$, and $V_2O_5$, can be challenging to use due to cost, glass-forming ability, optical properties, and/or production requirements.

Phosphate glasses can be characterized by a high refractive index and low density, however, phosphate glasses can be challenging to produce due to volatilization of $P_2O_5$ from the melts and/or risks of platinum incompatibility. In addition, phosphate glasses are often highly colored and may require an extra bleaching step to provide a glass having the desired transmittance characteristic.

Furthermore, phosphate glasses exhibiting a high refractive index also tend to have an increase in optical dispersion.

Silicoborate and borate glasses are typically easier to produce and can exhibit a high transmittance without a bleaching step. However, silicoborate and borosilicate glasses typically exhibit an increase in density at increasing refractive indices, compared to phosphate glasses.

In view of these considerations, there is a need for borate and silicoborate glasses having a high refractive index, a low density, and a high transmittance to blue light.

SUMMARY

According to an embodiment of the present disclosure, a glass comprises a plurality of components, the glass having a composition of the components comprising greater than or equal to 3.0 mol. % and less than or equal to 35.0 mol. % $WO_3$, greater than or equal to 0.3 mol. % and less than or equal to 50.0 mol. % $TiO_2$, greater than or equal to 0.3 mol. % and less than or equal to 50.0 mol. % $Nb_2O_5$, greater than or equal to 0.0 mol. % and less than or equal to 20.0 mol. % $Bi_2O_3$, greater than or equal to 0.0 mol. % and less than or equal to 10.0 mol. % $TeO_2$, greater than or equal to 0.0 mol. % and less than or equal to 5.0 mol. % PbO, greater than or equal to 0.0 mol. % and less than or equal to 3.0 mol. % $MoO_3$, greater than or equal to 0.0 mol. % and less than or equal to 1.0 mol. % $V_2O_5$, greater than or equal to 0.0 at. % and less than or equal to 5.0 at. % F, greater than or equal to 0.0 at. % and less than or equal to 1.0 at. % Cl, greater than or equal to 0.0 at. % and less than or equal to 1.0 at. % Br, greater than or equal to 0.0 at. % and less than or equal to 1.0 at. % I, greater than or equal to 0.6 mol. % and less than or equal to 60.0 mol. % $TiO_2+Nb_2O_5$ and may optionally contain one or more components selected from $Al_2O_3$, $B_2O_3$, BaO, CaO, $Gd_2O_3$, $GeO_2$, $K_2O$, $La_2O_3$, $Li_2O$, MgO, $Na_2O$, $P_2O_5$, $SiO_2$, SrO, $Ta_2O_5$, $Y_2O_3$, $Yb_2O_3$, ZnO and $ZrO_2$, wherein the glass has a liquidus temperature, $T_{liq}$ that is greater than or equal to 850° C. and less than or equal to 1350° C., and the glass satisfies the conditions: $1.92 \leq P_n \leq 2.08$ and $P_n-(1.437+0.0005*T_{liq})>0.00$, where $P_n$ is a refractive index parameter, calculated from the glass composition in terms of mol. % of the components according to the Formula (II):

$$P_n = -0.0051086*Al_2O_3 - 0.0049247*B_2O_3 - 0.00034289*BaO + 0.0086552*Bi_2O_3 - 0.0014511*CaO + 0.0047429*Gd_2O_3 - 0.0033126*GeO_2 - 0.0049544*K_2O + 0.0045475*La_2O_3 - 0.0023329*Li_2O - 0.0026561*MgO - 0.0035925*Na_2O + 0.0071165*Nb_2O_5 - 0.0075074*P_2O_5 + 0.0015814*PbO - 0.0043959*SiO_2 - 0.00086373*SrO + 0.0045915*Ta_2O_5 - 0.0015272*TeO_2 + 0.0020281*TiO_2 + 0.0012709*WO_3 + 0.0025878*Y_2O_3 + 0.0048156*Yb_2O_3 - 0.00047962*ZnO + 0.00090073*ZrO_2 + 1.955,$$  (II)

where a symbol "*" means multiplication.

According to another embodiment of the present disclosure, a glass comprises a plurality of components, the glass having a composition of the components comprising greater than or equal to 7.5 mol. % and less than or equal to 28.0 mol. % $TiO_2$, greater than or equal to 1.0 mol. % and less than or equal to 40.0 mol. % $B_2O_3$, greater than or equal to 0.3 mol. % and less than or equal to 19.5 mol. % $Nb_2O_5$, greater than or equal to 0.0 mol. % and less than or equal to 35.0 mol. % $WO_3$, greater than or equal to 0.0 mol. % and less than or equal to 25.0 mol. % $La_2O_3$, greater than or equal to 0.0 mol. % and less than or equal to 25.0 mol. % $Gd_2O_3$, greater than or equal to 0.0 mol. % and less than or equal to 20.0 mol. % $Bi_2O_3$, greater than or equal to 0.0 mol. % and less than or equal to 20.0 mol. % $ZrO_2$, greater than or equal to 0.0 mol. % and less than or equal to 20.0 mol. % $TeO_2$, greater than or equal to 0.0 mol. % and less than or equal to 13.5 mol. % $SiO_2$, greater than or equal to 0.0 mol. % and less than or equal to 10.0 mol. % $Al_2O_3$, greater than or equal to 0.0 mol. % and less than or equal to 10.0 mol. % ThO₂, greater than or equal to 0.0 mol. % and less than or equal to 10.0 mol. % GeO₂, greater than or equal to 0.0 mol. % and less than or equal to 10.0 mol. % Ta₂O₅, greater than or equal to 0.0 mol. % and less than or equal to 5.0 mol. % PbO, greater than or equal to 0.0 mol. % and less than or equal to 1.0 mol. % V₂O₅, greater than or equal to 0.0 at. % and less than or equal to 5.0 at. % F, greater than or equal to 0.0 at. % and less than or equal to 1.0 at. % Cl, greater than or equal to 0.0 at. % and less than or equal to 1.0 at. % Br, greater than or equal to 0.0 at. % and less than or equal to 1.0 at. % I, greater than or equal to 10.0 mol. % $RE_2O_3+ZrO_2+TiO_2+Nb_2O_5+WO_3$, less than or equal to 40.0 mol. % $WO_3+TiO_2$, less than or equal to 35.0 mol. % $TiO_2+Nb_2O_5$, greater than or equal to 0.0 mol. % and less than or equal to 5.0 mol. % $R_2O+RO$ and may optionally contain $P_2O_5$, wherein the composition of the components satisfies the conditions: $TiO_2-SiO_2$ [mol. %]≥7.5 and $B_2O_3+SiO_2-P_2O_5$[mol. %]≥0.00, and the glass satisfies the conditions: $1.9 \leq P_n \leq 2.1$ and $P_{ref}-(0.269-0.12*T_i)>0.00$, where $P_n$ is a refractive index parameter, calculated from the glass composition in terms of mol. % of the components according to the Formula (II):

$$P_n=-0.0051086*Al_2O_3-0.0049247*B_2O_3-\\0.00034289*BaO+0.0086552*Bi_2O_3-\\0.0014511*CaO+0.0047429*Gd_2O_3-\\0.0033126*GeO_2-0.0049544*K_2O+\\0.0045475*La_2O_3-0.0023329*Li_2O-\\0.0026561*MgO-0.0035925*Na_2O+\\0.0071165*Nb_2O_5-0.0075074*P_2O_5+\\0.0015814*PbO-0.0043959*SiO_2-\\0.00086373*SrO+0.0045915*Ta_2O_5-\\0.0015272*TeO_2+0.0020281*TiO_2+\\0.0012709*WO_3+0.0025878*Y_2O_3+\\0.0048156*Yb_2O_3-0.00047962*ZnO+\\0.00090073*ZrO_2+1.955, \quad (II)$$

$P_{ref}$ is a refraction parameter, calculated from the glass composition in terms of mol. % of the components according to the Formula (IV):

$$P_{ref}(cm^3/g)=0.000087034*SiO_2-0.00012035*B_2O_3-\\0.0012566*La_2O_3+0.0011411*TiO_2-\\0.00031654*ZnO+0.000088066*CaO+\\0.0020444*Nb_2O_5-0.00023383*MgO-\\0.00086501*BaO-0.0004486*WO_3-\\0.0014114*Gd_2O_3-0.00023872*Y_2O_3-\\0.00031575*Ta_2O_5+0.00011894*Li_2O+\\0.00027178*Al_2O_3-0.000099802*Na_2O-\\0.00028391*GeO_2-0.00030531*SrO-\\0.00072061*Bi_2O_3-0.0010964*Yb_2O_3+\\0.00022839*K_2O-0.00086617*PbO+\\0.00027129*TeO_2+0.198, \quad (IV)$$

$T_i$ is a value of transmittance index, calculated from the glass composition in terms of mol. % of the components according to the Formula (I):

$$T_i=(La_2O_3+Gd_2O_3+ZrO_2+WO_3)/(La_2O_3+Gd_2O_3+\\ZrO_2+WO_3+TiO_2+Nb_2O_5), \quad (I)$$

where $RE_2O_3$ is a total sum of rare earth metal oxides in trivalent equivalent, $R_2O$ is a total sum of monovalent metal oxides, RO is a total sum of divalent metal oxides, and an asterisk (*) means multiplication.

According to one more embodiment of the present disclosure, a glass comprises a plurality of components, the glass having a composition of the components comprising greater than or equal to 1.0 mol. % and less than or equal to 40.0 mol. % $WO_3$, greater than or equal to 0.3 mol. % and less than or equal to 20.0 mol. % $ZrO_2$, greater than or equal to 0.0 mol. % and less than or equal to 40.0 mol. % $B_2O_3$, greater than or equal to 0.0 mol. % and less than or equal to 35.0 mol. % $La_2O_3$, greater than or equal to 0.0 mol. % and less than or equal to 35.0 mol. % $Bi_2O_3$, greater than or equal to 0.0 mol. % and less than or equal to 35.0 mol. % ZnO, greater than or equal to 0.0 mol. % and less than or equal to 25.0 mol. % $Ta_2O_5$, greater than or equal to 0.0 mol. % and less than or equal to 10.0 mol. % $Al_2O_3$, greater than or equal to 0.0 mol. % and less than or equal to 10.0 mol. % $ThO_2$, greater than or equal to 0.0 mol. % and less than or equal to 10.0 mol. % $TeO_2$, greater than or equal to 0.0 mol. % and less than or equal to 5.0 mol. % $V_2O_5$, greater than or equal to 10.0 mol. % $RE_2O_3+ZrO_2+TiO_2+Nb_2O_5+WO_3$, greater than or equal to 0.0 mol. % and less than or equal to 35.0 mol. % $TiO_2+Nb_2O_5$, greater than or equal to 0.0 mol. % and less than or equal to 4.8 mol. % $SiO_2+GeO_2$ and may optionally contain one or more components selected from $P_2O_5$, BaO, CaO, $K_2O$, $Li_2O$, MgO, $Na_2O$, PbO and SrO, wherein the composition of the components satisfies the condition: $B_2O_3+SiO_2-P_2O_5$[mol. %]≥0.50, and the glass satisfies the conditions: $500 \leq P_{Tg} \leq 700$, $P_d<6.0$ and $P_n-(1.571+0.083*P_d)>0.00$, where $P_n$ is a refractive index parameter, calculated from the glass composition in terms of mol. % according to the Formula (II):

$$P_n=-0.0051086*Al_2O_3-0.0049247*B_2O_3-\\0.00034289*BaO+0.0086552*Bi_2O_3-\\0.0014511*CaO+0.0047429*Gd_2O_3-\\0.0033126*GeO_2-0.0049544*K_2O+\\0.0045475*La_2O_3-0.0023329*Li_2O-\\0.0026561*MgO-0.0035925*Na_2O+\\0.0071165*Nb_2O_5-0.0075074*P_2O_5+\\0.0015814*PbO-0.0043959*SiO_2-\\0.00086373*SrO+0.0045915*Ta_2O_5-\\0.0015272*TeO_2+0.0020281*TiO_2+\\0.0012709*WO_3+0.0025878*Y_2O_3+\\0.0048156*Yb_2O_3-0.00047962*ZnO+\\0.00090073*ZrO_2+1.955, \quad (II)$$

$P_d$ is a density parameter, calculated from the glass composition in terms of mol. % of the components according to the Formula (III):

$$P_d(g/cm^3)=4.95-0.036300*Al_2O_3-0.028364*B_2O_3+\\0.010786*BaO+0.077280*Bi_2O_3-\\0.0047086*CaO+0.060989*Er_2O_3+\\0.067356*Gd_2O_3-0.024973*K_2O+\\0.050388*La_2O_3-0.015411*Li_2O-\\0.014318*Na_2O-0.0016283*Nb_2O_5+\\0.078354*Nd_2O_3-0.045034*P_2O_5+\\0.037463*PbO-0.026153*SiO_2-\\0.0079191*TeO_2-0.015844*TiO_2+\\0.020220*WO_3+0.016362*Y_2O_3+\\0.058765*Yb_2O_3+0.0086588*ZnO+\\0.0043754*ZrO_2, \quad (III)$$

$P_{Tg}$ is a $T_g$ parameter, calculated from the glass composition in terms of mol. % of the components according to the Formula (V):

$$P_{Tg}(°C.)=595.358-0.63217*B_2O_3-0.46552*SiO_2+\\1.1849*TiO_2+0.59610*Nb_2O_5-1.6293*WO_3+\\1.3877*ZrO_2+4.4090*La_2O_3+4.1695*Y_2O_3-\\5.0756*Bi_2O_3+0.55630*CaO-5.3892*PbO-\\4.2774*TeO_2+1.8497*Al_2O_3-0.40659*GeO_2-\\1.7011*ZnO-4.1520*Li_2O+3.0777*Gd_2O_3, \quad (V)$$

where $RE_2O_3$ is a total sum of rare earth metal oxides in trivalent equivalent, and an asterisk (*) means multiplication.

These and other aspects, objects, and features of the present disclosure will be understood and appreciated by those skilled in the art upon studying the following specification, claims, and appended drawings.

and the minimum wavelength corresponding to a total transmittance of at least 70% for a glass sample having a thickness of 10 mm ($\lambda_{70\%}$) for some comparative glasses.

Figure 2:
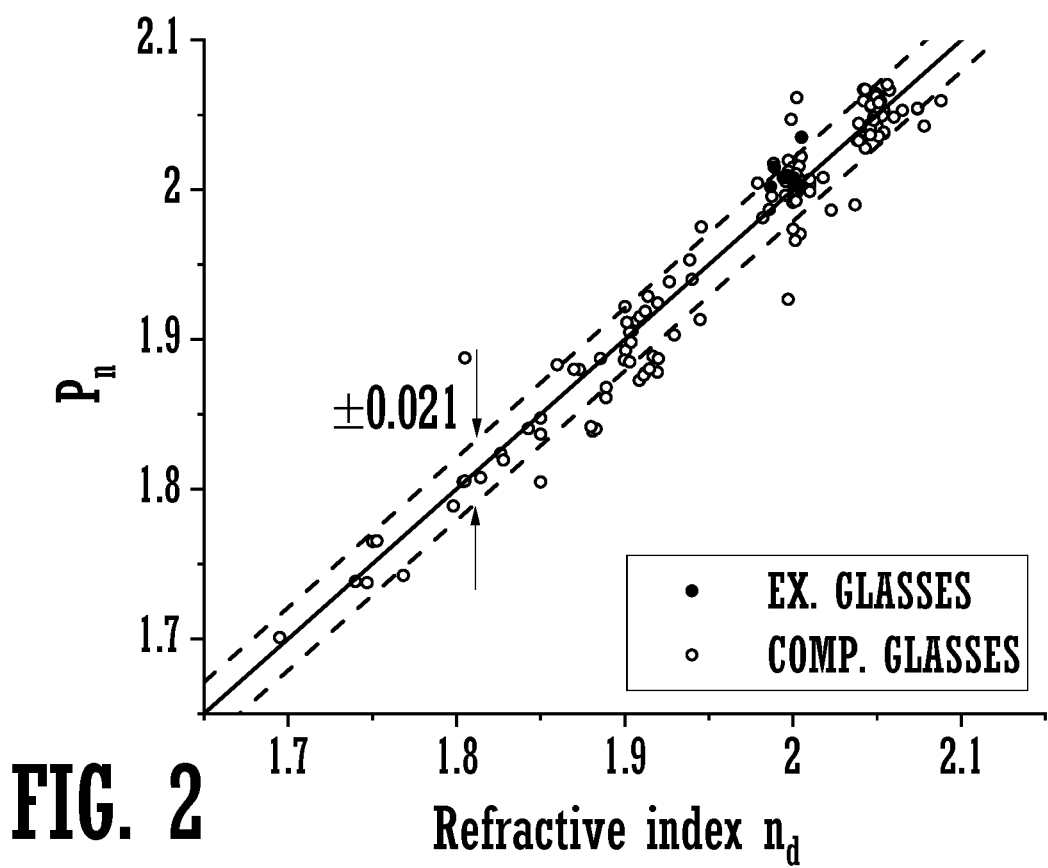

FIG. 2 is a plot illustrating the relationship between the refractive index $n_d$ and the refractive index parameter $P_n$ calculated by formula (II) for some Comparative Glasses and some Exemplary Glasses according to an embodiment of the present disclosure.

Figure 3:
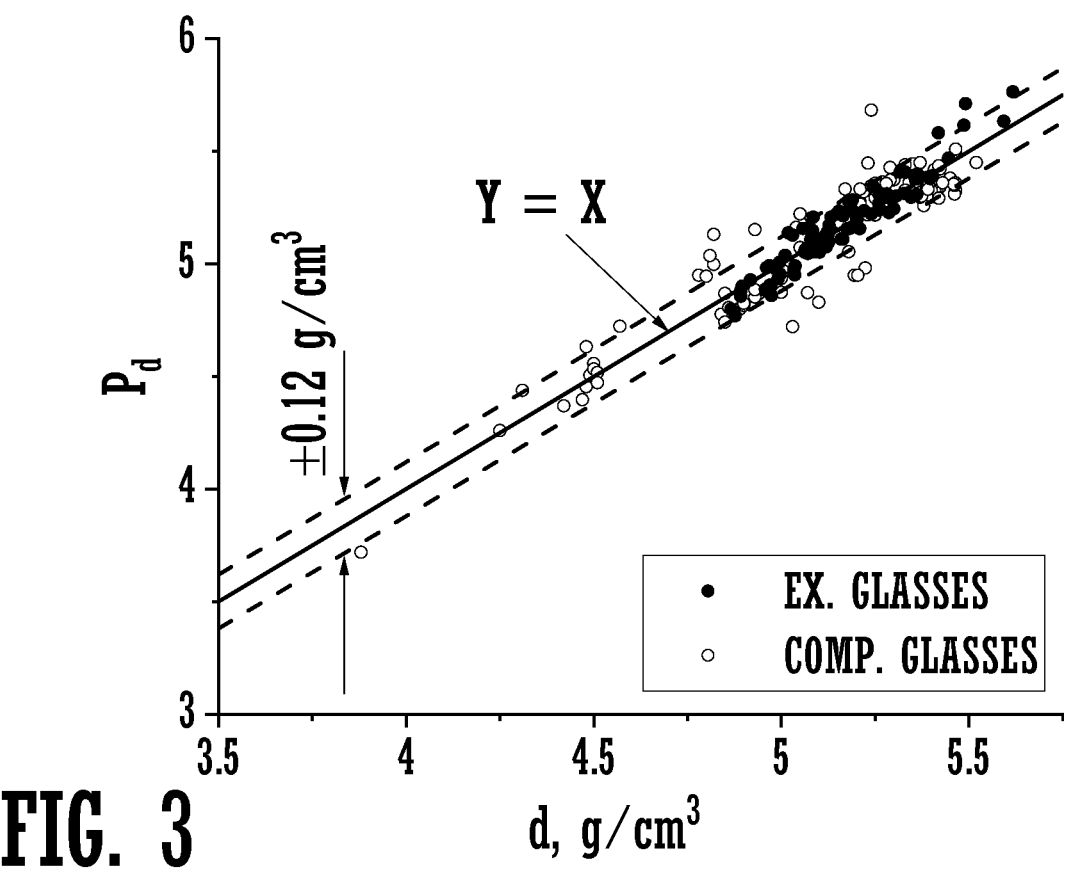

FIG. 3 is a plot illustrating the relationship between the density at room temperature $d_{RT}$ and the density parameter $P_d$ calculated by formula (III) for some Comparative Glasses and some Exemplary Glasses according to an embodiment of the present disclosure.

Figure 4:
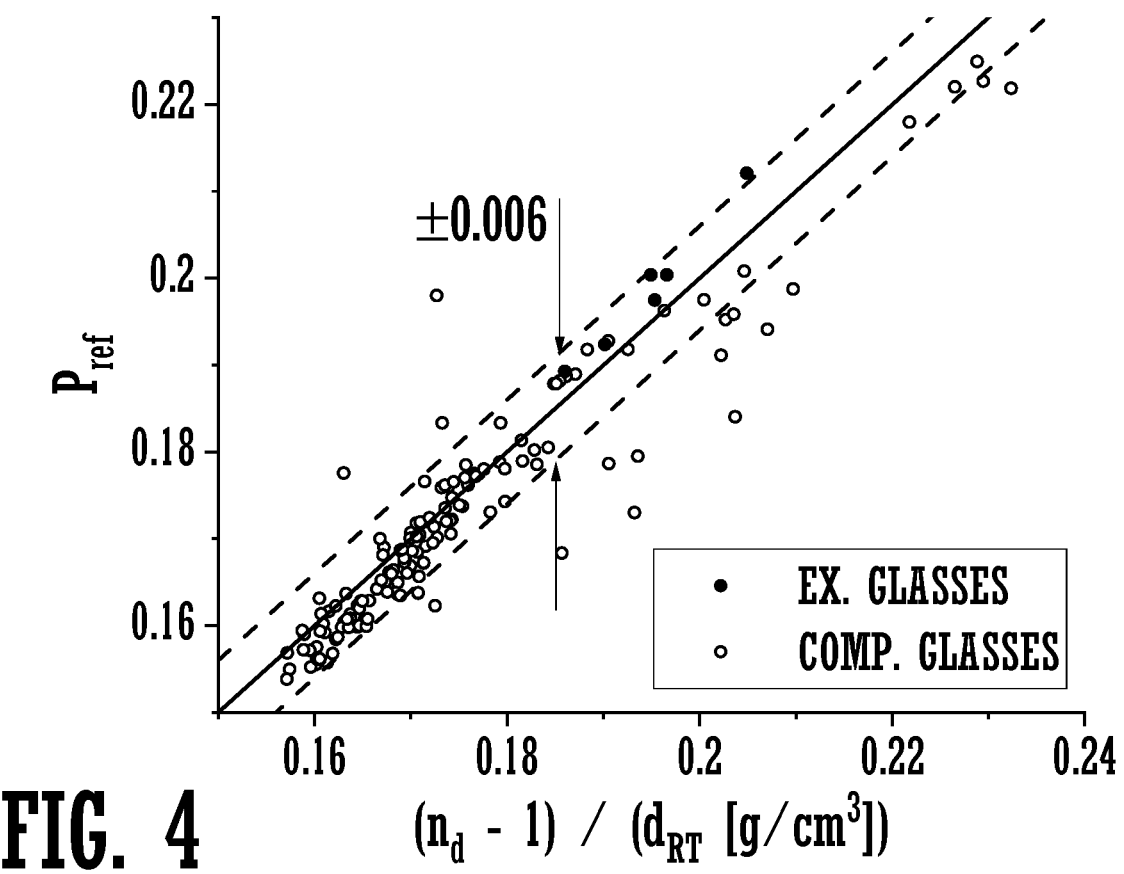

FIG. 4 is a plot illustrating the relationship between the refraction $(n_d-1)/d_{RT}$ and the refraction parameter $P_{ref}$ calculated by formula (IV) for some Comparative Glasses and some Exemplary Glasses according to an embodiment of the present disclosure.

Figure 5:
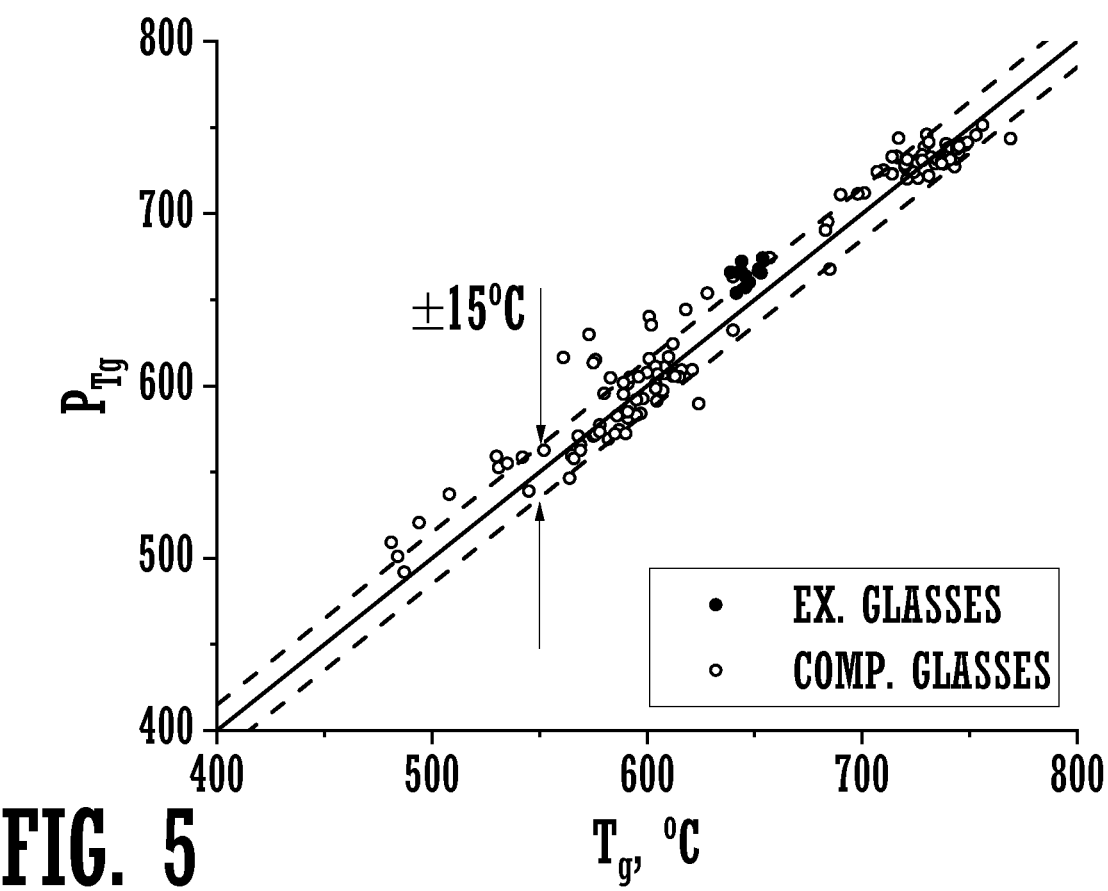

FIG. 5 is a plot illustrating the relationship between the glass transition temperature $T_g$ and the $T_g$ parameter $P_{Tg}$ calculated by formula (V) for some Comparative Glasses and some Exemplary Glasses according to an embodiment of the present disclosure.

Figure 6:
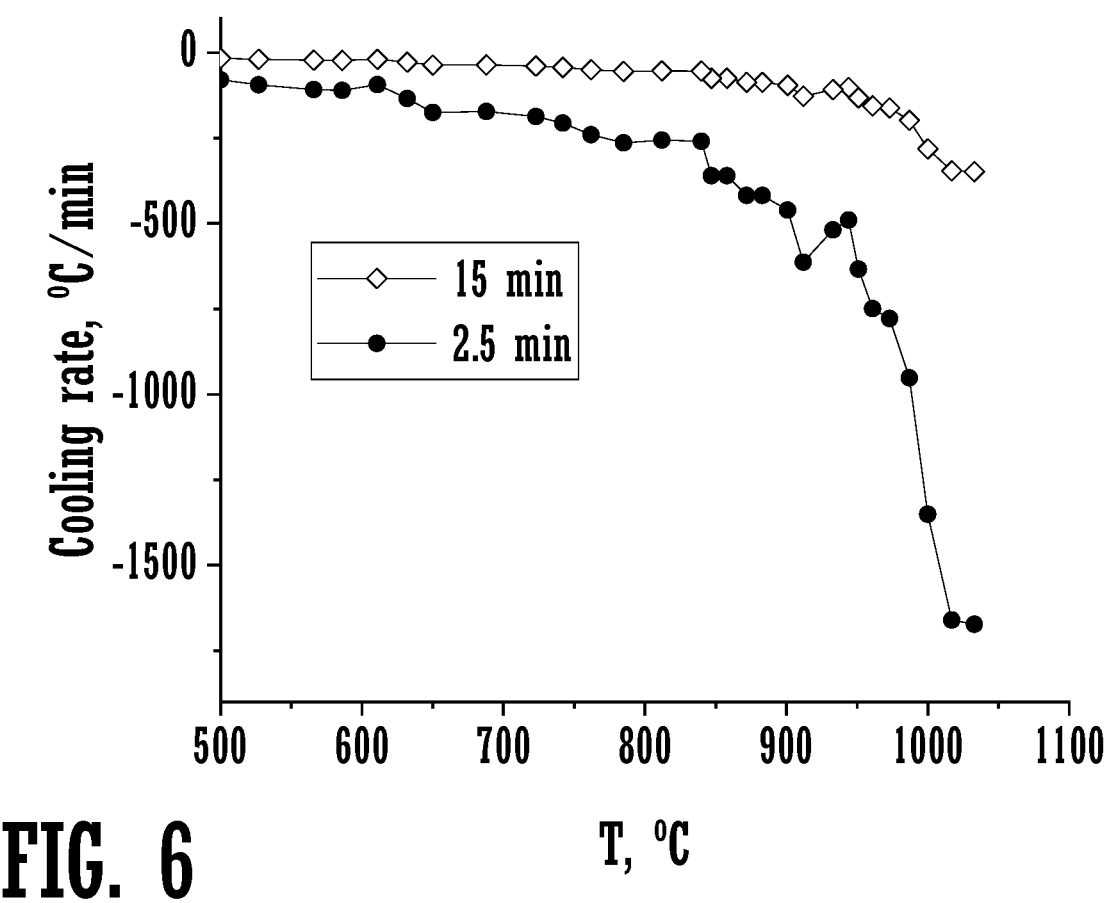

FIG. 6 is a plot of an exemplary cooling schedule according to a "15 min test" condition and a "2.5 min test" condition for some Exemplary Glasses according to an embodiment of the present disclosure.

Figure 7:
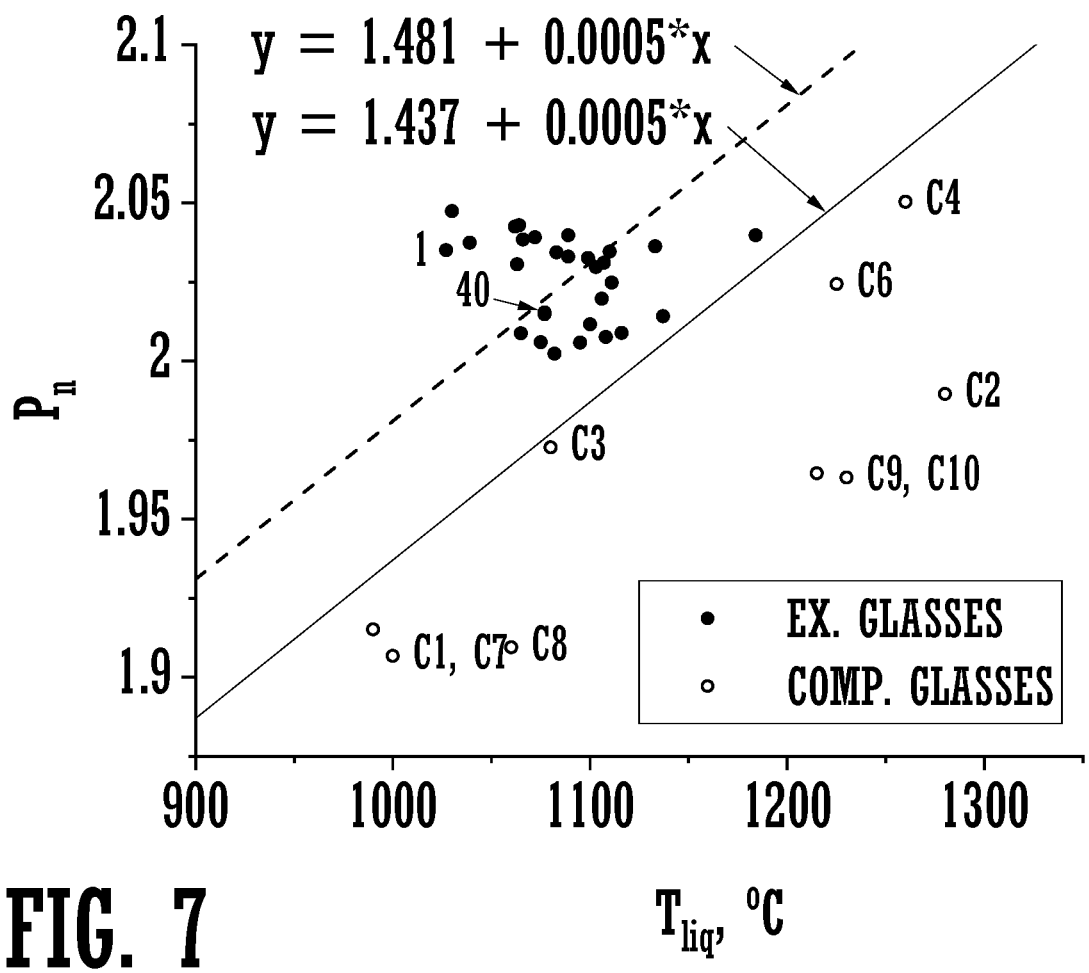

FIG. 7 is a plot illustrating the relationship between the liquidus temperature $T_{liq}$ and the refractive index parameter $P_n$ for some Comparative Glasses and some Exemplary Glasses according to an embodiment of the present disclosure.

Figure 8:
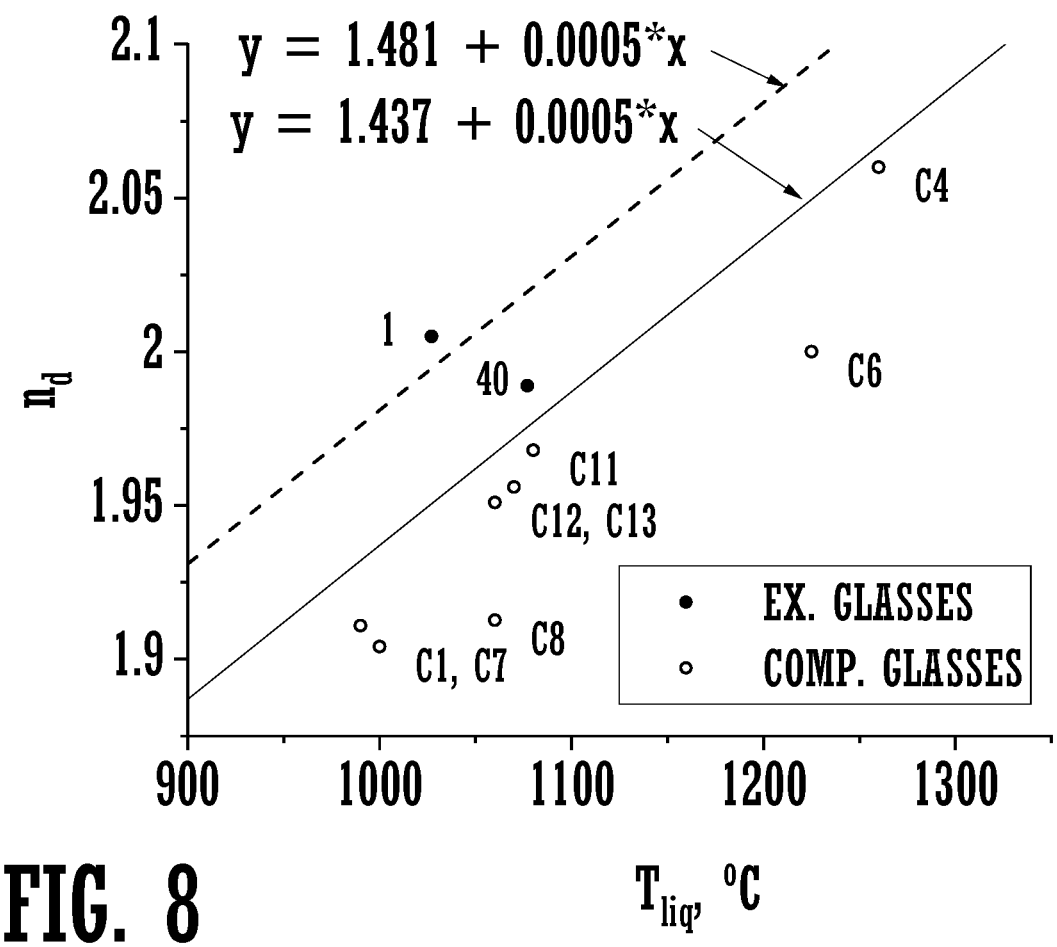

FIG. 8 is a plot illustrating the relationship between the liquidus temperature $T_{liq}$ and the refractive index $n_d$ for some Comparative Glasses and some Exemplary Glasses according to an embodiment of the present disclosure.

Figure 9:
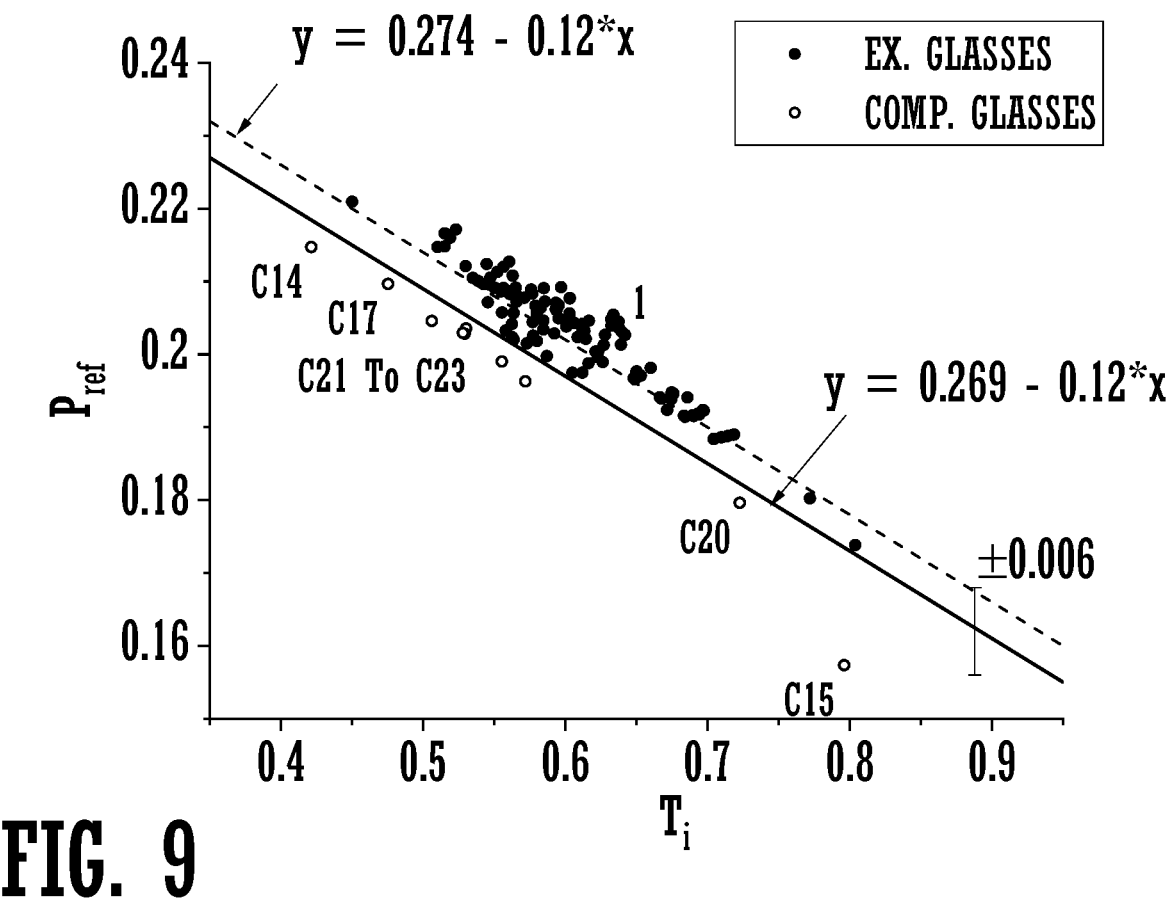

FIG. 9 is a plot illustrating the relationship between the transmittance index $T_i$ and the refraction parameter $P_{ref}$ for some Comparative Glasses and some Exemplary Glasses according to an embodiment of the present disclosure.

Figure 10:
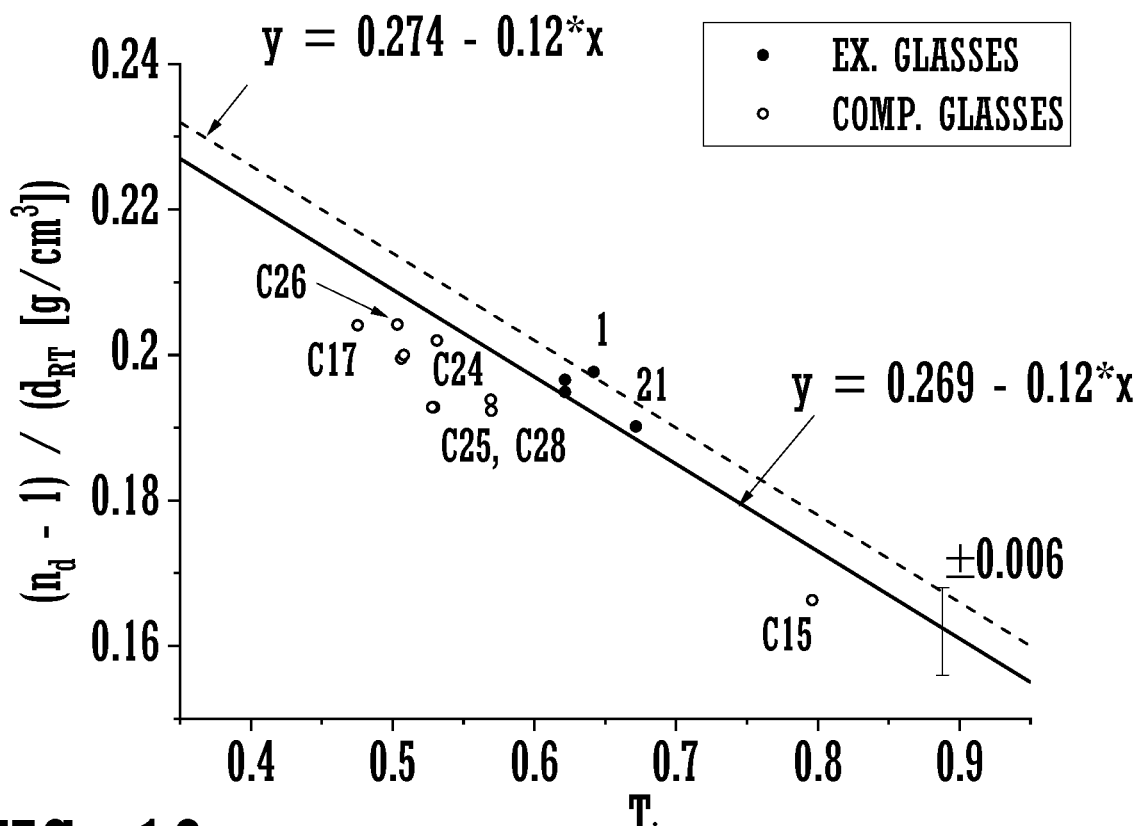

FIG. 10 is a plot illustrating the relationship between the transmittance index $T_i$ and the refractive index to density ratio ("refraction") $(n_d-1)/d_{RT}$ for some Comparative Glasses and some Exemplary Glasses according to an embodiment of the present disclosure.

Figure 11:
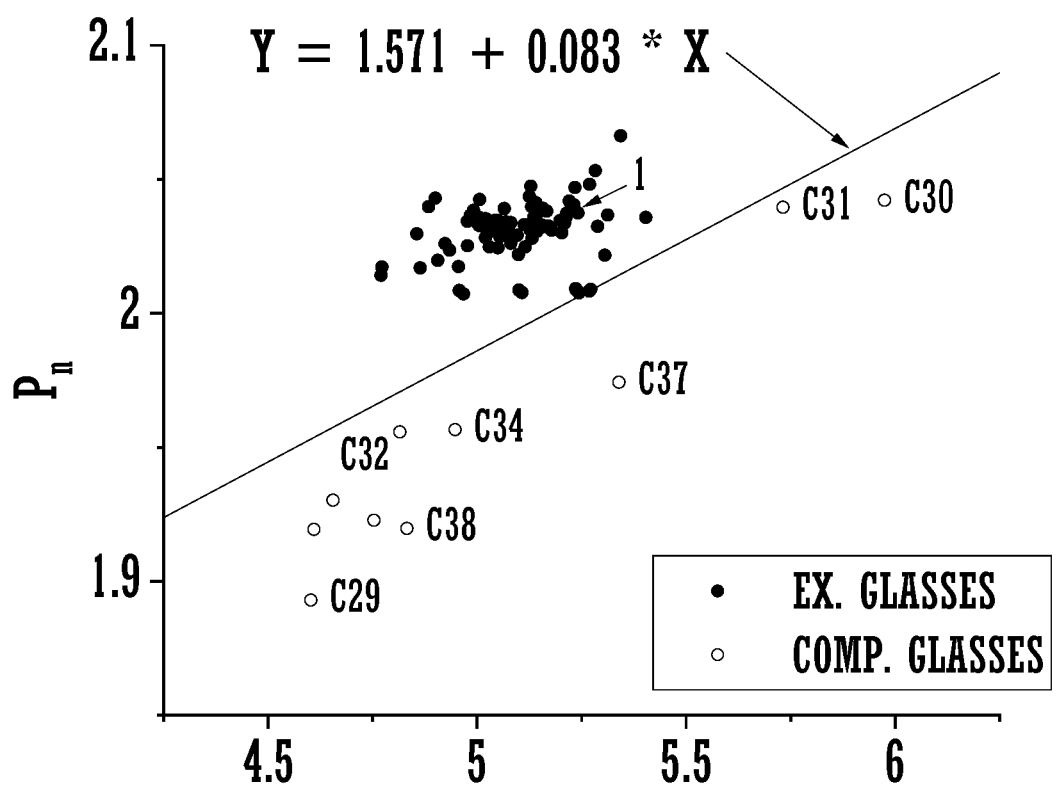

FIG. 11 is a plot illustrating the relationship between the density parameter $P_d$ and the refractive index parameter $P_n$ for some Comparative Glasses and some Exemplary Glasses according to an embodiment of the present disclosure.

Figure 12:
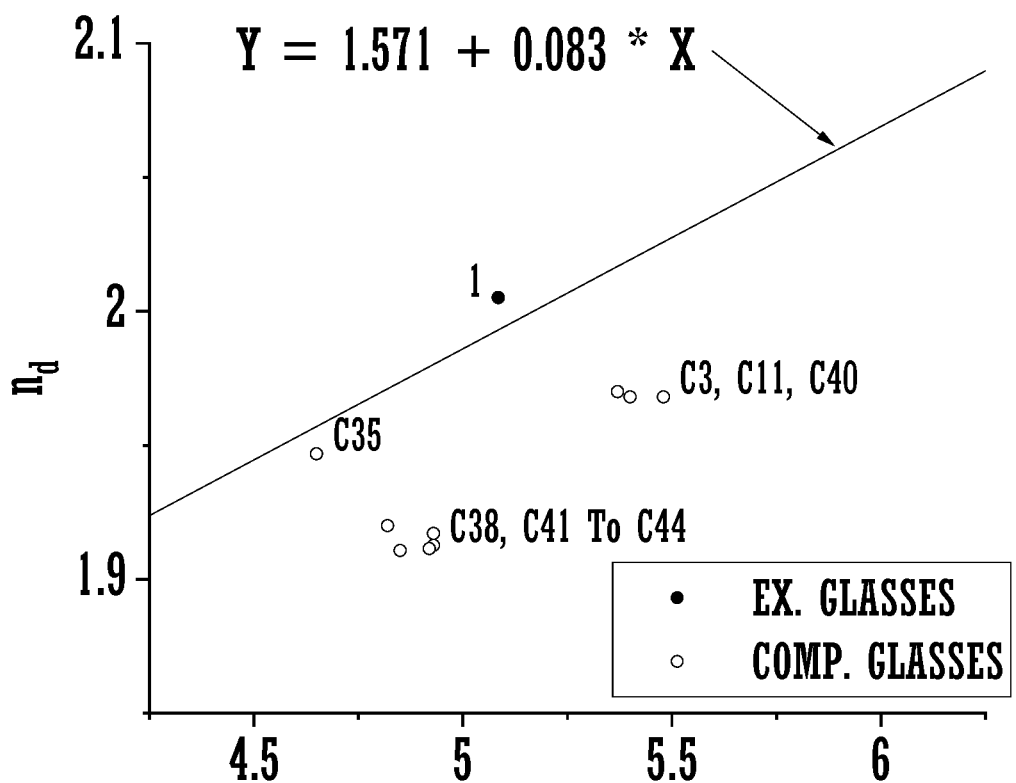

FIG. 12 is a plot illustrating the relationship between the density at room temperature $d_{RT}$ and the refractive index at 587.56 nm $n_d$ for some Comparative Glasses and some Exemplary Glasses according to an embodiment of the present disclosure.

Figure 13:
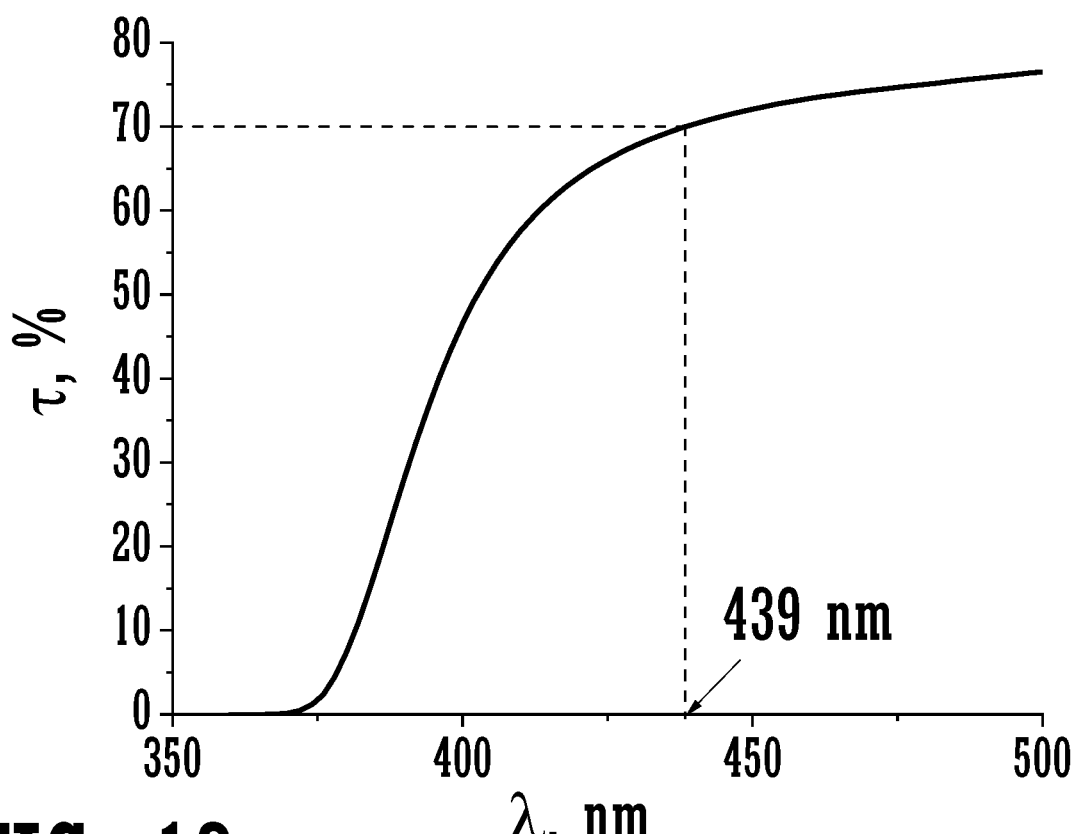

FIG. 13 illustrates the transmittance spectra for an exemplary glass according to an embodiment of the present disclosure.

DETAILED DESCRIPTION

In the following detailed description, for purposes of explanation and not limitation, example embodiments disclosing specific details are set forth to provide a thorough understanding of various principles of the present disclosure. However, it will be apparent to one having ordinary skill in the art, having had the benefit of the present disclosure, that the present disclosure may be practiced in other embodiments that depart from the specific details disclosed herein. Moreover, descriptions of well-known devices, methods and materials may be omitted so as not to obscure the description of various principles of the present disclosure. Finally, wherever applicable, like reference numerals refer to like elements.

Unless otherwise expressly stated, it is in no way intended that any method set forth herein be construed as requiring that its steps be performed in a specific order. Accordingly, where a method claim does not actually recite an order to be followed by its steps, or it is not otherwise specifically stated in the claims or descriptions that the steps are to be limited to a specific order, it is in no way intended that an order be inferred, in any respect. This holds for any possible non-express basis for interpretation, including, without limitation, matters of logic with respect to arrangement of steps or operational flow; plain meaning derived from grammatical organization or punctuation; the number or type of embodiments described in the specification.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

Modifications of the disclosure will occur to those skilled in the art and to those who make or use the disclosure. Therefore, it is understood that the embodiments shown in the drawings and described above are merely for illustrative purposes and not intended to limit the scope of the disclosure, which is defined by the following claims, as interpreted according to the principles of patent law, including the doctrine of equivalents.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those skilled in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The term "formed from" can mean one or more of comprises, consists essentially of, or consists of. For example, a component that is formed from a particular material can comprise the particular material, consist essentially of the particular material, or consist of the particular material.

The terms "free" and "substantially free" are used interchangeably herein to refer to an amount and/or an absence of a particular component in a glass composition that is not intentionally added to the glass composition. It is understood that the glass composition may contain traces of a particular constituent component as a contaminant or a tramp in an amount of less than 0.10 mol %.

As used herein, the term "tramp", when used to describe a particular constituent component in a glass composition, refers to a constituent component that is not intentionally added to the glass composition and is present in an amount of less than 0.05 mol %. Tramp components may be unintentionally added to the glass composition as an impurity in another constituent component and/or through migration of the tramp component into the composition during processing of the glass composition.

The symbol "*" means multiplication when used in any formula herein.

Unless otherwise specified, the term "glass" is used to refer to a glass made from a glass composition disclosed herein.

The term "glass former" is used herein to refer to a component that, being solely present in the glass composition (i.e., without other components, except for tramps), is able to form a glass when cooling the melt at a rate of not greater than about 200° C./min to about 300° C./min.

The term "modifier", as used herein, refers to the oxides of monovalent or divalent metals, i.e., $R_2O$ or RO, where "R" stands for a cation. Modifiers can be added to a glass composition to change the atomic structure of the melt and the resulting glass. In some embodiments, the modifier may change the coordination numbers of cations present in the glass formers (e.g., boron in $B_2O_3$), which may result in forming a more polymerized atomic network and, as a result, may provide better glass formation.

As used herein, the term "RO" refers to a total content of divalent metal oxides, the term "$R_2O$" refers to a total content of monovalent metal oxides, and the term "$Alk_2O$" refers to a total content of alkali metal oxides. The term $R_2O$ encompasses alkali metal oxides ($Alk_2O$), in addition to other monovalent metal oxides, such as $Ag_2O$, $Tl_2O$, and $Hg_2O$, for example. As discussed below, in the present disclosure, a rare earth metal oxide is referred to herein by its normalized formula ($RE_2O_3$) in which the rare earth metal has the redox state "+3," and thus rare earth metal oxides are not encompassed by the term RO.

As used herein, the term "rare earth metals" refers to the metals listed in the Lanthanide Series of the IUPAC Periodic Table, plus yttrium and scandium. As used herein, the term "rare earth metal oxides," is used to refer to the oxides of rare earth metals in different redox states, such as "+3" for lanthanum in $La_2O_3$, "+4" for cerium in $CeO_2$, "+2" for europium in EuO, etc. In general, the redox states of rare earth metals in oxide glasses may vary and, in particular, the redox state may change during melting, based on the batch composition and/or the redox conditions in the furnace where the glass is melted and/or heat-treated (e.g., annealed). Unless otherwise specified, a rare earth metal oxide is referred to herein by its normalized formula in which the rare earth metal has the redox state "+3." Accordingly, in the case in which a rare earth metal having a redox state other than "+3" is added to the glass composition batch, the glass compositions are recalculated by adding or removing some oxygen to maintain the stoichiometry. For example, when $CeO_2$ (with cerium in redox state "+4") is used as a batch component, the resulting as-batched composition is recalculated assuming that two moles of $CeO_2$ is equivalent to one mole of $Ce_2O_3$, and the resulting as-batched composition is expressed in terms of $Ce_2O_3$. As used herein, the term "$RE_mO_n$" is used to refer to the total content of rare earth metal oxides in all redox states present in the as-batched composition, and the term "$RE_2O_3$" is used to refer to the total content of rare earth metal oxides in the as-batched composition when recalculated to "+3" redox state. The term "$RE_2O_3$" is also specified herein as "trivalent equivalent".

Unless otherwise specified, all compositions are expressed in terms of as-batched mole percent (mol %). References to "composition" or "glass composition" thus refer to composition expressed in terms of mol. % in the as-batched state. As will be understood by those having ordinary skill in the art, various melt constituents (e.g., fluorine, alkali metals, boron, etc.) may be subject to different levels of volatilization (e.g., as a function of vapor pressure, melt time and/or melt temperature) during melting of the constituents. As such, the term "about," in relation to such constituents, is intended to encompass values within about 0.2 mol % when measuring final articles as compared to the as-batched compositions provided herein. With the forgoing in mind, substantial compositional equivalence between final articles and as-batched compositions is expected. In some embodiments, where indicated, the compositions may be expressed in terms of as-batched percent by weight of oxides (wt %).

Oxides and other constituents of the glass are referred to as "components". Expressions combining components with the mathematical symbols "+" and "−" refer to sums and differences, respectively, of the as-batched composition of the components expressed in mol. %. For example, the expression "$SiO_2+GeO_2$" or the expression "$SiO_2+GeO_2$ [mol. %]" means the sum of the components $SiO_2$ and $GeO_2$, each expressed in mol. %, in the as-batched composition. In another example, the expression "$B_2O_3+SiO_2-P_2O_5$" or the expression "$B_2O_3+SiO_2-P_2O_5$[mol. %]" means the sum of the components $B_2O_3+SiO_2$ less the component $P_2O_5$, each expressed in mol. %, in the as-batched composition. If the expression is preceded by an amount, the amount refers to the combined as-batched compositions of the components listed in the expression. For example, the expression "4.8 mol. % $SiO_2+GeO_2$" means that the combined amount of the components $SiO_2$ and $GeO_2$ in the as-batched composition is 4.8 mol. % and the expression "less than or equal to 4.8 mol. % $SiO_2+GeO_2$" means that the combined amount of the components of $SiO_2$ and $GeO_2$ in the as-batched composition is less than or equal to 4.8 mol. %.

In the case when fluorine or other halogen (chlorine, bromine, and/or iodine) is added to or is present in an oxide glass, the molecular representation of the resulting as-batched composition may be expressed in different ways. In the present disclosure, the content of a halogen as a component, when present, is expressed in terms of atomic percent (at. %), which is determined based on the fraction of the halogen in a total sum of all atoms in the as-batched composition multiplied by a factor of 100.

In the present disclosure, the following method of representation of fluorine-containing compositions and concentration ranges is used. The concentration limits for all oxides (e.g. $SiO_2$, $B_2O_3$, $Na_2O$, etc.) are presented under the assumption that the respective cations (such as, for example, silicon [$Si_4^+$], boron [$B_3^+$], sodium [$Na^+$], etc.) are initially presented in the form of the corresponding oxides.

When fluorine is present as a sole halogen, for the purposes of calculating the concentration of components of the as-batched composition, some part of the oxygen in the oxide is equivalently replaced with fluorine (i.e. one atom of oxygen is replaced with two atoms of fluorine). The fluorine is assumed to be present in the form of silicon fluoride ($SiF_4$); accordingly, the total sum of all oxides plus $SiF_4$ is assumed to be 100 mole percent or 100 weight percent in all compositions. Analogous treatment of other halogens as sole halogens or combinations of halogens applies.

The measured density values for the glasses reported herein were measured at room temperature in units of g/cm³ by the Archimedes method in water with an uncertainty of 0.001 g/cm$^3$. As used herein, density measurements at room temperature (specified as $d_{RT}$) are indicated as being measured at 20° C. or 25° C., and encompass measurements obtained at temperatures that may range from 20° C. to 25° C. It is understood that room temperature may vary between about 20° C. to about 25° C., however, for the purposes of the present disclosure, the variation in density within the temperature range of 20° C. to 25° C. is expected to be less than the uncertainty of 0.001 g/cm$^3$, and thus is not expected to impact the room temperature density measurements reported herein.

As used herein, the term "refraction" refers to the relationship of the refractive index to the density according to the ratio: $(n_d-1)/d_{RT}$, where the refractive index $n_d$ is measured at 587.56 nm and the density $d_{RT}$ is measured in g/cm$^3$ at room temperature. The ratio $(n_d-1)/d_{RT}$, or refraction, may characterize the relationship between the refractive index $n_d$ and the density $d_{RT}$. The higher the refraction value, the higher the refractive index is at a given density.

As used herein, good glass forming ability refers to a resistance of the melt to devitrification as the melt cools. Glass forming ability can be measured by determining the critical cooling rate of the melt. The terms "critical cooling rate" or "$v_{cr}$" are used herein to refer to the minimum cooling rate at which a melt of a given composition forms a glass free of crystals visible under an optical microscope under magnification from 100× to 500×. The critical cooling rate can be used to measure the glass-forming ability of a composition, i.e., the ability of the melt of a given glass composition to form glass when cooling. Generally speaking, the lower the critical cooling rate, the better the glass-forming ability.

The term "liquidus temperature" is used herein to refer to a temperature above which the glass composition is completely liquid with no crystallization of constituent components of the glass. The liquidus temperature values reported herein were obtained by measuring samples using either DSC or by isothermal hold of samples wrapped in platinum foil or in thermal gradient test in a platinum boat. For samples measured using DSC, powdered samples were heated at 10 K/min to 1250° C. The end of the endothermal event corresponding to the melting of crystals was taken as the liquidus temperature. For the second technique (isothermal hold), a glass block (about 1 cm$^3$) was put in platinum foil and placed in a furnace at a given temperature for 4 hours to 24 hours. The glass block was then observed under an optical microscope to check for crystals. For the third technique (thermal gradient test), about 10 g of glass cullet was placed in a thin platinum boat and placed in a furnace at a given temperature for 4 hours to 24 hours. The glass block was then observed by a naked eye to check for crystals. For some of Exemplary Glasses of the present disclosure, several different tests were used to determine the liquidus temperature, and they provided essentially the same results.

As used herein, unless otherwise specified, the term "internal transmittance" or $\tau_{int}$ is used to refer to the transmittance through a glass sample that is corrected for Fresnel losses. The term "total transmittance" or $\tau$ is used to refer to transmittance values for which Fresnel losses are not accounted for. Total transmittance of the glass samples were measured on samples with two or three different thicknesses using a Cary 5000 Spectrometer at wavelengths of from 250 nm to 2500 nm, at a resolution of 1 nm, and using an integrating sphere. The internal transmittance values for 10 mm thick samples was calculated between 375 nm and 1175 nm using the measured refractive index and the measured total transmittance at those said different thicknesses. The total transmittance considers the loss by reflection of light on the surface of the sample. The wavelengths corresponding to specific values of total transmittance, such as, for example, 5% or 70%, are represented as $\lambda$ with corresponding subscripts, such as $\lambda_{5\%}$ and $\lambda_{70\%}$, respectively.

The refractive index values reported herein were measured at room temperature (about 25° C.), unless otherwise specified. The refractive index values for a glass sample were measured using a Metricon Model 2010 prism coupler refractometer with an uncertainty of about ±0.0002. Using the Metricon, the refractive index of a glass sample was measured at two or more wavelengths of about 406 nm, 473 nm, 532 nm, 633 nm, 828 nm, and 1064 nm. The measured dependence characterizes the dispersion and was then fitted with a Cauchy's law equation or Sellmeier equation to allow for calculation of the refractive index of the sample at a given wavelength of interest between the measured wavelengths. The term "refractive index $n_d$" or "$n_d$" is used herein to refer to a refractive index calculated as described above at a wavelength of 587.56 nm, which corresponds to the helium d-line wavelength. The term "refractive index $n_C$" or "$n_C$" is used herein to refer to a refractive index calculated as described above at a wavelength of 656.3 nm. The term "refractive index $n_F$" or "$n_F$" is used herein to refer to a refractive index calculated as described above at a wavelength of 486.1 nm.

The term "refractive index $n_g$" or "n," is used herein to refer to a refractive index calculated as described above at a wavelength of 435.8 nm.

As used herein, the terms "high refractive index" or "high index" refer to a refractive index value of a glass that is greater than or equal to 1.80, unless otherwise indicated. Where indicated, embodiments of the terms "high refractive index" or "high index" refer to a refractive index value of a glass that is greater than or equal to 1.85, greater than or equal to 1.90, or greater than or equal to 1.95, or greater than or equal to 2.00.

The terms "dispersion" and "optical dispersion" are used interchangeably to refer to a difference or ratio of the refractive indices of a glass sample at predetermined wavelengths. One numerical measure of optical dispersion reported herein is the Abbe number, which can be calculated by the formula: $v_x=(n_x-1)/(n_F-n_C)$, where "x" in the present disclosure stands for one of the commonly used wavelengths (for example, 587.56 nm [d-line] for $v_d$ or 589.3 nm [D-line] for $V_D$), $n_x$ is the refractive index at this wavelength (for example, $n_d$ for $v_d$ and $n_D$ for $v_D$), and $n_F$ and $n_C$ are refractive indices at the wavelengths 486.1 nm (F-line) and 656.3 nm (C-line), respectively. The numerical values of $v_d$ and $v_D$ differ very slightly, mostly within ±0.1% to ±0.2%. A higher Abbe number corresponds to a lower optical dispersion.

The numerical value for an Abbe number corresponding to "high dispersion" or "low dispersion" may vary depending on the refractive indices for which the Abbe number is calculated. In some cases, an Abbe number corresponding to "low dispersion" for a high refractive index glass may be lower than an Abbe number corresponding to "low dispersion" for a low refractive index glass. In other words, as the calculated refractive index value increases, the value of the Abbe number corresponding to low dispersion decreases. The same relates to "high dispersion" as well.

The term "$\alpha$," or "$\alpha_{20-300}$," as used herein, refers to the average coefficient of linear thermal expansion (CTE) of the glass composition over a temperature range from 20° C. to 300° C. This property is measured by using a horizontal dilatometer (push-rod dilatometer) in accordance with ASTM E228-11.

The numeric measure of α is a linear average value in a specified temperature range (e.g., 20° C. to 300° C.) expressed as $\alpha = \Delta L/(L_0 \Delta T)$, where $L_0$ is the linear size of a sample at room temperature, and L is the change in the linear size ($\Delta L$) in the measured temperature range $\Delta T$.

The Young's elastic modulus E and the Poisson's ratio μ are measured by using Resonant Ultrasound Spectroscopy, using a Quasar RUSpec 4000 available from ITW Indiana Private Limited, Magnaflux Division.

The glass transition temperature ($T_g$) is measured by differential scanning calorimeter (DSC) at the heating rate of 10 K/min after cooling in air.

The term "annealing point," as used herein, refers to the temperature determined according to ASTM C598-93 (2013), at which the viscosity of a glass of a given glass composition is approximately 1013.2 poise.

Glass composition may include boron oxide ($B_2O_3$). According to some embodiments of the present disclosure, boron oxide may play a role of a glass former. As a glassformer, $B_2O_3$ may help to increase the liquidus viscosity and, therefore, protect a glass composition from crystallization. However, adding $B_2O_3$ to a glass composition may cause liquid-liquid phase separation, which may cause devitrification and/or reducing the transmittance of the resulting glass. Also, adding $B_2O_3$ to the high-index glasses reduces the refractive index. Accordingly, the amount of boron oxide in glasses of the present disclosure is limited, or glasses may be substantially free of $B_2O_3$. In embodiments, the glass composition may contain boron oxide ($B_2O_3$) in an amount from greater than or equal to 0.0 mol. % to less than or equal to 41.0 mol. % and all ranges and sub-ranges between the foregoing values. In some embodiments, the glass composition may contain $B_2O_3$ in an amount greater than or equal to 0.0 mol. %, greater than or equal to 1.0 mol. %, greater than or equal to 5.0 mol. %, greater than or equal to 10.0 mol. %, greater than or equal to 20.0 mol. %, greater than or equal to 21.5 mol. %, greater than or equal to 23.0 mol. %, greater than or equal to 27.0 mol. %, greater than or equal to 30.0 mol. %, greater than or equal to 35.0 mol. %, or greater than or equal to 40.0 mol. %. In some other embodiments, the glass composition may contain $B_2O_3$ in an amount less than or equal to 41.0 mol. %, less than or equal to 40.0 mol. %, less than or equal to 35.0 mol. %, less than or equal to 34.5 mol. %, less than or equal to 33.0 mol. %, less than or equal to 30.0 mol. %, less than or equal to 20.0 mol. %, or less than or equal to 5.0 mol. %. In some more embodiments, the glass composition may contain $B_2O_3$ in an amount greater than or equal to 0.0 mol. % and less than or equal to 40.0 mol. %, greater than or equal to 1.0 mol. % and less than or equal to 40.0 mol. %, greater than or equal to 10.0 mol. % and less than or equal to 40.0 mol. %, greater than or equal to 20.0 mol. % and less than or equal to 35.0 mol. %, greater than or equal to 21.5 mol. % and less than or equal to 34.5 mol. %, greater than or equal to 23.0 mol. % and less than or equal to 33.0 mol. %, greater than or equal to 27.05 mol. % and less than or equal to 33.24 mol. %, greater than or equal to 0.0 mol. % and less than or equal to 41.0 mol. %, greater than or equal to 0.0 mol. % and less than or equal to 5.0 mol. %, greater than or equal to 20.0 mol. % and less than or equal to 30.0 mol. %, greater than or equal to 30.0 mol. % and less than or equal to 33.0 mol. %, greater than or equal to 34.5 mol. % and less than or equal to 35.0 mol. %, greater than or equal to 35.0 mol. % and less than or equal to 40.0 mol. %.

Glass composition may include silica ($SiO_2$). Silica may play a role of an additional glass-former. Silica, as well as $B_2O_3$, may help to increase the liquidus viscosity (viscosity at the liquidus temperature) and, therefore, protect a glass composition from crystallization. However, adding $SiO_2$ to a glass composition may cause liquid-liquid phase separation, which may cause devitrification and/or reducing the transmittance of the resulting glass. Also, $SiO_2$ is a low refractive index component and makes it difficult to achieve high index glasses. Accordingly, the content of $SiO_2$ in the embodiments of the present disclosure is limited, or glasses may be substantially free of $SiO_2$. In embodiments, the glass composition may contain silica ($SiO_2$) in an amount from greater than or equal to 0.0 mol. % to less than or equal to 15.0 mol. % and all ranges and sub-ranges between the foregoing values. In some embodiments, the glass composition may contain $SiO_2$ in an amount greater than or equal to 0.0 mol. %, greater than or equal to 5.0 mol. %, greater than or equal to 9.0 mol. %, greater than or equal to 10.0 mol. %, greater than or equal to 11.0 mol. %, or greater than or equal to 13.0 mol. %. In some other embodiments, the glass composition may contain $SiO_2$ in an amount less than or equal to 15.0 mol. %, less than or equal to 13.5 mol. %, less than or equal to 13.0 mol. %, less than or equal to 12.5 mol. %, less than or equal to 11.5 mol. %, less than or equal to 11.0 mol. %, less than or equal to 10.0 mol. %, less than or equal to 9.0 mol. %, less than or equal to 6.0 mol. %, less than or equal to 5.0 mol. %, less than or equal to 4.8 mol. %, or less than or equal to 4.5 mol. %. In some more embodiments, the glass composition may contain $SiO_2$ in an amount greater than or equal to 0.0 mol. % and less than or equal to 15.0 mol. %, greater than or equal to 0.0 mol. % and less than or equal to 13.5 mol. %, greater than or equal to 0.0 mol. % and less than or equal to 12.5 mol. %, greater than or equal to 0.0 mol. % and less than or equal to 11.5 mol. %, greater than or equal to 0.0 mol. % and less than or equal to 4.5 mol. %, greater than or equal to 0.03 mol. % and less than or equal to 5.77 mol. %, greater than or equal to 4.5 mol. % and less than or equal to 4.8 mol. %, greater than or equal to 4.8 mol. % and less than or equal to 15.0 mol. %, greater than or equal to 5.0 mol. % and less than or equal to 15.0 mol. %, greater than or equal to 6.0 mol. % and less than or equal to 9.0 mol. %.

Glass composition may include germania ($GeO_2$). Germania ($GeO_2$) provides excellent ratio between the refractive index and density and does not reduce transmittance. However, germania is too expensive, and thus it may make a glass composition not economical. Accordingly, the content of germania should be limited, or glass compositions may be free of $GeO_2$, or glasses may be substantially free of $GeO_2$. In embodiments, the glass composition may contain germania ($GeO_2$) in an amount from greater than or equal to 0.0 mol. % to less than or equal to 10.0 mol. % and all ranges and sub-ranges between the foregoing values. In some embodiments, the glass composition may contain $GeO_2$ in an amount greater than or equal to 0.0 mol. %, greater than or equal to 5.0 mol. %, greater than or equal to 7.0 mol. %, greater than or equal to 8.0 mol. %, or greater than or equal to 9.0 mol. %. In some other embodiments, the glass composition may contain $GeO_2$ in an amount less than or equal to 10.0 mol. %, less than or equal to 9.0 mol. %, less than or equal to 8.0 mol. %, less than or equal to 7.0 mol. %, less than or equal to 5.0 mol. %, less than or equal to 4.8 mol. %, or less than or equal to 0.5 mol. %. In some more embodiments, the glass composition may contain $GeO_2$ in an amount greater than or equal to 0.0 mol. % and less than or equal to 10.0 mol. %, greater than or equal to 0.0 mol. % and less than or equal to 5.0 mol. %, greater than or equal to 0.0 mol. % and less than or equal to 0.5 mol. %, greater than or equal to 0.5 mol. % and less than or equal to 10.0 mol. %, greater than or equal to 0.5 mol. % and less than or equal to 4.8 mol. %, greater than or equal to 4.8 mol. % and less than or equal to 10.0 mol. %, greater than or equal to 4.8 mol. % and less than or equal to 5.0 mol. %, greater than or equal to 5.0 mol. % and less than or equal to 10.0 mol. %, greater than or equal to 5.0 mol. % and less than or equal to 7.0 mol. %.

Glass composition may include monovalent metal oxides ($R_2O$). Monovalent metal oxides, such as alkali metal oxides ($Li_2O$, $Na_2O$, $K_2O$, $Rb_2O$ and $Cs_2O$) or others (for example, $Ag_2O$ or $Tl_2O$) may help to better accommodate the index raisers, such as $TiO_2$, $Nb_2O_5$ or $WO_3$, in the glass structure, which may cause increasing their solubility in a glass and, accordingly, indirectly cause increasing the refractive index at an acceptably low density.

In some embodiments, the glass composition may contain monovalent metal oxides $R_2O$ in an amount greater than or equal to 0.0 mol. %, greater than or equal to 1.0 mol. %, greater than or equal to 2.0 mol. %, greater than or equal to 3.0 mol. %, or greater than or equal to 4.0 mol. %. In some other embodiments, the glass composition may contain monovalent metal oxides $R_2O$ in an amount less than or equal to 5.0 mol. %, less than or equal to 4.0 mol. %, less than or equal to 3.0 mol. %, less than or equal to 2.0 mol. %, or less than or equal to 1.0 mol. %. In some more embodiments, the glass composition may contain $R_2O$ in an amount from 0.0 mol. % to 5.0 mol. %, from 0.0 mol. % to 4.0 mol. %, from 0.0 mol. % to 3.0 mol. %, from 0.0 mol. % to 2.0 mol. %, from 1.0 mol. % to 5.0 mol. %, from 1.0 mol. % to 4.0 mol. %, from 1.0 mol. % to 3.0 mol. %, from 1.0 mol. % to 2.0 mol. %, from 2.0 mol. % to 5.0 mol. %, from 2.0 mol. % to 4.0 mol. %, from 2.0 mol. % to 3.0 mol. %, from 3.0 mol. % to 5.0 mol. %, from 3.0 mol. % to 4.0 mol. %, from 1.0 mol. % to 3.0 mol. %, from 2.0 mol. % to 4.0 mol. %, or from 1.0 mol. % to 4.0 mol. %.

Glass composition may include divalent metal oxides (RO). Divalent metal oxides, such as alkaline earth metal oxides (BeO, MgO, CaO, SrO and BaO), zinc oxide (ZnO), cadmium oxide (CdO), lead oxide (PbO) and others, being added to a glass, provide comparably high refractive indexes, greater than those for most of monovalent oxides. Some divalent metal oxides, such as, for example, CaO, SrO and ZnO, also provide comparably low density, therefore, increasing the ratio of the refractive index to density and, accordingly, improving the performance of optical glasses in certain applications. In addition, divalent metal oxides may help to increase the solubility of high index components, such as $TiO_2$, $Nb_2O_5$ and $WO_3$, which indirectly leads to a further increase in the refractive index at a comparable density. Also, some divalent metal oxides, such as, for example, ZnO and MgO, provide comparably low thermal expansion coefficient, which may reduce the thermal stresses formed in the glass articles when cooling and, therefore, improve the quality of the glass articles. However, when adding at high amounts, divalent metal oxides may cause crystallization of refractory minerals from the melts or liquid-liquid phase separation, which may reduce the glass-forming ability of glasses. Accordingly, the amount of divalent metal oxides in glass compositions of the present disclosure is limited.

In some embodiments, the glass composition may contain divalent metal oxides RO in an amount greater than or equal to 0.0 mol. %, greater than or equal to 1.0 mol. %, greater than or equal to 2.0 mol. %, greater than or equal to 3.0 mol. %, or greater than or equal to 4.0 mol. %. In some other embodiments, the glass composition may contain divalent metal oxides RO in an amount less than or equal to 5.0 mol. %, less than or equal to 4.0 mol. %, less than or equal to 3.0 mol. %, less than or equal to 2.0 mol. %, or less than or equal to 1.0 mol. %. In some more embodiments, the glass composition may contain RO in an amount from 0.0 mol. % to 5.0 mol. %, from 0.0 mol. % to 4.0 mol. %, from 0.0 mol. % to 3.0 mol. %, from 0.0 mol. % to 2.0 mol. %, from 1.0 mol. % to 5.0 mol. %, from 1.0 mol. % to 4.0 mol. %, from 1.0 mol. % to 3.0 mol. %, from 1.0 mol. % to 2.0 mol. %, from 2.0 mol. % to 5.0 mol. %, from 2.0 mol. % to 4.0 mol. %, from 2.0 mol. % to 3.0 mol. %, from 3.0 mol. % to 5.0 mol. %, from 3.0 mol. % to 4.0 mol. %, from 0 mol. % to 2.0 mol. %, from 2.0 mol. % to 4.0 mol. %, or from 2.0 mol. % to 5.0 mol. %.

Glass composition may include zinc oxide (ZnO). Zinc oxide provides a good refractive index to density ratio and may sometimes increase the solubility of titania, which indirectly increases the refractive index of glasses. However, it was found that in some embodiments, at high concentrations of ZnO, the glass-forming ability of the melt decreases and the melt may tend to crystallize during cooling.

In some embodiments, the glass composition may contain ZnO in an amount greater than or equal to 0.0 mol. %, greater than or equal to 5.0 mol. %, greater than or equal to 20.0 mol. %, greater than or equal to 25.0 mol. %, or greater than or equal to 30.0 mol. %. In some other embodiments, the glass composition may contain ZnO in an amount less than or equal to 35.0 mol. %, less than or equal to 30.0 mol. %, less than or equal to 25.0 mol. %, less than or equal to 20.0 mol. %, less than or equal to 5.0 mol. %, or less than or equal to 0.05 mol. %. In some more embodiments, the glass composition may contain ZnO in an amount greater than or equal to 0.0 mol. % and less than or equal to 35.0 mol. %, greater than or equal to 0.0 mol. % and less than or equal to 25.0 mol. %, greater than or equal to 0.0 mol. % and less than or equal to 0.05 mol. %, greater than or equal to 0.05 mol. % and less than or equal to 35.0 mol. %, greater than or equal to 0.05 mol. % and less than or equal to 5.0 mol. %, greater than or equal to 5.0 mol. % and less than or equal to 35.0 mol. %, greater than or equal to 5.0 mol. % and less than or equal to 20.0 mol. %, greater than or equal to 20.0 mol. % and less than or equal to 35.0 mol. %, greater than or equal to 20.0 mol. % and less than or equal to 25.0 mol. %.

Glass composition may include barium oxide (BaO). Barium oxide may increase the solubility of high index components, such as $TiO_2$ and $Nb_2O_5$, which may indirectly lead to a further increase in the refractive index at comparably low density. However, barium is a heavy element and, being added in a high amount, may increase the density of glass. Also, in high concentration, it may cause crystallization of such minerals as barium titanate ($BaTiO_3$), barium niobate ($BaNb_2O_6$) and others. Accordingly, the amount of BaO in glasses of the present disclosure is limited, or glasses may be substantially free of BaO. In embodiments, the glass composition may contain barium oxide (BaO) in an amount from greater than or equal to 0.0 mol. % to less than or equal to 10.0 mol. % and all ranges and sub-ranges between the foregoing values. In some embodiments, the glass composition may contain BaO in an amount greater than or equal to 0.0 mol. %, or greater than or equal to 5.0 mol. %. In some other embodiments, the glass composition may contain BaO in an amount less than or equal to 10.0 mol. %, less than or equal to 5.0 mol. %, less than or equal to 4.6 mol. %, less than or equal to 4.0 mol. %, or less than or equal to 1.6 mol.

%. In some more embodiments, the glass composition may contain BaO in an amount greater than or equal to 0.0 mol. % and less than or equal to 5.0 mol. %, greater than or equal to 0.0 mol. % and less than or equal to 4.6 mol. %, greater than or equal to 0.0 mol. % and less than or equal to 4.0 mol. %, greater than or equal to 0.01 mol. % and less than or equal to 1.6 mol. %, greater than or equal to 0.0 mol. % and less than or equal to 10.0 mol. %, greater than or equal to 0.0 mol. % and less than or equal to 1.6 mol. %, greater than or equal to 1.6 mol. % and less than or equal to 10.0 mol. %, greater than or equal to 1.6 mol. % and less than or equal to 4.0 mol. %.

Glass composition may include lead oxide (PbO). Lead oxide provides very high refractive index, but also significantly increases the density. Also, PbO may cause ecological concern. For these reasons, the content of PbO in glasses of the present disclosure should be limited, or glasses may be substantially free of PbO. In embodiments, the glass composition may contain lead oxide (PbO) in an amount from greater than or equal to 0.0 mol. % to less than or equal to 10.0 mol. % and all ranges and sub-ranges between the foregoing values. In some embodiments, the glass composition may contain PbO in an amount greater than or equal to 0.0 mol. %, greater than or equal to 5.0 mol. %, greater than or equal to 7.0 mol. %, greater than or equal to 8.0 mol. %, or greater than or equal to 9.0 mol. %. In some other embodiments, the glass composition may contain PbO in an amount less than or equal to 10.0 mol. %, less than or equal to 9.0 mol. %, less than or equal to 8.0 mol. %, less than or equal to 7.0 mol. %, less than or equal to 5.0 mol. %, or less than or equal to 0.5 mol. %. In some more embodiments, the glass composition may contain PbO in an amount greater than or equal to 0.0 mol. % and less than or equal to 5.0 mol. %, greater than or equal to 0.0 mol. % and less than or equal to 0.5 mol. %, greater than or equal to 0.0 mol. % and less than or equal to 10.0 mol. %, greater than or equal to 0.5 mol. % and less than or equal to 10.0 mol. %, greater than or equal to 0.5 mol. % and less than or equal to 5.0 mol. %, greater than or equal to 5.0 mol. % and less than or equal to 10.0 mol. %, greater than or equal to 5.0 mol. % and less than or equal to 7.0 mol. %, greater than or equal to 7.0 mol. % and less than or equal to 10.0 mol. %, greater than or equal to 7.0 mol. % and less than or equal to 8.0 mol. %.

In some embodiments, the glass composition may contain rare earth metal oxides in trivalent equivalent $RE_2O_3$ in an amount greater than or equal to 0.0 mol. %, greater than or equal to 0.25 mol. %, greater than or equal to 0.5 mol. %, or greater than or equal to 0.75 mol. %.

Glass composition may include lanthanum oxide ($La_2O_3$). Lanthanum oxide is one of the cheapest oxides providing high refractive indexes without significant loss of transmittance in visible range. Also, addition of $La_2O_3$ may reduce the risk of phase separation. However, $La_2O_3$ provides higher density than other high-index components, such as, for example, $TiO_2$, $Nb_2O_5$ or $WO_3$. Also, when added in high amounts, it may cause crystallization of refractory species. For this reason, the content of $La_2O_3$ in the glasses of the present disclosure should be limited. In embodiments, the glass composition may contain lanthanum oxide ($La_2O_3$) in an amount from greater than or equal to 0.0 mol. % to less than or equal to 35.0 mol. % and all ranges and sub-ranges between the foregoing values. In some embodiments, the glass composition may contain $La_2O_3$ in an amount greater than or equal to 0.0 mol. %, greater than or equal to 5.0 mol. %, greater than or equal to 10.0 mol. %, greater than or equal to 13.0 mol. %, greater than or equal to 14.5 mol. %, greater than or equal to 15.0 mol. %, greater than or equal to 20.0 mol. %, greater than or equal to 25.0 mol. %, or greater than or equal to 30.0 mol. %. In some other embodiments, the glass composition may contain $La_2O_3$ in an amount less than or equal to 35.0 mol. %, less than or equal to 30.0 mol. %, less than or equal to 25.0 mol. %, less than or equal to 24.0 mol. %, less than or equal to 22.5 mol. %, less than or equal to 21.4 mol. %, less than or equal to 20.0 mol. %, less than or equal to 5.0 mol. %, or less than or equal to 1.0 mol. %. In some more embodiments, the glass composition may contain $La_2O_3$ in an amount greater than or equal to 0.0 mol. % and less than or equal to 35.0 mol. %, greater than or equal to 0.0 mol. % and less than or equal to 25.0 mol. %, greater than or equal to 10.0 mol. % and less than or equal to 25.0 mol. %, greater than or equal to 13.0 mol. % and less than or equal to 24.0 mol. %, greater than or equal to 14.5 mol. % and less than or equal to 22.5 mol. %, greater than or equal to 15.0 mol. % and less than or equal to 25.0 mol. %, greater than or equal to 19.97 mol. % and less than or equal to 21.43 mol. %, greater than or equal to 0.0 mol. % and less than or equal to 1.0 mol. %, greater than or equal to 1.0 mol. % and less than or equal to 5.0 mol. %, greater than or equal to 5.0 mol. % and less than or equal to 35.0 mol. %, greater than or equal to 20.0 mol. % and less than or equal to 21.4 mol. %, greater than or equal to 21.4 mol. % and less than or equal to 35.0 mol. %, greater than or equal to 21.4 mol. % and less than or equal to 22.5 mol. %, greater than or equal to 22.5 mol. % and less than or equal to 24.0 mol. %.

In embodiments, the glass composition may contain yttria ($Y_2O_3$) in an amount from greater than or equal to 0.0 mol. % to less than or equal to 10.0 mol. % and all ranges and sub-ranges between the foregoing values. In some embodiments, the glass composition may contain $Y_2O_3$ in an amount greater than or equal to 0.0 mol. %, greater than or equal to 5.0 mol. %, greater than or equal to 7.0 mol. %, greater than or equal to 8.0 mol. %, or greater than or equal to 9.0 mol. %. In some other embodiments, the glass composition may contain $Y_2O_3$ in an amount less than or equal to 10.0 mol. %, less than or equal to 9.0 mol. %, less than or equal to 8.0 mol. %, less than or equal to 7.5 mol. %, less than or equal to 7.0 mol. %, less than or equal to 6.5 mol. %, less than or equal to 5.75 mol. %, less than or equal to 5.0 mol. %, or less than or equal to 1.0 mol. %. In some more embodiments, the glass composition may contain $Y_2O_3$ in an amount greater than or equal to 0.0 mol. % and less than or equal to 10.0 mol. %, greater than or equal to 0.0 mol. % and less than or equal to 7.5 mol. %, greater than or equal to 0.0 mol. % and less than or equal to 6.5 mol. %, greater than or equal to 0.0 mol. % and less than or equal to 5.75 mol. %, greater than or equal to 0.0 mol. % and less than or equal to 5.0 mol. %, greater than or equal to 0.38 mol. % and less than or equal to 5.02 mol. %, greater than or equal to 0.0 mol. % and less than or equal to 1.0 mol. %, greater than or equal to 1.0 mol. % and less than or equal to 5.0 mol. %, greater than or equal to 5.0 mol. % and less than or equal to 10.0 mol. %, greater than or equal to 5.0 mol. % and less than or equal to 5.75 mol. %, greater than or equal to 5.75 mol. % and less than or equal to 6.5 mol. %.

In some embodiments, the glass composition may contain gadolinium oxide ($Gd_2O_3$) in an amount from greater than or equal to 0.0 mol. % to less than or equal to 5.0 mol. % and all ranges and sub-ranges between the foregoing values. In some embodiments, the glass composition may contain $Gd_2O_3$ in an amount greater than or equal to 0.0 mol. %, or greater than or equal to 2.5 mol. %. In some other embodiments, the glass composition may contain $Gd_2O_3$ in an amount less than or equal to 5.0 mol. %, less than or equal to 5.0 mol. %, less than or equal to 2.5 mol. %, or less than or equal to 1.0 mol. %. In some more embodiments, the glass composition may contain $Gd_2O_3$ in an amount greater than or equal to 0.0 mol. % and less than or equal to 25.0 mol. %, greater than or equal to 0.0 mol. % and less than or equal to 1.0 mol. %, greater than or equal to 1.0 mol. % and less than or equal to 25.0 mol. %, greater than or equal to 1.0 mol. % and less than or equal to 2.5 mol. %, greater than or equal to 2.5 mol. % and less than or equal to 25.0 mol. %, greater than or equal to 2.5 mol. % and less than or equal to 5.0 mol. %.

Glass composition may include alumina ($Al_2O_3$). Alumina may increase the viscosity of glassforming melts at high temperature, which may reduce the critical cooling rate and improve the glassforming ability. However, addition of $Al_2O_3$ may cause crystallization of refractory minerals, such as aluminum titanate ($Al_2TiO_5$), aluminum niobate ($AlNbO_4$) and others, in the melts when cooling. Accordingly, the amount of $Al_2O_3$ in glasses of the present disclosure is limited, or glasses may be substantially free of $Al_2O_3$. In embodiments, the glass composition may contain alumina ($Al_2O_3$) in an amount from greater than or equal to 0.0 mol. % to less than or equal to 10.0 mol. % and all ranges and sub-ranges between the foregoing values. In some embodiments, the glass composition may contain $Al_2O_3$ in an amount greater than or equal to 0.0 mol. %, greater than or equal to 5.0 mol. %, greater than or equal to 7.0 mol. %, greater than or equal to 8.0 mol. %, or greater than or equal to 9.0 mol. %. In some other embodiments, the glass composition may contain $Al_2O_3$ in an amount less than or equal to 10.0 mol. %, less than or equal to 9.0 mol. %, less than or equal to 8.0 mol. %, less than or equal to 7.0 mol. %, or less than or equal to 5.0 mol. %. In some more embodiments, the glass composition may contain $Al_2O_3$ in an amount greater than or equal to 0.0 mol. % and less than or equal to 10.0 mol. %, greater than or equal to 0.0 mol. % and less than or equal to 5.0 mol. %, greater than or equal to 5.0 mol. % and less than or equal to 10.0 mol. %.

In embodiments, the glass composition may contain molybdenum oxide ($MoO_3$) in an amount from greater than or equal to 0.0 mol. % to less than or equal to 10.0 mol. % and all ranges and sub-ranges between the foregoing values. In some embodiments, the glass composition may contain $MoO_3$ in an amount greater than or equal to 0.0 mol. %, greater than or equal to 5.0 mol. %, greater than or equal to 7.0 mol. %, greater than or equal to 8.0 mol. %, or greater than or equal to 9.0 mol. %. In some other embodiments, the glass composition may contain $MoO_3$ in an amount less than or equal to 10.0 mol. %, less than or equal to 9.0 mol. %, less than or equal to 8.0 mol. %, less than or equal to 7.0 mol. %, less than or equal to 5.0 mol. %, or less than or equal to 3.0 mol. %. In some more embodiments, the glass composition may contain $MoO_3$ in an amount greater than or equal to 0.0 mol. % and less than or equal to 3.0 mol. %, greater than or equal to 0.0 mol. % and less than or equal to 10.0 mol. %.

Glass composition may include tellurium oxide ($TeO_2$). Tellurium oxide generally works like below-described bismuth oxide; in addition, $TeO_2$ is very expensive, which may make the cost of starting materials unacceptably high. Accordingly, the content of tellurium oxide should be limited, or glass compositions may be free of $TeO_2$. In embodiments, the glass composition may contain tellurium oxide ($TeO_2$) in an amount from greater than or equal to 0.0 mol. % to less than or equal to 20.0 mol. % and all ranges and sub-ranges between the foregoing values. In some embodiments, the glass composition may contain $TeO_2$ in an amount greater than or equal to 0.0 mol. %, greater than or equal to 5.0 mol. %, greater than or equal to 10.0 mol. %, greater than or equal to 14.0 mol. %, greater than or equal to 16.0 mol. %, or greater than or equal to 18.0 mol. %. In some other embodiments, the glass composition may contain $TeO_2$ in an amount less than or equal to 20.0 mol. %, less than or equal to 18.0 mol. %, less than or equal to 16.0 mol. %, less than or equal to 14.0 mol. %, less than or equal to 10.0 mol. %, less than or equal to 5.0 mol. %, or less than or equal to 2.0 mol. %. In some more embodiments, the glass composition may contain $TeO_2$ in an amount greater than or equal to 0.0 mol. % and less than or equal to 20.0 mol. %, greater than or equal to 0.0 mol. % and less than or equal to 10.0 mol. %, greater than or equal to 0.0 mol. % and less than or equal to 2.0 mol. %.

Glass composition may include vanadia ($V_2O_5$). Vanadia provides the highest ratio of the refractive index to density among all oxides. However, vanadia may cause undesirable dark coloring. For these reasons, the content of vanadia in the glasses of the present disclosure is limited, or glass compositions may be free of $V_2O_5$. In embodiments, the glass composition may contain vanadia ($V_2O_5$) in an amount from greater than or equal to 0.0 mol. % to less than or equal to 5.0 mol. % and all ranges and sub-ranges between the foregoing values. In some embodiments, the glass composition may contain $V_2O_5$ in an amount greater than or equal to 0.0 mol. %, or greater than or equal to 2.5 mol. %. In some other embodiments, the glass composition may contain $V_2O_5$ in an amount less than or equal to 5.0 mol. %, less than or equal to 2.5 mol. %, less than or equal to 1.0 mol. %, or less than or equal to 0.1 mol. %. In some more embodiments, the glass composition may contain $V_2O_5$ in an amount greater than or equal to 0.0 mol. % and less than or equal to 5.0 mol. %, greater than or equal to 0.0 mol. % and less than or equal to 1.0 mol. %, greater than or equal to 0.0 mol. % and less than or equal to 0.1 mol. %.

In embodiments, the glass composition may contain thorium oxide ($ThO_2$) in an amount from greater than or equal to 0.0 mol. % to less than or equal to 10.0 mol. % and all ranges and sub-ranges between the foregoing values. In some embodiments, the glass composition may contain $ThO_2$ in an amount greater than or equal to 0.0 mol. %, greater than or equal to 5.0 mol. %, greater than or equal to 7.0 mol. %, greater than or equal to 8.0 mol. %, or greater than or equal to 9.0 mol. %. In some other embodiments, the glass composition may contain $ThO_2$ in an amount less than or equal to 10.0 mol. %, less than or equal to 9.0 mol. %, less than or equal to 8.0 mol. %, less than or equal to 7.0 mol. %, or less than or equal to 5.0 mol. %. In some more embodiments, the glass composition may contain $ThO_2$ in an amount greater than or equal to 0.0 mol. % and less than or equal to 10.0 mol. %, greater than or equal to 0.0 mol. % and less than or equal to 5.0 mol. %.

Glass composition may include tantalum oxide ($Ta_2O_5$). Tantalum oxide increases the refractive index while maintaining an acceptable density without reducing the blue transmittance. However, $Ta_2O_5$ may cause crystallization of refractory minerals. Accordingly, the content of tantalum oxide should be limited, or glass compositions may be free of $Ta_2O_5$. In embodiments, the glass composition may contain tantalum oxide ($Ta_2O_5$) in an amount from greater than or equal to 0.0 mol. % to less than or equal to 25.0 mol. % and all ranges and sub-ranges between the foregoing values. In some embodiments, the glass composition may contain $Ta_2O_5$ in an amount greater than or equal to 0.0 mol. %, greater than or equal to 5.0 mol. %, greater than or equal to 10.0 mol. %, greater than or equal to 19.0 mol. %, greater than or equal to 20.0 mol. %, greater than or equal to 21.0 mol. %, or greater than or equal to 23.0 mol. %. In some other embodiments, the glass composition may contain $Ta_2O_5$ in an amount less than or equal to 25.0 mol. %, less than or equal to 23.0 mol. %, less than or equal to 21.0 mol. %, less than or equal to 20.0 mol. %, less than or equal to 19.0 mol. %, less than or equal to 10.0 mol. %, less than or equal to 5.0 mol. %, or less than or equal to 2.0 mol. %. In some more embodiments, the glass composition may contain $Ta_2O_5$ in an amount greater than or equal to 0.0 mol. % and less than or equal to 25.0 mol. %, greater than or equal to 0.0 mol. % and less than or equal to 10.0 mol. %, greater than or equal to 0.0 mol. % and less than or equal to 2.0 mol. %.

Glass composition may include zirconia ($ZrO_2$). Zirconia can increase the refractive index while maintaining an acceptably low density. $ZrO_2$ can also increase the viscosity of the melt, which may help to protect the melt from crystallization. $ZrO_2$ does not introduce coloring in the glass in the visible and near-UV ranges, which may help to maintain a high transmittance of the glass. However, high concentrations of zirconia may cause crystallization of refractory minerals, such as zirconia ($ZrO_2$), zircon ($ZrSiO_4$), calcium zirconate ($CaZrO_3$) and others, which may decrease the glass forming ability of the melt. In embodiments, the glass composition may contain zirconia ($ZrO_2$) in an amount from greater than or equal to 0.0 mol. % to less than or equal to 20.0 mol. % and all ranges and sub-ranges between the foregoing values. In some embodiments, the glass composition may contain $ZrO_2$ in an amount greater than or equal to 0.0 mol. %, greater than or equal to 0.3 mol. %, greater than or equal to 0.5 mol. %, greater than or equal to 1.75 mol. %, greater than or equal to 5.0 mol. %, greater than or equal to 6.99 mol. %, greater than or equal to 10.0 mol. %, greater than or equal to 14.0 mol. %. In some other embodiments, the glass composition may contain $ZrO_2$ in an amount less than or equal to 20.0 mol. %, less than or equal to 18.0 mol. %, less than or equal to 16.0 mol. %, less than or equal to 14.0 mol. %, less than or equal to 10.0 mol. %, less than or equal to 8.0 mol. %, less than or equal to 7.5 mol. %, less than or equal to 7.25 mol. %, less than or equal to 7.0 mol. %, or less than or equal to 5.0 mol. %. In some more embodiments, the glass composition may contain $ZrO_2$ in an amount greater than or equal to 0.0 mol. % and less than or equal to 10.0 mol. %, greater than or equal to 0.0 mol. % and less than or equal to 7.5 mol. %, greater than or equal to 0.3 mol. % and less than or equal to 20.0 mol. %, greater than or equal to 0.5 mol. % and less than or equal to 8.0 mol. %, greater than or equal to 1.75 mol. % and less than or equal to 7.25 mol. %, greater than or equal to 6.99 mol. % and less than or equal to 7.0 mol. %, greater than or equal to 0.0 mol. % and less than or equal to 20.0 mol. %, greater than or equal to 0.0 mol. % and less than or equal to 5.0 mol. %, greater than or equal to 5.0 mol. % and less than or equal to 7.0 mol. %, greater than or equal to 7.0 mol. % and less than or equal to 7.25 mol. %, greater than or equal to 7.5 mol. % and less than or equal to 8.0 mol. %, greater than or equal to 8.0 mol. % and less than or equal to 10.0 mol. %, greater than or equal to 10.0 mol. % and less than or equal to 20.0 mol. %, greater than or equal to 10.0 mol. % and less than or equal to 14.0 mol. %.

Glass composition may include bismuth oxide ($Bi_2O_3$). $Bi_2O_3$ provides very high refractive index, ut leads to increases in density. However, it may decrease the viscosity of melts at high temperatures, which may cause crystallization of the melts when cooling. Accordingly, the content of bismuth oxide should be limited, or glass compositions may be free of $Bi_2O_3$. In embodiments, the glass composition may contain bismuth oxide ($Bi_2O_3$) in an amount from greater than or equal to 0.0 mol. % to less than or equal to 35.0 mol. % and all ranges and sub-ranges between the foregoing values. In some embodiments, the glass composition may contain $Bi_2O_3$ in an amount greater than or equal to 0.0 mol. %, greater than or equal to 5.0 mol. %, greater than or equal to 20.0 mol. %, greater than or equal to 25.0 mol. %, or greater than or equal to 30.0 mol. %. In some other embodiments, the glass composition may contain $Bi_2O_3$ in an amount less than or equal to 35.0 mol. %, less than or equal to 30.0 mol. %, less than or equal to 25.0 mol. %, less than or equal to 20.0 mol. %, less than or equal to 10.0 mol. %, less than or equal to 7.5 mol. %, less than or equal to 7.0 mol. %, or less than or equal to 5.0 mol. %. In some more embodiments, the glass composition may contain $Bi_2O_3$ in an amount greater than or equal to 0.0 mol. % and less than or equal to 35.0 mol. %, greater than or equal to 0.0 mol. % and less than or equal to 20.0 mol. %, greater than or equal to 0.0 mol. % and less than or equal to 10.0 mol. %, greater than or equal to 0.0 mol. % and less than or equal to 7.5 mol. %, greater than or equal to 0.0 mol. % and less than or equal to 7.0 mol. %.

Glass composition may include niobia ($Nb_2O_5$). Niobia can be used to increase the refractive index of glass while maintaining a low density. However, niobia can introduce a yellow coloring to the glass that cannot be bleached in the same manner as titania, which can result in a loss of transmittance, particularly in the blue and UV range. Niobia may cause crystallization and/or phase separation of the melt. In some embodiments, the glasses may be substantially free of $Nb_2O_5$. In embodiments, the glass composition may contain niobia ($Nb_2O_5$) in an amount from greater than or equal to 0.0 mol. % to less than or equal to 50.0 mol. % and all ranges and sub-ranges between the foregoing values. In some embodiments, the glass composition may contain $Nb_2O_5$ in an amount greater than or equal to 0.0 mol. %, greater than or equal to 0.3 mol. %, greater than or equal to 1.0 mol. %, greater than or equal to 3.0 mol. %, greater than or equal to 4.5 mol. %, greater than or equal to 5.0 mol. %, greater than or equal to 6.0 mol. %, greater than or equal to 7.8 mol. %, greater than or equal to 10.0 mol. %, greater than or equal to 25.0 mol. %, greater than or equal to 35.0 mol. %, greater than or equal to 40.0 mol. %, or greater than or equal to 45.0 mol. %. In some other embodiments, the glass composition may contain $Nb_2O_5$ in an amount less than or equal to 50.0 mol. %, less than or equal to 45.0 mol. %, less than or equal to 40.0 mol. %, less than or equal to 35.0 mol. %, less than or equal to 25.0 mol. %, less than or equal to 20.0 mol. %, less than or equal to 19.5 mol. %, less than or equal to 19.0 mol. %, less than or equal to 18.0 mol. %, less than or equal to 16.5 mol. %, less than or equal to 15.0 mol. %, or less than or equal to 10.0 mol. %. In some more embodiments, the glass composition may contain $Nb_2O_5$ in an amount greater than or equal to 0.3 mol. % and less than or equal to 50.0 mol. %, greater than or equal to 0.3 mol. % and less than or equal to 20.0 mol. %, greater than or equal to 0.3 mol. % and less than or equal to 19.5 mol. %, greater than or equal to 1.0 mol. % and less than or equal to 19.0 mol. %, greater than or equal to 3.0 mol. % and less than or equal to 20.0 mol. %, greater than or equal to 4.5 mol. % and less than or equal to 18.0 mol. %, greater than or equal to 6.0 mol. % and less than or equal to 16.5 mol. %, greater than or equal to 7.79 mol. % and less than or equal to 15.0 mol. %, greater than or equal to 0.0 mol. % and less than or equal to 50.0 mol. %, greater than or equal to 0.0 mol. % and less than or equal to 10.0 mol. %, greater than or equal to 10.0 mol. % and less than or equal to 15.0 mol. %, greater than or equal to 15.0 mol. % and less than or equal to 50.0 mol. %, greater than or equal to 16.5 mol. % and less than or equal to 18.0 mol. %, greater than or equal to 18.0 mol. % and less than or equal to 50.0 mol. %, greater than or equal to 18.0 mol. % and less than or equal to 19.0 mol. %, greater than or equal to 19.0 mol. % and less than or equal to 19.5 mol. %, greater than or equal to 19.5 mol. % and less than or equal to 50.0 mol. %.

Glass composition may include titania ($TiO_2$). The levels of $TiO_2$ and/or $Nb_2O_5$ that are typically used in glasses to increase refractive index tend to decrease the transmittance in the near-UV region and shift the UV cut-off to higher wavelengths. Accordingly, the amount of $TiO_2$ is limited. In embodiments, the glass composition may contain titania ($TiO_2$) in an amount from greater than or equal to 0.0 mol. % to less than or equal to 50.0 mol. % and all ranges and sub-ranges between the foregoing values. In some embodiments, the glass composition may contain $TiO_2$ in an amount greater than or equal to 0.0 mol. %, greater than or equal to 0.3 mol. %, greater than or equal to 1.0 mol. %, greater than or equal to 5.0 mol. %, greater than or equal to 6.0 mol. %, greater than or equal to 7.5 mol. %, greater than or equal to 8.0 mol. %, greater than or equal to 10.0 mol. %, greater than or equal to 25.0 mol. %, greater than or equal to 35.0 mol. %, greater than or equal to 40.0 mol. %, or greater than or equal to 45.0 mol. %. In some other embodiments, the glass composition may contain $TiO_2$ in an amount less than or equal to 50.0 mol. %, less than or equal to 45.0 mol. %, less than or equal to 40.0 mol. %, less than or equal to 35.0 mol. %, less than or equal to 30.0 mol. %, less than or equal to 28.0 mol. %, less than or equal to 25.0 mol. %, less than or equal to 22.0 mol. %, less than or equal to 20.0 mol. %, less than or equal to 19.0 mol. %, less than or equal to 17.0 mol. %, or less than or equal to 10.0 mol. %. In some more embodiments, the glass composition may contain $TiO_2$ in an amount greater than or equal to 0.3 mol. % and less than or equal to 50.0 mol. %, greater than or equal to 0.3 mol. % and less than or equal to 30.0 mol. %, greater than or equal to 1.0 mol. % and less than or equal to 19.0 mol. %, greater than or equal to 5.0 mol. % and less than or equal to 25.0 mol. %, greater than or equal to 6.0 mol. % and less than or equal to 22.0 mol. %, greater than or equal to 7.5 mol. % and less than or equal to 28.0 mol. %, greater than or equal to 8.0 mol. % and less than or equal to 20.0 mol. %, greater than or equal to 10.0 mol. % and less than or equal to 16.98 mol. %, greater than or equal to 0.0 mol. % and less than or equal to 50.0 mol. %, greater than or equal to 0.0 mol. % and less than or equal to 10.0 mol. %, greater than or equal to 17.0 mol. % and less than or equal to 19.0 mol. %, greater than or equal to 19.0 mol. % and less than or equal to 20.0 mol. %, greater than or equal to 22.0 mol. % and less than or equal to 50.0 mol. %, greater than or equal to 22.0 mol. % and less than or equal to 25.0 mol. %, greater than or equal to 25.0 mol. % and less than or equal to 28.0 mol. %.

Glass composition may include tungsten oxide ($WO_3$). $WO_3$ provides high refractive index without significantly increasing density or causing undesirable coloring. Also, it was empirically found that addition of $WO_3$ to glass composition may decrease the liquidus temperature, which allows melting such glasses at lower temperatures, that, in turn, may increase the transmittance of such glasses. Also, addition of $WO_3$ may decrease the glass transition temperature $T_g$, which allows forming these glasses at lower temperatures. At high concentrations of $WO_3$, the liquidus temperature tends to increase, and the viscosity at the liquidus temperature drops, making it difficult to avoid crystallization of melts when cooling. Accordingly, the content of $WO_3$ should be limited, or glass compositions may be free of $WO_3$. In embodiments, the glass composition may contain tungsten oxide ($WO_3$) in an amount from greater than or equal to 0.0 mol. % to less than or equal to 40.0 mol. % and all ranges and sub-ranges between the foregoing values. In some embodiments, the glass composition may contain $WO_3$ in an amount greater than or equal to 0.0 mol. %, greater than or equal to 1.0 mol. %, greater than or equal to 2.0 mol. %, greater than or equal to 3.0 mol. %, greater than or equal to 5.0 mol. %, greater than or equal to 6.0 mol. %, greater than or equal to 9.0 mol. %, greater than or equal to 20.0 mol. %, greater than or equal to 25.0 mol. %, greater than or equal to 30.0 mol. %, or greater than or equal to 35.0 mol. %. In some other embodiments, the glass composition may contain $WO_3$ in an amount less than or equal to 40.0 mol. %, less than or equal to 35.0 mol. %, less than or equal to 30.0 mol. %, less than or equal to 26.0 mol. %, less than or equal to 25.0 mol. %, less than or equal to 23.0 mol. %, less than or equal to 20.0 mol. %, or less than or equal to 5.0 mol. %. In some more embodiments, the glass composition may contain $WO_3$ in an amount greater than or equal to 0.0 mol. % and less than or equal to 35.0 mol. %, greater than or equal to 0.0 mol. % and less than or equal to 30.0 mol. %, greater than or equal to 1.0 mol. % and less than or equal to 40.0 mol. %, greater than or equal to 2.0 mol. % and less than or equal to 26.0 mol. %, greater than or equal to 3.0 mol. % and less than or equal to 35.0 mol. %, greater than or equal to 5.0 mol. % and less than or equal to 23.0 mol. %, greater than or equal to 8.68 mol. % and less than or equal to 20.45 mol. %, greater than or equal to 0.0 mol. % and less than or equal to 40.0 mol. %, greater than or equal to 5.0 mol. % and less than or equal to 40.0 mol. %, greater than or equal to 5.0 mol. % and less than or equal to 20.0 mol. %, greater than or equal to 23.0 mol. % and less than or equal to 40.0 mol. %, greater than or equal to 23.0 mol. % and less than or equal to 25.0 mol. %, greater than or equal to 25.0 mol. % and less than or equal to 26.0 mol. %, greater than or equal to 26.0 mol. % and less than or equal to 30.0 mol. %, greater than or equal to 30.0 mol. % and less than or equal to 35.0 mol. %.

Glass composition may include fluorine (F). Adding fluorine to a glass composition is known to provide lower optical dispersion, which may improve the image quality. Also, fluorine can in some cases decrease the liquidus temperature, preventing a glass article from crystallization when cooling the melt. However, fluorine may be a subject of ecological concern. For that reason, the content of fluorine is limited, or glasses are free of fluorine. In embodiments, the glass composition may contain fluorine (F) in an amount from greater than or equal to 0.0 at. % to less than or equal to 5.0 at. % and all ranges and sub-ranges between the foregoing values. In some embodiments, the glass composition may contain F in an amount greater than or equal to 0.0 at. %, or greater than or equal to 2.5 at. %. In some other embodiments, the glass composition may contain F in an amount less than or equal to 5.0 at. %, less than or equal to 2.5 at. %, or less than or equal to 0.1 at. %.

In embodiments, the glass composition may contain chlorine (Cl) in an amount from greater than or equal to 0.0 at. % to less than or equal to 1.0 at. % and all ranges and sub-ranges between the foregoing values. In some embodiments, the glass composition may contain Cl in an amount greater than or equal to 0.0 at. %, or greater than or equal to 0.5 at. %. In some other embodiments, the glass composition may contain Cl in an amount less than or equal to 1.0 at. % or less than or equal to 0.5 at. %.

In embodiments, the glass composition may contain bromine (Br) in an amount from greater than or equal to 0.0 at. % to less than or equal to 1.0 at. % and all ranges and sub-ranges between the foregoing values. In some embodiments, the glass composition may contain Br in an amount greater than or equal to 0.0 at. %, or greater than or equal to 0.5 at. %. In some other embodiments, the glass composition may contain Br in an amount less than or equal to 1.0 at. % or less than or equal to 0.5 at. %.

In embodiments, the glass composition may contain iodine (I) in an amount from greater than or equal to 0.0 at. % to less than or equal to 1.0 at. % and all ranges and sub-ranges between the foregoing values. In some embodiments, the glass composition may contain I in an amount greater than or equal to 0.0 at. %, or greater than or equal to 0.5 at. %. In some other embodiments, the glass composition may contain I in an amount less than or equal to 1.0 at. % or less than or equal to 0.5 at. %.

In some other embodiments, the glass composition may have a sum of $Al_2O_3+RE_mO_n$ less than or equal to 30.0 mol. %.

In some other embodiments, the glass composition may have a sum of $R_2O+RO$ less than or equal to 5.0 mol. % or less than or equal to 1.0 mol. %.

In some embodiments, the glass composition may have a sum of $RE_2O_3+ZrO_2+TiO_2+Nb_2O_5+WO_3$ greater than or equal to 0.0 mol. %, greater than or equal to 10.0 mol. %, greater than or equal to 20.0 mol. %, greater than or equal to 30.0 mol. %, greater than or equal to 40.0 mol. %, greater than or equal to 50.0 mol. %, greater than or equal to 60.0 mol. %, or greater than or equal to 65.0 mol. %. In some other embodiments, the glass composition may have a sum of $RE_2O_3+ZrO_2+TiO_2+Nb_2O_5+WO_3$ less than or equal to 69.0 mol. %, less than or equal to 60.0 mol. %, less than or equal to 50.0 mol. %, less than or equal to 40.0 mol. %, less than or equal to 30.0 mol. %, less than or equal to 20.0 mol. %, or less than or equal to 10.0 mol. %. In some more embodiments, the glass composition may have a sum of $RE_2O_3+ZrO_2+TiO_2+Nb_2O_5+WO_3$ from 0.0 mol. % to 69.0 mol. %, from 0.0 mol. % to 50.0 mol. %, from 0.0 mol. % to 30.0 mol. %, from 10.0 mol. % to 50.0 mol. %, from 10.0 mol. % to 30.0 mol. %, from 20.0 mol. % to 60.0 mol. %, from 20.0 mol. % to 50.0 mol. %, from 30.0 mol. % to 69.0 mol. %, from 30.0 mol. % to 60.0 mol. %, from 40.0 mol. % to 60.0 mol. %, from 21.0 mol. % to 46.0 mol. %, from 33.0 mol. % to 63.0 mol. %, or from 9.0 mol. % to 39.0 mol. %.

In some other embodiments, the glass composition may have a sum of $SiO_2+GeO_2$ less than or equal to 4.8 mol. %.

In some embodiments, the glass composition may have a sum of $TiO_2+Nb_2O_5$ greater than or equal to 0.0 mol. %, greater than or equal to 0.6 mol. %, greater than or equal to 10.0 mol. %, greater than or equal to 20.0 mol. %, greater than or equal to 21.0 mol. %, greater than or equal to 30.0 mol. %, greater than or equal to 40.0 mol. %, or greater than or equal to 50.0 mol. %. In some other embodiments, the glass composition may have a sum of $TiO_2+Nb_2O_5$ less than or equal to 60.0 mol. %, less than or equal to 50.0 mol. %, less than or equal to 40.0 mol. %, less than or equal to 35.0 mol. %, less than or equal to 30.0 mol. %, less than or equal to 29.6 mol. %, less than or equal to 20.0 mol. %, or less than or equal to 10.0 mol. %. In some more embodiments, the glass composition may have a sum of $TiO_2+Nb_2O_5$ from 0.0 mol. % to 35.0 mol. %, from 0.6 mol. % to 60.0 mol. %, from 0.0 mol. % to 60.0 mol. %, from 0.0 mol. % to 40.0 mol. %, from 10.0 mol. % to 40.0 mol. %, from 10.0 mol. % to 30.0 mol. %, from 10.0 mol. % to 20.0 mol. %, from 20.0 mol. % to 40.0 mol. %, from 21.0 mol. % to 30.0 mol. %, from 8.0 mol. % to 35.0 mol. %, from 3.0 mol. % to 43.0 mol. %, or from 15.0 mol. % to 55.0 mol. %.

In some embodiments, the glass composition may have a sum of $WO_3+TiO_2$ greater than or equal to 0.0 mol. %, greater than or equal to 5.0 mol. %, greater than or equal to 10.0 mol. %, greater than or equal to 15.0 mol. %, greater than or equal to 20.0 mol. %, greater than or equal to 23.0 mol. %, greater than or equal to 25.0 mol. %, greater than or equal to 30.0 mol. %, or greater than or equal to 35.0 mol. %. In some other embodiments, the glass composition may have a sum of $WO_3+TiO_2$ less than or equal to 40.0 mol. %, less than or equal to 35.0 mol. %, less than or equal to 34.0 mol. %, less than or equal to 30.0 mol. %, less than or equal to 25.0 mol. %, less than or equal to 20.0 mol. %, less than or equal to 15.0 mol. %, less than or equal to 10.0 mol. %, or less than or equal to 5.0 mol. %. In some more embodiments, the glass composition may have a sum of $WO_3+TiO_2$ from 0.0 mol. % to 40.0 mol. %, from 0.0 mol. % to 30.0 mol. %, from 0.0 mol. % to 15.0 mol. %, from 5.0 mol. % to 15.0 mol. %, from 10.0 mol. % to 15.0 mol. %, from 20.0 mol. % to 40.0 mol. %, from 20.0 mol. % to 35.0 mol. %, from 20.0 mol. % to 30.0 mol. %, from 23.0 mol. % to 35.0 mol. %, from 23.0 mol. % to 34.0 mol. %, from 8.0 mol. % to 20.0 mol. %, from 0 mol. % to 28.0 mol. %, or from 15.0 mol. % to 27.0 mol. %.

In some embodiments, glass may have limitations for the difference $B_2O_3+SiO_2-P_2O_5$. The difference ($B_2O_3+SiO_2-P_2O_5$) distinguishes borate, silicoborate and borosilicate glasses from phosphate glasses. Positive values of the difference ($B_2O_3+SiO_2-P_2O_5$) identify borate, silicoborate or borosilicate glasses, whereas negative values of this quantity identify phosphate glasses. In some embodiments, the glass may have a difference $B_2O_3+SiO_2-P_2O_5$ greater than or equal to 0 mol. %. In some embodiments, the glass composition may have a difference $B_2O_3+SiO_2-P_2O_5$ greater than or equal to 0 mol. %, greater than or equal to 1 mol. %, greater than or equal to 5 mol. %, greater than or equal to 10 mol. %, greater than or equal to 15 mol. %, greater than or equal to 20 mol. %, greater than or equal to 25 mol. %, greater than or equal to 30 mol. %, or greater than or equal to 35 mol. %. In some other embodiments, the glass composition may have a difference $B_2O_3+SiO_2-P_2O_5$ less than or equal to 40 mol. %, less than or equal to 35 mol. %, less than or equal to 30 mol. %, less than or equal to 25 mol. %, less than or equal to 20 mol. %, or less than or equal to 15 mol. %. In some more embodiments, the glass composition may have a $B_2O_3+SiO_2-P_2O_5$ from 0 mol. % to 40 mol. %, from 0 mol. % to 10 mol. %, from 1 mol. % to 20 mol. %, from 1 mol. % to 10 mol. %, from 5 mol. % to 20 mol. %, from 5 mol. % to 10 mol. %, from 10 mol. % to 30 mol. %, from 10 mol. % to 20 mol. %, from 15 mol. % to 40 mol. %, from 15 mol. % to 35 mol. %, from 15 mol. % to 30 mol. %, from 15 mol. % to 25 mol. %, from 15 mol. % to 20 mol. %, from 20 mol. % to 25 mol. %, from 20 mol. % to 35 mol. %, from 6 mol. % to 25 mol. %, or from 9 mol. % to 31 mol. %.

In some embodiments, glass composition may have limitations for the difference $TiO_2-SiO_2$. The higher this difference, the higher refractive index may be expected to reach at a given density. However, if this difference is too high, the risk of phase separation may appear, which may cause crystallization and/or loss of transmittance. In some embodiments, the glass may have a difference $TiO_2-SiO_2$ greater than or equal to 7.5 mol. %, greater than or equal to 8 mol. %, greater than or equal to 8 mol. %, greater than or equal to 10 mol. %, greater than or equal to 12 mol. %, or greater than or equal to 15 mol. %. In some other embodiments, the glass composition may have a difference $TiO_2-SiO_2$ less than or equal to 16 mol. %, less than or equal to 15 mol. %, less than or equal to 12 mol. %, or less than or equal to 10 mol. %. In some more embodiments, the glass composition may have a $TiO_2-SiO_2$ from 8 mol. % to 16 mol. %, from 8 mol. % to 15 mol. %, from 8 mol. % to 12 mol. %, from 8 mol. % to 16 mol. %, from 8 mol. % to 15 mol. %, from 8 mol. % to 12 mol. %, from 10 mol. % to 16 mol. %, from 10 mol. % to 15 mol. %, from 10 mol. % to 12 mol. %, from 12 mol. % to 16 mol. %, from 12 mol. % to 15 mol. %, from 9 mol. % to 12 mol. %, from 11 mol. % to 14 mol. %, or from 11 mol. % to 15 mol. %.

In some embodiments, the glass produced from the glass composition may have $n_d$ from greater than or equal to 1.85 to less than or equal to 2.10 and all ranges and sub-ranges between the foregoing values. In some embodiments, the glass may have the $n_d$ greater than or equal to 1.85, greater than or equal to 1.86, greater than or equal to 1.88, greater than or equal to 1.90, greater than or equal to 1.92, greater than or equal to 1.95, greater than or equal to 1.98, greater than or equal to 2.01, greater than or equal to 2.04, greater than or equal to 2.05, greater than or equal to 2.06, or greater than or equal to 2.08. In some other embodiments, the glass may have the $n_d$ less than or equal to 2.10, less than or equal to 2.08, less than or equal to 2.08, less than or equal to 2.07, less than or equal to 2.06, less than or equal to 2.05, less than or equal to 2.04, less than or equal to 2.03, less than or equal to 1.95, less than or equal to 1.92, less than or equal to 1.90, less than or equal to 1.88, or less than or equal to 1.86.

In some more embodiments, the glass may have the $n_d$ greater than or equal to 1.85 to 2.10, greater than or equal to 1.92 to 2.08, greater than or equal to 1.95 to 2.07, greater than or equal to 1.85 and less than or equal to 2.06, greater than or equal to 1.85 and less than or equal to 1.86, greater than or equal to 1.86 and less than or equal to 1.95, greater than or equal to 1.88 and less than or equal to 2.07, greater than or equal to 1.88 and less than or equal to 1.92, greater than or equal to 1.90 and less than or equal to 2.07, greater than or equal to 1.90 and less than or equal to 1.92, greater than or equal to 1.92 and less than or equal to 2.04, greater than or equal to 1.95 and less than or equal to 2.08, greater than or equal to 1.95 and less than or equal to 2.06, greater than or equal to 1.95 and less than or equal to 2.04, greater than or equal to 2.03 and less than or equal to 2.08, greater than or equal to 2.03 and less than or equal to 2.06, greater than or equal to 1.86 and less than or equal to 1.94, greater than or equal to 1.87 and less than or equal to 1.98, or greater than or equal to 1.98 and less than or equal to 2.08.

In some embodiments, the glass composition may have a liquidus temperature $T_{liq}$ from greater than or equal to 850° C. to less than or equal to 1350° C. and all ranges and sub-ranges between the foregoing values. In some embodiments, the glass composition may have the $T_{liq}$ greater than or equal to 850° C., greater than or equal to 860° C., greater than or equal to 880° C., greater than or equal to 900° C., greater than or equal to 1000° C., greater than or equal to 1065° C., greater than or equal to 1100° C., greater than or equal to 1200° C., greater than or equal to 1300° C., greater than or equal to 1320° C., or greater than or equal to 1340° C. In some other embodiments, the glass composition may have the $T_{liq}$ less than or equal to 1350° C., less than or equal to 1340° C., less than or equal to 1320° C., less than or equal to 1300° C., less than or equal to 1200° C., less than or equal to 1108° C., less than or equal to 1100° C., less than or equal to 1050° C., less than or equal to 1000° C., less than or equal to 900° C., less than or equal to 880° C., or less than or equal to 860° C. In some more embodiments, the glass composition may have the $T_{liq}$ greater than or equal to 850° C. to 1350° C., greater than or equal to 850° C. and less than or equal to 1200° C., greater than or equal to 850° C. and less than or equal to 1000° C., greater than or equal to 860° C. and less than or equal to 1300° C., greater than or equal to 860° C. and less than or equal to 900° C., greater than or equal to 880° C. and less than or equal to 1350° C., greater than or equal to 880° C. and less than or equal to 1300° C., greater than or equal to 880° C. and less than or equal to 1100° C., greater than or equal to 880° C. and less than or equal to 900° C., greater than or equal to 900° C. and less than or equal to 1300° C., greater than or equal to 1000° C. and less than or equal to 1200° C., greater than or equal to 1000° C. and less than or equal to 1100° C., greater than or equal to 1050° C. and less than or equal to 1350° C., greater than or equal to 1050° C. and less than or equal to 1100° C., greater than or equal to 1100° C. and less than or equal to 1320° C., greater than or equal to 919° C. and less than or equal to 1175° C., greater than or equal to 1100° C. and less than or equal to 1308° C., or greater than or equal to 919° C. and less than or equal to 1100° C.

In some embodiments, the glass may have a glass transition temperature $T_g$ from greater than or equal to 500° C. to less than or equal to 725° C. and all ranges and sub-ranges between the foregoing values. In some embodiments, the glass may have the $T_g$ greater than or equal to 500° C., greater than or equal to 510° C., greater than or equal to 520° C., greater than or equal to 530° C., greater than or equal to 550° C., greater than or equal to 600° C., greater than or equal to 625° C., greater than or equal to 650° C., greater than or equal to 660° C., greater than or equal to 700° C., greater than or equal to 710° C., or greater than or equal to 720° C. In some other embodiments, the glass may have the $T_g$ less than or equal to 725° C., less than or equal to 720° C., less than or equal to 710° C., less than or equal to 700° C., less than or equal to 687° C., less than or equal to 650° C., less than or equal to 600° C., less than or equal to 550° C., less than or equal to 530° C., less than or equal to 520° C., or less than or equal to 510° C. In some more embodiments, the glass may have the $T_g$ greater than or equal to 500° C. to 700° C., greater than or equal to 500° C. and less than or equal to 725° C., greater than or equal to 500° C. and less than or equal to 600° C., greater than or equal to 500° C. and less than or equal to 520° C., greater than or equal to 510° C. and less than or equal to 700° C., greater than or equal to 510° C. and less than or equal to 600° C., greater than or equal to 520° C. and less than or equal to 725° C., greater than or equal to 520° C. and less than or equal to 700° C., greater than or equal to 530° C. and less than or equal to 710° C., greater than or equal to 530° C. and less than or equal to 600° C., greater than or equal to 550° C. and less than or equal to 710° C., greater than or equal to 550° C. and less than or equal to 600° C., greater than or equal to 600° C. and less than or equal to 710° C., greater than or equal to 600° C. and less than or equal to 687° C., greater than or equal to 650° C. and less than or equal to 725° C., greater than or equal to 650° C. and less than or equal to 720° C., greater than or equal to 650° C. and less than or equal to 687° C., greater than or equal to 597° C. and less than or equal to 718° C., greater than or equal to 531° C. and less than or equal to 670° C., or greater than or equal to 531° C. and less than or equal to 630° C.

In some embodiments, the glass may have the density at room temperature $d_{RT}$ from greater than or equal to 4.50 g/cm³ to less than or equal to 6.00 g/cm³ and all ranges and sub-ranges between the foregoing values. In some embodiments, the glass may have the $d_{RT}$ greater than or equal to 4.50 g/cm$^3$, greater than or equal to 4.60 g/cm$^3$, greater than or equal to 4.70 g/cm$^3$, greater than or equal to 4.80 g/cm$^3$, greater than or equal to 5.00 g/cm$^3$, greater than or equal to 5.50 g/cm$^3$, greater than or equal to 5.70 g/cm$^3$, greater than or equal to 5.80 g/cm$^3$, or greater than or equal to 5.90 g/cm$^3$. In some other embodiments, the glass may have the $d_{RT}$ less than or equal to 6.00 g/cm$^3$, less than or equal to 5.90 g/cm$^3$, less than or equal to 5.80 g/cm$^3$, less than or equal to 5.70 g/cm$^3$, less than or equal to 5.50 g/cm$^3$, less than or equal to 5.30 g/cm$^3$, less than or equal to 5.00 g/cm$^3$, less than or equal to 4.80 g/cm$^3$, less than or equal to 4.70 g/cm$^3$, or less than or equal to 4.60 g/cm$^3$. In some more embodiments, the glass may have the $d_{RT}$ greater than or equal to 4.50 g/cm$^3$ to 5.50 g/cm$^3$, greater than or equal to 4.50 g/cm$^3$ and less than or equal to 6.00 g/cm$^3$, greater than or equal to 4.50 g/cm$^3$ and less than or equal to 5.70 g/cm$^3$, greater than or equal to 4.60 g/cm$^3$ and less than or equal to 5.70 g/cm$^3$, greater than or equal to 4.70 g/cm$^3$ and less than or equal to 5.50 g/cm$^3$, greater than or equal to 4.70 g/cm$^3$ and less than or equal to 5.00 g/cm$^3$, greater than or equal to 4.80 g/cm$^3$ and less than or equal to 5.80 g/cm$^3$, greater than or equal to 4.80 g/cm$^3$ and less than or equal to 5.50 g/cm$^3$, greater than or equal to 4.80 g/cm$^3$ and less than or equal to 5.00 g/cm$^3$, greater than or equal to 5.00 g/cm$^3$ and less than or equal to 5.80 g/cm$^3$, greater than or equal to 5.30 g/cm$^3$ and less than or equal to 5.90 g/cm$^3$, greater than or equal to 5.30 g/cm$^3$ and less than or equal to 5.70 g/cm$^3$, greater than or equal to 5.30 g/cm$^3$ and less than or equal to 5.50 g/cm$^3$, greater than or equal to 4.73 g/cm$^3$ and less than or equal to 5.42 g/cm$^3$, greater than or equal to 5.05 g/cm$^3$ and less than or equal to 5.50 g/cm$^3$, or greater than or equal to 5.14 g/cm$^3$ and less than or equal to 5.70 g/cm$^3$.

In some embodiments, the glass composition may have the decimal logarithm of liquidus viscosity greater than or equal to 0.5 or greater than or equal to 0.75.

In some embodiments, the glass may have a quantity $n_d-(1.437+0.0005*T_{liq})$ greater than or equal to 0.

In some embodiments, the glass may have a quantity $n_d-(1.481+0.0005*T_{liq})$ greater than or equal to 0.

In some embodiments, the glass may have a quantity $(n_d-1)/d_{RT}-(0.269-0.12*T_i)$ greater than or equal to 0.

In some embodiments, the glass may have a quantity $(n_d-1)/d_{RT}-(0.274-0.12*T_i)$ greater than or equal to 0.

In some embodiments, the glass may have a quantity $n_d-(1.571+0.083*d_{RT})$ greater than or equal to 0.

Transmittance index $T_i$ is a quantity calculated by the following formula (I):

$$T_i=(La_2O_3+Gd_2O_3+ZrO_2+WO_3)/(La_2O_3+Gd_2O_3+ZrO_2+WO_3+TiO_2+Nb_2O_5), \quad (I)$$

where chemical formulas mean the amounts of corresponding components in the glass composition expressed in mol. %.

Figure 1:
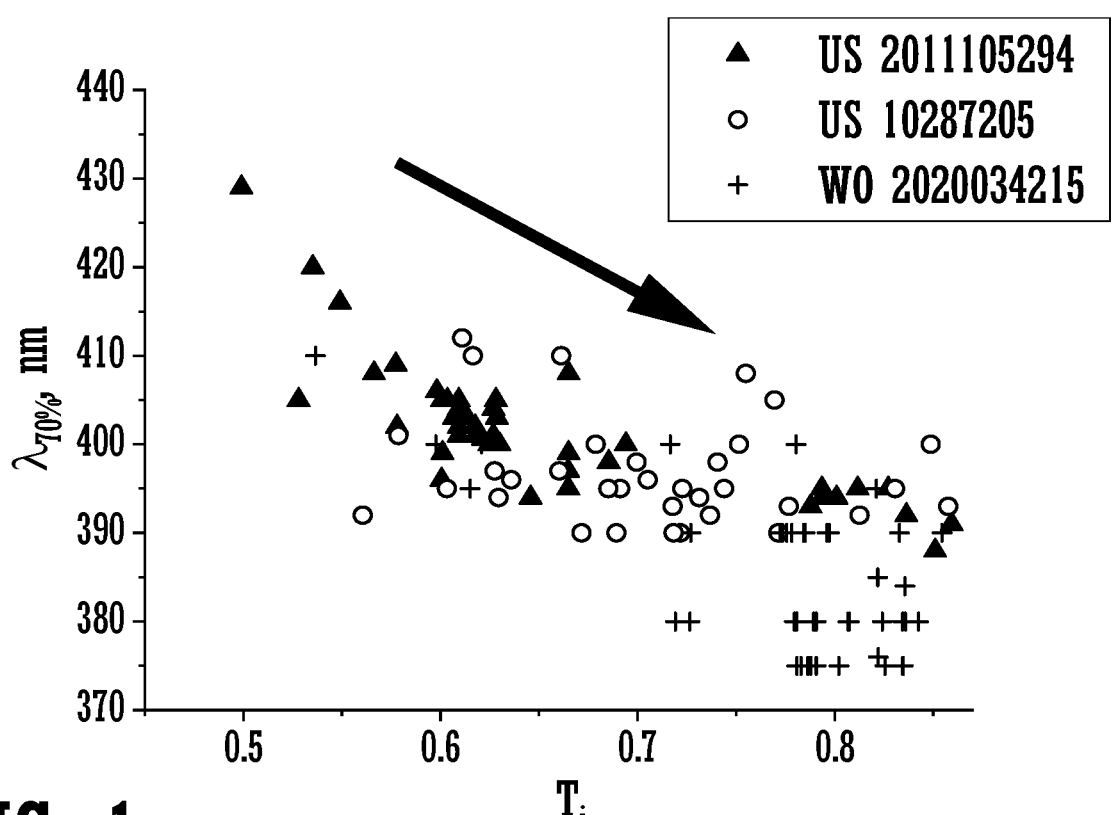
FIG. 1 is a plot illustrating the relationship between the transmittance index $T_i$ calculated according to formula (I)

FIG. 1 shows the relationship between the transmittance index $T_i$ according to formula (I) and the quantity $\lambda_{70\%}$. The quantity $\lambda_{70\%}$ is a measured quantity and indicates the minimum wavelength corresponding to a total transmittance of 70% or higher for a glass sample in the form of a plate having a thickness of 10 mm. Lower values of $\lambda_{70\%}$ generally correspond to a higher range of wavelengths at which the glass sample has a high internal transmittance, and therefore lower values of $\lambda_{70\%}$ generally correspond to a higher transmittance of the glass sample overall. The data points in FIG. 1 correspond to data taken from U.S. Pat. No. 10,287,205 (labeled as U.S. Ser. No. 10/287,205), U.S. Patent Application No. 2011/105294 (labeled as US 2011105294) and WO Patent Application No. 2020/034215 (labeled as WO 2020034215). U.S. Pat. No. 10,287,205 reported glass compositions in terms of cation percent. To calculate the transmittance index $T_i$ according to formula (I) in mol. %, the cation percent values were assumed to be equivalent to atomic percent of atoms, excluding oxygen, and the cation percent values were converted to mole percent of oxides and applied to formula (I). As illustrated in FIG. 1, the data demonstrate a correlation between the quantity $\lambda_{70\%}$ and the transmittance index $T_i$.

Refractive index $n_d$, density $d_{RT}$, refraction $(n_d-1)/d_{RT}$ and glass transition temperature $T_g$ are properties of glass that can be predicted from the glass composition. A linear regression analysis of the Exemplary Glasses of the present disclosure in the EXAMPLES section below and other glass compositions reported in the literature was performed to determine equations that can predict the composition dependences of the refractive index $n_d$, density $d_{RT}$, refraction $(n_d-1)/d_{RT}$ and glass transition temperature $T_g$.

The training dataset of glass compositions satisfying the criteria specified in Table 1 below and having measured values of the properties of interest, about 100 glass compositions for each property (refractive index $n_d$, density $d_{RT}$, refraction $(n_d-1)/d_{RT}$ and glass transition temperature $T_g$), was randomly selected from the literature data presented in the publicly available SciGlass Information System database and from the Exemplary Glasses from the embodiments presented herein. The linear regression analysis on the above-specified dataset was used to determine the formulas, with the exclusion of insignificant variables and outliers. The resulting formulas are presented in Table 2 below. Another part of glass compositions satisfying the same criteria was used as a validation set to evaluate the ability to interpolate within predefined compositional limits, which corresponds to the standard deviations specified in the Table 2. An external dataset of prior art glass compositions, also randomly selected from the SciGlass Information System database, was used to evaluate the ability to predict the properties outside of the specified compositional limits with a reasonable accuracy. Multiple iterations of this process were performed in order to determine the best variant for each property, corresponding to the above-mentioned regression formulas specified in the Table 2.

The data for the Comparative Glass compositions used in the linear regression modeling, including the training dataset, validation dataset and external dataset were obtained from the publically available SciGlass Information System database. Formulas (II), (III), (IV) and (V) below were obtained from the linear regression analysis and used to predict the refractive index $n_d$, density $d_{RT}$, refraction $(n_d-1)/d_{RT}$ and glass transition temperature $T_g$, respectively, of the glasses:

$$P_n=-0.0051086*Al_2O_3-0.0049247*B_2O_3-0.00034289*BaO+0.0086552*Bi_2O_3-0.0014511*CaO+0.0047429*Gd_2O_3-0.0033126*GeO_2-0.0049544*K_2O+0.0045475*La_2O_3-0.0023329*Li_2O-0.0026561*MgO-0.0035925*Na_2O+0.0071165*Nb_2O_5-0.0075074*P_2O_5+0.0015814*PbO-0.0043959*SiO_2-0.00086373*SrO+0.0045915*Ta_2O_5-0.0015272*TeO_2+0.0020281*TiO_2+0.0012709*WO_3+0.0025878*Y_2O_3+0.0048156*Yb_2O_3-0.00047962*ZnO+0.00090073*ZrO_2+1.955, \quad (II)$$

$$P_d(g/cm^3)=4.95-0.036300*Al_2O_3-0.028364*B_2O_3+0.010786*BaO+0.077280*Bi_2O_3-0.0047086*CaO+0.060989*Er_2O_3+$$

$0.067356*Gd_2O_3-0.024973*K_2O+$
$0.050388*La_2O_3-0.015411*Li_2O-$
$0.014318*Na_2O-0.0016283*Nb_2O_5+$
$0.078354*Nd_2O_3-0.045034*P_2O_5+$
$0.037463*PbO-0.026153*SiO_2-$
$0.0079191*TeO_2-0.015844*TiO_2+$
$0.020220*WO_3+0.016362*Y_2O_3+$
$0.058765*Yb_2O_3+0.0086588*ZnO+$
$0.0043754*ZrO_2$, (III)

$P_{ref}(cm^3/g)=0.000087034*SiO_2-0.00012035*B_2O_3-$
$0.0012566*La_2O_3+0.0011411*TiO_2-$
$0.00031654*ZnO+0.000088066*CaO+$
$0.0020444*Nb_2O_5-0.00023383*MgO-$
$0.00086501*BaO-0.0004486*WO_3-$
$0.0014114*Gd_2O_3-0.00023872*Y_2O_3-$
$0.00031575*Ta_2O_5+0.00011894*Li_2O+$
$0.00027178*Al_2O_3-0.000099802*Na_2O-$
$0.00028391*GeO_2-0.00030531*SrO-$
$0.00072061*Bi_2O_3-0.0010964*Yb_2O_3+$
$0.00022839*K_2O-0.00086617*PbO+$
$0.00027129*TeO_2+0.198$, (IV)

$P_{Tg}(°C.)=595.358-0.63217*B_2O_3-0.46552*SiO_2+$
$1.1849*TiO_2+0.59610*Nb_2O_5-1.6293*WO_3+$
$1.3877*ZrO_2+4.4090*La_2O_3+4.1695*Y_2O_3-$
$5.0756*Bi_2O_3+0.55630*CaO-5.3892*PbO-$
$4.2774*TeO_2+1.8497*Al_2O_3-0.40659*GeO_2-$
$1.7011*ZnO-4.1520*Li_2O+3.0777*Gd_2O_3$. (V)

In Formulas (II), (III), (IV) and (V) and Tables 1 and 2, refractive index parameter $P_n$ is a parameter that predicts the refractive index $n_d$ at 587.56 nm, calculated from the components of the glass composition expressed in mol. %; density parameter $P_d$ is a parameter that predicts the density $d_{RT}$ at room temperature [g/cm$^3$], calculated from the components of the glass composition expressed in mol. %; refraction parameter $P_{ref}$ is a parameter that predicts the refraction $(n_d-1)/d_{RT}$, calculated from the components of the glass composition expressed in mol. %; and $T_g$ parameter $P_{Tg}$ is a parameter that predicts the glass transition temperature $T_g$ [°C.], calculated from the components of the glass composition expressed in mol. %.

In Formulas (II), (III), (IV) and (V), each component of the glass composition is listed in terms of its chemical formula, where the chemical formula refers to the concentration of the component in the as-batched glass composition expressed in mol. %. It is understood that not all components listed in Formulas (II), (III), (IV) and (V) are necessarily present in a particular glass composition and that Formulas (II), (III), (IV) and (V) are equally valid for glass compositions that contain less than all of the components listed in the formulas. It is further understood that Formulas (II), (III), (IV) and (V) are also valid for glass compositions within the scope and claims of the present disclosure that contain components in addition to the components listed in the formulas. If a component listed in Formulas (II), (III), (IV) and (V) is absent in a particular glass composition, the concentration of the component in the glass composition is 0 mol. % and the contribution of the component to the value calculated from the formulas is zero.

In Table 1, $RE_mO_n$ is a total sum of rare earth metal oxides.

TABLE 1

Composition Space Used for Modeling

| Component limits | $n_d$ | | $d_{RT}$, g/cm$^3$ | | $(n_d - 1)/d_{RT}$ | | $T_g$, °C. | |
|---|---|---|---|---|---|---|---|---|
| | Min, mol. % | Max, mol. % | Min, mol. % | Max, mol. % | Min, mol. % | Max, mol. % | Min, mol. % | Max, mol. % |
| TiO$_2$ | 5 | 40 | 1 | 20 | 0 | 20 | 1 | 35 |
| La$_2$O$_3$ | 0 | 30 | 1 | 30 | 0 | 30 | Not limited | Not limited |
| B$_2$O$_3$ | 5 | 30 | 0 | 35 | 0 | 35 | 5 | 30 |
| SiO$_2$ | 0 | 15 | 0 | 30 | 0 | 30 | 0 | 15 |
| ZrO$_2$ | 0 | 10 | 0 | 20 | 0 | 20 | 0 | 15 |
| Nb$_2$O$_5$ | 0 | 15 | 0 | 15 | 0 | 15 | 0 | 15 |
| CaO | 0 | 20 | Not limited | Not limited | Not limited | Not limited | 0 | 20 |
| BaO | 0 | 10 | Not limited | Not limited | Not limited | Not limited | 0 | 10 |
| WO$_3$ | 0 | 30 | 1 | 25 | 0 | 25 | 0 | 30 |
| Bi$_2$O$_3$ | 0 | 20 | Not limited | Not limited | Not limited | Not limited | 0 | 20 |
| PbO | 0 | 15 | Not limited | Not limited | Not limited | Not limited | 0 | 15 |
| P$_2$O$_5$ | 0 | 10 | 0 | 10 | 0 | 10 | 0 | 10 |
| TeO$_2$ | 0 | 20 | Not limited | Not limited | 0 | 10 | 0 | 20 |
| Al$_2$O$_3$ + RE$_m$O$_n$ | 0 | 30 | Not limited | Not limited | Not limited | Not limited | 0 | 30 |
| GeO$_2$ | 0 | 10 | Not limited | Not limited | Not limited | Not limited | 0 | 10 |
| F | 0 | 3 [at. %] | 0 | 5 [at. %] | 0 | 5 [at. %] | Not limited | Not limited |
| La$_2$O$_3$ + Gd$_2$O$_3$ + ZrO$_2$ + TiO$_2$ + Nb$_2$O$_5$ + WO$_3$ + Bi$_2$O$_3$ | Not limited | Not limited | 10 | Not limited | 10 | Not limited | Not limited | Not limited |
| La$_2$O$_3$ + Gd$_2$O$_3$ | Not limited | Not limited | Not limited | Not limited | Not limited | Not limited | 1 | 35 |
| F + Cl + Br + I | Not limited | Not limited | Not limited | Not limited | Not limited | Not limited | 0 | 3 |
| TiO$_2$ + Nb$_2$O$_5$ | Not limited | Not limited | Not limited | Not limited | Not limited | Not limited | Not limited | 45 |

TABLE 1-continued

Composition Space Used for Modeling

| | Property | | | | | | | |
|---|---|---|---|---|---|---|---|---|
| | $n_d$ | | $d_{RT}$, g/cm³ | | $(n_d - 1)/d_{RT}$ | | $T_g$, °C. | |
| Component limits | Min, mol. % | Max, mol. % | Min, mol. % | Max, mol. % | Min, mol. % | Max, mol. % | Min, mol. % | Max, mol. % |
| SiO₂ + B₂O₃ − P₂O₅ | Not limited | Not limited | Not limited | Not limited | Not limited | Not limited | 0 | Not limited |
| Li₂O + Na₂O + K₂O | Not limited | Not limited | Not limited | Not limited | Not limited | Not limited | 0 | 25 |
| Other species | 0 | Not limited | 0 | Not limited | 0 | Not limited | 0 | Not limited |

TABLE 2

Property prediction models

| Property | Abbreviation | Unit | Predicting Parameter | Regression Formula | Composition Unit | Standard error |
|---|---|---|---|---|---|---|
| Refractive index at 587.56 nm | $n_d$ | | $P_n$ | Formula (II) | Mol. % | 0.021 |
| Density at room temperature | $d_{RT}$ | g/cm³ | $P_d$ | Formula (III) | Mol. % | 0.12 |
| Refractive index to density ratio ("refraction") | $(n_d - 1)/d_{RT}$ | cm³/g | $P_{ref}$ | Formula (IV) | Mol. % | 0.006 |
| Glass transition temperature | $T_g$ | °C. | $P_{Tg}$ | Formula (V) | Mol. % | 15 |

FIG. 2 is a plot of the parameter $P_n$ calculated by Formula (II) as a function of measured refractive index $n_d$ for some Literature Glasses ("Comp. Glasses") and some Exemplary Glasses ("Ex. Glasses"). As illustrated by the data in FIG. 2, the compositional dependence of the parameter $P_n$ had an error within a range of ±0.021 unit of the measured $n_d$ for the majority of glasses, that corresponds to the standard error specified in Table 2.

FIG. 3 is a plot of the parameter $P_d$ calculated by Formula (III) as a function of measured density $d_{RT}$ for some Literature Glasses ("Comp. Glasses") and some Exemplary Glasses ("Ex. Glasses"). As illustrated by the data in FIG. 3, the compositional dependence of the parameter $P_d$ had an error within a range of ±0.12 unit of the measured $d_{RT}$ for the majority of glasses, that corresponds to the standard error specified in Table 2.

FIG. 4 is a plot of the parameter $P_{ref}$ calculated by Formula (IV) as a function of measured refraction $(n_d-1)/d_{RT}$ for some Literature Glasses ("Comp. Glasses") and some Exemplary Glasses ("Ex. Glasses"). As illustrated by the data in FIG. 4, the compositional dependence of the parameter $P_{ref}$ had an error within a range of ±0.006 unit of the measured $(n_d-1)/d_{RT}$ for the majority of glasses, that corresponds to the standard error specified in Table 2.

FIG. 5 is a plot of the parameter $P_{Tg}$ calculated by Formula (V) as a function of measured glass transition temperature $T_g$ for some Literature Glasses ("Comp. Glasses") and some Exemplary Glasses ("Ex. Glasses"). As illustrated by the data in FIG. 5, the compositional dependence of the parameter $P_{Tg}$ had an error within a range of ±15 unit of the measured $T_g$ for the majority of glasses, that corresponds to the standard error specified in Table 2.

When considering $T_g$ as a function of glass composition, one should understand that the numerical value of this quantity may depend on the method of its measurement (such as differential scanning calorimetry [DSC], differential thermal analysis [DTA], thermomechanical analysis [TMA] and others), measurement conditions (such as heating rate when measuring $T_g$ when heating a sample), and the thermal history, that means the time-temperature schedule of preliminary thermal treatment, starting from melting a sample. That is why comparison of measured values of $T_g$ with the results of calculation from the glass composition may give some deviations caused by different method of measurement, and/or different process conditions, and/or different thermal history. The analysis of published data taken from different sources, performed with the use of the publicly available SciGlass Information System database shows that typically the values of $T_g$ reported for same compositions and obtained in different ways deviate from each other within approximately ±10-20° C., which is, typically, many times less than the variation of $T_g$ caused by changing the glass compositions within the ranges considered in the present disclosure.

Accordingly, the formula for prediction of $T_g$ from the glass composition presented in the present disclosure relates to the experimental conditions and methods described in the disclosure, which assumes the measurement by DSC method when heating the glass samples with the rate of 10° C./min cooled according to the procedure described in the present disclosure without special preliminary treatment. When comparing the results of such calculations with the data published in the literature, it is assumed that the published values of $T_g$ typically do not deviate from the values obtained in the conditions used herein by more than approximately 20° C.

Table 3 identifies the combination of components and their respective amounts according to some embodiments of the present disclosure. The Exemplary Glasses A in Table 3 may include additional components according to any aspects of the present disclosure as described herein.

TABLE 3

Exemplary Glasses A

| Composition | Amount (mol. %) |
|---|---|
| $WO_3$ | 3.0 to 35.0 mol. % |
| $TiO_2$ | 0.3 to 50.0 mol. % |
| $Nb_2O_5$ | 0.3 to 50.0 mol. % |
| $Bi_2O_3$ | 0.0 to 20.0 mol. % |
| $TeO_2$ | 0.0 to 10.0 mol. % |
| PbO | 0.0 to 5.0 mol. % |
| F | 0.0 to 5.0 at. % |
| Sum of ($TiO_2$ + $Nb_2O_5$) | 0.6 to 60.0 mol. % |

Exemplary Glasses A according to embodiments of the present disclosure may have a refractive index at 587.56 nm $n_d$ from 1.92 to 2.08.

According to some embodiments of the present disclosure, Exemplary Glasses A may also have a liquidus temperature $T_{liq}$ [° C.] from 850 to 1350.

According to some embodiments of the present disclosure, Exemplary Glasses A may also satisfy the following formula:

$$n_d-(1.437+0.0005*T_{liq})>0.00,$$

where $n_d$ is a refractive index at 587.56 nm, and $T_{liq}$ is a liquidus temperature.

According to some embodiments of the present disclosure, Exemplary Glasses A may also satisfy the following formula:

$$n_d-(1.481+0.0005*T_{liq})>0.00,$$

where $n_d$ is a refractive index at 587.56 nm, and $T_{liq}$ is a liquidus temperature.

Table 4 identifies the combination of components and their respective amounts according to some embodiments of the present disclosure. The Exemplary Glasses B in Table 4 may include additional components according to any aspects of the present disclosure as described herein.

TABLE 4

Exemplary Glasses B

| Composition | Amount (mol. %) |
|---|---|
| $TiO_2$ | 7.5 to 28.0 mol. % |
| $B_2O_3$ | 1.0 to 40.0 mol. % |
| $Nb_2O_5$ | 0.3 to 19.5 mol. % |
| $WO_3$ | 0.0 to 35.0 mol. % |
| $La_2O_3$ | 0.0 to 25.0 mol. % |
| $Gd_2O_3$ | 0.0 to 25.0 mol. % |
| $Bi_2O_3$ | 0.0 to 20.0 mol. % |
| $ZrO_2$ | 0.0 to 20.0 mol. % |
| $TeO_2$ | 0.0 to 20.0 mol. % |
| $SiO_2$ | 0.0 to 13.5 mol. % |
| $Al_2O_3$ | 0.0 to 10.0 mol. % |
| $ThO_2$ | 0.0 to 10.0 mol. % |
| $GeO_2$ | 0.0 to 10.0 mol. % |
| $Ta_2O_5$ | 0.0 to 10.0 mol. % |
| PbO | 0.0 to 5.0 mol. % |
| F | 0.0 to 5.0 at. % |
| Sum of ($WO_3$ + $TiO_2$) | ≤40.0 mol. % |
| Sum of ($TiO_2$ + $Nb_2O_5$) | ≤35.0 mol. % |
| Sum of ($R_2O$ + RO) | 0.0 to 5.0 mol. % |
| Sum of ($RE_2O_3$ + $ZrO_2$ + $TiO_2$ + $Nb_2O_5$ + $WO_3$) | ≥10.0 mol. % |

Exemplary Glasses B according to embodiments of the present disclosure may satisfy the following condition:

$$TiO_2-SiO_2[\text{mol. \%}]≥7.5,$$

where chemical formulas refer to the amounts of components in glass, expressed in mol. %.

According to some embodiments of the present disclosure, Exemplary Glasses B may also satisfy the following condition:

$$B_2O_3+SiO_2-P_2O_5[\text{mol. \%}]≥0.00,$$

where chemical formulas refer to the amounts of components in glass, expressed in mol. %.

According to some embodiments of the present disclosure, Exemplary Glasses B may also have a refractive index at 587.56 nm $n_d$ from 1.85 to 2.1.

According to some embodiments of the present disclosure, Exemplary Glasses B may also satisfy the following formula:

$$(n_d-1)/d_{RT}-(0.269-0.12*T_i)>0.00,$$

where $(n_d-1)/d_{RT}$ is a refractive index to density ratio ("refraction") (cm$^3$/g), and $T_i$ is a transmittance index.

According to some embodiments of the present disclosure, Exemplary Glasses B may also satisfy the following formula:

$$(n_d-1)/d_{RT}-(0.274-0.12*T_i)>0.00,$$

where $(n_d-1)/d_{RT}$ is a refractive index to density ratio ("refraction") (cm$^3$/g), and $T_i$ is a transmittance index.

Table 5 identifies the combination of components and their respective amounts according to some embodiments of the present disclosure. The Exemplary Glasses C in Table 5 may include additional components according to any aspects of the present disclosure as described herein.

TABLE 5

Exemplary Glasses C

| Composition | Amount (mol. %) |
|---|---|
| $WO_3$ | 1.0 to 40.0 mol. % |
| $ZrO_2$ | 0.3 to 20.0 mol. % |
| $B_2O_3$ | 0.0 to 40.0 mol. % |
| $La_2O_3$ | 0.0 to 35.0 mol. % |
| $Bi_2O_3$ | 0.0 to 35.0 mol. % |
| ZnO | 0.0 to 35.0 mol. % |
| $Ta_2O_5$ | 0.0 to 25.0 mol. % |
| $Al_2O_3$ | 0.0 to 10.0 mol. % |
| $ThO_2$ | 0.0 to 10.0 mol. % |
| $TeO_2$ | 0.0 to 10.0 mol. % |
| $V_2O_5$ | 0.0 to 5.0 mol. % |
| Sum of ($TiO_2$ + $Nb_2O_5$) | 0.0 to 35.0 mol. % |
| Sum of ($RE_2O_3$ + $ZrO2$ + $TiO2$ + $Nb2O5$ + $WO3$) | ≥10.0 mol. % |

Exemplary Glasses C according to embodiments of the present disclosure may satisfy the following condition:

$$B_2O_3+SiO_2-P_2O_5[\text{mol. \%}]≥0.50,$$

where chemical formulas refer to the amounts of components in glass, expressed in mol. %.

According to some embodiments of the present disclosure, Exemplary Glasses C may also have a glass transition temperature $T_g$ [° C.] from 500 to 700.

According to some embodiments of the present disclosure, Exemplary Glasses C may also have a density at room temperature $d_{RT}$ [g/cm$^3$] of less than or equal to 6.

According to some embodiments of the present disclosure, Exemplary Glasses C may also satisfy the following formula:

$$n_d-(1.571+0.083*d_{RT})>0.00,$$

where $n_d$ is a refractive index at 587.56 nm, and $d_{RT}$ is a density at room temperature (g/cm³).

EXAMPLES

The following examples describe various features and advantages provided by the disclosure, and are in no way intended to limit the invention and appended claims.

To prepare the glass samples for some exemplary glasses of the present disclosure, about 15 grams of each sample (content of intended components in the as-batched composition was more than 99.99 wt %) was melted from batch raw materials at a temperature of about 1300° C. in platinum or platinum-rhodium crucibles (Pt:Rh=80:20) for 1 hour. Two controlled cooling conditions were applied. In the first condition (referred to as "15 min test" or "15 min devit test"), it took about 15 min for the samples to cool from 1100° C. to 500° C. inside a furnace. In the second condition (referred to as "2.5 min test" or "2.5 min devit test"), it took about 2.5 min for the samples to cool from 1100° C. to 500° C. in air inside a furnace. Temperature readings were obtained by direct reading of the furnace temperature or using an IR camera reading with calibration scaling. The first condition (15 min test) approximately corresponds to the cooling rate of up to 300° C./min at a temperature of 1000° C. and the second test approximately corresponds to the cooling rate of up to 600° C./min at 1000° C. (near to this temperature, the cooling rate approached the maximum). When the temperature is lower, the cooling rate also decreases significantly. Typical schedules of the first and second cooling regimes are shown in FIG. 6. For these samples, observations referred to as "15-min devit test" and "2.5-min devit test", are specified in Table 6 below; the observation "1" is used to denote that a glass composition passed the indicated devit test, where a composition is deemed to have passed the indicated devit test if a melt of the composition forms a glass free of crystals visible under an optical microscope under magnification from 100× to 500×. The observation "0" is used to denote that a glass composition failed the indicated devit test.

To prepare other glass samples for exemplary glasses of the present disclosure, unless otherwise specified, a one kilogram batch of the components was prepared in a pure platinum crucible. The crucible was placed in a furnace set at a temperature of 1250° C., after which, the temperature in the furnace was raised to 1300° C. and held at 1300° C. for 2 hours. The furnace temperature was then reduced to 1250° C. and the glass was allowed to equilibrate at this temperature for an hour before being poured on a steel table followed by annealing at Tg for an hour.

Some sample melts were also melted in a "one liter" platinum crucible heated by Joule effect. In this process, approximately 3700 g of raw materials was used. The crucible was filled in 1.5 hours at 1250° C. The temperature was then raised to 1300° C. and held for one hour. During this step, the glass was continuously stirred at 60 rpm. The temperature was then decreased to 1200° C. where it was allowed to equilibrate for 30 minutes and the stirring speed was decreased to 20 rpm. The delivery tube was heated at 1225° C. and the glass was cast on a cooled graphite table. The glass was formed into a bar of approximately 25 mm in thickness, 50 mm in width, and 90 cm in length. The prepared bars were inspected under an optical microscope to check for crystallization and were all crystal free. The glass quality observed under the optical microscope was good with the bars being free of striae and bubbles. The glass was placed at Tg in a lehr oven for 1 hour for a rough annealing. The bars were then annealed in a static furnace for one hour at Tg and the temperature was then lowered at 1° C./min.

Some of samples were bleached after melting to improve the transmittance. Bleaching process was performed at the temperatures between 500° C. and the crystallization onset temperature $T_x$. When the temperature is less than about 500° C., the bleaching process may take too long time because of its slow rate. When the temperature of bleaching exceeds $T_x$, the glass may crystallize when heat-treating. The higher the bleaching temperature, the faster the bleaching process goes, but the lower value of resulting transmittance can be obtained.

No chemical analysis of the tested samples was performed because chemical analysis was performed for similar samples prepared in independent meltings by XRF method (X-ray fluorescence—for all oxides, except for $B_2O_3$ and $Li_2O$), by ICP method (inductively coupled plasma mass spectrometry—for $B_2O_3$) and by FES method (flame emission spectrometry—for $Li_2O$). These analyses gave deviations from the as-batched compositions within ±2.0 mass % for the major components such as $Nb_2O_5$ which is equivalently less than about 1 mol %. In Tables 6 and 7, the abbreviation "n" with a subscript refers to the refractive index at a corresponding wavelength in nm; for example, $n_{632.8\ nm}$ refers to the refractive index at wavelengths of 632.8 nm. $T_x$ refers to the crystallization onset temperature.

For some of Exemplary Glasses, including the Exemplary Glass 1, the liquidus temperature was measured by using several of the above-specified methods, including the gradient boat test with observation of the resulting material by a naked eye, and isothermal tests for 24 hours with observation of the resulting material under an optical microscope. Both methods provided the results that were consistent with each other within ±7° C.

TABLE 6

Exemplary Glass Compositions

| Exemplary Glass | | 1 | 2 | 3 | 4 | 5 | 6 | 7 | 8 |
|---|---|---|---|---|---|---|---|---|---|
| Composition - mol. % | | | | | | | | | |
| $B_2O_3$ | mol. % | 32.98 | 32.98 | 32.98 | 33.87 | 27.96 | 28.48 | 28.93 | 29.35 |
| $WO_3$ | mol. % | 15.99 | 15.99 | 15.99 | 12.11 | 6.99 | 5.05 | 3.56 | 2.05 |
| $La_2O_3$ | mol. % | 19.99 | 19.99 | 19.99 | 20.00 | 24.96 | 24.94 | 24.94 | 24.94 |
| $TiO_2$ | mol. % | 8.99 | 8.99 | 8.99 | 9.29 | 16.97 | 16.97 | 16.95 | 16.95 |
| $Nb_2O_5$ | mol. % | 15.00 | 15.00 | 15.00 | 16.45 | 8.48 | 9.17 | 9.70 | 10.25 |
| $SiO_2$ | mol. % | 0.0301 | 0.0301 | 0.0301 | 1.27 | 7.48 | 8.03 | 8.45 | 8.89 |
| $ZrO_2$ | mol. % | 7.00 | 7.00 | 7.00 | 7.00 | 6.99 | 7.12 | 7.22 | 7.33 |
| $CeO_2$ | mol. % | 0 | 0 | 0 | 0 | 0.15 | 0.15 | 0.15 | 0.15 |
| CaO | mol. % | 0 | 0 | 0 | 0 | 0.0297 | 0.0587 | 0.0583 | 0.0578 |
| $Na_2O$ | mol. % | 0 | 0 | 0 | 0 | 0 | 0.0266 | 0.0264 | 0.0261 |
| $Ta_2O_5$ | mol. % | 0.0123 | 0.0123 | 0.0123 | 0.0161 | 0.0075 | 0.0075 | 0.0074 | 0.011 |

TABLE 6-continued

Exemplary Glass Compositions

Composition constraints

| | | | | | | | | | |
|---|---|---|---|---|---|---|---|---|---|
| $TiO_2 + Nb_2O_5$ | mol. % | 23.99 | 23.99 | 23.99 | 25.74 | 25.47 | 26.15 | 26.67 | 27.21 |
| $RE_2O_3 + ZrO_2 + TiO_2 + Nb_2O_5 + WO_3$ | mol. % | 66.98 | 66.98 | 66.98 | 64.84 | 64.50 | 63.37 | 62.50 | 61.63 |
| $WO_3 + TiO_2$ | mol. % | 24.98 | 24.98 | 24.98 | 21.39 | 23.97 | 22.03 | 20.52 | 19.01 |
| $R_2O + RO$ | mol. % | 0 | 0 | 0 | 0 | 0.02971 | 0.08536 | 0.08467 | 0.08394 |
| $TiO_2 - SiO_2$ | mol. % | 8.963 | 8.963 | 8.963 | 8.015 | 9.492 | 8.943 | 8.503 | 8.059 |
| $B_2O_3 + SiO_2 - P_2O_5$ | mol. % | 33.01 | 33.01 | 33.01 | 35.14 | 35.46 | 36.53 | 37.41 | 38.27 |
| $SiO_2 + GeO_2$ | mol. % | 0.03011 | 0.03011 | 0.03011 | 1.270 | 7.487 | 8.036 | 8.460 | 8.900 |

Measured properties

| | | | | | | | | | |
|---|---|---|---|---|---|---|---|---|---|
| $n_d$ | | 2.0051 | | | | 1.9942 | | | |
| $d_{RT}$ | g/cm³ | 5.085 | | | | 5.090 | 5.010 | 4.961 | 4.918 |
| $(n_d - 1)/d_{RT}$ | cm³/g | 0.19766 | | | | 0.19533 | | | |
| 15 – min devit test (0/1) | | | | | | 1 | 1 | 1 | 1 |
| $T_{liq}$ | ° C. | 1027.0 | | | | | | | |
| $T_g$ | ° C. | 638.90 | 642.30 | 644.00 | 644.00 | | | | |
| $Log(\eta_{liq})$ | P | 0.80620 | | | | | | | |
| $\lambda_{70\%}$ | nm | 439 | | | | | | | |
| $n_d - (1.437 + 0.0005 * T_{liq})$ | | 0.0546 | | | | | | | |
| $n_d - (1.481 + 0.0005 * T_{liq})$ | | 0.0106 | | | | | | | |
| $(n_d - 1)/d_{RT} - (0.269 - 0.12 * T_i)$ | | 0.0057 | | | | -0.0011 | | | |
| $(n_d - 1)/d_{RT} - (0.274 - 0.12 * T_i)$ | | 6.800E-04 | | | | -0.0061 | | | |
| $n_d - (1.571 + 0.083 * d_{RT})$ | | 0.0121 | | | | 7.700E-04 | | | |

Predicted and calculated properties

| | | | | | | | | | |
|---|---|---|---|---|---|---|---|---|---|
| $T_i$ | | 0.6418 | 0.6418 | 0.6418 | 0.603 | 0.6047 | 0.5868 | 0.5727 | 0.5579 |
| $P_n$ [for $n_d$] | | 2.035 | 2.035 | 2.035 | 2.0312 | 2.0079 | 2.0053 | 2.0032 | 2.0012 |
| $P_{ref}$ [for $(n_d - 1)/d_{RT}$] | cm³/g | 0.2027 | 0.2027 | 0.2027 | 0.2077 | 0.1975 | 0.1998 | 0.2015 | 0.2033 |
| $P_{Tg}$ [for $T_g$] | ° C. | 665.9 | 665.9 | 665.9 | 672.3 | 707.8 | 710.9 | 713.3 | 715.8 |
| $P_d$ [for $d_{RT}$] | g/cm³ | 5.2082 | 5.2082 | 5.2082 | 5.0652 | 5.1082 | 5.038 | 4.9839 | 4.9291 |
| $P_{ref} - (0.269 - 0.12 * T_i)$ | | 0.0107 | 0.0107 | 0.0107 | 0.0111 | 0.0011 | 0.0012 | 0.0012 | 0.0012 |
| $P_{ref} - (0.274 - 0.12 * T_i)$ | | 0.0057 | 0.0057 | 0.0057 | 0.0061 | -0.0039 | -0.0038 | -0.0038 | -0.0038 |
| $P_n - (1.571 + 0.083 * P_d)$ | | 0.0317 | 0.0317 | 0.0317 | 0.0398 | 0.0129 | 0.0161 | 0.0185 | 0.0211 |

| Exemplary Glass | | 9 | 10 | 11 | 12 | 13 | 14 | 15 | 16 |
|---|---|---|---|---|---|---|---|---|---|

Composition - mol. %

| | | | | | | | | | |
|---|---|---|---|---|---|---|---|---|---|
| $B_2O_3$ | mol. % | 27.96 | 28.52 | 27.95 | 27.97 | 28.43 | 27.96 | 28.45 | 28.86 |
| $WO_3$ | mol. % | 6.99 | 5.03 | 7.09 | 10.07 | 6.86 | 13.97 | 10.46 | 7.57 |
| $La_2O_3$ | mol. % | 24.96 | 21.61 | 21.45 | 20.81 | 23.14 | 19.98 | 22.49 | 24.53 |
| $TiO_2$ | mol. % | 16.97 | 16.97 | 19.91 | 18.20 | 18.14 | 15.97 | 15.98 | 15.97 |
| $Nb_2O_5$ | mol. % | 8.48 | 9.19 | 8.74 | 8.85 | 8.85 | 8.98 | 8.98 | 8.98 |
| $SiO_2$ | mol. % | 7.48 | 8.60 | 7.47 | 6.82 | 7.15 | 6.00 | 6.36 | 6.69 |
| $Bi_2O_3$ | mol. % | 0 | 2.80 | 0 | 0 | 0 | 0 | 0 | 0 |
| $ZrO_2$ | mol. % | 6.99 | 7.12 | 7.23 | 7.13 | 7.25 | 6.99 | 7.11 | 7.22 |
| $CeO_2$ | mol. % | 0.15 | 0.13 | 0.13 | 0.12 | 0.14 | 0.12 | 0.14 | 0.15 |
| CaO | mol. % | 0.0297 | 0.0298 | 0.0283 | 0.0289 | 0.029 | 0.0296 | 0.0298 | 0.0299 |
| $Ta_2O_5$ | mol. % | 0.0075 | 0.0076 | 0.0072 | 0.0073 | 0.0074 | 0.0075 | 0.0076 | 0.0076 |

Composition constraints

| | | | | | | | | | |
|---|---|---|---|---|---|---|---|---|---|
| $TiO_2 + Nb_2O_5$ | mol. % | 25.47 | 26.18 | 28.67 | 27.06 | 27.01 | 24.96 | 24.98 | 24.97 |
| $RE_2O_3 + ZrO_2 + TiO_2 + Nb_2O_5 + WO_3$ | mol. % | 64.50 | 60.01 | 64.52 | 65.16 | 64.36 | 65.99 | 65.13 | 64.39 |
| $WO_3 + TiO_2$ | mol. % | 23.97 | 22.01 | 27.02 | 28.29 | 25.02 | 29.96 | 26.45 | 23.56 |
| $R_2O + RO$ | mol. % | 0.02971 | 0.02983 | 0.02830 | 0.02888 | 0.02903 | 0.02963 | 0.02977 | 0.02988 |
| $TiO_2 - SiO_2$ | mol. % | 9.492 | 8.380 | 12.45 | 11.39 | 11.00 | 9.97 | 9.627 | 9.291 |
| $B_2O_3 + SiO_2 - P_2O_5$ | mol. % | 35.46 | 37.15 | 35.44 | 34.80 | 35.60 | 33.97 | 34.83 | 35.57 |
| $SiO_2 + GeO_2$ | mol. % | 7.487 | 8.602 | 7.474 | 6.819 | 7.152 | 6.001 | 6.364 | 6.693 |

Measured properties

| | | | | | | | | | |
|---|---|---|---|---|---|---|---|---|---|
| $n_d$ | | | | | | | 2.003 | | |
| $d_{RT}$ | g/cm³ | | | 4.958 | 5.033 | 5.037 | 5.102 | 5.099 | 5.101 |
| $(n_d - 1)/d_{RT}$ | cm³/g | | | | | | 0.19658 | | |
| 15 – min devit test (0/1) | | 1 | 1 | | | | | | |

TABLE 6-continued

Exemplary Glass Compositions

| | | | | | | | | | |
|---|---|---|---|---|---|---|---|---|---|
| $(n_d - 1)/d_{RT} -$ $(0.269 - 0.12 * T_i)$ | | | | | | 0.0021 | | | |
| $(n_d - 1)/d_{RT} -$ $(0.274 - 0.12 * T_i)$ | | | | | | −0.0029 | | | |
| $n_d - (1.571 +$ $0.083 * d_{RT})$ | | | | | | 0.0085 | | | |

Predicted and calculated properties

| | | | | | | | | | |
|---|---|---|---|---|---|---|---|---|---|
| $T_i$ | | 0.6047 | 0.5634 | 0.5552 | 0.5843 | 0.5799 | 0.6214 | 0.6161 | 0.6117 |
| $P_n$ [for $n_d$] | | 2.0079 | 2.0119 | 2.0002 | 2.0011 | 2.0038 | 2.0022 | 2.0053 | 2.0075 |
| $P_{ref}$ [for $(n_d - 1)/d_{RT}$] | cm³/g | 0.1975 | 0.202 | 0.2058 | 0.2034 | 0.2018 | 0.2004 | 0.1988 | 0.1975 |
| $P_{Tg}$ [for $T_g$] | °C. | 707.8 | 681.7 | 696.1 | 686.6 | 701.8 | 674.2 | 690.8 | 704.2 |
| $P_d$ [for $d_{RT}$] | g/cm³ | 5.1082 | 5.0701 | 4.8875 | 4.9591 | 4.9913 | 5.0522 | 5.0848 | 5.1096 |
| $P_{ref} - (0.269 - 0.12 * T_i)$ | | 0.0011 | 6.500E−04 | 0.0034 | 0.0045 | 0.0024 | 0.0059 | 0.0037 | 0.0019 |
| $P_{ref} - (0.274 - 0.12 * T_i)$ | | −0.0039 | −0.0044 | −0.0016 | −4.700E−04 | −0.0026 | 9.400E−04 | −0.0013 | −0.0031 |
| $P_n - (1.571 + 0.083 * P_d)$ | | 0.0129 | 0.0201 | 0.0235 | 0.0184 | 0.0186 | 0.0119 | 0.0122 | 0.0124 |

| Exemplary Glass | | 17 | 18 | 19 | 20 | 21 | 22 | 23 | 24 |
|---|---|---|---|---|---|---|---|---|---|

Composition - mol. %

| | | | | | | | | | |
|---|---|---|---|---|---|---|---|---|---|
| $B_2O_3$ | mol. % | 31.32 | 30.22 | 29.19 | 29.66 | 27.95 | 28.46 | 28.89 | 30.21 |
| $WO_3$ | mol. % | 6.50 | 10.94 | 15.04 | 10.11 | 19.98 | 14.76 | 10.59 | 10.92 |
| $La_2O_3$ | mol. % | 19.97 | 19.97 | 19.97 | 19.96 | 19.98 | 19.97 | 19.97 | 21.96 |
| $TiO_2$ | mol. % | 16.97 | 16.98 | 16.97 | 16.97 | 16.98 | 16.98 | 16.98 | 19.95 |
| $Nb_2O_5$ | mol. % | 12.72 | 10.51 | 8.46 | 6.84 | 5.99 | 4.43 | 3.18 | 10.51 |
| $SiO_2$ | mol. % | 5.37 | 4.24 | 3.23 | 4.72 | 1.99 | 3.57 | 4.81 | 6.27 |
| $Bi_2O_3$ | mol. % | 0 | 0 | 0 | 4.59 | 0 | 4.68 | 8.44 | 0 |
| $ZrO_2$ | mol. % | 6.98 | 6.99 | 6.99 | 6.99 | 6.98 | 6.99 | 6.99 | 0 |
| $CeO_2$ | mol. % | 0.12 | 0.11 | 0.12 | 0.12 | 0.12 | 0.12 | 0.12 | 0.14 |
| CaO | mol. % | 0.0288 | 0.0293 | 0.0298 | 0.031 | 0.0304 | 0.0316 | 0.0326 | 0.0296 |
| $Ta_2O_5$ | mol. % | 0.011 | 0.0112 | 0.0076 | 0.0079 | 0.0039 | 0.004 | 0.0041 | 0.0113 |

Composition constraints

| | | | | | | | | | |
|---|---|---|---|---|---|---|---|---|---|
| $TiO_2 + Nb_2O_5$ | mol. % | 29.72 | 27.50 | 25.45 | 23.82 | 22.99 | 21.42 | 20.17 | 30.49 |
| $RE_2O_3 + ZrO_2 + TiO_2 + Nb_2O_5 + WO_3$ | mol. % | 63.24 | 65.48 | 67.53 | 60.97 | 70.01 | 63.22 | 57.80 | 63.46 |
| $WO_3 + TiO_2$ | mol. % | 23.48 | 27.93 | 32.02 | 27.10 | 36.98 | 31.76 | 27.59 | 30.89 |
| $R_2O + RO$ | mol. % | 0.02880 | 0.02933 | 0.02982 | 0.03104 | 0.03040 | 0.03163 | 0.03262 | 0.02960 |
| $TiO_2 - SiO_2$ | mol. % | 11.61 | 12.74 | 13.75 | 12.25 | 15.00 | 13.41 | 12.18 | 13.70 |
| $B_2O_3 + SiO_2 - P_2O_5$ | mol. % | 36.72 | 34.48 | 32.44 | 34.40 | 29.95 | 32.05 | 33.71 | 36.50 |
| $SiO_2 + GeO_2$ | mol. % | 5.376 | 4.243 | 3.229 | 4.722 | 1.986 | 3.572 | 4.811 | 6.271 |

Measured properties

| | | | | | | | | | |
|---|---|---|---|---|---|---|---|---|---|
| $n_d$ | | 1.997 | | | | 2.0002 | | | |
| $d_{RT}$ | g/cm³ | 4.866 | 4.997 | 5.126 | 5.306 | 5.260 | 5.446 | 5.593 | |
| $(n_d - 1)/d_{RT}$ | cm³/g | 0.20489 | | | | 0.19016 | | | |
| $(n_d - 1)/d_{RT} -$ $(0.269 - 0.12 * T_i)$ | | −5.500E−04 | | | | 0.0017 | | | |
| $(n_d - 1)/d_{RT} -$ $(0.274 - 0.12 * T_i)$ | | −0.0055 | | | | −0.0033 | | | |
| $n_d - (1.571 +$ $0.083 * d_{RT})$ | | 0.0221 | | | | −0.0073 | | | |

Predicted and calculated properties

| | | | | | | | | | |
|---|---|---|---|---|---|---|---|---|---|
| $T_i$ | | 0.5297 | 0.5796 | 0.6228 | 0.6089 | 0.6714 | 0.6609 | 0.6507 | 0.519 |
| $P_n$ [for $n_d$] | | 2.0075 | 2.0078 | 2.008 | 2.0209 | 2.0083 | 2.0215 | 2.0323 | 2.0078 |
| $P_{ref}$ [for $(n_d - 1)/d_{RT}$] | cm³/g | 0.2121 | 0.2056 | 0.1996 | 0.1953 | 0.1924 | 0.1882 | 0.1849 | 0.2067 |
| $P_{Tg}$ [for $T_g$] | °C. | 688.0 | 680.6 | 673.9 | 656.6 | 665.7 | 648.4 | 634.6 | 682.4 |
| $P_d$ [for $d_{RT}$] | g/cm³ | 4.7991 | 4.9536 | 5.0961 | 5.3011 | 5.2677 | 5.4703 | 5.6342 | 4.9232 |
| $P_{ref} - (0.269 - 0.12 * T_i)$ | | 0.0066 | 0.0061 | 0.0053 | −6.800E−04 | 0.0039 | −0.0015 | −0.0060 | −3.200E−05 |
| $P_{ref} - (0.274 - 0.12 * T_i)$ | | 0.0016 | 0.0011 | 3.300E−04 | −0.0057 | −0.0011 | −0.0065 | −0.0110 | −0.0050 |
| $P_n - (1.571 + 0.083 * P_d)$ | | 0.0381 | 0.0256 | 0.0140 | 0.0100 | 3.400E−05 | −0.0036 | −0.0063 | 0.0281 |

TABLE 6-continued

Exemplary Glass Compositions

| Exemplary Glass | | 25 | 26 | 27 | 28 | 29 | 30 | 31 | 32 |
|---|---|---|---|---|---|---|---|---|---|
| Composition - mol. % | | | | | | | | | |
| $B_2O_3$ | mol. % | 27.96 | 27.05 | 27.96 | 26.39 | 27.12 | 27.95 | 25.76 | 26.49 |
| $WO_3$ | mol. % | 13.97 | 16.71 | 16.58 | 18.68 | 18.90 | 18.53 | 20.57 | 20.70 |
| $La_2O_3$ | mol. % | 19.98 | 19.97 | 19.97 | 19.97 | 19.97 | 19.97 | 19.97 | 19.97 |
| $TiO_2$ | mol. % | 15.97 | 15.98 | 14.23 | 15.97 | 14.39 | 12.95 | 15.98 | 14.42 |
| $Nb_2O_5$ | mol. % | 8.98 | 7.77 | 8.98 | 6.89 | 7.85 | 8.98 | 6.05 | 7.04 |
| $SiO_2$ | mol. % | 6.00 | 5.37 | 5.13 | 4.94 | 4.63 | 4.47 | 4.53 | 4.24 |
| $ZrO_2$ | mol. % | 6.99 | 6.99 | 6.99 | 7.00 | 6.98 | 6.99 | 6.99 | 6.98 |
| $CeO_2$ | mol. % | 0.12 | 0.12 | 0.12 | 0.12 | 0.12 | 0.12 | 0.12 | 0.12 |
| CaO | mol. % | 0.0296 | 0.03 | 0.0304 | 0.0303 | 0.0306 | 0.0309 | 0.0305 | 0.0309 |
| $Ta_2O_5$ | mol. % | 0.0075 | 0.0076 | 0.0077 | 0.0077 | 0.0078 | 0.0078 | 0.0039 | 0.0078 |
| Composition constraints | | | | | | | | | |
| $TiO_2 + Nb_2O_5$ | mol. % | 24.96 | 23.76 | 23.23 | 22.88 | 22.25 | 21.95 | 22.05 | 21.47 |
| $RE_2O_3 + ZrO_2 + TiO_2 + Nb_2O_5 + WO_3$ | mol. % | 65.99 | 67.52 | 66.85 | 68.61 | 68.20 | 67.52 | 69.66 | 69.22 |
| $WO_3 + TiO_2$ | mol. % | 29.96 | 32.71 | 30.83 | 34.67 | 33.31 | 31.50 | 36.57 | 35.13 |
| $R_2O + RO$ | mol. % | 0.02963 | 0.03001 | 0.03037 | 0.03028 | 0.03065 | 0.03092 | 0.03053 | 0.03090 |
| $TiO_2 - SiO_2$ | mol. % | 9.97 | 10.61 | 9.110 | 11.04 | 9.761 | 8.486 | 11.46 | 10.19 |
| $B_2O_3 + SiO_2 - P_2O_5$ | mol. % | 33.97 | 32.45 | 33.11 | 31.36 | 31.77 | 32.44 | 30.31 | 30.75 |
| $SiO_2 + GeO_2$ | mol. % | 6.001 | 5.377 | 5.130 | 4.945 | 4.634 | 4.473 | 4.531 | 4.239 |
| Measured properties | | | | | | | | | |
| $n_d$ | | 1.9867 | | | | | | | |
| $d_{RT}$ | g/cm³ | 5.062 | | | 5.240 | 5.260 | 5.193 | 5.290 | |
| $(n_d - 1)/d_{RT}$ | cm³/g | 0.19492 | | | | | | | |
| 15 – min devit test (0/1) | | | 1 | 1 | | | | | 1 |
| $(n_d - 1)/d_{RT} - (0.269 - 0.12 * T_i)$ | | 4.800E-04 | | | | | | | |
| $(n_d - 1)/d_{RT} - (0.274 - 0.12 * T_i)$ | | -0.0045 | | | | | | | |
| $n_d - (1.571 + 0.083 * d_{RT})$ | | -0.0045 | | | | | | | |
| Predicted and calculated properties | | | | | | | | | |
| $T_i$ | | 0.6214 | 0.6477 | 0.6522 | 0.6662 | 0.6734 | 0.6747 | 0.6832 | 0.6895 |
| $P_n$ [for $n_d$] | | 2.0022 | 2.0042 | 2.0057 | 2.0056 | 2.0073 | 2.0086 | 2.007 | 2.0087 |
| $P_{ref}$ [for $(n_d - 1)/d_{RT}$] | cm³/g | 0.2004 | 0.1967 | 0.1972 | 0.1941 | 0.194 | 0.1948 | 0.1916 | 0.1916 |
| $P_{Tg}$ [for $T_g$] | ° C. | 674.2 | 669.9 | 668.3 | 666.8 | 664.8 | 663.9 | 663.8 | 662.0 |
| $P_d$ [for $d_{RT}$] | g/cm³ | 5.0522 | 5.151 | 5.1547 | 5.2221 | 5.2381 | 5.232 | 5.2906 | 5.3035 |
| $P_{ref} - (0.269 - 0.12 * T_i)$ | | 0.0059 | 0.0055 | 0.0064 | 0.0051 | 0.0058 | 0.0067 | 0.0046 | 0.0054 |
| $P_{ref} - (0.274 - 0.12 * T_i)$ | | 9.400E-04 | 4.700E-04 | 0.0014 | 4.800E-05 | 8.400E-04 | 0.0017 | -4.300E-04 | 3.800E-04 |
| $P_n - (1.571 + 0.083 * P_d)$ | | 0.0119 | 0.0057 | 0.0069 | 0.0012 | 0.0016 | 0.0033 | -0.0032 | -0.0025 |

| Exemplary Glass | | 33 | 34 | 35 | 36 | 37 | 38 | 39 | 40 |
|---|---|---|---|---|---|---|---|---|---|
| Composition - mol. % | | | | | | | | | |
| $B_2O_3$ | mol. % | 27.11 | 27.96 | 24.96 | 25.78 | 26.41 | 27.07 | 27.95 | 27.95 |
| $WO_3$ | mol. % | 20.66 | 20.45 | 22.96 | 22.96 | 22.95 | 22.96 | 22.97 | 22.97 |
| $La_2O_3$ | mol. % | 19.97 | 19.97 | 19.96 | 19.96 | 19.96 | 19.97 | 19.97 | 19.97 |
| $TiO_2$ | mol. % | 13.20 | 11.65 | 15.98 | 14.35 | 13.08 | 11.77 | 9.98 | 9.98 |
| $Nb_2O_5$ | mol. % | 7.86 | 8.99 | 4.99 | 6.08 | 6.92 | 7.79 | 8.99 | 8.99 |
| $SiO_2$ | mol. % | 4.04 | 3.84 | 4.00 | 3.73 | 3.52 | 3.29 | 3.00 | 3.00 |
| $ZrO_2$ | mol. % | 6.99 | 6.98 | 6.99 | 6.99 | 6.99 | 7.00 | 7.00 | 7.00 |
| $CeO_2$ | mol. % | 0.12 | 0.12 | 0.12 | 0.12 | 0.12 | 0.11 | 0.12 | 0.12 |
| CaO | mol. % | 0.0311 | 0.0314 | 0.0308 | 0.0312 | 0.0315 | 0.0318 | 0.0322 | 0.0322 |
| $Ta_2O_5$ | mol. % | 0.0079 | 0.008 | 0.0039 | 0.004 | 0.008 | 0.0081 | 0.0082 | 0.0082 |
| Composition constraints | | | | | | | | | |
| $TiO_2 + Nb_2O_5$ | mol. % | 21.08 | 20.65 | 20.98 | 20.43 | 20.01 | 19.58 | 18.98 | 18.98 |
| $RE_2O_3 + ZrO_2 + TiO_2 + Nb_2O_5 + WO_3$ | mol. % | 68.79 | 68.14 | 70.98 | 70.44 | 70.01 | 69.59 | 68.99 | 68.99 |
| $WO_3 + TiO_2$ | mol. % | 33.88 | 32.12 | 38.96 | 37.33 | 36.06 | 34.75 | 32.96 | 32.96 |
| $R_2O + RO$ | mol. % | 0.03116 | 0.03146 | 0.03086 | 0.03122 | 0.03149 | 0.03178 | 0.03217 | 0.03217 |
| $TiO_2 - SiO_2$ | mol. % | 9.170 | 7.814 | 11.98 | 10.63 | 9.560 | 8.487 | 6.981 | 6.981 |

TABLE 6-continued

Exemplary Glass Compositions

| | | | | | | | | | |
|---|---|---|---|---|---|---|---|---|---|
| $B_2O_3 + SiO_2 - P_2O_5$ | mol. % | 31.17 | 31.82 | 28.98 | 29.53 | 29.95 | 30.37 | 30.97 | 30.97 |
| $SiO_2 + GeO_2$ | mol. % | 4.042 | 3.846 | 4.003 | 3.729 | 3.526 | 3.292 | 3.003 | 3.003 |

Measured properties

| | | | | | | | | | |
|---|---|---|---|---|---|---|---|---|---|
| $n_d$ | | | | | | | | | 1.9889 |
| $d_{RT}$ | g/cm³ | | 5.261 | 5.360 | | 5.355 | | 5.331 | 5.317 |
| $(n_d - 1)/d_{RT}$ | cm³/g | | | | | | | | 0.18599 |
| 15 – min devit test (0/1) | | 1 | | | 1 | | 1 | | |
| $T_{liq}$ | °C. | | | | | | | | 1077.0 |
| $T_g$ | °C. | | | | | | | | 641.50 |
| $n_d - (1.437 + 0.0005 * T_{liq})$ | | | | | | | | | 0.0134 |
| $n_d - (1.481 + 0.0005 * T_{liq})$ | | | | | | | | | -0.0306 |
| $(n_d - 1)/d_{RT} - (0.269 - 0.12 * T_i)$ | | | | | | | | | 0.004 |
| $(n_d - 1)/d_{RT} - (0.274 - 0.12 * T_i)$ | | | | | | | | | -0.001 |
| $n_d - (1.571 + 0.083 * d_{RT})$ | | | | | | | | | -0.0234 |

Predicted and calculated properties

| | | | | | | | | | |
|---|---|---|---|---|---|---|---|---|---|
| $T_i$ | | 0.6933 | 0.6966 | 0.7042 | 0.7097 | 0.714 | 0.7185 | 0.7247 | 0.7247 |
| $P_n$ [for $n_d$] | | 2.0098 | 2.0111 | 2.0087 | 2.0102 | 2.0115 | 2.0129 | 2.0147 | 2.0147 |
| $P_{ref}$ [for $(n_d - 1)/d_{RT}$] | cm³/g | 0.1919 | 0.1924 | 0.1884 | 0.1886 | 0.1888 | 0.189 | 0.1893 | 0.1893 |
| $P_{Tg}$ [for $T_g$] | °C. | 660.8 | 659.5 | 660.0 | 658.3 | 657.0 | 655.7 | 653.9 | 653.9 |
| $P_d$ [for $d_{RT}$] | g/cm³ | 5.3079 | 5.3074 | 5.3768 | 5.385 | 5.391 | 5.3982 | 5.4074 | 5.4074 |
| $P_{ref} - (0.269 - 0.12 * T_i)$ | | 0.0061 | 0.0070 | 0.0039 | 0.0048 | 0.0055 | 0.0062 | 0.0072 | 0.0072 |
| $P_{ref} - (0.274 - 0.12 * T_i)$ | | 0.0011 | 0.0020 | -0.0011 | -2.200E-04 | 4.800E-04 | 0.0012 | 0.0022 | 0.0022 |
| $P_n - (1.571 + 0.083 * P_d)$ | | -0.0017 | -4.000E-04 | -0.0086 | -0.0077 | -0.0070 | -0.0062 | -0.0051 | -0.0051 |

| Exemplary Glass | | 41 | 42 | 43 | 44 | 45 | 46 | 47 | 48 |
|---|---|---|---|---|---|---|---|---|---|

Composition - mol. %

| | | | | | | | | | |
|---|---|---|---|---|---|---|---|---|---|
| $B_2O_3$ | mol. % | 26.72 | 27.96 | 25.84 | 27.95 | 21.27 | 21.18 | 21.60 | 27.97 |
| $WO_3$ | mol. % | 26.34 | 25.93 | 28.73 | 28.11 | 14.41 | 19.46 | 19.32 | 13.99 |
| $La_2O_3$ | mol. % | 21.50 | 20.86 | 22.59 | 21.52 | 20.95 | 20.95 | 20.95 | 19.99 |
| $TiO_2$ | mol. % | 9.97 | 7.01 | 9.99 | 4.84 | 14.30 | 10.25 | 11.35 | 15.98 |
| $Nb_2O_5$ | mol. % | 6.23 | 8.98 | 4.26 | 8.99 | 9.48 | 9.48 | 9.48 | 8.99 |
| $SiO_2$ | mol. % | 2.09 | 2.12 | 1.43 | 1.44 | 8.78 | 7.66 | 8.17 | 5.97 |
| $ZrO_2$ | mol. % | 6.99 | 6.99 | 6.99 | 6.99 | 7.36 | 7.17 | 7.18 | 6.99 |
| $Y_2O_3$ | mol. % | 0 | 0 | 0 | 0 | 0.38 | 0.43 | 0.21 | 0 |
| BaO | mol. % | 0 | 0 | 0 | 0 | 2.87 | 3.20 | 1.53 | 0.0108 |
| $CeO_2$ | mol. % | 0.13 | 0.12 | 0.13 | 0.12 | 0.12 | 0.13 | 0.13 | 0 |
| SrO | mol. % | 0 | 0 | 0 | 0 | 0.0167 | 0.0175 | 0.0173 | 0 |
| CaO | mol. % | 0.0329 | 0.0334 | 0.0334 | 0.0343 | 0.0309 | 0.0323 | 0.032 | 0.0592 |
| $SrCl_4$ | mol. % | 0 | 0 | 0 | 0 | 0 | 0 | 0 | 0.0391 |
| $Na_2O$ | mol. % | 0 | 0 | 0 | 0 | 0.0279 | 0.0292 | 0.0289 | 0 |
| $Ta_2O_5$ | mol. % | 0.0042 | 0.0085 | 0.0042 | 0.0087 | 0.0078 | 0.0082 | 0.0081 | 0.0075 |

Composition constraints

| | | | | | | | | | |
|---|---|---|---|---|---|---|---|---|---|
| $TiO_2 + Nb_2O_5$ | mol. % | 16.21 | 16.00 | 14.25 | 13.84 | 23.79 | 19.74 | 20.84 | 24.97 |
| $RE_2O_3 + ZrO_2 + TiO_2 + Nb_2O_5 + WO_3$ | mol. % | 71.14 | 69.86 | 72.67 | 70.55 | 66.98 | 67.85 | 68.59 | 65.94 |
| $WO_3 + TiO_2$ | mol. % | 36.33 | 32.95 | 38.74 | 32.97 | 28.72 | 29.73 | 30.69 | 29.97 |
| $R_2O + RO$ | mol. % | 0.03290 | 0.03339 | 0.03341 | 0.03430 | 2.943 | 3.283 | 1.610 | 0.07005 |
| $TiO_2 - SiO_2$ | mol. % | 7.889 | 4.890 | 8.558 | 3.400 | 5.516 | 2.594 | 3.182 | 10.02 |
| $B_2O_3 + SiO_2 - P_2O_5$ | mol. % | 28.83 | 30.09 | 27.30 | 29.40 | 30.07 | 28.86 | 29.79 | 33.94 |
| $SiO_2 + GeO_2$ | mol. % | 2.088 | 2.119 | 1.434 | 1.441 | 8.788 | 7.663 | 8.177 | 5.969 |

Measured properties

| | | | | | | | | | |
|---|---|---|---|---|---|---|---|---|---|
| $d_{RT}$ | g/cm³ | 5.487 | 5.419 | 5.617 | 5.491 | | | | 5.090 |
| 15 – min devit test (0/1) | | | | | | 1 | 1 | 1 | |
| $T_{liq}$ | °C. | | | | | | | | 1082.0 |
| $T_g$ | °C. | | | | | | | | 653.70 |

TABLE 6-continued

Exemplary Glass Compositions

Predicted and calculated properties

| | | | | | | | | | |
|---|---|---|---|---|---|---|---|---|---|
| $T_i$ | | 0.7719 | 0.7708 | 0.8037 | 0.8037 | 0.6425 | 0.7069 | 0.6949 | 0.6213 |
| $P_n$ [for $n_d$] | | 2.0163 | 2.0203 | 2.0175 | 2.0248 | 2.0282 | 2.0317 | 2.0294 | 2.0023 |
| $P_{ref}$ [for ($n_d$ − 1)/$d_{RT}$] | cm³/g | 0.1802 | 0.1833 | 0.1738 | 0.179 | 0.1965 | 0.1893 | 0.1921 | 0.2004 |
| $P_{Tg}$ [for $T_g$] | ° C. | 654.7 | 649.8 | 655.3 | 646.9 | 681.2 | 668.7 | 668.8 | 674.3 |
| $P_d$ [for $d_{RT}$] | g/cm³ | 5.6163 | 5.582 | 5.7646 | 5.712 | 5.2913 | 5.493 | 5.4257 | 5.0529 |
| $P_{ref}$ − (0.269 − 0.12 * $T_i$) | | 0.0039 | 0.0068 | 0.0013 | 0.0064 | 0.0046 | 0.0051 | 0.0065 | 0.0059 |
| $P_{ref}$ − (0.274 − 0.12 * $T_i$) | | −0.0011 | 0.0018 | −0.0037 | 0.0014 | −3.900E−04 | 8.200E−05 | 0.0015 | 9.300E−04 |
| $P_n$ − (1.571 + 0.083 * $P_d$) | | −0.0208 | −0.0140 | −0.0320 | −0.0203 | 0.0181 | 0.0048 | 0.0081 | 0.0119 |

| Exemplary Glass | | 49 | 50 | 51 | 52 | 53 | 54 | 55 | 56 |
|---|---|---|---|---|---|---|---|---|---|

Composition - mol. %

| | | | | | | | | | |
|---|---|---|---|---|---|---|---|---|---|
| $B_2O_3$ | mol. % | 27.02 | 27.98 | 26.36 | 27.09 | 27.97 | 25.73 | 26.47 | 27.10 |
| $WO_3$ | mol. % | 16.86 | 16.67 | 18.84 | 19.04 | 18.64 | 20.71 | 20.81 | 20.77 |
| $La_2O_3$ | mol. % | 19.99 | 19.98 | 19.98 | 19.99 | 19.99 | 19.99 | 19.98 | 19.99 |
| $TiO_2$ | mol. % | 15.99 | 14.20 | 15.98 | 14.38 | 12.87 | 15.99 | 14.44 | 13.21 |
| $Nb_2O_5$ | mol. % | 7.72 | 8.99 | 6.83 | 7.82 | 8.99 | 6.01 | 7.00 | 7.83 |
| $SiO_2$ | mol. % | 5.32 | 5.07 | 4.89 | 4.58 | 4.42 | 4.47 | 4.18 | 3.98 |
| $ZrO_2$ | mol. % | 6.99 | 6.99 | 7.00 | 6.99 | 7.00 | 6.99 | 7.00 | 6.99 |
| BaO | mol. % | 0.011 | 0.0111 | 0.0111 | 0.0112 | 0.0113 | 0.0112 | 0.0113 | 0.0114 |
| CaO | mol. % | 0.06 | 0.0607 | 0.0606 | 0.0613 | 0.0619 | 0.0611 | 0.0618 | 0.0623 |
| $SiCl_4$ | mol. % | 0.0396 | 0.0401 | 0.04 | 0.0405 | 0.0408 | 0.0403 | 0.0408 | 0.0411 |
| $Ta_2O_5$ | mol. % | 0.0076 | 0.0077 | 0.0077 | 0.0078 | 0.0078 | 0.0039 | 0.0078 | 0.0079 |

Composition constraints

| | | | | | | | | | |
|---|---|---|---|---|---|---|---|---|---|
| $TiO_2$ + $Nb_2O_5$ | mol. % | 23.70 | 23.18 | 22.82 | 22.20 | 21.87 | 22.00 | 21.44 | 21.04 |
| $RE_2O_3$ + $ZrO_2$ + $TiO_2$ + $Nb_2O_5$ + $WO_3$ | mol. % | 67.54 | 66.83 | 68.63 | 68.21 | 67.49 | 69.68 | 69.23 | 68.79 |
| $WO_3$ + $TiO_2$ | mol. % | 32.85 | 30.87 | 34.82 | 33.42 | 31.52 | 36.70 | 35.25 | 33.98 |
| $R_2O$ + RO | mol. % | 0.07098 | 0.07183 | 0.07162 | 0.07252 | 0.07316 | 0.07223 | 0.07307 | 0.07370 |
| $TiO_2$ − $SiO_2$ | mol. % | 10.67 | 9.124 | 11.09 | 9.798 | 8.458 | 11.52 | 10.26 | 9.226 |
| $B_2O_3$ + $SiO_2$ − $P_2O_5$ | mol. % | 32.34 | 33.05 | 31.25 | 31.67 | 32.39 | 30.20 | 30.65 | 31.08 |
| $SiO_2$ + $GeO_2$ | mol. % | 5.321 | 5.073 | 4.888 | 4.578 | 4.416 | 4.474 | 4.180 | 3.983 |

Measured properties

| | | | | | | | | | |
|---|---|---|---|---|---|---|---|---|---|
| $d_{RT}$ | g/cm³ | 5.209 | 5.182 | 5.287 | 5.299 | 5.221 | 5.346 | 5.361 | 5.328 |
| 15 − min devit test (0/1) | | 1 | | | | | 1 | 1 | 1 |
| $T_{liq}$ | ° C. | | 1075.0 | 1095.0 | 1108.0 | 1065.0 | | | |
| $T_g$ | ° C. | | | 651.80 | | 645.80 | | | |

Predicted and calculated properties

| | | | | | | | | | |
|---|---|---|---|---|---|---|---|---|---|
| $T_i$ | | 0.649 | 0.6531 | 0.6676 | 0.6746 | 0.676 | 0.6843 | 0.6903 | 0.6941 |
| $P_n$ [for $n_d$] | | 2.0044 | 2.0059 | 2.0058 | 2.0076 | 2.0087 | 2.0073 | 2.0089 | 2.0101 |
| $P_{ref}$ [for ($n_d$ − 1)/$d_{RT}$] | cm³/g | 0.1965 | 0.1971 | 0.1939 | 0.1939 | 0.1946 | 0.1914 | 0.1915 | 0.1917 |
| $P_{Tg}$ [for $T_g$] | ° C. | 669.7 | 668.2 | 666.6 | 664.6 | 663.7 | 663.7 | 661.9 | 660.7 |
| $P_d$ [for $d_{RT}$] | g/cm³ | 5.1569 | 5.1584 | 5.2282 | 5.244 | 5.2369 | 5.2964 | 5.3077 | 5.3128 |
| $P_{ref}$ − (0.269 − 0.12 * $T_i$) | | 0.0054 | 0.0064 | 0.0050 | 0.0058 | 0.0067 | 0.0045 | 0.0054 | 0.0060 |
| $P_{ref}$ − (0.274 − 0.12 * $T_i$) | | 4.300E−04 | 0.0014 | 6.800E−06 | 8.200E−04 | 0.0017 | −4.700E−04 | 3.500E−04 | 0.0010 |
| $P_n$ − (1.571 + 0.083 * $P_d$) | | 0.0054 | 0.0068 | 8.500E−04 | 0.0014 | 0.0031 | −0.0033 | −0.0026 | −0.0019 |

| Exemplary Glass | | 57 | 58 | 59 | 60 | 61 | 62 | 63 | 64 |
|---|---|---|---|---|---|---|---|---|---|

Composition - mol. %

| | | | | | | | | | |
|---|---|---|---|---|---|---|---|---|---|
| $B_2O_3$ | mol. % | 27.97 | 24.97 | 25.78 | 26.41 | 27.06 | 27.96 | 31.41 | 29.82 |
| $WO_3$ | mol. % | 20.54 | 22.99 | 22.98 | 22.98 | 22.98 | 22.98 | 11.40 | 15.38 |
| $La_2O_3$ | mol. % | 19.98 | 19.99 | 19.99 | 19.98 | 19.98 | 19.98 | 19.98 | 19.99 |
| $TiO_2$ | mol. % | 11.62 | 15.98 | 14.39 | 13.12 | 11.82 | 10.00 | 16.98 | 16.98 |
| $Nb_2O_5$ | mol. % | 8.99 | 5.00 | 6.06 | 6.90 | 7.78 | 8.99 | 10.29 | 8.30 |
| $SiO_2$ | mol. % | 3.79 | 3.97 | 3.70 | 3.50 | 3.26 | 2.97 | 2.83 | 2.42 |
| $ZrO_2$ | mol. % | 6.99 | 6.99 | 7.00 | 6.99 | 7.00 | 6.99 | 7.00 | 7.00 |
| BaO | mol. % | 0.0115 | 0.0113 | 0.0114 | 0.0115 | 0.0116 | 0.0118 | 0.0108 | 0.0109 |

TABLE 6-continued

Exemplary Glass Compositions

| | | | | | | | | |
|---|---|---|---|---|---|---|---|---|
| CaO | mol. % | 0.0629 | 0.0617 | 0.0624 | 0.0629 | 0.0635 | 0.0643 | 0.0588 | 0.0597 |
| $SiCl_4$ | mol. % | 0.0415 | 0.0407 | 0.0412 | 0.0416 | 0.0419 | 0.0424 | 0.0388 | 0.0394 |
| $Ta_2O_5$ | mol. % | 0.008 | 0.0039 | 0.004 | 0.008 | 0.0081 | 0.0082 | 0.0112 | 0.0076 |

Composition constraints

| | | | | | | | | |
|---|---|---|---|---|---|---|---|---|
| $TiO_2 + Nb_2O_5$ | mol. % | 20.61 | 20.98 | 20.45 | 20.02 | 19.59 | 18.99 | 27.26 | 25.28 |
| $RE_2O_3 + ZrO_2 + TiO_2 + Nb_2O_5 + WO_3$ | mol. % | 68.11 | 70.94 | 70.41 | 69.97 | 69.55 | 68.94 | 65.64 | 67.64 |
| $WO_3 + TiO_2$ | mol. % | 32.15 | 38.97 | 37.37 | 36.10 | 34.80 | 32.97 | 28.38 | 32.35 |
| $R_2O + RO$ | mol. % | 0.07442 | 0.07297 | 0.07379 | 0.07444 | 0.07513 | 0.07605 | 0.06952 | 0.07062 |
| $TiO_2 - SiO_2$ | mol. % | 7.829 | 12.01 | 10.69 | 9.627 | 8.555 | 7.027 | 14.15 | 14.55 |
| $B_2O_3 + SiO_2 - P_2O_5$ | mol. % | 31.76 | 28.94 | 29.47 | 29.91 | 30.32 | 30.93 | 34.24 | 32.24 |
| $SiO_2 + GeO_2$ | mol. % | 3.788 | 3.973 | 3.697 | 3.495 | 3.260 | 2.970 | 2.825 | 2.424 |

Measured properties

| | | | | | | | | |
|---|---|---|---|---|---|---|---|---|
| $d_{RT}$ | g/cm³ | 5.281 | 5.397 | 5.392 | 5.403 | 5.363 | 5.322 | | |
| 15 – min devit test (0/1) | | 1 | | 1 | | 1 | | 1 | 1 |
| $T_{liq}$ | ° C. | | 1116.0 | | 1100.0 | | 1077.0 | | |
| $T_g$ | ° C. | | 647.50 | | 645.70 | | 641.50 | | |

Predicted and calculated properties

| | | | | | | | | |
|---|---|---|---|---|---|---|---|---|
| $T_i$ | | 0.6974 | 0.7043 | 0.7096 | 0.7139 | 0.7183 | 0.7245 | 0.5847 | 0.6263 |
| $P_n$ [for $n_d$] | | 2.0113 | 2.0089 | 2.0104 | 2.0116 | 2.013 | 2.0148 | 2.0072 | 2.0077 |
| $P_{ref}$ [for ($n_d$ − 1)/$d_{RT}$] | cm³/g | 0.1923 | 0.1884 | 0.1886 | 0.1888 | 0.189 | 0.1893 | 0.2046 | 0.1989 |
| $P_{Tg}$ [for $T_g$] | ° C. | 659.4 | 660.0 | 658.4 | 657.1 | 655.8 | 653.9 | 679.7 | 673.3 |
| $P_d$ [for $d_{RT}$] | g/cm³ | 5.3112 | 5.3789 | 5.3863 | 5.3924 | 5.3993 | 5.4078 | 4.9674 | 5.1072 |
| $P_{ref}$ − (0.269 − 0.12 * $T_i$) | | 0.0070 | 0.0039 | 0.0048 | 0.0054 | 0.0062 | 0.0072 | 0.0058 | 0.0051 |
| $P_{ref}$ − (0.274 − 0.12 * $T_i$) | | 0.0020 | −0.0011 | −2.500E−04 | 4.400E−04 | 0.0012 | 0.0022 | 7.900E−04 | 9.600E−05 |
| $P_n$ − (1.571 + 0.083 * $P_d$) | | −4.900E−04 | −0.0086 | −0.0077 | −0.0070 | −0.0061 | −0.0051 | 0.0239 | 0.0128 |

| Exemplary Glass | | 65 | 66 | 67 | 68 | 69 | 70 | 71 | 72 |
|---|---|---|---|---|---|---|---|---|---|

Composition - mol. %

| | | | | | | | | |
|---|---|---|---|---|---|---|---|---|
| $B_2O_3$ | mol. % | 27.98 | 28.97 | 30.67 | 30.75 | 32.09 | 32.38 | 32.19 | 33.66 |
| $WO_3$ | mol. % | 19.99 | 15.99 | 12.11 | 15.99 | 8.86 | 12.22 | 15.98 | 5.29 |
| $La_2O_3$ | mol. % | 19.99 | 19.98 | 19.99 | 19.99 | 19.98 | 19.99 | 19.98 | 19.99 |
| $TiO_2$ | mol. % | 16.98 | 16.97 | 16.98 | 12.67 | 16.98 | 12.72 | 9.16 | 16.97 |
| $Nb_2O_5$ | mol. % | 5.99 | 9.99 | 11.44 | 12.79 | 12.66 | 14.15 | 15.06 | 14.01 |
| $SiO_2$ | mol. % | 1.96 | 0.97 | 1.71 | 0.71 | 2.31 | 1.41 | 0.51 | 2.97 |
| $ZrO_2$ | mol. % | 7.00 | 7.00 | 6.99 | 6.99 | 6.99 | 7.00 | 6.99 | 6.99 |
| BaO | mol. % | 0.0111 | 0.0112 | 0.011 | 0.0115 | 0.0108 | 0.0113 | 0.0118 | 0.0106 |
| CaO | mol. % | 0.0608 | 0.0613 | 0.06 | 0.0631 | 0.059 | 0.0619 | 0.0646 | 0.0578 |
| $SiCl_4$ | mol. % | 0.0401 | 0.0405 | 0.0396 | 0.0417 | 0.0389 | 0.0408 | 0.0426 | 0.0382 |
| $Ta_2O_5$ | mol. % | 0.0039 | 0.0078 | 0.0114 | 0.012 | 0.0112 | 0.0118 | 0.0123 | 0.0147 |

Composition constraints

| | | | | | | | | |
|---|---|---|---|---|---|---|---|---|
| $TiO_2 + Nb_2O_5$ | mol. % | 22.97 | 26.97 | 28.42 | 25.45 | 29.64 | 26.87 | 24.21 | 30.98 |
| $RE_2O_3 + ZrO_2 + TiO_2 + Nb_2O_5 + WO_3$ | mol. % | 69.95 | 69.93 | 67.50 | 68.42 | 65.48 | 66.08 | 67.17 | 63.25 |
| $WO_3 + TiO_2$ | mol. % | 36.97 | 32.96 | 29.09 | 28.65 | 25.84 | 24.94 | 25.14 | 22.26 |
| $R_2O + RO$ | mol. % | 0.07189 | 0.07249 | 0.07099 | 0.07463 | 0.06977 | 0.07316 | 0.07636 | 0.06842 |
| $TiO_2 - SiO_2$ | mol. % | 15.02 | 16.00 | 15.27 | 11.96 | 14.67 | 11.31 | 8.643 | 14.00 |
| $B_2O_3 + SiO_2 - P_2O_5$ | mol. % | 29.93 | 29.95 | 32.38 | 31.45 | 34.40 | 33.80 | 32.70 | 36.63 |
| $SiO_2 + GeO_2$ | mol. % | 1.957 | 0.9723 | 1.708 | 0.7066 | 2.312 | 1.414 | 0.5121 | 2.969 |

Measured properties

| | | | | | | | | |
|---|---|---|---|---|---|---|---|---|
| $d_{RT}$ | g/cm³ | | | | 5.202 | 4.972 | 5.084 | 5.165 | 4.877 |
| 15 – min devit test (0/1) | | 1 | | | 1 | | 1 | | |
| $T_{liq}$ | ° C. | | 1107.0 | 1111.0 | | 1106.0 | | 1039.0 | 1137.0 |

Predicted and calculated properties

| | | | | | | | | |
|---|---|---|---|---|---|---|---|---|
| $T_i$ | | 0.6716 | 0.6144 | 0.5789 | 0.628 | 0.5473 | 0.5933 | 0.6395 | 0.5101 |
| $P_n$ [for $n_d$] | | 2.0083 | 2.031 | 2.0248 | 2.0346 | 2.0197 | 2.0285 | 2.0374 | 2.0142 |
| $P_{ref}$ [for ($n_d$ − 1)/$d_{RT}$] | cm³/g | 0.1923 | 0.2021 | 0.2067 | 0.2027 | 0.2105 | 0.2071 | 0.2031 | 0.2147 |
| $P_{Tg}$ [for $T_g$] | ° C. | 665.8 | 674.5 | 680.2 | 670.0 | 685.1 | 675.7 | 666.4 | 690.4 |
| $P_d$ [for $d_{RT}$] | g/cm³ | 5.2684 | 5.1781 | 5.0295 | 5.1986 | 4.9062 | 5.0546 | 5.2146 | 4.7702 |

TABLE 6-continued

Exemplary Glass Compositions

| | | | | | | | | | |
|---|---|---|---|---|---|---|---|---|---|
| $P_{ref} - (0.269 - 0.12 * T_i)$ | | | 0.0039 | 0.0068 | 0.0072 | 0.0090 | 0.0072 | 0.0093 | 0.0109 | 0.0069 |
| $P_{ref} - (0.274 - 0.12 * T_i)$ | | | −0.0011 | 0.0018 | 0.0022 | 0.0040 | 0.0022 | 0.0043 | 0.0059 | 0.0019 |
| $P_n - (1.571 + 0.083 * P_d)$ | | | −2.200E−05 | 0.0302 | 0.0363 | 0.0321 | 0.0415 | 0.0380 | 0.0336 | 0.0472 |

| Exemplary Glass | | 73 | 74 | 75 | 76 | 77 | 78 | 79 | 80 |
|---|---|---|---|---|---|---|---|---|---|
| Composition - mol. % | | | | | | | | | |
| $B_2O_3$ | mol. % | 33.83 | 33.86 | 33.75 | 35.96 | 35.96 | 35.97 | 35.96 | 32.60 |
| $WO_3$ | mol. % | 9.08 | 12.09 | 15.98 | 0 | 4.75 | 8.23 | 11.63 | 13.40 |
| $La_2O_3$ | mol. % | 19.98 | 19.98 | 19.98 | 19.98 | 19.98 | 19.99 | 19.98 | 20.90 |
| $TiO_2$ | mol. % | 12.53 | 9.26 | 5.39 | 16.98 | 11.94 | 8.24 | 4.64 | 13.11 |
| $Nb_2O_5$ | mol. % | 15.45 | 16.44 | 17.49 | 15.98 | 17.46 | 18.56 | 19.61 | 12.93 |
| $SiO_2$ | mol. % | 2.02 | 1.24 | 0.28 | 3.98 | 2.79 | 1.89 | 1.06 | 0.0584 |
| $ZrO_2$ | mol. % | 7.00 | 7.00 | 7.00 | 7.00 | 6.99 | 6.99 | 6.99 | 6.99 |
| BaO | mol. % | 0.0111 | 0.0116 | 0.0121 | 0.0103 | 0.0109 | 0.0114 | 0.0119 | 0 |
| CaO | mol. % | 0.0609 | 0.0633 | 0.0661 | 0.0561 | 0.0598 | 0.0625 | 0.065 | 0 |
| $SiCl_4$ | mol. % | 0.0402 | 0.0418 | 0.0437 | 0.0371 | 0.0395 | 0.0412 | 0.0429 | 0 |
| $Ta_2O_5$ | mol. % | 0.0155 | 0.0161 | 0.0168 | 0.0142 | 0.0152 | 0.0159 | 0.0165 | 0.0119 |
| Composition constraints | | | | | | | | | |
| $TiO_2 + Nb_2O_5$ | mol. % | 27.98 | 25.70 | 22.88 | 32.97 | 29.40 | 26.80 | 24.25 | 26.04 |
| $RE_2O_3 + ZrO_2 + TiO_2 + Nb_2O_5 + WO_3$ | mol. % | 64.03 | 64.77 | 65.84 | 59.94 | 61.12 | 62.01 | 62.84 | 67.33 |
| $WO_3 + TiO_2$ | mol. % | 21.60 | 21.35 | 21.37 | 16.98 | 16.69 | 16.47 | 16.26 | 26.51 |
| $R_2O + RO$ | mol. % | 0.07204 | 0.07483 | 0.07823 | 0.06639 | 0.07070 | 0.07387 | 0.07693 | 0 |
| $TiO_2 - SiO_2$ | mol. % | 10.51 | 8.019 | 5.108 | 13.00 | 9.148 | 6.348 | 3.572 | 13.05 |
| $B_2O_3 + SiO_2 - P_2O_5$ | mol. % | 35.84 | 35.10 | 34.02 | 39.94 | 38.75 | 37.86 | 37.03 | 32.66 |
| $SiO_2 + GeO_2$ | mol. % | 2.018 | 1.240 | 0.2778 | 3.981 | 2.789 | 1.894 | 1.062 | 0.05839 |
| Measured properties | | | | | | | | | |
| $d_{RT}$ | g/cm³ | 4.992 | 5.065 | | | | | | 5.130 |
| 15 − min devit test (0/1) | | 1 | 1 | 1 | 1 | 1 | 1 | 1 | 1 |
| Predicted and calculated properties | | | | | | | | | |
| $T_i$ | | 0.563 | 0.6032 | 0.6525 | 0.450 | 0.519 | 0.5678 | 0.6141 | 0.6133 |
| $P_n$ [for $n_d$] | | 2.0236 | 2.0311 | 2.0404 | 2.0057 | 2.0173 | 2.026 | 2.0341 | 2.0312 |
| $P_{ref}$ [for ($n_d$ − 1)/$d_{RT}$] | cm³/g | 0.2108 | 0.2077 | 0.2036 | 0.221 | 0.216 | 0.2124 | 0.2088 | 0.2032 |
| $P_{Tg}$ [for $T_g$] | ° C. | 680.1 | 672.3 | 662.5 | 698.2 | 686.0 | 677.0 | 668.2 | 678.0 |
| $P_d$ [for $d_{RT}$] | g/cm³ | 4.9346 | 5.0654 | 5.2322 | 4.5678 | 4.7728 | 4.9235 | 5.0688 | 5.1496 |
| $P_{ref} - (0.269 - 0.12 * T_i)$ | | 0.0094 | 0.0111 | 0.0129 | 0.0060 | 0.0093 | 0.0115 | 0.0135 | 0.0078 |
| $P_{ref} - (0.274 - 0.12 * T_i)$ | | 0.0044 | 0.0061 | 0.0079 | 9.700E−04 | 0.0043 | 0.0065 | 0.0085 | 0.0028 |
| $P_n - (1.571 + 0.083 * P_d)$ | | 0.0430 | 0.0397 | 0.0352 | 0.0556 | 0.0502 | 0.0463 | 0.0424 | 0.0328 |

| Exemplary Glass | | 81 | 82 | 83 | 84 | 85 | 86 | 87 | 88 |
|---|---|---|---|---|---|---|---|---|---|
| Composition - mol. % | | | | | | | | | |
| $B_2O_3$ | mol. % | 31.04 | 32.93 | 29.65 | 31.39 | 33.10 | 29.76 | 33.04 | 32.66 |
| $WO_3$ | mol. % | 15.61 | 10.93 | 17.60 | 13.24 | 9.15 | 15.54 | 8.73 | 9.54 |
| $La_2O_3$ | mol. % | 18.25 | 21.10 | 15.87 | 18.48 | 21.03 | 15.67 | 21.58 | 21.21 |
| $TiO_2$ | mol. % | 17.09 | 14.89 | 20.67 | 18.72 | 16.63 | 22.98 | 15.88 | 16.95 |
| $Nb_2O_5$ | mol. % | 10.94 | 13.08 | 9.15 | 11.11 | 13.03 | 9.00 | 13.11 | 12.61 |
| $SiO_2$ | mol. % | 0.0562 | 0.0574 | 0.0542 | 0.0552 | 0.0564 | 0.0529 | 0.0568 | 0.0565 |
| $ZrO_2$ | mol. % | 7.00 | 7.00 | 7.00 | 6.99 | 7.00 | 7.00 | 7.60 | 6.96 |
| $Ta_2O_5$ | mol. % | 0.0115 | 0.0117 | 0.0074 | 0.0113 | 0.0115 | 0.0072 | 0.0116 | 0.0115 |
| Composition constraints | | | | | | | | | |
| $TiO_2 + Nb_2O_5$ | mol. % | 28.03 | 27.97 | 29.82 | 29.83 | 29.66 | 31.98 | 28.99 | 29.56 |
| $RE_2O_3 + ZrO_2 + TiO_2 + Nb_2O_5 + WO_3$ | mol. % | 68.89 | 67.00 | 70.29 | 68.54 | 66.84 | 70.18 | 66.89 | 67.27 |
| $WO_3 + TiO_2$ | mol. % | 32.70 | 25.82 | 38.27 | 31.96 | 25.78 | 38.51 | 24.61 | 26.50 |
| $TiO_2 - SiO_2$ | mol. % | 17.03 | 14.83 | 20.62 | 18.66 | 16.57 | 22.92 | 15.83 | 16.90 |
| $B_2O_3 + SiO_2 - P_2O_5$ | mol. % | 31.10 | 32.99 | 29.71 | 31.45 | 33.15 | 29.81 | 33.10 | 32.72 |
| $SiO_2 + GeO_2$ | mol. % | 0.05616 | 0.05738 | 0.05415 | 0.05524 | 0.05639 | 0.05285 | 0.05676 | 0.05649 |

TABLE 6-continued

Exemplary Glass Compositions

Measured properties

|  |  |  |  |  |  |  |  |  |  |
|---|---|---|---|---|---|---|---|---|---|
| $d_{RT}$ | g/cm³ | 5.071 | 5.089 | 5.036 | 5.034 |  | 4.974 |  |  |
| 15 – min devit test (0/1) |  | 1 | 1 | 1 | 1 | 1 | 1 | 1 | 1 |

Predicted and calculated properties

|  |  |  |  |  |  |  |  |  |  |
|---|---|---|---|---|---|---|---|---|---|
| $T_i$ |  | 0.5931 | 0.5825 | 0.5757 | 0.5647 | 0.5563 | 0.5443 | 0.5667 | 0.5605 |
| $P_n$ [for $n_d$] |  | 2.0236 | 2.0321 | 2.0166 | 2.0244 | 2.0318 | 2.0162 | 2.0336 | 2.0329 |
| $P_{ref}$ [for ($n_d$ − 1)/$d_{RT}$] | cm³/g | 0.2062 | 0.2064 | 0.2089 | 0.2091 | 0.2091 | 0.2124 | 0.2079 | 0.2083 |
| $P_{Tg}$ [for $T_g$] | °C. | 667.2 | 684.9 | 657.5 | 673.9 | 689.4 | 662.6 | 692.5 | 689.9 |
| $P_d$ [for $d_{RT}$] | g/cm³ | 5.0455 | 5.072 | 4.9513 | 4.9728 | 5.0006 | 4.860 | 5.0354 | 5.0251 |
| $P_{ref}$ − (0.269 − 0.12 * $T_i$) |  | 0.0084 | 0.0073 | 0.0090 | 0.0079 | 0.0069 | 0.0087 | 0.0069 | 0.0065 |
| $P_{ref}$ − (0.274 − 0.12 * $T_i$) |  | 0.0034 | 0.0023 | 0.0040 | 0.0029 | 0.0019 | 0.0037 | 0.0019 | 0.0015 |
| $P_n$ − (1.571 + 0.083 * $P_d$) |  | 0.0338 | 0.0401 | 0.0347 | 0.0407 | 0.0458 | 0.0418 | 0.0447 | 0.0448 |

| Exemplary Glass |  | 89 | 90 | 91 | 92 | 93 | 94 | 95 | 96 |
|---|---|---|---|---|---|---|---|---|---|

Composition - mol. %

|  |  |  |  |  |  |  |  |  |  |
|---|---|---|---|---|---|---|---|---|---|
| $B_2O_3$ | mol. % | 33.33 | 32.27 | 32.96 | 33.53 | 32.53 | 33.12 | 33.72 | 32.59 |
| $WO_3$ | mol. % | 7.88 | 10.35 | 8.69 | 7.29 | 9.55 | 8.13 | 6.67 | 13.39 |
| $La_2O_3$ | mol. % | 21.84 | 20.86 | 21.49 | 22.02 | 21.09 | 21.63 | 22.20 | 20.89 |
| $TiO_2$ | mol. % | 16.27 | 18.02 | 17.30 | 16.64 | 18.55 | 17.90 | 17.23 | 13.13 |
| $Nb_2O_5$ | mol. % | 13.33 | 12.12 | 12.85 | 13.47 | 12.30 | 12.93 | 13.58 | 12.93 |
| $SiO_2$ | mol. % | 0.0566 | 0.0562 | 0.0564 | 0.0565 | 0.0561 | 0.0562 | 0.0563 | 0.0584 |
| $ZrO_2$ | mol. % | 7.28 | 6.32 | 6.65 | 6.97 | 5.90 | 6.22 | 6.54 | 7.00 |
| $Ta_2O_5$ | mol. % | 0.0116 | 0.0115 | 0.0115 | 0.0115 | 0.0114 | 0.0115 | 0.0115 | 0.0119 |

Composition constraints

|  |  |  |  |  |  |  |  |  |  |
|---|---|---|---|---|---|---|---|---|---|
| $TiO_2 + Nb_2O_5$ | mol. % | 29.60 | 30.14 | 30.15 | 30.11 | 30.86 | 30.83 | 30.81 | 26.06 |
| $RE_2O_3 + ZrO_2 + TiO_2 + Nb_2O + WO_3$ | mol. % | 66.60 | 67.66 | 66.97 | 66.40 | 67.40 | 66.81 | 66.21 | 67.34 |
| $WO_3 + TiO_2$ | mol. % | 24.15 | 28.36 | 25.98 | 23.94 | 28.10 | 26.03 | 23.89 | 26.51 |
| $TiO_2 - SiO_2$ | mol. % | 16.21 | 17.96 | 17.24 | 16.59 | 18.50 | 17.84 | 17.17 | 13.07 |
| $B_2O_3 + SiO_2 - P_2O_5$ | mol. % | 33.39 | 32.33 | 33.02 | 33.59 | 32.59 | 33.18 | 33.78 | 32.65 |
| $SiO_2 + GeO_2$ | mol. % | 0.05663 | 0.05623 | 0.05637 | 0.05652 | 0.05605 | 0.05619 | 0.05634 | 0.05837 |

Measured properties

|  |  |  |  |  |  |  |  |  |  |
|---|---|---|---|---|---|---|---|---|---|
| $d_{RT}$ | g/cm³ |  |  |  |  |  |  |  | 5.083 |
| 15 – min devit test (0/1) |  | 1 | 1 | 1 | 1 | 1 | 1 | 1 | 1 |

Predicted and calculated properties

|  |  |  |  |  |  |  |  |  |  |
|---|---|---|---|---|---|---|---|---|---|
| $T_i$ |  | 0.5555 | 0.5545 | 0.5498 | 0.5465 | 0.5422 | 0.5386 | 0.5347 | 0.613 |
| $P_n$ [for $n_d$] |  | 2.0344 | 2.0324 | 2.0338 | 2.0349 | 2.0331 | 2.0343 | 2.0356 | 2.0313 |
| $P_{ref}$ [for ($n_d$ − 1)/$d_{RT}$] | cm³/g | 0.2088 | 0.2086 | 0.2091 | 0.2095 | 0.2096 | 0.210 | 0.2105 | 0.2032 |
| $P_{Tg}$ [for $T_g$] | °C. | 695.0 | 687.4 | 692.5 | 696.8 | 689.7 | 694.1 | 698.6 | 678.0 |
| $P_d$ [for $d_{RT}$] | g/cm³ | 5.0154 | 5.0158 | 5.0061 | 4.9994 | 4.9933 | 4.986 | 4.9789 | 5.1491 |
| $P_{ref}$ − (0.269 − 0.12 * $T_i$) |  | 0.0065 | 0.0062 | 0.0061 | 0.0061 | 0.0057 | 0.0057 | 0.0056 | 0.0078 |
| $P_{ref}$ − (0.274 − 0.12 * $T_i$) |  | 0.0015 | 0.0012 | 0.0011 | 0.0011 | 6.900E−04 | 6.700E−04 | 6.400E−04 | 0.0028 |
| $P_n$ − (1.571 + 0.083 * $P_d$) |  | 0.0472 | 0.0451 | 0.0473 | 0.0490 | 0.0477 | 0.0495 | 0.0514 | 0.0329 |

| Exemplary Glass |  | 97 | 98 | 99 | 100 | 101 | 102 | 103 | 104 |
|---|---|---|---|---|---|---|---|---|---|

Composition - mol. %

|  |  |  |  |  |  |  |  |  |  |
|---|---|---|---|---|---|---|---|---|---|
| $B_2O_3$ | mol. % | 31.69 | 32.86 | 31.05 | 31.98 | 33.06 | 30.41 | 31.33 | 32.14 |
| $WO_3$ | mol. % | 14.68 | 11.72 | 15.59 | 13.10 | 10.44 | 16.45 | 14.02 | 11.93 |
| $La_2O_3$ | mol. % | 19.96 | 21.21 | 19.30 | 20.30 | 21.43 | 18.66 | 19.64 | 20.51 |
| $TiO_2$ | mol. % | 15.44 | 14.08 | 17.06 | 16.17 | 14.83 | 18.63 | 17.75 | 16.90 |
| $Nb_2O_5$ | mol. % | 11.77 | 13.07 | 10.94 | 11.97 | 13.18 | 10.15 | 11.16 | 12.06 |
| $SiO_2$ | mol. % | 0.0288 | 0.0579 | 0.0286 | 0.0286 | 0.0575 | 0.0283 | 0.0284 | 0.0284 |
| $ZrO_2$ | mol. % | 4.85 | 6.98 | 3.33 | 4.97 | 6.99 | 1.88 | 3.49 | 4.94 |
| BaO | mol. % | 1.54 | 0 | 2.62 | 1.45 | 0 | 3.65 | 2.50 | 1.46 |
| SiO | mol. % | 0.0334 | 0 | 0.0497 | 0.0332 | 0 | 0.0821 | 0.0493 | 0.033 |
| $Na_2O$ | mol. % | 0 | 0 | 0.0277 | 0 | 0 | 0.0274 | 0.0275 | 0 |

TABLE 6-continued

Exemplary Glass Compositions

|  |  |  |  |  |  |  |  |  |  |
|---|---|---|---|---|---|---|---|---|---|
| $Ta_2O_5$ | mol. % | 0.0118 | 0.0118 | 0.0117 | 0.0117 | 0.0117 | 0.0077 | 0.0116 | 0.0116 |
| $Al_2O_3$ | mol. % | 0 | 0 | 0 | 0 | 0 | 0.0167 | 0 | 0 |

Composition constraints

|  |  |  |  |  |  |  |  |  |  |
|---|---|---|---|---|---|---|---|---|---|
| $TiO_2 + Nb_2O_5$ | mol. % | 27.21 | 27.16 | 28.00 | 28.13 | 28.01 | 28.79 | 28.91 | 28.95 |
| $RE_2O_3 + ZrO_2 + TiO_2 + Nb_2O_5 + WO_3$ | mol. % | 66.70 | 67.07 | 66.21 | 66.50 | 66.88 | 65.77 | 66.05 | 66.32 |
| $WO_3 + TiO_2$ | mol. % | 30.12 | 25.80 | 32.64 | 29.26 | 25.27 | 35.08 | 31.77 | 28.82 |
| $R_2O + RO$ | mol. % | 1.570 | 0 | 2.696 | 1.480 | 0 | 3.759 | 2.578 | 1.493 |
| $TiO_2 - SiO_2$ | mol. % | 15.41 | 14.02 | 17.03 | 16.14 | 14.77 | 18.60 | 17.72 | 16.87 |
| $B_2O_3 + SiO_2 - P_2O_5$ | mol. % | 31.72 | 32.92 | 31.08 | 32.01 | 33.11 | 30.44 | 31.36 | 32.17 |
| $SiO_2 + GeO_2$ | mol. % | 0.02883 | 0.05787 | 0.02856 | 0.02862 | 0.05747 | 0.02831 | 0.02836 | 0.02843 |

Measured properties

|  |  |  |  |  |  |  |  |  |  |
|---|---|---|---|---|---|---|---|---|---|
| $d_{RT}$ | g/cm³ | 5.124 | 5.079 | 5.164 | 5.115 | 5.073 | 5.117 | 5.120 | 5.064 |
| 15 – min devit test (0/1) |  | 1 | 1 | 1 | 1 | 1 | 1 | 1 | 1 |

Predicted and calculated properties

|  |  |  |  |  |  |  |  |  |  |
|---|---|---|---|---|---|---|---|---|---|
| $T_i$ |  | 0.5921 | 0.5951 | 0.5771 | 0.5769 | 0.5811 | 0.5624 | 0.5623 | 0.5635 |
| $P_n$ [for $n_d$] |  | 2.0271 | 2.0322 | 2.024 | 2.0283 | 2.0329 | 2.0211 | 2.0253 | 2.029 |
| $P_{ref}$ [for $(n_d - 1)/d_{RT}$] | cm³/g | 0.2029 | 0.2049 | 0.2026 | 0.2044 | 0.2063 | 0.2024 | 0.2042 | 0.2057 |
| $P_{Tg}$ [for $T_g$] | ° C. | 671.4 | 683.1 | 666.7 | 676.5 | 687.1 | 662.3 | 671.8 | 680.1 |
| $P_d$ [for $d_{RT}$] | g/cm³ | 5.1269 | 5.108 | 5.1103 | 5.0914 | 5.0762 | 5.0942 | 5.0761 | 5.062 |
| $P_{ref} - (0.269 - 0.12 * T_i)$ |  | 0.0049 | 0.0074 | 0.0028 | 0.0047 | 0.0070 | 8.400E-04 | 0.0026 | 0.0043 |
| $P_{ref} - (0.274 - 0.12 * T_i)$ |  | -9.800E-05 | 0.0024 | -0.0022 | -3.500E-04 | 0.0020 | -0.0042 | -0.0024 | -7.200E-04 |
| $P_n - (1.571 + 0.083 * P_d)$ |  | 0.0306 | 0.0372 | 0.0288 | 0.0347 | 0.0406 | 0.0273 | 0.0330 | 0.0379 |

| Exemplary Glass |  | 105 | 106 | 107 | 108 | 109 | 110 | 111 | 112 |
|---|---|---|---|---|---|---|---|---|---|

Composition - mol. %

|  |  |  |  |  |  |  |  |  |  |
|---|---|---|---|---|---|---|---|---|---|
| $B_2O_3$ | mol. % | 33.24 | 29.63 | 32.28 | 33.53 | 34.98 | 34.07 | 33.47 | 33.41 |
| $WO_3$ | mol. % | 9.12 | 17.58 | 10.59 | 7.29 | 9.99 | 9.99 | 12.98 | 10.00 |
| $La_2O_3$ | mol. % | 21.68 | 17.84 | 20.67 | 22.01 | 20.98 | 20.98 | 20.99 | 20.99 |
| $TiO_2$ | mol. % | 15.60 | 20.65 | 17.94 | 16.66 | 9.99 | 13.02 | 10.29 | 15.19 |
| $Nb_2O_5$ | mol. % | 13.30 | 9.13 | 12.07 | 13.46 | 16.99 | 14.87 | 15.20 | 13.35 |
| $SiO_2$ | mol. % | 0.0571 | 0.028 | 0.0282 | 0.0565 | 0.0592 | 0.0579 | 0.0596 | 0.057 |
| $ZrO_2$ | mol. % | 6.98 | 0 | 4.74 | 6.97 | 7.00 | 7.00 | 6.99 | 7.00 |
| BaO | mol. % | 0 | 4.99 | 1.60 | 0 | 0 | 0 | 0 | 0 |
| SiO | mol. % | 0 | 0.0974 | 0.0327 | 0 | 0 | 0 | 0 | 0 |
| $Na_2O$ | mol. % | 0 | 0.0271 | 0.0273 | 0 | 0 | 0 | 0 | 0 |
| $Ta_2O_5$ | mol. % | 0.0116 | 0.0076 | 0.0115 | 0.0115 | 0.0161 | 0.0118 | 0.0122 | 0.0116 |
| $Al_2O_3$ | mol. % | 0 | 0.0165 | 0 | 0 | 0 | 0 | 0 | 0 |

Composition constraints

|  |  |  |  |  |  |  |  |  |  |
|---|---|---|---|---|---|---|---|---|---|
| $TiO_2 + Nb_2O_5$ | mol. % | 28.90 | 29.78 | 30.02 | 30.13 | 26.98 | 27.89 | 25.49 | 28.54 |
| $RE_2O_3 + ZrO_2 + TiO_2 + Nb_2O_5 + WO_3$ | mol. % | 66.69 | 65.20 | 66.02 | 66.40 | 64.95 | 65.86 | 66.45 | 66.52 |
| $WO_3 + TiO_2$ | mol. % | 24.73 | 38.23 | 28.54 | 23.95 | 19.98 | 23.01 | 23.27 | 25.19 |
| $R_2O + RO$ | mol. % | 0 | 5.114 | 1.660 | 0 | 0 | 0 | 0 | 0 |
| $TiO_2 - SiO_2$ | mol. % | 15.55 | 20.62 | 17.92 | 16.61 | 9.932 | 12.96 | 10.23 | 15.13 |
| $B_2O_3 + SiO_2 - P_2O_5$ | mol. % | 33.30 | 29.66 | 32.31 | 33.58 | 35.04 | 34.13 | 33.53 | 33.47 |
| $SiO_2 + GeO_2$ | mol. % | 0.05706 | 0.02798 | 0.02817 | 0.05651 | 0.05917 | 0.05788 | 0.05963 | 0.05697 |

Measured properties

|  |  |  |  |  |  |  |  |  |  |
|---|---|---|---|---|---|---|---|---|---|
| 15 – min devit test (0/1) |  | 1 | 1 | 1 | 1 | 1 | 1 | 1 | 1 |

Predicted and calculated properties

|  |  |  |  |  |  |  |  |  |  |
|---|---|---|---|---|---|---|---|---|---|
| $T_i$ |  | 0.5666 | 0.5432 | 0.5453 | 0.5463 | 0.5846 | 0.5765 | 0.6164 | 0.571 |
| $P_n$ [for $n_d$] |  | 2.0338 | 2.0174 | 2.0293 | 2.0349 | 2.0381 | 2.0337 | 2.0372 | 2.0305 |
| $P_{ref}$ [for $(n_d - 1)/d_{RT}$] | cm³/g | 0.2077 | 0.202 | 0.2071 | 0.2096 | 0.2091 | 0.2083 | 0.2046 | 0.2077 |
| $P_{Tg}$ [for $T_g$] | ° C. | 691.1 | 656.6 | 683.9 | 696.8 | 681.1 | 684.0 | 676.5 | 686.1 |
| $P_d$ [for $d_{RT}$] | g/cm³ | 5.0441 | 5.0739 | 5.0231 | 4.9988 | 5.0602 | 5.0415 | 5.1619 | 5.0287 |
| $P_{ref} - (0.269 - 0.12 * T_i)$ |  | 0.0067 | -0.0018 | 0.0036 | 0.0061 | 0.0102 | 0.0085 | 0.0096 | 0.0073 |

TABLE 6-continued

Exemplary Glass Compositions

| | | | | | | | | | |
|---|---|---|---|---|---|---|---|---|---|
| $P_{ref} - (0.274 - 0.12 * T_i)$ | | 0.0017 | −0.0068 | −0.0014 | 0.0011 | 0.0052 | 0.0035 | 0.0046 | 0.0023 |
| $P_n - (1.571 + 0.083 * P_d)$ | | 0.0442 | 0.0252 | 0.0414 | 0.0490 | 0.0471 | 0.0442 | 0.0378 | 0.0421 |

| Exemplary Glass | | 113 | 114 | 115 | 116 | 117 | 118 | 119 | 120 |
|---|---|---|---|---|---|---|---|---|---|
| Composition - mol. % | | | | | | | | | |
| $B_2O_3$ | mol. % | 32.76 | 32.40 | 32.78 | 32.19 | 31.78 | 31.35 | 31.00 | 30.57 |
| $WO_3$ | mol. % | 12.73 | 15.17 | 9.99 | 12.69 | 14.73 | 17.29 | 14.96 | 17.11 |
| $La_2O_3$ | mol. % | 20.99 | 20.99 | 20.98 | 20.99 | 20.99 | 20.99 | 20.99 | 20.99 |
| $TiO_2$ | mol. % | 13.05 | 10.51 | 17.31 | 15.04 | 13.21 | 10.72 | 15.52 | 13.59 |
| $Nb_2O_5$ | mol. % | 13.41 | 13.89 | 11.87 | 12.02 | 12.23 | 12.62 | 10.49 | 10.71 |
| $SiO_2$ | mol. % | 0.0584 | 0.03 | 0.0561 | 0.0576 | 0.0294 | 0.0301 | 0.0289 | 0.0295 |
| $ZrO_2$ | mol. % | 6.99 | 7.00 | 7.00 | 7.00 | 7.00 | 7.00 | 7.00 | 7.00 |
| $Ta_2O_5$ | mol. % | 0.0119 | 0.0122 | 0.0114 | 0.0117 | 0.012 | 0.0123 | 0.0079 | 0.008 |
| Composition constraints | | | | | | | | | |
| $TiO_2 + Nb_2O_5$ | mol. % | 26.46 | 24.40 | 29.18 | 27.07 | 25.45 | 23.34 | 26.01 | 24.30 |
| $RE_2O_3 + ZrO_2 + TiO_2 + Nb_2O_5 + WO_3$ | mol. % | 67.16 | 67.56 | 67.15 | 67.74 | 68.17 | 68.61 | 68.96 | 69.39 |
| $WO_3 + TiO_2$ | mol. % | 25.78 | 25.68 | 27.30 | 27.73 | 27.95 | 28.01 | 30.48 | 30.70 |
| $TiO_2 - SiO_2$ | mol. % | 12.99 | 10.48 | 17.26 | 14.99 | 13.18 | 10.69 | 15.49 | 13.56 |
| $B_2O_3 + SiO_2 - P_2O_5$ | mol. % | 32.82 | 32.43 | 32.84 | 32.25 | 31.81 | 31.38 | 31.03 | 30.60 |
| $SiO_2 + GeO_2$ | mol. % | 0.05841 | 0.02998 | 0.05607 | 0.05756 | 0.02937 | 0.03014 | 0.02890 | 0.02952 |
| Measured properties | | | | | | | | | |
| 15 - min devit test (0/1) | | 1 | 1 | 1 | 1 | 1 | 1 | 1 | 1 |
| Predicted and calculated properties | | | | | | | | | |
| $T_i$ | | 0.6061 | 0.6389 | 0.5655 | 0.6005 | 0.6268 | 0.6598 | 0.6228 | 0.6499 |
| $P_n$ [for $n_d$] | | 2.0332 | 2.0366 | 2.0274 | 2.0302 | 2.0328 | 2.0358 | 2.0292 | 2.0316 |
| $P_{ref}$ [for $(n_d - 1)/d_{RT}$] | cm³/g | 0.2043 | 0.2013 | 0.2072 | 0.2038 | 0.2013 | 0.1981 | 0.2003 | 0.1977 |
| $P_{Tg}$ [for $T_g$] | °C. | 679.6 | 673.2 | 688.1 | 681.6 | 676.5 | 669.8 | 678.3 | 672.9 |
| $P_d$ [for $d_{RT}$] | g/cm³ | 5.1361 | 5.2364 | 5.015 | 5.1224 | 5.2048 | 5.3074 | 5.1978 | 5.2837 |
| $P_{ref} - (0.269 - 0.12 * T_i)$ | | 0.0080 | 0.0090 | 0.0061 | 0.0069 | 0.0075 | 0.0083 | 0.0061 | 0.0067 |
| $P_{ref} - (0.274 - 0.12 * T_i)$ | | 0.0030 | 0.0040 | 0.0011 | 0.0019 | 0.0025 | 0.0033 | 0.0011 | 0.0017 |
| $P_n - (1.571 + 0.083 * P_d)$ | | 0.0359 | 0.0310 | 0.0401 | 0.0341 | 0.0298 | 0.0243 | 0.0267 | 0.0221 |

| Exemplary Glass | | 121 | 122 | 123 | 124 | 125 | 126 | 127 | 128 |
|---|---|---|---|---|---|---|---|---|---|
| Composition - mol. % | | | | | | | | | |
| $B_2O_3$ | mol. % | 29.99 | 33.00 | 28.25 | 31.85 | 24.76 | 27.51 | 30.98 | 21.37 |
| $WO_3$ | mol. % | 19.99 | 13.00 | 13.00 | 13.00 | 13.00 | 13.00 | 13.00 | 13.00 |
| $La_2O_3$ | mol. % | 20.99 | 21.00 | 21.01 | 19.28 | 21.00 | 19.42 | 17.99 | 21.00 |
| $TiO_2$ | mol. % | 11.00 | 13.00 | 12.99 | 13.00 | 13.01 | 13.00 | 13.01 | 13.00 |
| $Nb_2O_5$ | mol. % | 11.00 | 13.00 | 13.01 | 13.00 | 13.00 | 13.00 | 13.00 | 13.00 |
| $SiO_2$ | mol. % | 0.0303 | 0 | 4.74 | 0 | 8.24 | 4.42 | 0 | 11.64 |
| $ZrO_2$ | mol. % | 7.00 | 7.01 | 7.00 | 6.99 | 7.00 | 7.01 | 7.00 | 7.00 |
| $Y_2O_3$ | mol. % | 0 | 0 | 0 | 2.86 | 0 | 2.64 | 5.02 | 0 |
| $Ta_2O_5$ | mol. % | 0.0083 | 0 | 0 | 0 | 0 | 0 | 0 | 0 |
| Composition constraints | | | | | | | | | |
| $TiO_2 + Nb_2O_5$ | mol. % | 22.00 | 26.00 | 26.00 | 26.01 | 26.00 | 25.99 | 26.01 | 26.00 |
| $RE_2O_3 + ZrO_2 + TiO_2 + Nb_2O_5 + WO_3$ | mol. % | 69.98 | 67.00 | 67.01 | 68.15 | 67.00 | 68.07 | 69.02 | 67.00 |
| $WO_3 + TiO_2$ | mol. % | 30.99 | 26.00 | 25.99 | 26.01 | 26.00 | 26.00 | 26.01 | 26.00 |
| $TiO_2 - SiO_2$ | mol. % | 10.97 | 13.00 | 8.251 | 13.00 | 4.766 | 8.575 | 13.01 | 1.363 |
| $B_2O_3 + SiO_2 - P_2O_5$ | mol. % | 30.02 | 33.00 | 32.99 | 31.85 | 33.00 | 31.93 | 30.98 | 33.00 |
| $SiO_2 + GeO_2$ | mol. % | 0.03034 | 0 | 4.739 | 0 | 8.239 | 4.421 | 0 | 11.64 |
| Measured properties | | | | | | | | | |
| $d_{RT}$ | g/cm³ | | 5.019 | 5.076 | | 5.176 | 5.123 | | |
| 15 - min devit test (0/1) | | 1 | | | 1 | | 1 | | |
| $T_{liq}$ | °C. | | 1063.0 | 1089.0 | | 1110.0 | | 1184.0 | 1133.0 |

TABLE 6-continued

Exemplary Glass Compositions

Predicted and calculated properties

| | | | | | | | | | |
|---|---|---|---|---|---|---|---|---|---|
| $T_i$ | | 0.6857 | 0.612 | 0.6121 | 0.6016 | 0.6119 | 0.6027 | 0.5936 | 0.6119 |
| $P_n$ [for $n_d$] | | 2.035 | 2.0297 | 2.0323 | 2.0349 | 2.034 | 2.0369 | 2.0389 | 2.0358 |
| $P_{ref}$ [for ($n_d$ − 1)/$d_{RT}$] | cm³/g | 0.1941 | 0.2032 | 0.2042 | 0.2048 | 0.2049 | 0.2056 | 0.2061 | 0.2056 |
| $P_{Tg}$ [for $T_g$] | ° C. | 665.7 | 678.8 | 679.6 | 683.8 | 680.1 | 684.2 | 687.7 | 680.7 |
| $P_d$ [for $d_{RT}$] | g/cm³ | 5.399 | 5.1384 | 5.1498 | 5.1311 | 5.1565 | 5.1424 | 5.126 | 5.1638 |
| $P_{ref}$ − (0.269 − 0.12 * $T_i$) | | 0.0074 | 0.0077 | 0.0086 | 0.0080 | 0.0094 | 0.0089 | 0.0083 | 0.0101 |
| $P_{ref}$ − (0.274 − 0.12 * $T_i$) | | 0.0024 | 0.0027 | 0.0036 | 0.0030 | 0.0044 | 0.0039 | 0.0033 | 0.0051 |
| $P_n$ − (1.571 + 0.083 * $P_d$) | | 0.0158 | 0.0322 | 0.0339 | 0.0381 | 0.0350 | 0.0391 | 0.0425 | 0.0362 |

| Exemplary Glass | | 129 | 130 | 131 | 132 | 133 | 134 | 135 | 136 |
|---|---|---|---|---|---|---|---|---|---|

Composition - mol. %

| | | | | | | | | | |
|---|---|---|---|---|---|---|---|---|---|
| $B_2O_3$ | mol. % | 24.26 | 26.72 | 30.14 | 30.64 | 32.98 | 31.99 | 30.98 | 33.99 |
| $WO_3$ | mol. % | 13.00 | 13.00 | 13.00 | 5.99 | 13.00 | 12.99 | 13.99 | 9.99 |
| $La_2O_3$ | mol. % | 19.44 | 18.23 | 16.71 | 19.96 | 19.99 | 21.00 | 20.99 | 19.98 |
| $TiO_2$ | mol. % | 13.00 | 13.00 | 12.99 | 16.97 | 9.99 | 13.50 | 16.00 | 11.99 |
| $Nb_2O_5$ | mol. % | 13.00 | 13.00 | 13.00 | 8.74 | 16.99 | 13.49 | 10.99 | 16.98 |
| $SiO_2$ | mol. % | 7.70 | 4.42 | 0 | 5.77 | 0.03 | 0.0293 | 0.0288 | 0.0584 |
| $Bi_2O_3$ | mol. % | 0 | 0 | 0 | 4.77 | 0 | 0 | 0 | 0 |
| $ZrO_2$ | mol. % | 7.00 | 7.00 | 7.00 | 6.99 | 7.00 | 6.99 | 7.00 | 6.99 |
| $Y_2O_3$ | mol. % | 2.60 | 4.62 | 7.17 | 0 | 0 | 0 | 0 | 0 |
| $CeO_2$ | mol. % | 0 | 0 | 0 | 0.12 | 0 | 0 | 0 | 0 |
| CaO | mol. % | 0 | 0 | 0 | 0.0306 | 0 | 0 | 0 | 0 |
| $Ta_2O_5$ | mol. % | 0 | 0 | 0 | 0.0078 | 0.0163 | 0.012 | 0.0118 | 0.0159 |

Composition constraints

| | | | | | | | | | |
|---|---|---|---|---|---|---|---|---|---|
| $TiO_2$ + $Nb_2O_5$ | mol. % | 26.00 | 26.00 | 25.99 | 25.73 | 26.98 | 26.99 | 26.99 | 28.97 |
| $RE_2O_3$ + $ZrO_2$ + $TiO_2$ + $Nb_2O_5$ + $WO_3$ | mol. % | 68.05 | 68.86 | 69.86 | 58.76 | 66.97 | 67.97 | 68.97 | 65.94 |
| $WO_3$ + $TiO_2$ | mol. % | 26.00 | 26.00 | 25.99 | 22.98 | 22.99 | 26.49 | 29.99 | 21.98 |
| $R_2O$ + RO | mol. % | 0 | 0 | 0 | 0.03062 | 0 | 0 | 0 | 0 |
| $TiO_2$ − $SiO_2$ | mol. % | 5.301 | 8.578 | 12.99 | 11.21 | 9.959 | 13.47 | 15.97 | 11.93 |
| $B_2O_3$ + $SiO_2$ − $P_2O_5$ | mol. % | 31.95 | 31.14 | 30.14 | 36.43 | 33.01 | 32.01 | 31.01 | 34.04 |
| $SiO_2$ + $GeO_2$ | mol. % | 7.695 | 4.423 | 0 | 5.773 | 0.02998 | 0.02932 | 0.02881 | 0.05838 |

Measured properties

| | | | | | | | | | |
|---|---|---|---|---|---|---|---|---|---|
| $d_{RT}$ | g/cm³ | | | | 5.200 | 5.030 | 5.058 | 5.127 | 4.996 |
| 15 − min devit test (0/1) | | 1 | 1 | 1 | | | | | |
| $T_{liq}$ | ° C. | | | | 1030.0 | 1072.0 | 1099.0 | 1062.0 |

Predicted and calculated properties

| | | | | | | | | | |
|---|---|---|---|---|---|---|---|---|---|
| $T_i$ | | 0.6027 | 0.5952 | 0.5854 | 0.5616 | 0.5971 | 0.6029 | 0.6087 | 0.5606 |
| $P_n$ [for $n_d$] | | 2.0386 | 2.0406 | 2.0428 | 2.0214 | 2.0474 | 2.0391 | 2.0326 | 2.0425 |
| $P_{ref}$ [for ($n_d$ − 1)/$d_{RT}$] | cm³/g | 0.2063 | 0.2067 | 0.2072 | 0.2008 | 0.2092 | 0.2049 | 0.2023 | 0.2127 |
| $P_{Tg}$ [for $T_g$] | ° C. | 684.7 | 687.8 | 691.5 | 662.4 | 673.1 | 680.3 | 680.7 | 679.7 |
| $P_d$ [for $d_{RT}$] | g/cm³ | 5.1495 | 5.1372 | 5.1206 | 5.1731 | 5.1284 | 5.1575 | 5.1705 | 5.0065 |
| $P_{ref}$ − (0.269 − 0.12 * $T_i$) | | 0.0096 | 0.0092 | 0.0085 | −7.600E−04 | 0.0119 | 0.0083 | 0.0064 | 0.0110 |
| $P_{ref}$ − (0.274 − 0.12 * $T_i$) | | 0.0046 | 0.0042 | 0.0035 | −0.0058 | 0.0069 | 0.0033 | 0.0014 | 0.0060 |
| $P_n$ − (1.571 + 0.083 * $P_d$) | | 0.0402 | 0.0432 | 0.0468 | 0.0210 | 0.0508 | 0.0400 | 0.0324 | 0.0560 |

| Exemplary Glass | | 137 | 138 | 139 | 140 | 141 | 142 | 143 | 144 |
|---|---|---|---|---|---|---|---|---|---|

Composition - mol. %

| | | | | | | | | | |
|---|---|---|---|---|---|---|---|---|---|
| $B_2O_3$ | mol. % | 33.48 | 32.97 | 34.98 | 33.98 | 33.97 | 32.99 | 32.00 | 31.99 |
| $WO_3$ | mol. % | 9.99 | 10.00 | 7.00 | 7.00 | 6.99 | 15.99 | 15.99 | 15.99 |
| $La_2O_2$ | mol. % | 19.98 | 19.98 | 19.99 | 19.98 | 19.98 | 20.00 | 19.99 | 19.99 |
| $TiO_2$ | mol. % | 13.98 | 16.00 | 12.99 | 15.99 | 18.00 | 8.99 | 9.00 | 10.00 |
| $Nb_2O_5$ | mol. % | 15.49 | 13.99 | 17.99 | 15.99 | 13.99 | 15.00 | 15.99 | 14.99 |
| $SiO_2$ | mol. % | 0.0575 | 0.0566 | 0.0575 | 0.0562 | 0.055 | 0.0301 | 0.0304 | 0.0301 |
| $ZrO_2$ | mol. % | 6.99 | 6.99 | 6.99 | 6.99 | 7.00 | 6.99 | 6.99 | 6.99 |
| $Ta_2O_5$ | mol. % | 0.0156 | 0.0115 | 0.0156 | 0.0153 | 0.015 | 0.0123 | 0.0166 | 0.0123 |

TABLE 6-continued

Exemplary Glass Compositions

Composition constraints

| | | | | | | | | |
|---|---|---|---|---|---|---|---|---|
| $TiO_2 + Nb_2O_5$ | mol. % | 29.48 | 29.99 | 30.97 | 31.98 | 31.99 | 23.99 | 24.99 | 24.99 |
| $RE_2O_3 + ZrO_2 + TiO_2 + Nb_2O_5 + WO_3$ | mol. % | 66.45 | 66.96 | 64.95 | 65.95 | 65.96 | 66.97 | 67.96 | 67.97 |
| $WO_3 + TiO_2$ | mol. % | 23.98 | 25.99 | 19.98 | 22.99 | 24.99 | 24.99 | 24.99 | 25.99 |
| $TiO_2 - SiO_2$ | mol. % | 13.93 | 15.94 | 12.93 | 15.94 | 17.94 | 8.964 | 8.968 | 9.966 |
| $B_2O_3 + SiO_2 - P_2O_5$ | mol. % | 33.54 | 33.03 | 35.04 | 34.03 | 34.02 | 33.02 | 32.03 | 32.02 |
| $SiO_2 + GeO_2$ | mol. % | 0.05747 | 0.05656 | 0.05745 | 0.05624 | 0.05501 | 0.03012 | 0.03044 | 0.03013 |

Measured properties

| | | | | | | | | |
|---|---|---|---|---|---|---|---|---|
| $d_{RT}$ | g/cm³ | 4.968 | 4.986 | 4.896 | 4.893 | 4.892 | 5.133 | 5.154 | 5.147 |
| $T_{liq}$ | ° C. | 1066.0 | 1083.0 | 1064.0 | 1089.0 | 1103.0 | | | |

Predicted and calculated properties

| | | | | | | | | |
|---|---|---|---|---|---|---|---|---|
| $T_i$ | | 0.5564 | 0.5521 | 0.5231 | 0.5151 | 0.5151 | 0.6418 | 0.6323 | 0.6324 |
| $P_n$ [for $n_d$] | | 2.0384 | 2.0343 | 2.043 | 2.0398 | 2.0297 | 2.035 | 2.0469 | 2.0419 |
| $P_{ref}$ [for $(n_d - 1)/d_{RT}$] | cm³/g | 0.212 | 0.2113 | 0.2171 | 0.2166 | 0.2148 | 0.2027 | 0.2048 | 0.2039 |
| $P_{Tg}$ [for $T_g$] | ° C. | 681.5 | 683.3 | 685.7 | 688.7 | 690.0 | 665.9 | 667.1 | 667.7 |
| $P_d$ [for $d_{RT}$] | g/cm³ | 4.9917 | 4.9768 | 4.9005 | 4.8843 | 4.8561 | 5.2082 | 5.2342 | 5.2206 |
| $P_{ref} - (0.269 - 0.12 * T_i)$ | | 0.0098 | 0.0086 | 0.0109 | 0.0094 | 0.0076 | 0.0107 | 0.0117 | 0.0108 |
| $P_{ref} - (0.274 - 0.12 * T_i)$ | | 0.0048 | 0.0036 | 0.0059 | 0.0044 | 0.0026 | 0.0057 | 0.0067 | 0.0058 |
| $P_n - (1.571 + 0.083 * P_d)$ | | 0.0531 | 0.0503 | 0.0652 | 0.0634 | 0.0556 | 0.0317 | 0.0415 | 0.0376 |

| Exemplary Glass | | 145 | 146 | 147 |
|---|---|---|---|---|

Composition - mol. %

| | | | | |
|---|---|---|---|---|
| $B_2O_3$ | mol. % | 30.98 | 30.99 | 28.99 |
| $WO_3$ | mol. % | 16.99 | 16.99 | 17.99 |
| $La_2O_3$ | mol. % | 19.99 | 19.99 | 19.99 |
| $TiO_2$ | mol. % | 9.01 | 9.99 | 10.00 |
| $Nb_2O_5$ | mol. % | 15.99 | 14.99 | 15.99 |
| $SiO_2$ | mol. % | 0.0307 | 0.0304 | 0.031 |
| $ZrO_2$ | mol. % | 6.99 | 7.00 | 7.00 |
| $Ta_2O_5$ | mol. % | 0.0167 | 0.0124 | 0.0169 |

Composition constraints

| | | | | |
|---|---|---|---|---|
| $TiO_2 + Nb_2O_5$ | mol. % | 25.00 | 24.99 | 25.99 |
| $RE_2O_3 + ZrO_2 + TiO_2 + Nb_2O_5 + WO_3$ | mol. % | 68.97 | 68.97 | 70.96 |
| $WO_3 + TiO_2$ | mol. % | 26.00 | 26.99 | 27.99 |
| $TiO_2 - SiO_2$ | mol. % | 8.977 | 9.963 | 9.969 |
| $B_2O_3 + SiO_2 - P_2O_5$ | mol. % | 31.01 | 31.02 | 29.02 |
| $SiO_2 + GeO_2$ | mol. % | 0.03071 | 0.03040 | 0.03099 |

Measured properties

| | | | | |
|---|---|---|---|---|
| $d_{RT}$ | g/cm³ | 5.189 | 5.183 | 5.245 |

Predicted and calculated properties

| | | | | |
|---|---|---|---|---|
| $T_i$ | | 0.6375 | 0.6377 | 0.6338 |
| $P_n$ [for $n_d$] | | 2.0532 | 2.0481 | 2.0663 |
| $P_{ref}$ [for $(n_d - 1)/d_{RT}$] | cm³/g | 0.2045 | 0.2036 | 0.2054 |
| $P_{Tg}$ [for $T_g$] | ° C. | 666.1 | 666.7 | 666.9 |
| $P_d$ [for $d_{RT}$] | g/cm³ | 5.2831 | 5.2692 | 5.3438 |
| $P_{ref} - (0.269 - 0.12 * T_i)$ | | 0.0120 | 0.0111 | 0.0125 |
| $P_{ref} - (0.274 - 0.12 * T_i)$ | | 0.0070 | 0.0061 | 0.0075 |
| $P_n - (1.571 + 0.083 * P_d)$ | | 0.0438 | 0.0398 | 0.0517 |

Table 7 below lists the glass compositions and properties for Comparative Glasses C1-C44.

TABLE 7

Compositions and Properties of Comparative Example Glasses

| Comparative Examples | | C1 | C2 | C3 | C4 | C5 | C6 | C7 | C8 |
|---|---|---|---|---|---|---|---|---|---|
| Reference | | [4] | [10] | [5] | [8] | [6] | [9] | [3] | [2] |
| Composition - mol. % | | | | | | | | | |
| $La_2O_3$ | mol. % | 9.71 | 14.49 | 13.29 | 20.08 | 20.11 | 25.60 | 10.68 | 12.13 |
| $TiO_2$ | mol. % | 21.73 | 3.97 | 3.33 | 31.67 | 31.71 | 23.99 | 8.54 | 3.57 |
| $B_2O_3$ | mol. % | 24.37 | 11.38 | 23.36 | 13.05 | 12.95 | 19.81 | 26.67 | 31.18 |
| BaO | mol. % | 10.47 | 0 | 0 | 0 | 0 | 0 | 0 | 0 |
| $Nb_2O_5$ | mol. % | 4.32 | 7.15 | 7.85 | 4.85 | 4.85 | 4.50 | 0.71 | 6.91 |
| $WO_3$ | mol. % | 4.45 | 7.79 | 13.28 | 4.12 | 4.12 | 3.00 | 11.39 | 5.08 |
| $ZrO_2$ | mol. % | 6.89 | 5.92 | 3.33 | 7.60 | 7.61 | 6.80 | 0.36 | 3.58 |
| $Y_2O_3$ | mol. % | 3.73 | 9.12 | 0.83 | 0.35 | 0.35 | 4.50 | 0 | 0 |
| $SiO_2$ | mol. % | 9.78 | 16.62 | 3.32 | 12.99 | 12.99 | 11.81 | 1.43 | 3.58 |
| $GeO_2$ | mol. % | 3.24 | 0 | 0 | 0 | 0 | 0 | 0 | 0 |
| MgO | mol. % | 1.30 | 0 | 0 | 0 | 0 | 0 | 0 | 0 |
| ZnO | mol. % | 0 | 21.42 | 28.09 | 2.38 | 2.38 | 0 | 35.95 | 30.40 |
| $Gd_2O_3$ | mol. % | 0 | 2.14 | 0 | 2.90 | 2.91 | 0 | 4.27 | 0 |
| $Ta_2O_5$ | mol. % | 0 | 0 | 3.33 | 0 | 0 | 0 | 0 | 3.58 |
| Measured properties | | | | | | | | | |
| $n_d$ | | 1.9109 | 1.852 | 1.968 | 2.060 | 2.060 | 2.000 | 1.9041 | 1.9127 |
| $d_{RT}$ | g/cm³ | | | 5.400 | 5.230 | 5.230 | 5.100 | 5.280 | 4.990 |
| $(n_d - 1)/d_{RT}$ | cm³/g | | | 0.17926 | 0.20268 | 0.20268 | 0.19608 | 0.17123 | 0.18291 |
| $T_{liq}$ | ° C. | 990.00 | 1280.0 | 1080.0 | 1260.0 | 1260.0 | 1225.0 | 1000.0 | 1060.0 |
| $T_g$ | ° C. | | 638.00 | 591.00 | 726.00 | 726.00 | 727.00 | 576.00 | 593.00 |
| $Log(\eta_{liq})$ | P | | | | | | 0.40000 | | |
| Predicted and calculated properties | | | | | | | | | |
| $P_n$ [for $n_d$] | | 1.915 | 1.990 | 1.972 | 2.049 | 2.050 | 2.024 | 1.906 | 1.909 |
| $P_{ref}$ [for $(n_d - 1)/d_{RT}$] | cm³/g | 0.2042 | 0.1835 | 0.1825 | 0.2116 | 0.2116 | 0.1986 | 0.1702 | 0.1845 |
| $P_{Tg}$ [for $T_g$] | ° C. | 663.1 | 657.0 | 585.0 | 720.2 | 720.5 | 744.6 | 569.4 | 580.8 |
| $P_d$ [for $d_{RT}$] | g/cm³ | 4.435 | 5.511 | 5.345 | 5.081 | 5.085 | 5.146 | 5.389 | 4.897 |

| Comparative Examples | | C9 | C10 | C11 | C12 | C13 | C14 | C15 | C16 |
|---|---|---|---|---|---|---|---|---|---|
| Reference | | [1] | [7] | [5] | [5] | [5] | [13] | [18] | [17] |
| Composition - mol. % | | | | | | | | | |
| $La_2O_3$ | mol. % | 23.43 | 22.47 | 14.44 | 12.92 | 14.44 | 15.30 | 24.93 | 23.61 |
| $TiO_2$ | mol. % | 4.49 | 13.40 | 3.49 | 3.24 | 3.49 | 15.81 | 11.82 | 23.17 |
| $B_2O_3$ | mol. % | 31.31 | 23.76 | 24.87 | 22.71 | 26.36 | 37.20 | 32.01 | 20.96 |
| $Nb_2O_5$ | mol. % | 4.65 | 4.37 | 6.73 | 4.85 | 5.23 | 12.79 | 1.42 | 7.25 |
| $WO_3$ | mol. % | 3.61 | 3.14 | 13.93 | 18.47 | 13.93 | 0 | 0 | 0.44 |
| $ZrO_2$ | mol. % | 12.33 | 7.24 | 3.49 | 3.23 | 3.49 | 4.60 | 11.04 | 7.10 |
| $Y_2O_3$ | mol. % | 2.14 | 1.06 | 0 | 0.81 | 0 | 0 | 0 | 0.37 |
| $SiO_2$ | mol. % | 9.72 | 14.88 | 1.62 | 3.23 | 1.62 | 2.69 | 3.14 | 11.78 |
| $GeO_2$ | mol. % | 0 | 0 | 0 | 0 | 0 | 4.64 | 0 | 0 |
| ZnO | mol. % | 1.02 | 5.66 | 27.58 | 27.31 | 27.59 | 0 | 0 | 0 |
| $Gd_2O_3$ | mol. % | 4.37 | 4.02 | 0 | 0 | 0 | 0.89 | 15.63 | 3.14 |
| $Ta_2O_5$ | mol. % | 0 | 0 | 3.86 | 3.23 | 3.86 | 5.28 | 0 | 0 |
| $Yb_2O_3$ | mol. % | 2.93 | 0 | 0 | 0 | 0 | 0 | 0 | 0 |
| $Al_2O_3$ | mol. % | 0 | 0 | 0 | 0 | 0 | 0.79 | 0 | 0 |
| $SnO_2$ | mol. % | 0 | 0 | 0 | 0 | 0 | 0 | 0 | 0.68 |
| $Li_2O$ | mol. % | 0 | 0 | 0 | 0 | 0 | 0 | 0 | 1.50 |
| $Sb_2O_3$ | mol. % | 0 | 0 | 0 | 0 | 0 | 0 | 0 | 0.011 |
| Measured properties | | | | | | | | | |
| $n_d$ | | 1.908 | 1.948 | 1.968 | 1.956 | 1.951 | 1.970 | 1.873 | 2.0049 |
| $d_{RT}$ | g/cm³ | 4.890 | 5.170 | 5.480 | 5.520 | 5.450 | | 5.250 | |
| $(n_d - 1)/d_{RT}$ | cm³/g | 0.18569 | 0.18337 | 0.17664 | 0.17319 | 0.17450 | | 0.16629 | |
| $T_{liq}$ | ° C. | 1215.0 | 1230.0 | 1080.0 | 1070.0 | 1060.0 | | 1320.0 | |
| $T_g$ | ° C. | | 694.00 | 592.00 | 587.00 | 588.00 | | | |
| Predicted and calculated properties | | | | | | | | | |
| $P_n$ [for $n_d$] | | 1.962 | 1.963 | 1.971 | 1.959 | 1.953 | 1.966 | 2.015 | 2.025 |
| $P_{ref}$ [for $(n_d - 1)/d_{RT}$] | cm³/g | 0.1684 | 0.1833 | 0.1785 | 0.1748 | 0.1753 | 0.2147 | 0.1574 | 0.2036 |
| $P_{Tg}$ [for $T_g$] | ° C. | 714.3 | 703.0 | 585.9 | 574.5 | 584.0 | 673.1 | 761.9 | 726.6 |
| $P_d$ [for $d_{RT}$] | g/cm³ | 5.547 | 5.232 | 5.399 | 5.451 | 5.360 | 4.376 | 6.127 | 5.092 |

TABLE 7-continued

Compositions and Properties of Comparative Example Glasses

| Comparative Examples | | C17 | C18 | C19 | C20 | C21 | C22 | C23 | C24 |
|---|---|---|---|---|---|---|---|---|---|
| Reference | | [9] | [8] | [11] | [12] | [15] | [16] | [14] | [15] |
| Composition - mol. % | | | | | | | | | |
| $La_2O_3$ | mol. % | 18.60 | 22.55 | 22.52 | 20.35 | 21.76 | 22.49 | 21.67 | 16.65 |
| $TiO_2$ | mol. % | 27.00 | 27.07 | 27.16 | 14.17 | 22.14 | 26.05 | 16.97 | 18.77 |
| $B_2O_3$ | mol. % | 22.21 | 15.58 | 15.57 | 39.48 | 16.45 | 21.37 | 28.51 | 38.96 |
| $Nb_2O_5$ | mol. % | 6.00 | 5.52 | 5.52 | 1.83 | 6.02 | 5.36 | 7.19 | 5.10 |
| $WO_3$ | mol. % | 0 | 0 | 0 | 16.04 | 0 | 0 | 3.44 | 0 |
| $ZrO_2$ | mol. % | 6.51 | 9.09 | 9.02 | 5.25 | 8.75 | 7.27 | 7.13 | 7.41 |
| $Y_2O_3$ | mol. % | 0 | 0 | 0 | 2.15 | 7.46 | 0.38 | 0 | 4.11 |
| $SiO_2$ | mol. % | 11.19 | 11.58 | 11.57 | 0 | 12.61 | 12.07 | 8.92 | 5.95 |
| ZnO | mol. % | 0 | 1.48 | 1.48 | 0 | 0 | 2.64 | 0 | 0 |
| $Gd_2O_3$ | mol. % | 4.80 | 4.88 | 4.92 | 0 | 4.65 | 2.38 | 0 | 2.99 |
| $Ta_2O_5$ | mol. % | 0 | 2.26 | 2.24 | 0.73 | 0 | 0 | 0.0079 | 0 |
| $Li_2O$ | mol. % | 3.69 | 0 | 0 | 0 | 0 | 0 | 0 | 0 |
| $As_2O_3$ | mol. % | 0 | 0 | 0 | 0 | 0.17 | 0 | 0 | 0.0722 |
| $Bi_2O_3$ | mol. % | 0 | 0 | 0 | 0 | 0 | 0 | 6.01 | 0 |
| $CeO_2$ | mol. % | 0 | 0 | 0 | 0 | 0 | 0 | 0.13 | 0 |
| CaO | mol. % | 0 | 0 | 0 | 0 | 0 | 0 | 0.031 | 0 |
| Measured properties | | | | | | | | | |
| $n_d$ | | 2.000 | 2.0451 | 2.0451 | 1.933 | 2.0233 | 2.0034 | | 1.923 |
| $d_{RT}$ | g/cm³ | 4.900 | 5.420 | 5.420 | | 5.300 | 5.030 | | 4.570 |
| $(n_d - 1)/d_{RT}$ | cm³/g | 0.20408 | 0.19282 | 0.19282 | | 0.19308 | 0.19948 | | 0.20197 |
| $T_{liq}$ | °C. | 1200.0 | 1250.0 | 1250.0 | | | 1190.0 | | |
| $T_g$ | °C. | 698.00 | 746.00 | 746.00 | | | 706.00 | | |
| $Log(\eta_{liq})$ | P | 0.40000 | | | | | | | |
| Predicted and calculated properties | | | | | | | | | |
| $P_n$ [for $n_d$] | | 1.999 | 2.065 | 2.065 | 1.929 | 2.054 | 2.008 | 2.022 | 1.919 |
| $P_{ref}$ [for $(n_d - 1)/d_{RT}$] | cm³/g | 0.2097 | 0.2029 | 0.203 | 0.1796 | 0.199 | 0.2046 | 0.1963 | 0.1995 |
| $P_{Tg}$ [for $T_g$] | °C. | 702.2 | 740.0 | 740.0 | 668.1 | 762.4 | 724.0 | 667.0 | 703.3 |
| $P_d$ [for $d_{RT}$] | g/cm³ | 4.822 | 5.285 | 5.285 | 5.010 | 5.363 | 4.961 | 5.285 | 4.524 |

| Comparative Examples | | C25 | C26 | C27 | C28 | C29 | C30 | C31 | C32 |
|---|---|---|---|---|---|---|---|---|---|
| Reference | | [19] | [9] | [9] | [9] | [20] | [27] | [25] | [21] |
| Composition - mol. % | | | | | | | | | |
| $La_2O_3$ | mol. % | 19.33 | 22.50 | 22.70 | 22.33 | 12.25 | 27.23 | 24.55 | 15.51 |
| $TiO_2$ | mol. % | 20.74 | 24.99 | 23.99 | 24.03 | 8.34 | 0 | 0 | 0 |
| $B_2O_3$ | mol. % | 20.54 | 24.70 | 28.50 | 19.82 | 38.60 | 27.32 | 33.75 | 40.00 |
| $Nb_2O_5$ | mol. % | 5.94 | 4.30 | 4.00 | 3.50 | 7.26 | 0 | 8.31 | 16.98 |
| $WO_3$ | mol. % | 0 | 0.20 | 0.20 | 4.50 | 2.99 | 18.23 | 15.06 | 3.51 |
| $ZrO_2$ | mol. % | 7.06 | 7.00 | 6.00 | 6.61 | 5.40 | 13.61 | 6.18 | 9.01 |
| $Y_2O_3$ | mol. % | 1.55 | 3.50 | 4.00 | 4.41 | 1.77 | 0 | 0.71 | 0 |
| $SiO_2$ | mol. % | 12.46 | 12.81 | 10.61 | 11.80 | 1.11 | 0 | 0 | 0 |
| ZnO | mol. % | 3.57 | 0 | 0 | 0 | 21.24 | 0 | 0 | 14.99 |
| $Gd_2O_3$ | mol. % | 8.81 | 0 | 0 | 3.00 | 0 | 0 | 2.48 | 0 |
| $Ta_2O_5$ | mol. % | 0 | 0 | 0 | 0 | 1.05 | 13.61 | 8.90 | 0 |
| $Sb_2O_3$ | mol. % | 0 | 0 | 0 | 0 | 0 | 0 | 0.0674 | 0.0106 |
| Measured properties | | | | | | | | | |
| $n_d$ | | 1.9886 | 1.980 | 1.960 | 2.000 | 1.8994 | 1.9813 | 1.953 | 1.9482 |
| $d_{RT}$ | g/cm³ | 5.100 | 4.800 | 4.800 | 5.200 | | | 5.940 | |
| $(n_d - 1)/d_{RT}$ | cm³/g | 0.19384 | 0.20417 | 0.20000 | 0.19231 | | | 0.16044 | |
| $T_{liq}$ | °C. | | 1125.0 | 1125.0 | 1225.0 | 1040.0 | | | |
| $T_g$ | °C. | 703.00 | 717.00 | 708.00 | 729.00 | 605.00 | | 679.00 | |
| $Log(\eta_{liq})$ | P | | 0.80000 | 0.70000 | 0.40000 | | | | |
| Predicted and calculated properties | | | | | | | | | |
| $P_n$ [for $n_d$] | | 2.022 | 1.976 | 1.964 | 2.018 | 1.892 | 2.042 | 2.039 | 1.955 |
| $P_{ref}$ [for $(n_d - 1)/d_{RT}$] | cm³/g | 0.1942 | 0.2043 | 0.2015 | 0.1959 | 0.1936 | 0.148 | 0.1668 | 0.2021 |
| $P_{Tg}$ [for $T_g$] | °C. | 727.2 | 729.1 | 728.0 | 735.8 | 612.5 | 687.4 | 681.8 | 629.8 |
| $P_d$ [for $d_{RT}$] | g/cm³ | 5.358 | 4.737 | 4.717 | 5.212 | 4.596 | 5.976 | 5.726 | 4.809 |

| Comparative Example | | C33 | C34 | C35 | C36 | C37 | C38 | C39 | C40 |
|---|---|---|---|---|---|---|---|---|---|
| Reference | | [23] | [22] | [24] | [1] | [5] | [2] | [26] | [5] |
| Composition - mol. % | | | | | | | | | |
| $La_2O_3$ | mol. % | 17.13 | 20.17 | 15.64 | 15.66 | 13.26 | 12.31 | 9.70 | 12.92 |
| $TiO_2$ | mol. % | 20.06 | 15.56 | 23.34 | 0 | 2.80 | 3.64 | 7.95 | 8.79 |
| $B_2O_3$ | mol. % | 39.04 | 30.61 | 30.35 | 39.80 | 23.73 | 31.67 | 39.59 | 22.71 |

TABLE 7-continued

Compositions and Properties of Comparative Example Glasses

| | | | | | | | | | |
|---|---|---|---|---|---|---|---|---|---|
| BaO | mol. % | 0 | 0 | 1.62 | 0 | 0 | 0 | 0 | 0 |
| $Nb_2O_5$ | mol. % | 0 | 0 | 1.87 | 10.68 | 5.49 | 10.13 | 2.42 | 4.85 |
| $WO_3$ | mol. % | 11.67 | 3.83 | 1.61 | 2.60 | 12.09 | 2.04 | 3.78 | 12.91 |
| $ZrO_2$ | mol. % | 6.05 | 4.32 | 6.05 | 15.61 | 6.07 | 3.63 | 10.14 | 3.23 |
| $Y_2O_3$ | mol. % | 0 | 0 | 0 | 6.09 | 0 | 0 | 0 | 0.81 |
| $SiO_2$ | mol. % | 0 | 0 | 4.13 | 4.46 | 2.92 | 3.64 | 4.31 | 3.24 |
| ZnO | mol. % | 0 | 0 | 15.27 | 4.60 | 26.01 | 30.87 | 12.71 | 27.31 |
| $Gd_2O_3$ | mol. % | 0 | 0 | 0 | 0 | 0.36 | 0 | 5.19 | 0 |
| $Ta_2O_5$ | mol. % | 6.05 | 4.42 | 0 | 0.51 | 7.28 | 2.07 | 0 | 3.23 |
| $Li_2O$ | mol. % | 0 | 0 | 0 | 0 | 0 | 0 | 4.22 | 0 |
| $Sb_2O_3$ | mol. % | 0 | 0 | 0.13 | 0 | 0 | 0 | 0 | 0 |
| $HfO_2$ | mol. % | 0 | 21.09 | 0 | 0 | 0 | 0 | 0 | 0 |
| Measured properties | | | | | | | | | |
| $n_d$ | | 1.9466 | 1.9661 | 1.9468 | 1.815 | 1.958 | 1.920 | 1.860 | 1.970 |
| $d_{RT}$ | g/cm$^3$ | | | 4.650 | 4.450 | 5.450 | 4.820 | 4.230 | 5.370 |
| $(n_d - 1)/d_{RT}$ | cm$^3$/g | | | 0.20361 | 0.18315 | 0.17578 | 0.19087 | 0.20331 | 0.18063 |
| $T_{liq}$ | °C. | | | | 1140.0 | 1180.0 | 1070.0 | | 1130.0 |
| $T_g$ | °C. | | | 623.00 | | 598.00 | 590.00 | 597.00 | 591.00 |
| Predicted and calculated properties | | | | | | | | | |
| $P_n$ [for $n_d$] | | 1.929 | 1.957 | 1.919 | 1.920 | 1.974 | 1.919 | 1.841 | 1.963 |
| $P_{ref}$ [for $(n_d - 1)/d_{RT}$] | cm$^3$/g | 0.1875 | 0.1836 | 0.1986 | 0.1915 | 0.1767 | 0.1926 | 0.1829 | 0.1836 |
| $P_{Tg}$ [for $T_g$] | °C. | 659.4 | 683.1 | 651.8 | 678.5 | 589.6 | 587.5 | 606.7 | 590.2 |
| $P_d$ [for $d_{RT}$] | g/cm$^3$ | 4.650 | 4.948 | 4.605 | 4.737 | 5.336 | 4.827 | 4.589 | 5.250 |

| Comparative Examples | | C41 | C42 | C43 | C44 |
|---|---|---|---|---|---|
| Reference | | [2] | [2] | [2] | [2] |
| Composition - mol. % | | | | | |
| $La_2O_3$ | mol. % | 12.36 | 12.41 | 12.31 | 12.32 |
| $TiO_2$ | mol. % | 1.30 | 2.09 | 2.07 | 2.06 |
| $B_2O_3$ | mol. % | 31.79 | 31.92 | 31.29 | 31.68 |
| $Nb_2O_5$ | mol. % | 10.18 | 9.43 | 8.97 | 8.57 |
| $WO_3$ | mol. % | 1.26 | 2.05 | 1.26 | 1.25 |
| $ZrO_2$ | mol. % | 3.64 | 3.66 | 3.63 | 4.42 |
| $SiO_2$ | mol. % | 3.66 | 3.67 | 3.63 | 3.63 |
| ZnO | mol. % | 33.35 | 31.11 | 32.44 | 32.44 |
| $Ta_2O_5$ | mol. % | 2.47 | 3.66 | 3.63 | 3.63 |
| CaO | mol. % | 0 | 0 | 0.77 | 0 |
| Measured properties | | | | | |
| $n_d$ | | 1.9107 | 1.9171 | 1.9126 | 1.9114 |
| $d_{RT}$ | g/cm$^3$ | 4.850 | 4.930 | 4.930 | 4.920 |
| $(n_d - 1)/d_{RT}$ | cm$^3$/g | 0.18777 | 0.18602 | 0.18511 | 0.18524 |
| $T_{liq}$ | °C. | 1150.0 | 1060.0 | 1100.0 | 1150.0 |
| $T_g$ | °C. | 588.00 | 593.00 | 590.00 | 592.00 |
| Predicted and calculated properties | | | | | |
| $P_n$ [for $n_d$] | | 1.914 | 1.917 | 1.914 | 1.911 |
| $P_{ref}$ [for $(n_d - 1)/d_{RT}$] | cm$^3$/g | 0.1893 | 0.1886 | 0.1879 | 0.1869 |
| $P_{Tg}$ [for $T_g$] | °C. | 581.9 | 585.1 | 584.2 | 584.4 |
| $P_d$ [for $d_{RT}$] | g/cm$^3$ | 4.869 | 4.853 | 4.859 | 4.856 |

The reference key for each of the Comparative Glasses listed in Table 7 is as follows: [1]U.S. Ser. No. 10/287,205B2; [2] U.S. Pat. No. 8,575,048B2; [3] U.S. Pat. No. 8,609,560B2; [4] U.S. Pat. No. 8,835,336B2; [5] U.S. Pat. No. 9,255,028B2; [6]U.S. Pat. No. 9,302,930B2; [7] U.S. Pat. No. 9,394,194B2; [8] U.S. Pat. No. 9,643,880B2; [9] WO2020045417A1; [10] WO2020062009A1; [11] JP2020073453A; [12] JP52129716A; [13] JPH09278480; [14] U.S. Provisional Patent Application Ser. No. 63/076,551; [15] U.S. Pat. No. 4,584,279A; [16] U.S. Pat. No. 8,728,963B2; [17] WO2012099168A1; [18] WO2020034215A1; [19] U.S. Pat. No. 8,661,853B2; [20] CN101215082; [21] CN104583142B; [22] JPS534023; [23] U.S. Pat. No. 4,268,312A; [24]U.S. Pat. No. 8,404,606B2; [25] U.S. Pat. No. 8,476,177B2; [26] US2015225282; [27] Imaoka M., Yamazaki T., Refractive index and Abbes number of glass of lanthanum borate system, J. Ceram. Assoc. Jpn, 1962, vol. 70, No. 5, p. 115-123.

Glasses with high refractive indexes, such as $n_d=2.0$ or like, are typically characterized with high liquidus temperatures, which may reduce the liquidus viscosity and, therefore, cause crystallization of melts when cooling. Also, glasses with high liquidus temperatures should be melted at higher temperatures to avoid crystallization, which may cause the loss of transmittance and/or require longer bleaching procedure. Therefore, the lower the liquidus temperature at a given value of the refractive index, the better the characteristics of the resulting glasses are, and the higher the glass formability may be expected from these glasses. Accordingly, high refractive index at lower liquidus temperature identifies the advantage of a given glass composition comparing to its analogs with higher liquidus temperatures and/or lower refractive indexes.

FIG. 7 is a plot showing the relationship between the liquidus temperature $T_{liq}$ and the refractive index parameter $P_n$ for some of the Exemplary Glasses and some of the Comparative Glasses. The Exemplary Glasses (filled circles) are the Examples 1, 40, 48, 50 to 53, 58, 60, 62, 66, 67, 69, 71, 72, 122, 123, 125, 127, 128 and 133 to 141 from Table 6. The Comparative Glasses (open circles) are the Examples C1 to C10 from Table 7. The refractive index parameter $P_n$ was determined according to Formula (II). All of the Exemplary Glasses and Comparative Glasses shown in FIG. 7 have the features specified in Table 8. In Table 8, the specification "Not limited" refers to a limitation that was not considered when selecting the compositions.

TABLE 8

Limitations for glass compositions shown in FIG. 7

| Quantity | Unit | Min | Max |
|---|---|---|---|
| $WO_3$ | mol. % | 3 | 35 |
| $TiO_2$ | mol. % | 0.3 | 50 |
| $Nb_2O_5$ | mol. % | 0.3 | 50 |
| $Bi_2O_3$ | mol. % | 0 | 20 |
| $TeO_2$ | mol. % | 0 | 10 |
| PbO | mol. % | 0 | 5 |
| $MoO_3$ | mol. % | 0 | 3 |
| $V_2O_5$ | mol. % | 0 | 1 |
| $TiO_2 + Nb_2O_5$ | mol. % | 0.6 | 60 |
| F + Cl + Br + I | mol. % | 0 | 3 |
| $B_2O_3 + SiO_2 - P_2O_5$ | mol. % | 0 | Not limited |
| $P_n$ | | 1.9 | Not limited |
| $T_{liq}$ | ° C. | Not limited | 1350 |

The above-enumerated Comparative Glasses were selected as having the highest refractive index parameter $P_n$ at comparable values of liquidus temperature $T_{liq}$ among the known glasses that have the features specified in Table 8.

The line corresponding to the formula y=1.437+0.0005*x shown in FIG. 7 provides a distinction between the Comparative Glasses having the features specified in Table 8 and the Exemplary Glasses 1, 40, 48, 50 to 53, 58, 60, 62, 66, 67, 69, 71, 72, 122, 123, 125, 127, 128 and 133 to 141 according to the present disclosure. As can be seen in FIG. 7, the mentioned Exemplary Glasses (filled circles) and none of the Comparative Glasses (open circles) represented in FIG. 7 fall above the line y=1.437+0.0005*x, where y corresponds to the refractive index parameter $P_n$ and x corresponds to the liquidus temperature $T_{liq}$. In other words, some of the Exemplary Glasses and none of the Comparative Glasses represented in FIG. 7 satisfy the following formula (VI)(a):

$$P_n - (1.437 + 0.0005 * T_{liq}) > 0.00 \quad \text{(VI)(a)}$$

As can also be seen in FIG. 7, some of Exemplary Glasses and none of the Comparative Glasses represented in FIG. 7 fall above the line y=1.481+0.0005*x, where y corresponds to the refractive index parameter $P_n$ and x corresponds to the liquidus temperature $T_{liq}$. In other words, some of the Exemplary Glasses and none of the Comparative Glasses represented in FIG. 7 satisfy the following formula (VI)(b):

$$P_n - (1.481 + 0.0005 * T_{liq}) > 0.00 \quad \text{(VI)(b)}$$

The Exemplary Examples represented in FIG. 7 are, by prediction, superior in terms of the combination of $T_{liq}$ and $n_d$ to the best known Comparative Glasses that have the features specified in Table 8.

FIG. 8 is a plot showing the relationship between the liquidus temperature $T_{liq}$ and $n_d$ for some of the Exemplary Glasses and some of the Comparative Glasses. The Exemplary Glasses (filled circles) are the Examples 1 and 40 from Table 6. The Comparative Glasses (open circles) are the Examples C1, C3 to C8 and C11 to C13 from Table 7. All of the Exemplary Glasses and Comparative Glasses shown in FIG. 8 have the features specified in Table 9. In Table 9, the specification "Not limited" refers to a limitation that was not considered when selecting the compositions.

TABLE 9

Limitations for glass compositions shown in FIG. 8

| Quantity | Unit | Min | Max |
|---|---|---|---|
| $WO_3$ | mol. % | 3 | 35 |
| $TiO_2$ | mol. % | 0.3 | 50 |
| $Nb_2O_5$ | mol. % | 0.3 | 50 |
| $Bi_2O_3$ | mol. % | 0 | 20 |
| $TeO_2$ | mol. % | 0 | 10 |
| PbO | mol. % | 0 | 5 |
| $MoO_3$ | mol. % | 0 | 3 |
| $V_2O_5$ | mol. % | 0 | 1 |
| $TiO_2 + Nb_2O_5$ | mol. % | 0.6 | 60 |
| F + Cl + Br + I | mol. % | 0 | 3 |
| $B_2O_3 + SiO_2 - P_2O_5$ | mol. % | 0 | Not limited |
| $n_d$ | | 1.9 | Not limited |
| $T_{liq}$ | ° C. | Not limited | 1350 |

The above-enumerated Comparative Glasses were selected as having the highest measured values of $n_d$ at comparable values of the liquidus temperature $T_{liq}$ among the known glasses that have the mentioned features specified in Table 9.

The line corresponding to the formula y=1.437+0.0005*x shown in FIG. 8 provides a distinction between the Comparative Glasses having the features specified in Table 9 and the Exemplary Glasses 1 and 40 according to the present disclosure. As can be seen in FIG. 8, the mentioned Exemplary Glasses (filled circles) and none of the Comparative Glasses (open circles) represented in FIG. 8 fall above the line y=1.437+0.0005*x, where y corresponds to $n_d$ and x corresponds to $T_{liq}$. In other words, some of the Exemplary Glasses and none of the Comparative Glasses represented in FIG. 8 satisfy the following formula (VII)(a):

$$n_d - (1.437 + 0.0005 * T_{liq}) > 0.00 \quad \text{(VII)(a)}$$

As can also be seen in FIG. 8, some of Exemplary Glasses and none of the Comparative Glasses represented in FIG. 8 fall above the line y=1.481+0.0005*x, where y corresponds to $n_d$ and x corresponds to $T_{liq}$. In other words, the said Exemplary Glasses and none of the Comparative Glasses represented in FIG. 8 satisfy the following formula (VII)(b):

$$n_d - (1.481 + 0.0005 * T_{liq}) > 0.00 \quad \text{(VII)(b)}$$

The Exemplary Examples represented in FIG. 8 are, according to measurement, superior in terms of combination of $T_{liq}$ and $n_d$ to the best known Comparative Glasses that have the features specified in Table 9.

TABLE 10

Attributes of Comparative Example Glasses Having the Features Specified in Tables 8 and 9

| Ex. # | | C1 | C2 | C3 | C4 | C5 | C6 | C7 | C8 |
|---|---|---|---|---|---|---|---|---|---|
| Composition | | | | | | | | | |
| $Nb_2O_5$ | mol. % | 4.32 | 7.15 | 7.84 | 4.86 | 4.85 | 4.50 | 0.71 | 6.90 |
| $TiO_2$ | mol. % | 21.73 | 3.97 | 3.33 | 31.69 | 31.69 | 24.00 | 8.52 | 3.57 |
| $Bi_2O_3$ | mol. % | 0 | 0 | 0 | 0 | 0 | 0 | 0 | 0 |
| $TeO_2$ | mol. % | 0 | 0 | 0 | 0 | 0 | 0 | 0 | 0 |
| PbO | mol. % | 0 | 0 | 0 | 0 | 0 | 0 | 0 | 0 |
| $MoO_3$ | mol. % | 0 | 0 | 0 | 0 | 0 | 0 | 0 | 0 |
| $V_2O_5$ | mol. % | 0 | 0 | 0 | 0 | 0 | 0 | 0 | 0 |
| $TiO_2 + Nb_2O_5$ | mol. % | 26.06 | 11.12 | 11.17 | 36.55 | 36.55 | 28.50 | 9.24 | 10.47 |
| F + Cl + Br + I | mol. % | 0 | 0 | 0 | 0 | 0 | 0 | 0 | 0 |
| $B_2O_3 + SiO_2 - P_2O_5$ | mol. % | 34.08 | 28.00 | 26.56 | 25.90 | 25.91 | 31.60 | 27.95 | 34.60 |
| Measured properties | | | | | | | | | |
| $T_{liq}$ | ° C. | 990.0 | 1280 | 1080 | 1260 | 1260 | 1225 | 1000 | 1060 |
| $n_d$ | | 1.9109 | 1.852 | 1.968 | 2.060 | 2.060 | 2.000 | 1.9041 | 1.9127 |
| $n_d - (1.437 + 0.0005 * T_{liq})$ | | −0.0211 | −0.225 | −0.009 | −0.007 | −0.007 | −0.0495 | −0.0329 | −0.0543 |
| $n_d - (1.481 + 0.0005 * T_{liq})$ | | −0.0651 | −0.269 | −0.053 | −0.051 | −0.051 | −0.0935 | −0.0769 | −0.0983 |
| Predicted and calculated properties | | | | | | | | | |
| $P_n$ | | 1.9152 | 1.9895 | 1.9727 | 2.0504 | 2.0504 | 2.0243 | 1.9067 | 1.9095 |
| $P_n - (1.437 + 0.0005 * T_{liq})$ | | −0.0168 | −0.0875 | −0.0043 | −0.0166 | −0.0166 | −0.0252 | −0.0303 | −0.0575 |
| $P_n - (1.481 + 0.0005 * T_{liq})$ | | −0.0608 | −0.1315 | −0.0483 | −0.0606 | −0.0606 | −0.0692 | −0.0743 | −0.1015 |

| Ex. # | | C9 | C10 | C11 | C12 | C13 |
|---|---|---|---|---|---|---|
| Composition | | | | | | |
| $Nb_2O_5$ | mol. % | 4.66 | 4.37 | 6.72 | 4.85 | 5.23 |
| $TiO_2$ | mol. % | 4.48 | 13.39 | 3.49 | 3.23 | 3.49 |
| $Bi_2O_3$ | mol. % | 0 | 0 | 0 | 0 | 0 |
| $TeO_2$ | mol. % | 0 | 0 | 0 | 0 | 0 |
| PbO | mol. % | 0 | 0 | 0 | 0 | 0 |
| $MoO_3$ | mol. % | 0 | 0 | 0 | 0 | 0 |
| $V_2O_5$ | mol. % | 0 | 0 | 0 | 0 | 0 |
| $TiO_2 + Nb_2O_5$ | mol. % | 9.15 | 17.77 | 10.21 | 8.08 | 8.71 |
| F + Cl + Br + I | mol. % | 0 | 0 | 0 | 0 | 0 |
| $B_2O_3 + SiO_2 - P_2O_5$ | mol. % | 40.77 | 38.57 | 26.35 | 25.82 | 27.85 |
| Measured properties | | | | | | |
| $T_{liq}$ | ° C. | 1215 | 1230 | 1080 | 1070 | 1060 |
| $n_d$ | | 1.908 | 1.948 | 1.968 | 1.956 | 1.951 |
| $n_d - (1.437 + 0.0005 * T_{liq})$ | | −0.1365 | −0.104 | −0.009 | −0.016 | −0.016 |
| $n_d - (1.481 + 0.0005 * T_{liq})$ | | −0.1805 | −0.148 | −0.053 | −0.060 | −0.060 |
| Predicted and calculated properties | | | | | | |
| $P_n$ | | 1.9645 | 1.9631 | 1.9714 | 1.9591 | 1.9533 |
| $P_n - (1.437 + 0.0005 * T_{liq})$ | | −0.0800 | −0.0889 | −0.0056 | −0.0129 | −0.0137 |
| $P_n - (1.481 + 0.0005 * T_{liq})$ | | −0.1240 | −0.1329 | −0.0496 | −0.0569 | −0.0577 |

In addition to high refractive index and low density, high transmittance in the blue range is also desired for many applications. Glasses with high values of refraction at a given transmittance have an advantage over glasses with a lower value of refraction at the same transmittance.

FIG. 9 is a plot showing the relationship between the transmittance index $T_i$ (a predictor of transmittance in the blue and given by Formula (IV)) and the refraction parameter $P_{ref}$ (a prediction of refraction and given by Formula (II)) for some of the Exemplary Glasses and some of the Comparative Glasses. The Exemplary Glasses (filled circles) are the Examples 1 to 19, 21, 25 to 38, 41, 43, 48 to 61, 63 to 74, 76, 77, 80 to 105, 107 to 124, 126, 127, 130, 131 and 133 to 147 from Table 6. The Comparative Glasses (open circles) are the Examples C14 to C23 from Table 7. All of the Exemplary Glasses and Comparative Glasses shown in FIG. 9 have the features specified in Table 11. In Table 11, the specification "Not limited" refers to a limitation that was not considered when selecting the compositions.

TABLE 11

Limitations for glass compositions shown in FIG. 9

| Quantity | Unit | Min | Max |
|---|---|---|---|
| $TiO_2$ | mol. % | 7.5 | 28 |
| $B_2O_3$ | mol. % | 1 | 40 |
| $Nb_2O_5$ | mol. % | 0.3 | 19.5 |
| $WO_3$ | mol. % | 0 | 35 |
| $La_2O_3$ | mol. % | 0 | 25 |
| $Gd_2O_3$ | mol. % | 0 | 25 |
| $Bi_2O_3$ | mol. % | 0 | 20 |
| $ZrO_2$ | mol. % | 0 | 20 |
| $TeO_2$ | mol. % | 0 | 20 |
| $SiO_2$ | mol. % | 0 | 13.5 |
| $Al_2O_3$ | mol. % | 0 | 10 |
| $ThO_2$ | mol. % | 0 | 10 |
| $GeO_2$ | mol. % | 0 | 10 |
| $Ta_2O_5$ | mol. % | 0 | 10 |
| PbO | mol. % | 0 | 5 |
| $V_2O_5$ | mol. % | 0 | 1 |
| F | at. % | 0 | 5 |

TABLE 11-continued

Limitations for glass compositions shown in FIG. 9

| Quantity | Unit | Min | Max |
|---|---|---|---|
| Cl | at. % | 0 | 1 |
| Br | at. % | 0 | 1 |
| I | at. % | 0 | 1 |
| $RE_2O_3 + ZrO_2 + TiO_2 + Nb_2O_5 + WO_3$ | mol. % | 10 | Not limited |
| $WO_3 + TiO_2$ | mol. % | Not limited | 40 |
| $TiO_2 + Nb_2O_5$ | mol. % | Not limited | 35 |
| $R_2O + RO$ | mol. % | 0 | 5 |
| $TiO_2 - SiO_2$ | mol. % | 7.5 | Not limited |
| $B_2O_3 + SiO_2 - P_2O_5$ | mol. % | 0 | Not limited |
| $P_n$ | | 1.85 | 2.1 |

The above-enumerated Comparative Glasses were selected as having the highest refraction parameter $P_{ref}$ at comparable values of transmittance index $T_i$ among the known glasses that have the features specified in Table 11.

The line corresponding to the formula $y=0.269-0.12*x$ shown in FIG. 9 provides a visual distinction between the Comparative Glasses having the features specified in Table 11 and the Exemplary Glasses 1 to 19, 21, 25 to 38, 41, 43, 48 to 61, 63 to 74, 76, 77, 80 to 105, 107 to 124, 126, 127, 130, 131 and 133 to 147. As can be seen in FIG. 9, the mentioned Exemplary Glasses (filled circles) and none of the Comparative Glasses (open circles) represented in FIG. 9 fall above the line $y=0.269-0.12*x$, where y corresponds to the refraction parameter $P_{ref}$ and x corresponds to the transmittance index $T_i$. In other words, some of the Exemplary Glasses and none of the Comparative Glasses represented in FIG. 9 satisfy the following formula (VIII)(a):

$$P_{ref} - (0.269 - 0.12*T_i) > 0.00 \quad \text{(VIII)(a)}$$

As can also be seen in FIG. 9, some of Exemplary Glasses and none of the Comparative Glasses represented in FIG. 9 fall above the line $y=0.274-0.12*x$, where y corresponds to the refraction parameter $P_{ref}$ and x corresponds to the transmittance index $T_i$. In other words, some of the Exemplary Glasses and none of the Comparative Glasses represented in FIG. 9 satisfy the following formula (VIII)(b):

$$P_{ref} - (0.274 - 0.12*T_i) > 0.00 \quad \text{(VIII)(b)}$$

The Exemplary Examples represented in FIG. 9 are, by prediction, superior in terms of the combination of $T_i$ and $(n_d-1)/d_{RT}$ to the best known Comparative Glasses that have the features specified in Table 11.

FIG. 10 is a plot showing the relationship between the transmittance index $T_i$ and the refractive index to density ratio ("refraction") $(n_d-1)/d_{RT}$ for some of the Exemplary Glasses and some of the Comparative Glasses. The Exemplary Glasses (filled circles) are the Examples 1, 14, 21 and 25 from Table 6. The Comparative Glasses (open circles) are the Examples C15, C17 to C19, C22 and C24 to C28 from Table 7. All of the Exemplary Glasses and Comparative Glasses shown in FIG. 10 have the features specified in Table 12. In Table 12, the specification "Not limited" refers to a limitation that was not considered when selecting the compositions.

TABLE 12

Limitations for glass compositions shown in FIG. 10

| Quantity | Unit | Min | Max |
|---|---|---|---|
| $TiO_2$ | mol. % | 7.5 | 28 |
| $B_2O_3$ | mol. % | 1 | 40 |
| $Nb_2O_5$ | mol. % | 0.3 | 19.5 |
| $WO_3$ | mol. % | 0 | 35 |
| $La_2O_3$ | mol. % | 0 | 25 |
| $Gd_2O_3$ | mol. % | 0 | 25 |
| $Bi_2O_3$ | mol. % | 0 | 20 |
| $ZrO_2$ | mol. % | 0 | 20 |
| $TeO_2$ | mol. % | 0 | 20 |
| $SiO_2$ | mol. % | 0 | 13.5 |
| $Al_2O_3$ | mol. % | 0 | 10 |
| $ThO_2$ | mol. % | 0 | 10 |
| $GeO_2$ | mol. % | 0 | 10 |
| $Ta_2O_5$ | mol. % | 0 | 10 |
| PbO | mol. % | 0 | 5 |
| $V_2O_5$ | mol. % | 0 | 1 |
| F | at. % | 0 | 5 |
| Cl | at. % | 0 | 1 |
| Br | at. % | 0 | 1 |
| I | at. % | 0 | 1 |
| $RE_2O_3 + ZrO_2 + TiO_2 + Nb_2O_5 + WO_3$ | mol. % | 10 | Not limited |
| $WO_3 + TiO_2$ | mol. % | Not limited | 40 |
| $TiO_2 + Nb_2O_5$ | mol. % | Not limited | 35 |
| $R_2O + RO$ | mol. % | 0 | 5 |
| $TiO_2 - SiO_2$ | mol. % | 7.5 | Not limited |
| $B_2O_3 + SiO_2 - P_2O_5$ | mol. % | 0 | Not limited |
| $n_d$ | | 1.85 | 2.1 |

The above-enumerated Comparative Glasses were selected as having the highest measured values of the refractive index to density ratio ("refraction") $(n_d-1)/d_{RT}$ at comparable values of the transmittance index $T_i$ among the known glasses that have the mentioned features specified in Table 12.

The line corresponding to the formula $y=0.269-0.12*x$ shown in FIG. 10 provides a distinction between the Comparative Glasses having the features specified in Table 12 and the Exemplary Glasses 1, 14, 21 and 25. As can be seen in FIG. 10, the Exemplary Glasses (filled circles) and none of the Comparative Glasses (open circles) represented in FIG. 10 fall above the line $y=0.269-0.12*x$, where y corresponds to $(n_d-1)/d_{RT}$ and x corresponds to $T_i$. In other words, some of the Exemplary Glasses and none of the Comparative Glasses represented in FIG. 10 satisfy the following formula (IX)(a):

$$(n_d-1)/d_{RT} - (0.269 - 0.12*T_i) > 0.00 \quad \text{(IX)(a)}$$

As can also be seen in FIG. 10, some of Exemplary Glasses and none of the Comparative Glasses represented in FIG. 10 fall above the line $y=0.274-0.12*x$, where y corresponds to $(n_d-1)/d_{RT}$ and x corresponds to $T_i$. In other words, the Exemplary Glasses and none of the Comparative Glasses represented in FIG. 10 satisfy the following formula (IX)(b):

$$(n_d-1)/d_{RT} - (0.274 - 0.12*T_i) > 0.00 \quad \text{(IX)(b)}$$

TABLE 13

Attributes of Comparative Example Glasses Having the Features Specified in Tables 11 and 12

| Ex. # | | C14 | C15 | C16 | C17 | C18 | C19 | C20 | C21 |
|---|---|---|---|---|---|---|---|---|---|
| Composition | | | | | | | | | |
| $B_2O_3$ | mol. % | 37.09 | 31.89 | 20.87 | 22.20 | 15.37 | 15.37 | 39.37 | 16.45 |
| $Nb_2O_5$ | mol. % | 12.81 | 1.42 | 7.25 | 6.00 | 5.52 | 5.52 | 1.83 | 6.02 |
| $WO_3$ | mol. % | 0 | 0 | 0.44 | 0 | 0 | 0 | 16.07 | 0 |
| $La_2O_3$ | mol. % | 15.33 | 24.95 | 23.64 | 18.60 | 22.61 | 22.58 | 20.39 | 21.76 |
| $Gd_2O_3$ | mol. % | 0.90 | 15.68 | 3.15 | 4.80 | 4.90 | 4.94 | 0 | 4.65 |
| $Bi_2O_3$ | mol. % | 0 | 0 | 0 | 0 | 0 | 0 | 0 | 0 |
| $ZrO_2$ | mol. % | 4.62 | 11.07 | 7.12 | 6.50 | 9.14 | 9.06 | 5.27 | 8.75 |
| $TeO_2$ | mol. % | 0 | 0 | 0 | 0 | 0 | 0 | 0 | 0 |
| $SiO_2$ | mol. % | 2.70 | 3.15 | 11.81 | 11.20 | 11.63 | 11.63 | 0 | 12.61 |
| $Al_2O_3$ | mol. % | 0.80 | 0 | 0 | 0 | 0 | 0 | 0 | 0 |
| $ThO_2$ | mol. % | 0 | 0 | 0 | 0 | 0 | 0 | 0 | 0 |
| $GeO_2$ | mol. % | 4.64 | 0 | 0 | 0 | 0 | 0 | 0 | 0 |
| $Ta_2O_5$ | mol. % | 5.29 | 0 | 0 | 0 | 2.26 | 2.24 | 0.73 | 0 |
| PbO | mol. % | 0 | 0 | 0 | 0 | 0 | 0 | 0 | 0 |
| F | mol. % | 0 | 0 | 0 | 0 | 0 | 0 | 0 | 0 |
| $V_2O_5$ | mol. % | 0 | 0 | 0 | 0 | 0 | 0 | 0 | 0 |
| Cl | mol. % | 0 | 0 | 0 | 0 | 0 | 0 | 0 | 0 |
| Br | mol. % | 0 | 0 | 0 | 0 | 0 | 0 | 0 | 0 |
| I | mol. % | 0 | 0 | 0 | 0 | 0 | 0 | 0 | 0 |
| $RE_2O_3 + ZrO_2 + TiO_2 + Nb_2O_5 + WO_3$ | mol. % | 49.48 | 64.95 | 65.15 | 62.90 | 69.25 | 69.26 | 59.90 | 70.77 |
| $WO_3 + TiO_2$ | mol. % | 15.82 | 11.82 | 23.62 | 27.00 | 27.08 | 27.17 | 30.26 | 22.14 |
| $TiO_2 + Nb_2O_5$ | mol. % | 28.63 | 13.25 | 30.43 | 33.00 | 32.60 | 32.69 | 16.01 | 28.16 |
| $R_2O + RO$ | mol. % | 0 | 0 | 1.47 | 3.70 | 1.50 | 1.50 | 0 | 0 |
| Measured properties | | | | | | | | | |
| $T_i$ | | | 0.7961 | | 0.4754 | 0.5292 | 0.528 | | 0.5553 |
| Composition | | | | | | | | | |
| $TiO_2 - SiO_2$ | mol. % | 13.12 | 8.671 | 11.37 | 15.80 | 15.45 | 15.53 | 14.18 | 9.524 |
| $B_2O_3 + SiO_2 - P_2O_5$ | mol. % | 39.80 | 35.05 | 32.68 | 33.40 | 26.99 | 27.00 | 39.37 | 29.06 |
| Measured properties | | | | | | | | | |
| $(n_d - 1)/d_{RT}$ | cm³/g | | 0.1663 | | 0.2041 | 0.1928 | 0.1928 | | 0.1931 |
| $n_d$ | | | 1.873 | | 2.000 | 2.0451 | 2.0451 | | 2.0233 |
| $(n_d - 1)/d_{RT} - (0.269 - 0.12 * T_i)$ | | | −0.0072 | | −0.0079 | −0.0127 | −0.0128 | | |
| $(n_d - 1)/d_{RT} - (0.274 - 0.12 *T_i)$ | | | −0.0122 | | −0.0129 | −0.0177 | −0.0178 | | |
| Predicted and calculated properties | | | | | | | | | |
| $P_{ref}$ | | 0.2147 | 0.1574 | 0.2035 | 0.2097 | 0.2028 | 0.2029 | 0.1796 | 0.199 |
| $P_n$ | | 1.9667 | 2.016 | 2.0259 | 1.9985 | 2.0664 | 2.0664 | 1.9297 | 2.0545 |
| $P_{ref} - (0.269 - 0.12 * T_i)$ | | −0.0037 | −0.0161 | −0.0018 | −0.0023 | −0.0027 | −0.0027 | −0.0027 | −0.0034 |
| $P_{ref} - (0.274 - 0.12 *T_i)$ | | −0.0087 | −0.0211 | −0.0068 | −0.0073 | −0.0077 | −0.0077 | −0.0077 | −0.0084 |

| Ex. # | | C22 | C23 | C24 | C25 | C26 | C27 | C28 |
|---|---|---|---|---|---|---|---|---|
| Composition | | | | | | | | |
| $B_2O_3$ | mol. % | 21.28 | 28.41 | 38.96 | 20.44 | 24.70 | 28.50 | 19.82 |
| $Nb_2O_5$ | mol. % | 5.36 | 7.19 | 5.10 | 5.94 | 4.30 | 4.00 | 3.50 |
| $WO_3$ | mol. % | 0 | 3.44 | 0 | 0 | 0.20 | 0.20 | 4.50 |
| $La_2O_3$ | mol. % | 22.51 | 21.70 | 16.65 | 19.34 | 22.50 | 22.70 | 22.32 |
| $Gd_2O_3$ | mol. % | 2.39 | 0 | 2.99 | 8.84 | 0 | 0 | 3.00 |
| $Bi_2O_3$ | mol. % | 0 | 6.02 | 0 | 0 | 0 | 0 | 0 |
| $ZrO_2$ | mol. % | 7.29 | 7.15 | 7.41 | 7.08 | 7.00 | 6.00 | 6.61 |
| $TeO_2$ | mol. % | 0 | 0 | 0 | 0 | 0 | 0 | 0 |
| $SiO_2$ | mol. % | 12.09 | 8.95 | 5.94 | 12.49 | 12.80 | 10.60 | 11.81 |
| $Al_2O_3$ | mol. % | 0 | 0 | 0 | 0 | 0 | 0 | 0 |
| $ThO_2$ | mol. % | 0 | 0 | 0 | 0 | 0 | 0 | 0 |
| $GeO_2$ | mol. % | 0 | 0 | 0 | 0 | 0 | 0 | 0 |
| $Ta_2O_5$ | mol. % | 0 | 0.0079 | 0 | 0 | 0 | 0 | 0 |
| PbO | mol. % | 0 | 0 | 0 | 0 | 0 | 0 | 0 |
| F | mol. % | 0 | 0 | 0 | 0 | 0 | 0 | 0 |
| $V_2O_5$ | mol. % | 0 | 0 | 0 | 0 | 0 | 0 | 0 |
| Cl | mol. % | 0 | 0 | 0 | 0 | 0 | 0 | 0 |
| Br | mol. % | 0 | 0 | 0 | 0 | 0 | 0 | 0 |
| I | mol. % | 0 | 0 | 0 | 0 | 0 | 0 | 0 |
| $RE_2O_3 + ZrO_2 + TiO_2 + Nb_2O_5 + WO_3$ | mol. % | 63.98 | 56.58 | 55.03 | 63.48 | 62.50 | 60.90 | 68.37 |
| $WO_3 + TiO_2$ | mol. % | 26.05 | 20.41 | 18.76 | 20.73 | 25.20 | 24.20 | 28.53 |
| $TiO_2 + Nb_2O_5$ | mol. % | 31.41 | 24.17 | 23.87 | 26.68 | 29.30 | 28.00 | 27.53 |
| $R_2O + RO$ | mol. % | 2.65 | 0.031 | 0 | 3.59 | 0 | 0 | 0 |

TABLE 13-continued

Attributes of Comparative Example Glasses Having the Features Specified in Tables 11 and 12

Measured properties

| | | | | | | | | |
|---|---|---|---|---|---|---|---|---|
| $T_i$ | | 0.5061 | | 0.5313 | 0.5693 | 0.5034 | 0.5079 | 0.5696 |

Composition

| | | | | | | | | |
|---|---|---|---|---|---|---|---|---|
| $TiO_2 - SiO_2$ | mol. % | 13.96 | 8.019 | 12.82 | 8.247 | 12.20 | 13.40 | 12.21 |
| $B_2O_3 + SiO_2 - P_2O_5$ | mol. % | 33.37 | 37.36 | 44.90 | 32.93 | 37.50 | 39.10 | 31.63 |

Measured properties

| | | | | | | | | |
|---|---|---|---|---|---|---|---|---|
| $(n_d - 1)/d_{RT}$ | cm³/g | 0.1995 | | 0.202 | 0.1938 | 0.2042 | 0.200 | 0.1923 |
| $n_d$ | | 2.0034 | | 1.923 | 1.9886 | 1.980 | 1.960 | 2.000 |
| $(n_d - 1)/d_{RT} - (0.269 - 0.12 * T_i)$ | | −0.0088 | | −0.0033 | −0.0068 | −0.0044 | −0.0081 | −0.0083 |
| $(n_d - 1)/d_{RT} - (0.274 - 0.12 * T_i)$ | | −0.0138 | | −0.0083 | −0.0118 | −0.0094 | −0.0131 | −0.0133 |

Predicted and calculated properties

| | | | | | | | | |
|---|---|---|---|---|---|---|---|---|
| $P_{ref}$ | | 0.2046 | 0.1963 | 0.1995 | 0.1942 | 0.2043 | 0.2015 | 0.1959 |
| $P_n$ | | 2.008 | 2.0229 | 1.9186 | 2.0218 | 1.9763 | 1.9644 | 2.018 |
| $P_{ref} - (0.269 - 0.12 * T_i)$ | | −0.0037 | −0.0041 | −0.0057 | −0.0065 | −0.0043 | −0.0066 | −0.0048 |
| $P_{ref} - (0.274 - 0.12 * T_i)$ | | −0.0087 | −0.0091 | −0.0107 | −0.0115 | −0.0093 | −0.0116 | −0.0098 |

The Exemplary Examples represented in FIG. 10 are, according to measurement, superior in terms of combination of T; and $(n_d-1)/d_{RT}$ to the best known Comparative Glasses that have the features specified in Table 12.

FIG. 11 is a plot showing the relationship between the density parameter $P_d$ (Formula III) and the refractive index parameter $P_n$ (Formula II) for some of the Exemplary Glasses and some of the Comparative Glasses. The Exemplary Glasses (filled circles) are the Examples 1 to 4, 18 to 21, 29, 30, 52, 53, 63 to 75, 77 to 105, 107 to 124, 126, 127, 130, 131 and 133 to 147 from Table 6. The Comparative Glasses (open circles) are the Examples C29 to C38 from Table 7. All of the Exemplary Glasses and Comparative Glasses shown in FIG. 11 have the features specified in Table 14. In Table 14, the specification "Not limited" refers to a limitation that was not considered when selecting the compositions.

TABLE 14

Limitations for glass compositions shown in FIG. 11

| Quantity | Unit | Min | Max |
|---|---|---|---|
| $WO_3$ | mol. % | 1 | 40 |
| $ZrO_2$ | mol. % | 0.3 | 20 |
| $B_2O_3$ | mol. % | 0 | 40 |
| $La_2O_3$ | mol. % | 0 | 35 |
| $Bi_2O_3$ | mol. % | 0 | 35 |
| ZnO | mol. % | 0 | 35 |
| $Ta_2O_5$ | mol. % | 0 | 25 |
| $Al_2O_3$ | mol. % | 0 | 10 |
| $ThO_2$ | mol. % | 0 | 10 |
| $TeO_2$ | mol. % | 0 | 10 |
| $V_2O_5$ | mol. % | 0 | 5 |
| $RE_2O_3 + ZrO_2 + TiO_2 + Nb_2O_5 + WO_3$ | mol. % | 10 | Not limited |
| $TiO_2 + Nb_2O_5$ | mol. % | 0 | 35 |
| $SiO_2 + GeO_2$ | mol. % | 0 | 4.8 |
| $B_2O_3 + SiO_2 - P_2O_5$ | mol. % | 0.5 | Not limited |
| $P_{Tg}$ | ° C. | 500 | 700 |
| $P_d$ | g/cm³ | Not limited | 6 |
| $P_n$ | | 0 | Not limited |

The above-enumerated Comparative Glasses were selected as having the highest refractive index parameter $P_n$ at comparable values of density parameter $P_d$ among the known glasses that have the features specified in Table 14.

The line corresponding to the formula y=1.571+0.083*x shown in FIG. 11 provides a distinction between the Comparative Glasses having the features specified in Table 14 and the Exemplary Glasses 1 to 4, 18 to 21, 29, 30, 52, 53, 63 to 75, 77 to 105, 107 to 124, 126, 127, 130, 131 and 133 to 147. As can be seen in FIG. 11, the Exemplary Glasses (filled circles) and none of the Comparative Glasses (open circles) represented in FIG. 11 fall above the line y=1.571+0.083*x, where y corresponds to the refractive index parameter $P_n$ and x corresponds to the density parameter $P_d$. In other words, some of the Exemplary Glasses and none of the Comparative Glasses represented in FIG. 11 satisfy the following formula (X):

$$P_n - (1.571 + 0.083 * P_d) > 0.00 \quad (X)$$

This means that, under the conditions specified in Table 14 above, some of the Exemplary Glasses are, by prediction, superior in terms of the combination of $d_{RT}$ and $n_d$ to the best known Comparative Glasses that have the features specified in Table 14.

FIG. 12 is a plot showing the relationship between $d_{RT}$ and $n_d$ for some of the Exemplary Glasses and some of the Comparative Glasses. The Exemplary Glasses (filled circles) are the Examples 1 from Table 6. The Comparative Glasses (open circles) are the Examples C3, C11, C35 and C38 to C44 from Table 7. All of the Exemplary Glasses and Comparative Glasses shown in FIG. 12 have the features specified in Table 15. In Table 15, the specification "Not limited" refers to a limitation that was not considered when selecting the compositions.

TABLE 15

Limitations for glass compositions shown in FIG. 12

| Quantity | Unit | Min | Max |
|---|---|---|---|
| $WO_3$ | mol. % | 1 | 40 |
| $ZrO_2$ | mol. % | 0.3 | 20 |
| $B_2O_3$ | mol. % | 0 | 40 |
| $La_2O_3$ | mol. % | 0 | 35 |
| $Bi_2O_3$ | mol. % | 0 | 35 |
| ZnO | mol. % | 0 | 35 |
| $Ta_2O_5$ | mol. % | 0 | 25 |
| $Al_2O_3$ | mol. % | 0 | 10 |
| $ThO_2$ | mol. % | 0 | 10 |
| $TeO_2$ | mol. % | 0 | 10 |
| $V_2O_5$ | mol. % | 0 | 5 |
| $RE_2O_3 + ZrO_2 + TiO_2 + Nb_2O_5 + WO_3$ | mol. % | 10 | Not limited |
| $TiO_2 + Nb_2O_5$ | mol. % | 0 | 35 |

TABLE 15-continued

Limitations for glass compositions shown in FIG. 12

| Quantity | Unit | Min | Max |
|---|---|---|---|
| $SiO_2 + GeO_2$ | mol. % | 0 | 4.8 |
| $B_2O_3 + SiO_2 - P_2O_5$ | mol. % | 0.5 | Not limited |
| $T_g$ | ° C. | 500 | 700 |
| $d_{RT}$ | g/cm³ | Not limited | 6 |
| $n_d$ | | 0 | Not limited |

The above-enumerated Comparative Glasses were selected as having the highest measured values of $n_d$ at comparable values of $d_{RT}$ among the known glasses that have the mentioned features specified in Table 15.

The line corresponding to the formula y=1.571+0.083*x shown in FIG. 12 provides a distinction between the Comparative Glasses having the features specified in Table 15 and the Exemplary Glasses. As can be seen in FIG. 12, the mentioned Exemplary Glasses (filled circles) and none of the Comparative Glasses (open circles) represented in FIG. 12 fall above the line y=1.571+0.083*x, where y corresponds to $n_d$ and x corresponds to $d_{RT}$. In other words, some of the Exemplary Glasses and none of the Comparative Glasses represented in FIG. 12 satisfy the following formula (XI):

$$n_d - (1.571 + 0.083 * d_{RT}) > 0.00 \quad (XI)$$

This means that, under the conditions specified in Table 15 above, some of the Exemplary Glasses are, according to measurement, superior in terms of combination of $d_{RT}$ and $n_d$ to the best known Comparative Glasses that have the features specified in Table 15.

TABLE 16

Attributes of Comparative Example Glasses Having the Features Specified in Tables 14 and 15

| Ex. # | | C3 | C11 | C29 | C30 | C31 | C32 | C33 | C34 |
|---|---|---|---|---|---|---|---|---|---|
| Composition | | | | | | | | | |
| $ZrO_2$ | mol. % | 3.33 | 3.49 | 5.42 | 13.61 | 6.20 | 9.03 | 6.07 | 4.32 |
| $B_2O_3$ | mol. % | 23.24 | 24.73 | 38.44 | 27.33 | 33.65 | 39.84 | 38.93 | 30.61 |
| $La_2O_3$ | mol. % | 13.29 | 14.43 | 12.26 | 27.23 | 24.58 | 15.52 | 17.17 | 20.17 |
| $Bi_2O_3$ | mol. % | 0 | 0 | 0 | 0 | 0 | 0 | 0 | 0 |
| ZnO | mol. % | 28.23 | 27.73 | 21.38 | 0 | 0 | 15.08 | 0 | 0 |
| $Ta_2O_5$ | mol. % | 3.33 | 3.86 | 1.05 | 13.61 | 8.91 | 0 | 6.06 | 4.42 |
| $Al_2O_3$ | mol. % | 0 | 0 | 0 | 0 | 0 | 0 | 0 | 0 |
| $ThO_2$ | mol. % | 0 | 0 | 0 | 0 | 0 | 0 | 0 | 0 |
| $TeO_2$ | mol. % | 0 | 0 | 0 | 0 | 0 | 0 | 0 | 0 |
| $V_2O_5$ | mol. % | 0 | 0 | 0 | 0 | 0 | 0 | 0 | 0 |
| $RE_2O_3 + ZrO_2 + TiO_2 + Nb_2O_5 + WO_3$ | mol. % | 41.89 | 42.06 | 38.01 | 59.06 | 57.38 | 45.07 | 55.01 | 43.88 |
| $TiO_2 + Nb_2O_5$ | mol. % | 11.17 | 10.21 | 15.59 | 0 | 8.32 | 17.00 | 20.08 | 15.56 |
| $SiO_2 + GeO_2$ | mol. % | 3.33 | 1.62 | 1.11 | 0 | 0 | 0 | 0 | 0 |
| $B_2O_3 + SiO_2 - P_2O_5$ | mol. % | 26.56 | 26.35 | 39.55 | 27.33 | 33.65 | 39.84 | 38.93 | 30.61 |
| Measured properties | | | | | | | | | |
| $d_{RT}$ | g/cm³ | 5.400 | 5.480 | | | 5.940 | | | |
| $n_d$ | | 1.968 | 1.968 | | | 1.953 | | | |
| $T_g$ | ° C. | 591.0 | 592.0 | | | 679.0 | | | |
| $n_d - (1.571 + 0.083 * d_{RT})$ | | −0.0512 | −0.0578 | | | −0.111 | | | |
| Predicted and calculated properties | | | | | | | | | |
| $P_d$ | | 5.3451 | 5.3993 | 4.6027 | 5.9748 | 5.7317 | 4.8154 | 4.6556 | 4.9478 |
| $P_n$ | | 1.9723 | 1.9714 | 1.893 | 2.0422 | 2.0396 | 1.9557 | 1.9303 | 1.9566 |
| $P_{Tg}$ | | 585.0 | 585.9 | 612.4 | 687.3 | 682.1 | 629.9 | 659.6 | 683.1 |
| $P_n - (1.571 + 0.083 * P_d)$ | | −0.0424 | −0.0478 | −0.0601 | −0.0247 | −0.0072 | −0.0150 | −0.0272 | −0.0251 |

| Ex. # | | C35 | C36 | C37 | C38 | C39 | C40 | C41 | C42 |
|---|---|---|---|---|---|---|---|---|---|
| Composition | | | | | | | | | |
| $ZrO_2$ | mol. % | 6.07 | 15.74 | 6.08 | 3.64 | 10.17 | 3.23 | 3.65 | 3.67 |
| $B_2O_3$ | mol. % | 30.21 | 39.36 | 23.61 | 31.51 | 39.44 | 22.59 | 31.62 | 31.75 |
| $La_2O_3$ | mol. % | 15.65 | 15.74 | 13.25 | 12.30 | 9.70 | 12.92 | 12.35 | 12.41 |
| $Bi_2O_3$ | mol. % | 0 | 0 | 0 | 0 | 0 | 0 | 0 | 0 |
| ZnO | mol. % | 15.36 | 4.66 | 26.13 | 31.02 | 12.80 | 27.44 | 33.52 | 31.27 |
| $Ta_2O_5$ | mol. % | 0 | 0.51 | 7.28 | 2.07 | 0 | 3.23 | 2.47 | 3.66 |
| $Al_2O_3$ | mol. % | 0 | 0 | 0 | 0 | 0 | 0 | 0 | 0 |
| $ThO_2$ | mol. % | 0 | 0 | 0 | 0 | 0 | 0 | 0 | 0 |
| $TeO_2$ | mol. % | 0 | 0 | 0 | 0 | 0 | 0 | 0 | 0 |
| $V_2O_5$ | mol. % | 0 | 0 | 0 | 0 | 0 | 0 | 0 | 0 |
| $RE_2O_3 + ZrO_2 + TiO_2 + Nb_2O_5 + WO_3$ | mol. % | 48.52 | 50.95 | 40.06 | 31.74 | 39.24 | 43.50 | 28.73 | 29.63 |
| $TiO_2 + Nb_2O_5$ | mol. % | 25.20 | 10.74 | 8.29 | 13.76 | 10.37 | 13.63 | 11.47 | 11.50 |
| $SiO_2 + GeO_2$ | mol. % | 4.15 | 4.52 | 2.92 | 3.65 | 4.32 | 3.23 | 3.66 | 3.68 |
| $B_2O_3 + SiO_2 - P_2O_5$ | mol. % | 34.36 | 43.88 | 26.53 | 35.16 | 43.75 | 25.83 | 35.28 | 35.43 |
| Measured properties | | | | | | | | | |
| $d_{RT}$ | g/cm³ | 4.650 | | 5.450 | 4.820 | 4.230 | 5.370 | 4.850 | 4.930 |
| $n_d$ | | 1.9468 | | 1.958 | 1.920 | 1.860 | 1.970 | 1.9107 | 1.9171 |
| $T_g$ | ° C. | 623.0 | | 598.0 | 590.0 | 597.0 | 591.0 | 588.0 | 593.0 |
| $n_d - (1.571 + 0.083 * d_{RT})$ | | −0.0102 | | −0.0654 | −0.0511 | −0.0621 | −0.0467 | −0.0629 | −0.0631 |

TABLE 16-continued

Attributes of Comparative Example Glasses Having the Features Specified in Tables 14 and 15

Predicted and calculated properties

| | | | | | | | | |
|---|---|---|---|---|---|---|---|---|
| $P_d$ | 4.6099 | 4.7535 | 5.3396 | 4.8324 | 4.5885 | 5.2501 | 4.8686 | 4.8526 |
| $P_n$ | 1.9193 | 1.9228 | 1.9743 | 1.9197 | 1.8412 | 1.9632 | 1.9139 | 1.9172 |
| $P_{Tg}$ | 651.7 | 679.4 | 589.5 | 587.3 | 606.7 | 590.2 | 581.9 | 585.1 |
| $P_n - (1.571 + 0.083 * P_d)$ | −0.0343 | −0.0428 | −0.0399 | −0.0524 | −0.1107 | −0.0435 | −0.0612 | −0.0566 |

| Ex. # | | C43 | C44 |
|---|---|---|---|

Composition

| | | | |
|---|---|---|---|
| $ZrO_2$ | mol. % | 3.64 | 4.43 |
| $B_2O_3$ | mol. % | 31.13 | 31.52 |
| $La_2O_3$ | mol. % | 12.31 | 12.31 |
| $Bi_2O_3$ | mol. % | 0 | 0 |
| ZnO | mol. % | 32.60 | 32.60 |
| $Ta_2O_5$ | mol. % | 3.63 | 3.63 |
| $Al_2O_3$ | mol. % | 0 | 0 |
| $ThO_2$ | mol. % | 0 | 0 |
| $TeO_2$ | mol. % | 0 | 0 |
| $V_2O_5$ | mol. % | 0 | 0 |
| $RE_2O_3 + ZrO_2 + TiO_2 + Nb_2O_5 + WO_3$ | mol. % | 28.22 | 28.62 |
| $TiO_2 + Nb_2O_5$ | mol. % | 11.02 | 10.63 |
| $SiO_2 + GeO_2$ | mol. % | 3.64 | 3.63 |
| $B_2O_3 + SiO_2 - P_2O_5$ | mol. % | 34.77 | 35.15 |

Measured properties

| | | | |
|---|---|---|---|
| $d_{RT}$ | g/cm³ | 4.930 | 4.920 |
| $n_d$ | | 1.9126 | 1.9114 |
| $T_g$ | ° C. | 590.0 | 592.0 |
| $n_d - (1.571 + 0.083 * d_{RT})$ | | −0.0676 | −0.068 |

Predicted and calculated properties

| | | |
|---|---|---|
| $P_d$ | 4.8591 | 4.8562 |
| $P_n$ | 1.9138 | 1.9109 |
| $P_{Tg}$ | 584.2 | 584.4 |
| $P_n - (1.571 + 0.083 * P_d)$ | −0.0605 | −0.0631 |

FIG. 13 shows the total transmittance T of Exemplary Glass 1 according to the present disclosure at wavelengths of from 350 nm to about 500 nm. Before testing, the sample was bleached at 650° C. for 90 hours. Before bleaching, the glass was heated from the room temperature with the rate of about 4° C./min. After bleaching, the glass was cooled to the room temperature with the rate from about 2° C./min. The total transmittance T data shown in FIG. 13 was obtained from glass sample having a thickness of 10 mm. As can be seen in FIG. 13, the Exemplary Glass 1 provides a total transmittance T=70% at the wavelength k=439 nm.

The following non-limiting aspects are encompassed by the present disclosure. To the extent not already described, any one of the features of the first through the eighty-sixth aspect may be combined in part or in whole with features of any one or more of the other aspects of the present disclosure to form additional aspects, even if such a combination is not explicitly described.

According to a first aspect, the glass comprises a plurality of components, the glass having a composition of the components comprising greater than or equal to 3.0 mol. % and less than or equal to 35.0 mol. % $WO_3$, greater than or equal to 0.3 mol. % and less than or equal to 50.0 mol. % $TiO_2$, greater than or equal to 0.3 mol. % and less than or equal to 50.0 mol. % $Nb_2O_5$, greater than or equal to 0.0 mol. % and less than or equal to 20.0 mol. % $Bi_2O_3$, greater than or equal to 0.0 mol. % and less than or equal to 10.0 mol. % $TeO_2$, greater than or equal to 0.0 mol. % and less than or equal to 5.0 mol. % PbO, greater than or equal to 0.0 mol. % and less than or equal to 3.0 mol. % $MoO_3$, greater than or equal to 0.0 mol. % and less than or equal to 1.0 mol. % $V_2O_5$, greater than or equal to 0.0 at. % and less than or equal to 5.0 at. % F, greater than or equal to 0.0 at. % and less than or equal to 1.0 at. % Cl, greater than or equal to 0.0 at. % and less than or equal to 1.0 at. % Br, greater than or equal to 0.0 at. % and less than or equal to 1.0 at. % I, greater than or equal to 0.6 mol. % and less than or equal to 60.0 mol. % $TiO_2+Nb_2O_5$ and may optionally contain one or more components selected from $Al_2O_3$, $B_2O_3$, BaO, CaO, $Gd_2O_3$, $GeO_2$, $K_2O$, $La_2O_3$, $Li_2O$, MgO, $Na_2O$, $P_2O_5$, $SiO_2$, SrO, $Ta_2O_5$, $Y_2O_3$, $Yb_2O_3$, ZnO and $ZrO_2$, wherein the glass has liquidus temperature, $T_{liq}$, that is greater than or equal to 850° C. and less than or equal to 1350° C., and the glass satisfies the conditions: $1.92 \leq P_n \leq 2.08$ and $P_n-(1.437+0.0005*T_{liq})>0.00$, where $P_n$ is a refractive index parameter, calculated from the glass composition in terms of mol. % of the components according to the Formula (II):

$$P_n = -0.0051086*Al_2O_3 - 0.0049247*B_2O_3 - 0.00034289*BaO + 0.0086552*Bi_2O_3 - 0.0014511*CaO + 0.0047429*Gd_2O_3 - 0.0033126*GeO_2 - 0.0049544*K_2O + 0.0045475*La_2O_3 - 0.0023329*Li_2O - 0.0026561*MgO - 0.0035925*Na_2O + 0.0071165*Nb_2O_5 - 0.0075074*P_2O_5 + 0.0015814*PbO - 0.0043959*SiO_2 - 0.00086373*SrO + 0.0045915*Ta_2O_5 - 0.0015272*TeO_2 + 0.0020281*TiO_2 + 0.0012709*WO_3 + 0.0025878*Y_2O_3 + 0.0048156*Yb_2O_3 - 0.00047962*ZnO + 0.00090073*ZrO_2 + 1.955,$$

(II)

where a symbol "*" means multiplication.

According to a second aspect, the glass of the first aspect, wherein the glass has a refractive index at 587.56 nm, $n_d$, that is greater than or equal to 1.92 and less than or equal to 2.08 and wherein the glass satisfies the condition: $n_d-(1.437+0.0005*T_{liq})>0.00$.

According to a third aspect, the glass of any one of aspects 1-2, wherein the glass satisfies the condition: $n_d-(1.481+0.0005*T_{liq})>0.00$, where $n_d$ is refractive index at 587.56 nm.

According to a fourth aspect, the glass of any one of aspects 1-3, wherein the glass satisfies the condition: $P_n-(1.481+0.0005*T_{liq})>0.00$.

According to a fifth aspect, the glass of any one of aspects 1-4, wherein the composition of the components comprises greater than or equal to 0.3 mol. % and less than or equal to 20.0 mol. % $ZrO_2$, greater than or equal to 0.0 mol. % and less than or equal to 25.0 mol. % ZnO, greater than or equal to 0.0 mol. % and less than or equal to 10.0 mol. % $P_2O_5$, greater than or equal to 0.0 mol. % and less than or equal to 5.0 mol. % $GeO_2$, greater than or equal to 17.0 mol. % $TiO_2+Nb_2O_5+ZrO_2$ and wherein the composition of the components satisfies the condition: $0 \leq B_2O_3+SiO_2-P_2O_5$ [mol. %]$\leq 40$.

According to a sixth aspect, the glass of any one of aspects 1-5, wherein the composition of the components comprises greater than or equal to 1.0 mol. % and less than or equal to 19.0 mol. % $Nb_2O_5$ and greater than or equal to 1.0 mol. % and less than or equal to 19.0 mol. % $TiO_2$.

According to a seventh aspect, the glass of any one of aspects 1-6, wherein the composition of the components comprises greater than or equal to 5.0 mol. % $La_2O_3$, greater than or equal to 5.0 mol. % $Nb_2O_5$ and greater than or equal to 5.0 mol. % $TiO_2$.

According to an eighth aspect, the glass of any one of aspects 1-7, wherein the composition of the components comprises greater than or equal to 6.0 mol. % $WO_3$, greater than or equal to 0.0 mol. % and less than or equal to 5.0 mol. % $P_2O_5$, greater than or equal to 95.0 mol. % $R_mO_n$ and greater than or equal to 0.0 mol. % and less than or equal to 30.0 mol. % $Al_2O_3+RE_mO_n$, where $RE_mO_n$ is a total sum of rare earth metal oxides, and $R_mO_n$ is a total sum of all oxides.

According to a ninth aspect, the glass of any one of aspects 1-8, wherein the composition of the components comprises greater than or equal to 0.0 mol. % and less than or equal to 5.0 mol. % $R_2O+RO$, where $R_2O$ is a total sum of monovalent metal oxides, and RO is a total sum of divalent metal oxides.

According to a tenth aspect, the glass of the ninth aspect, wherein the composition of the components comprises greater than or equal to 0.0 mol. % and less than or equal to 1.0 mol. % $R_2O+RO$.

According to an eleventh aspect, the glass of any one of aspects 1-10, wherein the composition of the components comprises greater than or equal to 0.0 mol. % and less than or equal to 4.5 mol. % $SiO_2$.

According to a twelfth aspect, the glass of any one of aspects 1-11, wherein the composition of the components comprises greater than or equal to 10.0 mol. % and less than or equal to 40.0 mol. % $B_2O_3$, greater than or equal to 10.0 mol. % and less than or equal to 25.0 mol. % $La_2O_3$, greater than or equal to 3.0 mol. % and less than or equal to 30.0 mol. % $WO_3$, greater than or equal to 0.3 mol. % and less than or equal to 30.0 mol. % $TiO_2$, greater than or equal to 0.3 mol. % and less than or equal to 20.0 mol. % $Nb_2O_5$, greater than or equal to 0.0 mol. % and less than or equal to 15.0 mol. % $SiO_2$, greater than or equal to 0.0 mol. % and less than or equal to 10.0 mol. % $Bi_2O_3$, greater than or equal to 0.0 mol. % and less than or equal to 10.0 mol. % $Y_2O_3$, greater than or equal to 0.0 mol. % and less than or equal to 10.0 mol. % $ZrO_2$, greater than or equal to 0.0 mol. % and less than or equal to 7.5 mol. % CaO, greater than or equal to 0.0 mol. % and less than or equal to 5.0 mol. % BaO, greater than or equal to 0.0 mol. % and less than or equal to 4.0 mol. % $Li_2O$, greater than or equal to 0.0 mol. % and less than or equal to 4.0 mol. % SrO, greater than or equal to 0.0 mol. % and less than or equal to 3.0 mol. % $Na_2O$ and greater than or equal to 0.0 mol. % and less than or equal to 2.0 mol. % $K_2O$.

According to a thirteenth aspect, the glass of any one of aspects 1-12, wherein the composition of the components comprises greater than or equal to 21.5 mol. % and less than or equal to 34.5 mol. % $B_2O_3$, greater than or equal to 13.0 mol. % and less than or equal to 24.0 mol. % $La_2O_3$, greater than or equal to 6.0 mol. % and less than or equal to 22.0 mol. % $TiO_2$, greater than or equal to 4.5 mol. % and less than or equal to 18.0 mol. % $Nb_2O_5$, greater than or equal to 3.0 mol. % and less than or equal to 26.0 mol. % $WO_3$, greater than or equal to 0.5 mol. % and less than or equal to 8.0 mol. % $ZrO_2$, greater than or equal to 0.0 mol. % and less than or equal to 12.5 mol. % $SiO_2$, greater than or equal to 0.0 mol. % and less than or equal to 7.5 mol. % $Bi_2O_3$, greater than or equal to 0.0 mol. % and less than or equal to 6.5 mol. % $Y_2O_3$, greater than or equal to 0.0 mol. % and less than or equal to 5.5 mol. % CaO, greater than or equal to 0.0 mol. % and less than or equal to 4.6 mol. % BaO, greater than or equal to 0.0 mol. % and less than or equal to 3.6 mol. % $Li_2O$, greater than or equal to 0.0 mol. % and less than or equal to 3.6 mol. % SrO, greater than or equal to 0.0 mol. % and less than or equal to 2.7 mol. % $Na_2O$ and greater than or equal to 0.0 mol. % and less than or equal to 1.8 mol. % $K_2O$.

According to a fourteenth aspect, the glass of any one of aspects 1-13, wherein the composition of the components comprises greater than or equal to 23.0 mol. % and less than or equal to 33.0 mol. % $B_2O_3$, greater than or equal to 14.5 mol. % and less than or equal to 22.5 mol. % $La_2O_3$, greater than or equal to 8.0 mol. % and less than or equal to 20.0 mol. % $TiO_2$, greater than or equal to 6.0 mol. % and less than or equal to 16.5 mol. % $Nb_2O_5$, greater than or equal to 5.0 mol. % and less than or equal to 23.0 mol. % $WO_3$, greater than or equal to 1.75 mol. % and less than or equal to 7.25 mol. % $ZrO_2$, greater than or equal to 0.0 mol. % and less than or equal to 11.5 mol. % $SiO_2$, greater than or equal to 0.0 mol. % and less than or equal to 7.0 mol. % $Bi_2O_3$, greater than or equal to 0 mol. % and less than or equal to 5.75 mol. % $Y_2O_3$, greater than or equal to 0 mol. % and less than or equal to 4.75 mol. % CaO, greater than or equal to 0.0 mol. % and less than or equal to 4.0 mol. % BaO, greater than or equal to 0.0 mol. % and less than or equal to 3.2 mol. % $Li_2O$, greater than or equal to 0.0 mol. % and less than or equal to 3.2 mol. % SrO, greater than or equal to 0.0 mol. % and less than or equal to 2.4 mol. % $Na_2O$ and greater than or equal to 0.0 mol. % and less than or equal to 1.6 mol. % $K_2O$.

According to a fifteenth aspect, the glass of any one of aspects 1-14, wherein the composition of the components is substantially free of ZnO.

According to a sixteenth aspect, the glass of any one of aspects 1-15, wherein the composition of the components comprises greater than or equal to 0.0 mol. % and less than or equal to 5.0 mol. % $Y_2O_3$, greater than or equal to 0.0 mol. % and less than or equal to 2.0 mol. % $Ta_2O_5$, greater than or equal to 0.0 mol. % and less than or equal to 2.0 mol.

% TeO₂, greater than or equal to 0.0 mol. % and less than or equal to 0.5 mol. % GeO₂, greater than or equal to 0.0 mol. % and less than or equal to 0.5 mol. % PbO, greater than or equal to 0.0 mol. % and less than or equal to 0.2 mol. % As₂O₃ and greater than or equal to 0.0 mol. % and less than or equal to 0.2 mol. % Sb₂O₃, and wherein the composition of the components is substantially free of fluorine and substantially free of $V_2O_5$.

According to a seventeenth aspect, the glass of any one of aspects 1-16, wherein the glass satisfies the condition: $T_i \geq 0.52$, where $T_i$ is a transmittance index, calculated from the glass composition in terms of mol. % of the components according to the Formula (I):

$$T_i = (La_2O_3 + Gd_2O_3 + ZrO_2 + WO_3)/(La_2O_3 + Gd_2O_3 + ZrO_2 + WO_3 + TiO_2 + Nb_2O_5) \quad (I).$$

According to an eighteenth aspect, the glass of the seventeenth aspect, wherein $T_i \geq 0.57$.

According to a nineteenth aspect, the glass of the eighteenth aspect, wherein $0.62 \leq T_i \leq 0.95$.

According to a twentieth aspect, the glass of any one of aspects 1-19, wherein the glass satisfies the conditions: $4.5 \leq P_d \leq 5.5$ and $1.95 \leq P_n \leq 2.07$, where $P_n$ is a refractive index parameter, calculated from the glass composition in terms of mol. % of the components according to the Formula (II):

$$P_n = -0.0051086*Al_2O_3 - 0.0049247*B_2O_3 - 0.00034289*BaO + 0.0086552*Bi_2O_3 - 0.0014511*CaO + 0.0047429*Gd_2O_3 - 0.0033126*GeO_2 - 0.0049544*K_2O + 0.0045475*La_2O_3 - 0.0023329*Li_2O - 0.0026561*MgO - 0.0035925*Na_2O + 0.0071165*Nb_2O_5 - 0.0075074*P_2O_5 + 0.0015814*PbO - 0.0043959*SiO_2 - 0.00086373*SrO + 0.0045915*Ta_2O_5 - 0.0015272*TeO_2 + 0.0020281*TiO_2 + 0.0012709*WO_3 + 0.0025878*Y_2O_3 + 0.0048156*Yb_2O_3 - 0.00047962*ZnO + 0.00090073*ZrO_2 + 1.955, \quad (II)$$

$P_d$ is a density parameter, calculated from the glass composition in terms of mol. % of the components according to the Formula (III):

$$P_d(g/cm^3) = 4.95 - 0.036300*Al_2O_3 - 0.028364*B_2O_3 + 0.010786*BaO + 0.077280*Bi_2O_3 - 0.0047086*CaO + 0.060989*Er_2O_3 + 0.067356*Gd_2O_3 - 0.024973*K_2O + 0.050388*La_2O_3 - 0.015411*Li_2O - 0.014318*Na_2O - 0.0016283*Nb_2O_5 + 0.078354*Nd_2O_3 - 0.045034*P_2O_5 + 0.037463*PbO - 0.026153*SiO_2 - 0.0079191*TeO_2 - 0.015844*TiO_2 + 0.020220*WO_3 + 0.016362*Y_2O_3 + 0.058765*Yb_2O_3 + 0.0086588*ZnO + 0.0043754*ZrO_2, \quad (III)$$

wherein a symbol "*" means multiplication.

According to a twenty-first aspect, the glass of any one of aspects 1-20, wherein the glass has a density at room temperature, $d_{RT}$, that is greater than or equal to 4.5 g/cm³ and less than or equal to 5.5 g/cm³ and a refractive index at 587.56 nm, $n_d$, that is greater than or equal to 1.95 and less than or equal to 2.07.

According to a twenty-second aspect, the glass of any one of aspects 1-21, wherein the liquidus temperature, $T_{liq}$, is less than or equal to 1100° C.

According to a twenty-third aspect, the glass of the twenty-second aspect, wherein the liquidus temperature, $T_{liq}$, is less than or equal to 1050° C.

According to a twenty-fourth aspect, the glass of any one of aspects 1-23, wherein the glass has a decimal logarithm of liquidus viscosity, $Log(\eta_{liq} [P])$, that is greater than or equal to 0.50.

According to a twenty-fifth aspect, the glass of the twenty-fourth aspect, wherein the decimal logarithm of liquidus viscosity, $Log(\eta_{liq} [P])$, is greater than or equal to 0.75.

According to a twenty-sixth aspect, a glass of any one of aspects 1-25, wherein when cooled in air from 1100° C. to 500° C. in 2.5 minutes, the glass does not crystallize.

According to a twenty-seventh aspect, a glass of any one of aspects 1-26, wherein when having a thickness of 10 mm, the glass can be bleached in less than or equal to 96 hours at a temperature less than or equal to 700° C.

According to a twenty-eighth aspect, a method for manufacturing an optical element, the method comprising processing the glass of any one of aspects 1-27.

According to a twenty-ninth aspect, an optical element comprising the glass of any one of aspects 1-28.

According to a thirtieth aspect, the glass comprises a plurality of components, the glass having a composition of the components comprising greater than or equal to 7.5 mol. % and less than or equal to 28.0 mol. % TiO₂, greater than or equal to 1.0 mol. % and less than or equal to 40.0 mol. % B₂O₃, greater than or equal to 0.3 mol. % and less than or equal to 19.5 mol. % Nb₂O₅, greater than or equal to 0.0 mol. % and less than or equal to 35.0 mol. % WO₃, greater than or equal to 0.0 mol. % and less than or equal to 25.0 mol. % La₂O₃, greater than or equal to 0.0 mol. % and less than or equal to 25.0 mol. % Gd₂O₃, greater than or equal to 0.0 mol. % and less than or equal to 20.0 mol. % Bi₂O₃, greater than or equal to 0.0 mol. % and less than or equal to 20.0 mol. % ZrO₂, greater than or equal to 0.0 mol. % and less than or equal to 20.0 mol. % TeO₂, greater than or equal to 0.0 mol. % and less than or equal to 13.5 mol. % SiO₂, greater than or equal to 0.0 mol. % and less than or equal to 10.0 mol. % Al₂O₃, greater than or equal to 0.0 mol. % and less than or equal to 10.0 mol. % ThO₂, greater than or equal to 0.0 mol. % and less than or equal to 10.0 mol. % GeO₂, greater than or equal to 0.0 mol. % and less than or equal to 10.0 mol. % Ta₂O₅, greater than or equal to 0.0 mol. % and less than or equal to 5.0 mol. % PbO, greater than or equal to 0.0 mol. % and less than or equal to 1.0 mol. % $V_2O_5$, greater than or equal to 0.0 at. % and less than or equal to 5.0 at. % F, greater than or equal to 0.0 at. % and less than or equal to 1.0 at. % Cl, greater than or equal to 0.0 at. % and less than or equal to 1.0 at. % Br, greater than or equal to 0.0 at. % and less than or equal to 1.0 at. % I, greater than or equal to 10.0 mol. % $RE_2O_3 + ZrO_2 + TiO_2 + Nb_2O_5 + WO_3$, less than or equal to 40.0 mol. % WO₃+TiO₂, less than or equal to 35.0 mol. % TiO₂+Nb₂O₅, greater than or equal to 0.0 mol. % and less than or equal to 5.0 mol. % R₂O+RO and may optionally contain P₂O₅, wherein the composition of the components satisfies the conditions: TiO₂–SiO₂[mol. %]≥7.5 and B₂O₃+SiO₂–P₂O₅[mol. %]≥0.00, and the glass satisfies the conditions: $1.9 \leq P_n \leq 2.1$ and $P_{ref} - (0.269 - 0.12*T_i) > 0.00$, where $P_n$ is a refractive index parameter, calculated from the glass composition in terms of mol. % of the components according to the Formula (II):

$$P_n = -0.0051086*Al_2O_3 - 0.0049247*B_2O_3 - 0.00034289*BaO + 0.0086552*Bi_2O_3 - 0.0014511*CaO + 0.0047429*Gd_2O_3 - 0.0033126*GeO_2 - 0.0049544*K_2O + 0.0045475*La_2O_3 - 0.0023329*Li_2O - 0.0026561*MgO - 0.0035925*Na_2O + 0.0071165*Nb_2O_5 - 0.0075074*P_2O_5 + 0.0015814*PbO - 0.0043959*SiO_2 - 0.00086373*SrO + 0.0045915*Ta_2O_5 - 0.0015272*TeO_2 + 0.0020281*TiO_2 + 0.0012709*WO_3 + 0.0025878*Y_2O_3 + 0.0048156*Yb_2O_3 - 0.00047962*ZnO + 0.00090073*ZrO_2 + 1.955, \quad (II)$$

$P_{ref}$ is a refraction parameter, calculated from the glass composition in terms of mol. % of the components according to the Formula (IV):

$$P_{ref}(cm^3/g)=0.000087034*SiO_2-0.00012035*B_2O_3-\\0.0012566*La_2O_3+0.0011411*TiO_2-\\0.00031654*ZnO+0.000088066*CaO+\\0.0020444*Nb_2O_5-0.00023383*MgO-\\0.00086501*BaO-0.0004486*WO_3-\\0.0014114*Gd_2O_3-0.00023872*Y_2O_3-\\0.00031575*Ta_2O_5+0.00011894*Li_2O+\\0.00027178*Al_2O_3-0.000099802*Na_2O-\\0.00028391*GeO_2-0.00030531*SrO-\\0.00072061*Bi_2O_3-0.0010964*Yb_2O_3+\\0.00022839*K_2O-0.00086617*PbO+\\0.00027129*TeO_2+0.198,$$ (IV)

where $RE_2O_3$ is a total sum of rare earth metal oxides in trivalent equivalent, $R_2O$ is a total sum of monovalent metal oxides, RO is a total sum of divalent metal oxides, and an asterisk (*) means multiplication.

According to a thirty-first aspect, the glass of the thirtieth aspect, wherein the glass has a refractive index at 587.56 nm, $n_d$, that is greater than or equal to 1.9 and less than or equal to 2.1 and wherein the glass satisfies the condition: $(n_d-1)/d_{RT}-(0.269-0.12*T_i)>0.00$, where $d_{RT}$ (g/cm$^3$) is a density at room temperature, $T_i$ is a transmittance index, calculated from the glass composition in terms of mol. % of the components according to the Formula (I):

$$T_i=(La_2O_3+Gd_2O_3+ZrO_2+WO_3)/(La_2O_3+Gd_2O_3+ZrO_2+WO_3+TiO_2+Nb_2O_5)$$ (I).

According to a thirty-second aspect, the glass of any one of aspects 30-31, wherein the glass satisfies the condition: $(n_d-1)/d_{RT}-(0.274-0.12*T_i)>0.00$, where $n_d$ is a refractive index at 587.56 nm, $d_{RT}$ (g/cm$^3$) is a density at room temperature, and $T_i$ is a transmittance index, calculated from the glass composition in terms of mol. % of the components according to the Formula (I):

$$T_i=(La_2O_3+Gd_2O_3+ZrO_2+WO_3)/(La_2O_3+Gd_2O_3+ZrO_2+WO_3+TiO_2+Nb_2O_5)$$ (I).

According to a thirty-third aspect, the glass of any one of aspects 30-32, wherein the glass satisfies the condition: $P_{ref}-(0.274-0.12*T_i)>0.00$, where $T_i$ is a transmittance index, calculated from the glass composition in terms of mol. % of the components according to the Formula (I):

$$T_i=(La_2O_3+Gd_2O_3+ZrO_2+WO_3)/(La_2O_3+Gd_2O_3+ZrO_2+WO_3+TiO_2+Nb_2O_5)$$ (I).

According to a thirty-fourth aspect, the glass of any one of aspects 30-33, wherein the composition of the components comprises greater than or equal to 7.5 mol. % and less than or equal to 19.0 mol. % $TiO_2$ and greater than or equal to 1.0 mol. % and less than or equal to 19.0 mol. % $Nb_2O_5$.

According to a thirty-fifth aspect, the glass of any one of aspects 30-34, wherein the composition of the components comprises greater than or equal to 5.0 mol. % $La_2O_3$ and greater than or equal to 5.0 mol. % $Nb_2O_5$.

According to a thirty-sixth aspect, the glass of any one of aspects 30-35, wherein the composition of the components comprises greater than or equal to 6.0 mol. % $WO_3$, greater than or equal to 0.0 mol. % and less than or equal to 5.0 mol. % $P_2O_5$, greater than or equal to 95.0 mol. % $R_mO_n$ and greater than or equal to 0.0 mol. % and less than or equal to 30.0 mol. % $Al_2O_3+RE_mO_n$, where $RE_mO_n$ is a total sum of rare earth metal oxides, and $R_mO_n$ is a total sum of all oxides.

According to a thirty-seventh aspect, the glass of any one of aspects 30-36, wherein the composition of the components comprises greater than or equal to 0.0 mol. % and less than or equal to 5.0 mol. % $R_2O+RO$.

According to a thirty-eighth aspect, the glass of the thirty-seventh aspect, wherein the composition of the components comprises greater than or equal to 0.0 mol. % and less than or equal to 1.0 mol. % $R_2O+RO$.

According to a thirty-ninth aspect, the glass of any one of aspects 30-38, wherein the composition of the components comprises greater than or equal to 0.0 mol. % and less than or equal to 4.5 mol. % $SiO_2$.

According to a fortieth aspect, the glass of any one of aspects 30-39, wherein the composition of the components comprises greater than or equal to 10.0 mol. % and less than or equal to 40.0 mol. % $B_2O_3$, greater than or equal to 10.0 mol. % and less than or equal to 25.0 mol. % $La_2O_3$, greater than or equal to 0.0 mol. % and less than or equal to 30.0 mol. % $WO_3$, greater than or equal to 0.0 mol. % and less than or equal to 10.0 mol. % $Bi_2O_3$, greater than or equal to 0.0 mol. % and less than or equal to 10.0 mol. % $Y_2O_3$, greater than or equal to 0.0 mol. % and less than or equal to 10.0 mol. % $ZrO_2$, greater than or equal to 0.0 mol. % and less than or equal to 7.5 mol. % CaO, greater than or equal to 0.0 mol. % and less than or equal to 5.0 mol. % BaO, greater than or equal to 0.0 mol. % and less than or equal to 4.0 mol. % $Li_2O$, greater than or equal to 0.0 mol. % and less than or equal to 4.0 mol. % SrO, greater than or equal to 0.0 mol. % and less than or equal to 3.0 mol. % $Na_2O$ and greater than or equal to 0.0 mol. % and less than or equal to 2.0 mol. % $K_2O$.

According to a forty-first aspect, the glass of any one of aspects 30-40, wherein the composition of the components comprises greater than or equal to 21.5 mol. % and less than or equal to 34.5 mol. % $B_2O_3$, greater than or equal to 13.0 mol. % and less than or equal to 24.0 mol. % $La_2O_3$, greater than or equal to 7.5 mol. % and less than or equal to 22.0 mol. % $TiO_2$, greater than or equal to 4.5 mol. % and less than or equal to 18.0 mol. % $Nb_2O_5$, greater than or equal to 2.0 mol. % and less than or equal to 26.0 mol. % $WO_3$, greater than or equal to 0.5 mol. % and less than or equal to 8.0 mol. % $ZrO_2$, greater than or equal to 0.0 mol. % and less than or equal to 12.5 mol. % $SiO_2$, greater than or equal to 0.0 mol. % and less than or equal to 7.5 mol. % $Bi_2O_3$, greater than or equal to 0.0 mol. % and less than or equal to 6.5 mol. % $Y_2O_3$, greater than or equal to 0.0 mol. % and less than or equal to 5.5 mol. % CaO, greater than or equal to 0.0 mol. % and less than or equal to 4.6 mol. % BaO, greater than or equal to 0.0 mol. % and less than or equal to 3.6 mol. % $Li_2O$, greater than or equal to 0.0 mol. % and less than or equal to 3.6 mol. % SrO, greater than or equal to 0.0 mol. % and less than or equal to 2.7 mol. % $Na_2O$ and greater than or equal to 0.0 mol. % and less than or equal to 1.8 mol. % $K_2O$.

According to a forty-second aspect, the glass of any one of aspects 30-37, wherein the composition of the components comprises greater than or equal to 23.0 mol. % and less than or equal to 33.0 mol. % $B_2O_3$, greater than or equal to 14.5 mol. % and less than or equal to 22.5 mol. % $La_2O_3$, greater than or equal to 8.0 mol. % and less than or equal to 20.0 mol. % $TiO_2$, greater than or equal to 6.0 mol. % and less than or equal to 16.5 mol. % $Nb_2O_5$, greater than or equal to 5.0 mol. % and less than or equal to 23.0 mol. % $WO_3$, greater than or equal to 1.75 mol. % and less than or equal to 7.25 mol. % $ZrO_2$, greater than or equal to 0.0 mol. % and less than or equal to 11.5 mol. % $SiO_2$, greater than or equal to 0.0 mol. % and less than or equal to 7.0 mol. % $Bi_2O_3$, greater than or equal to 0 mol. % and less than or equal to 5.75 mol. % $Y_2O_3$, greater than or equal to 0 mol.

% and less than or equal to 4.75 mol. % CaO, greater than or equal to 0.0 mol. % and less than or equal to 4.0 mol. % BaO, greater than or equal to 0.0 mol. % and less than or equal to 3.2 mol. % $Li_2O$, greater than or equal to 0.0 mol. % and less than or equal to 3.2 mol. % SrO, greater than or equal to 0.0 mol. % and less than or equal to 2.4 mol. % $Na_2O$ and greater than or equal to 0.0 mol. % and less than or equal to 1.6 mol. % $K_2O$.

According to a forty-third aspect, the glass of any one of aspects 30-42, wherein the composition of the components is substantially free of ZnO.

According to a forty-fourth aspect, the glass of any one of aspects 30-43, wherein the composition of the components comprises greater than or equal to 0.0 mol. % and less than or equal to 5.0 mol. % $Y_2O_3$, greater than or equal to 0.0 mol. % and less than or equal to 2.0 mol. % $Ta_2O_5$, greater than or equal to 0.0 mol. % and less than or equal to 2.0 mol. % $TeO_2$, greater than or equal to 0.0 mol. % and less than or equal to 0.5 mol. % $GeO_2$, greater than or equal to 0.0 mol. % and less than or equal to 0.5 mol. % PbO, greater than or equal to 0.0 mol. % and less than or equal to 0.2 mol. % $As_2O_3$ and greater than or equal to 0.0 mol. % and less than or equal to 0.2 mol. % $Sb_2O_3$, and wherein the composition of the components is substantially free of fluorine and substantially free of $V_2O_5$.

According to a forty-fifth aspect, the glass of any one of aspects 30-44, wherein the glass satisfies the condition: $T_i \geq 0.52$, where $T_i$ is a transmittance index, calculated from the glass composition in terms of mol. % of the components according to the Formula (I):

$$T_i=(La_2O_3+Gd_2O_3+ZrO_2+WO_3)/(La_2O_3+Gd_2O_3+ZrO_2+WO_3+TiO_2+Nb_2O_5) \quad (I).$$

According to a forty-sixth aspect, the glass of the forty-fifth aspect, wherein $T_i \geq 0.57$.

According to a forty-seventh aspect, the glass of the forty-sixth aspect, wherein $0.62 \leq T_i \leq 0.95$.

According to a forty-eighth aspect, the glass of any one of aspects 30-47, wherein the glass satisfies the conditions: $4.5 \leq P_d \leq 5.5$ and $1.95 \leq P_n \leq 2.07$, where $P_d$ is a density parameter, calculated from the glass composition in terms of mol. % of the components according to the Formula (III):

$$P_d(g/cm^3)=4.95-0.036300*Al_2O_3-0.028364*B_2O_3+\\0.010786*BaO+0.077280*Bi_2O_3-\\0.0047086*CaO+0.060989*Er_2O_3+\\0.067356*Gd_2O_3-0.024973*K_2O+\\0.050388*La_2O_3-0.015411*Li_2O-\\0.014318*Na_2O-0.0016283*Nb_2O_5+\\0.078354*Nd_2O_3-0.045034*P_2O_5+\\0.037463*PbO-0.026153*SiO_2-\\0.0079191*TeO_2-0.015844*TiO_2+\\0.020220*WO_3+0.016362*Y_2O_3+\\0.058765*Yb_2O_3+0.0086588*ZnO+\\0.0043754*ZrO_2 \quad (III).$$

According to a fourth-ninth aspect, the glass of any one of aspects 30-48, wherein the glass has a density at room temperature, $d_{RT}$, that is greater than or equal to 4.5 g/cm³ and less than or equal to 5.5 g/cm³ and a refractive index at 587.56 nm, $n_d$, that is greater than or equal to 1.95 and less than or equal to 2.07.

According to a fiftieth aspect, the glass of any one of aspects 30-49, wherein the glass has a liquidus temperature, $T_{liq}$, that is less than or equal to 1100° C.

According to a fifty-first aspect, the glass of the fifty-second aspect, wherein the liquidus temperature, $T_{liq}$, is less than or equal to 1050° C.

According to a fifty-second aspect, the glass of any one of aspects 30-51, wherein the glass has a decimal logarithm of liquidus viscosity, $Log(\eta_{liq} [P])$, that is greater than or equal to 0.50.

According to a fifty-third aspect, the glass of the fifty-fourth aspect, wherein the decimal logarithm of liquidus viscosity, $Log(\eta_{liq} [P])$, is greater than or equal to 0.75.

According to a fifty-fourth aspect, a glass of any one of aspects 30-53, wherein when cooled in air from 1100° C. to 500° C. in 2.5 minutes, the glass does not crystallize.

According to a fifty-fifth aspect, a glass of any one of aspects 30-54, wherein when having a thickness of 10 mm, the glass can be bleached in less than or equal to 96 hours at a temperature less than or equal to 700° C.

According to a fifty-sixth aspect, a method for manufacturing an optical element, the method comprising processing the glass of any one of aspects 30-55.

According to a fifty-seventh aspect, an optical element comprising the glass of any one of aspects 30-56.

According to a fifty-eighth aspect, the glass comprises a plurality of components, the glass having a composition of the components comprising greater than or equal to 1.0 mol. % and less than or equal to 40.0 mol. % $WO_3$, greater than or equal to 0.3 mol. % and less than or equal to 20.0 mol. % $ZrO_2$, greater than or equal to 0.0 mol. % and less than or equal to 40.0 mol. % $B_2O_3$, greater than or equal to 0.0 mol. % and less than or equal to 35.0 mol. % $La_2O_3$, greater than or equal to 0.0 mol. % and less than or equal to 35.0 mol. % $Bi_2O_3$, greater than or equal to 0.0 mol. % and less than or equal to 35.0 mol. % ZnO, greater than or equal to 0.0 mol. % and less than or equal to 25.0 mol. % $Ta_2O_5$, greater than or equal to 0.0 mol. % and less than or equal to 10.0 mol. % $Al_2O_3$, greater than or equal to 0.0 mol. % and less than or equal to 10.0 mol. % $ThO_2$, greater than or equal to 0.0 mol. % and less than or equal to 10.0 mol. % $TeO_2$, greater than or equal to 0.0 mol. % and less than or equal to 5.0 mol. % $V_2O_5$, greater than or equal to 10.0 mol. % $RE_2O_3+ZrO_2+TiO_2+Nb_2O_5+WO_3$, greater than or equal to 0.0 mol. % and less than or equal to 35.0 mol. % $TiO_2+Nb_2O_5$, greater than or equal to 0.0 mol. % and less than or equal to 4.8 mol. % $SiO_2+GeO_2$ and may optionally contain one or more components selected from $P_2O_5$, BaO, CaO, $K_2O$, $Li_2O$, MgO, $Na_2O$, PbO and SrO, wherein the composition of the components satisfies the condition: $B_2O_3+SiO_2-P_2O_5$[mol. %]≥0.50, and the glass satisfies the conditions: $500 \leq P_{Tg} \leq 700$, $P_d<6.0$ and $P_n-(1.571+0.083*P_d)>0.00$, where $P_n$ is a refractive index parameter, calculated from the glass composition in terms of mol. % of the components according to the Formula (II):

$$P_n=-0.0051086*Al_2O_3-0.0049247*B_2O_3-\\0.00034289*BaO+0.0086552*Bi_2O_3-\\0.0014511*CaO+0.0047429*Gd_2O_3-\\0.0033126*GeO_2-0.0049544*K_2O+\\0.0045475*La_2O_3-0.0023329*Li_2O-\\0.0026561*MgO-0.0035925*Na_2O+\\0.0071165*Nb_2O_5-0.0075074*P_2O_5+\\0.0015814*PbO-0.0043959*SiO_2-\\0.00086373*SrO+0.0045915*Ta_2O_5-\\0.0015272*TeO_2+0.0020281*TiO_2+\\0.0012709*WO_3+0.0025878*Y_2O_3+\\0.0048156*Yb_2O_3-0.00047962*ZnO+\\0.00090073*ZrO_2+1.955, \quad (II)$$

$P_d$ is a density parameter, calculated from the glass composition in terms of mol. % of the components according to the Formula (III):

$$P_d(g/cm^3)=4.95-0.036300*Al_2O_3-0.028364*B_2O_3+\\0.010786*BaO+0.077280*Bi_2O_3-\\0.0047086*CaO+0.060989*Er_2O_3+$$

0.067356*Gd₂O₃−0.024973*K₂O+
0.050388*La₂O₃−0.015411*Li₂O−
0.014318*Na₂O−0.0016283*Nb₂O₅+
0.078354*Nd₂O₃−0.045034*P₂O₅+
0.037463*PbO−0.026153*SiO₂−
0.0079191*TeO₂−0.015844*TiO₂+
0.020220*WO₃+0.016362*Y₂O₃+
0.058765*Yb₂O₃+0.0086588*ZnO+
0.0043754*ZrO₂,                                    (III)

$P_{Tg}$ is a $T_g$ parameter, calculated from the glass composition in terms of mol. % of the components according to the Formula (V):

$P_{Tg}$(° C.)=595.358−0.63217*B₂O₃−0.46552*SiO₂+
1.1849*TiO₂+0.59610*Nb₂O₅−1.6293*WO₃+
1.3877*ZrO₂+4.4090*La₂O₃+4.1695*Y₂O₃−
5.0756*Bi₂O₃+0.55630*CaO−5.3892*PbO−
4.2774*TeO₂+1.8497*Al₂O₃−0.40659*GeO₂−
1.7011*ZnO−4.1520*Li₂O+3.0777*Gd₂O₃,          (V)

where $RE_2O_3$ is a total sum of rare earth metal oxides in trivalent equivalent, and an asterisk (*) means multiplication.

According to a fifty-ninth aspect, the glass of the fifty-eighth aspect, wherein the glass has a glass transition temperature, $T_g$, that is greater than or equal to 500° C. and less than or equal to 700° C. and a density at room temperature, $d_{RT}$, that is less than or equal to 6.0 g/cm³ and wherein the glass satisfies the following condition: $n_d − (1.571+0.083*d_{RT}) > 0.00$, where $n_d$ is a refractive index at 587.56 nm.

According to a sixtieth aspect, the glass of any one of aspects 58-59, wherein the composition of the components comprises greater than or equal to 1.0 mol. % and less than or equal to 19.0 mol. % Nb₂O₅ and greater than or equal to 1.0 mol. % and less than or equal to 19.0 mol. % TiO₂.

According to a sixty-first aspect, the glass of any one of aspects 58-60, wherein the composition of the components comprises greater than or equal to 5.0 mol. % La₂O₃, greater than or equal to 5.0 mol. % Nb₂O₅ and greater than or equal to 5.0 mol. % TiO₂.

According to a sixty-second aspect, the glass of any one of aspects 58-61, wherein the composition of the components comprises greater than or equal to 6.0 mol. % WO₃, greater than or equal to 0.0 mol. % and less than or equal to 20.0 mol. % Bi₂O₃, greater than or equal to 0.0 mol. % and less than or equal to 5.0 mol. % P₂O₅, greater than or equal to 95.0 mol. % $R_mO_n$ and greater than or equal to 0.0 mol. % and less than or equal to 30.0 mol. % Al₂O₃+$RE_mO_n$, where $RE_mO_n$ is a total sum of rare earth metal oxides, and $R_mO_n$ is a total sum of all oxides.

According to a sixty-third aspect, the glass of any one of aspects 58-62, wherein the composition of the components comprises greater than or equal to 0.0 mol. % and less than or equal to 5.0 mol. % R₂O+RO, where R₂O is a total sum of monovalent metal oxides, and RO is a total sum of divalent metal oxides.

According to a sixty-fourth aspect, the glass of the sixty-third aspect, wherein the glass further comprises greater than or equal to 0.0 mol. % and less than or equal to 1.0 mol. % R₂O+RO, where R₂O is total sum of monovalent metal oxides, and RO is total sum of divalent metal oxides.

According to a sixty-fifth aspect, the glass of any one of aspects 58-64, wherein the composition of the components comprises greater than or equal to 0.0 mol. % and less than or equal to 4.5 mol. % SiO₂.

According to a sixty-sixth aspect, the glass of any one of aspects 58-65, wherein the composition of the components comprises greater than or equal to 10.0 mol. % and less than or equal to 40.0 mol. % B₂O₃, greater than or equal to 10.0 mol. % and less than or equal to 25.0 mol. % La₂O₃, greater than or equal to 1.0 mol. % and less than or equal to 30.0 mol. % WO₃, greater than or equal to 0.3 mol. % and less than or equal to 30.0 mol. % TiO₂, greater than or equal to 0.3 mol. % and less than or equal to 20.0 mol. % Nb₂O₅, greater than or equal to 0.3 mol. % and less than or equal to 10.0 mol. % ZrO₂, greater than or equal to 0.0 mol. % and less than or equal to 4.8 mol. % SiO₂, greater than or equal to 0.0 mol. % and less than or equal to 10.0 mol. % Bi₂O₃, greater than or equal to 0.0 mol. % and less than or equal to 10.0 mol. % Y₂O₃, greater than or equal to 0.0 mol. % and less than or equal to 7.5 mol. % CaO, greater than or equal to 0.0 mol. % and less than or equal to 5.0 mol. % BaO, greater than or equal to 0.0 mol. % and less than or equal to 4.0 mol. % Li₂O, greater than or equal to 0.0 mol. % and less than or equal to 4.0 mol. % SrO, greater than or equal to 0.0 mol. % and less than or equal to 3.0 mol. % Na₂O and greater than or equal to 0.0 mol. % and less than or equal to 2.0 mol. % K₂O.

According to a sixty-seventh aspect, the glass of any one of aspects 58-66, wherein the composition of the components comprises greater than or equal to 21.5 mol. % and less than or equal to 34.5 mol. % B₂O₃, greater than or equal to 13.0 mol. % and less than or equal to 24.0 mol. % La₂O₃, greater than or equal to 6.0 mol. % and less than or equal to 22.0 mol. % TiO₂, greater than or equal to 4.5 mol. % and less than or equal to 18.0 mol. % Nb₂O₅, greater than or equal to 2.0 mol. % and less than or equal to 26.0 mol. % WO₃, greater than or equal to 0.5 mol. % and less than or equal to 8.0 mol. % ZrO₂, greater than or equal to 0.0 mol. % and less than or equal to 4.8 mol. % SiO₂, greater than or equal to 0.0 mol. % and less than or equal to 7.5 mol. % Bi₂O₃, greater than or equal to 0.0 mol. % and less than or equal to 6.5 mol. % Y₂O₃, greater than or equal to 0.0 mol. % and less than or equal to 5.5 mol. % CaO, greater than or equal to 0.0 mol. % and less than or equal to 4.6 mol. % BaO, greater than or equal to 0.0 mol. % and less than or equal to 3.6 mol. % Li₂O, greater than or equal to 0.0 mol. % and less than or equal to 3.6 mol. % SrO, greater than or equal to 0.0 mol. % and less than or equal to 2.7 mol. % Na₂O and greater than or equal to 0.0 mol. % and less than or equal to 1.8 mol. % K₂O.

According to a sixtieth-eighth aspect, the glass of any one of aspects 58-67, wherein the composition of the components comprises greater than or equal to 23.0 mol. % and less than or equal to 33.0 mol. % B₂O₃, greater than or equal to 14.5 mol. % and less than or equal to 22.5 mol. % La₂O₃, greater than or equal to 8.0 mol. % and less than or equal to 20.0 mol. % TiO₂, greater than or equal to 6.0 mol. % and less than or equal to 16.5 mol. % Nb₂O₅, greater than or equal to 5.0 mol. % and less than or equal to 23.0 mol. % WO₃, greater than or equal to 1.75 mol. % and less than or equal to 7.25 mol. % ZrO₂, greater than or equal to 0.0 mol. % and less than or equal to 4.8 mol. % SiO₂, greater than or equal to 0.0 mol. % and less than or equal to 7.0 mol. % Bi₂O₃, greater than or equal to 0 mol. % and less than or equal to 5.75 mol. % Y₂O₃, greater than or equal to 0 mol. % and less than or equal to 4.75 mol. % CaO, greater than or equal to 0.0 mol. % and less than or equal to 4.0 mol. % BaO, greater than or equal to 0.0 mol. % and less than or equal to 3.2 mol. % Li₂O, greater than or equal to 0.0 mol. % and less than or equal to 3.2 mol. % SrO, greater than or equal to 0.0 mol. % and less than or equal to 2.4 mol. % Na₂O and greater than or equal to 0.0 mol. % and less than or equal to 1.6 mol. % K₂O.

According to a sixty-ninth aspect, the glass of any one of aspects 58-68, wherein the composition of the components is substantially free of ZnO.

According to a seventieth aspect, the glass of any one of aspects 58-69, wherein the composition of the components comprises greater than or equal to 0.0 mol. % and less than or equal to 2.0 mol. % $Ta_2O_5$, greater than or equal to 0.0 mol. % and less than or equal to 2.0 mol. % $TeO_2$, greater than or equal to 0.0 mol. % and less than or equal to 0.5 mol. % $GeO_2$, greater than or equal to 0.0 mol. % and less than or equal to 0.5 mol. % PbO, greater than or equal to 0.0 mol. % and less than or equal to 0.2 mol. % $As_2O_3$ and greater than or equal to 0.0 mol. % and less than or equal to 0.2 mol. % $Sb_2O_3$, and wherein the composition of the components is substantially free of fluorine and substantially free of $V_2O_5$.

According to a seventy-first aspect, the glass of any one of aspects 58-70, wherein the glass satisfies the condition: $T_i \geq 0.52$, where $T_i$ is a transmittance index, calculated from the glass composition in terms of mol. % of the components according to the Formula (I):

$$T_i=(La_2O_3+Gd_2O_3+ZrO_2+WO_3)/(La_2O_3+Gd_2O_3+ZrO_2+WO_3+TiO_2+Nb_2O_5) \quad (I).$$

According to a seventy-second aspect, the glass of the seventy-first aspect, wherein $T_i \geq 0.57$.

According to a seventy-third aspect, the glass of the seventy-second aspect, wherein $0.62 \leq T_i \leq 0.95$.

According to a seventy-fourth aspect, the glass of any one of aspects 58-73, wherein the glass satisfies the conditions: $4.5 \leq P_d \leq 5.5$ and $1.95 \leq P_n \leq 2.07$.

According to a seventy-fifth aspect, the glass of any one of aspects 58-74, wherein the glass has a density at room temperature, $d_{RT}$, that is greater than or equal to 4.5 and less than or equal to 5.5 and a refractive index at 587.56 nm, $n_d$, that is greater than or equal to 1.95 and less than or equal to 2.07.

According to a seventy-sixth aspect, the glass of any one of aspects 58-75, wherein the glass has a liquidus temperature, $T_{liq}$, that is less than or equal to 1100° C.

According to a seventy-seventh aspect, the glass of the seventy-sixth aspect, wherein the liquidus temperature, $T_{liq}$, is less than or equal to 1050° C.

According to a seventy-eighth aspect, the glass of any one of aspects 58-77, wherein the glass further has a decimal logarithm of liquidus viscosity, $Log(\eta_{liq} [P])$, that is greater than or equal to 0.50.

According to a seventy-ninth aspect, the glass of the seventy-eighth aspect, wherein the decimal logarithm of liquidus viscosity, $Log(\eta_{liq} [P])$, is greater than or equal to 0.75.

According to an eightieth aspect, a glass of any one of aspects 58-79, wherein when cooled in air from 1100° C. to 500° C. in 2.5 minutes, the glass does not crystallize.

According to an eighty-first aspect, a glass of any one of aspects 58-80, wherein when having a thickness of 10 mm, the glass can be bleached in less than or equal to 96 hours at a temperature less than or equal to 700° C.

According to an eighty-second aspect, a method for manufacturing an optical element, the method comprising processing the glass of any one of aspects 58-81.

According to an eighty-third aspect, an optical element comprising the glass of any one of aspects 58-82.

According to an eighty-fourth aspect, a glass of any one of aspects 1-29, wherein the glass has a total transmittance measured on a sample of 10 mm thickness that is greater than or equal to 70% at a wavelength of 450 nm.

According to an eighty-fifth aspect, a glass of any one of aspects 30-57, wherein the glass has a total transmittance measured on a sample of 10 mm thickness that is greater than or equal to 70% at a wavelength of 450 nm.

According to an eighty-sixth aspect, a glass of any one of aspects 58-79, wherein the glass has a total transmittance measured on a sample of 10 mm thickness that is greater than or equal to 70% at a wavelength of 450 nm.

Many variations and modifications may be made to the above-described embodiments of the disclosure without departing substantially from the spirit and various principles of the disclosure. All such modifications and variations are intended to be included herein within the scope of this disclosure and protected by the following claims.

To the extent not already described, the different features of the various aspects of the present disclosure may be used in combination with each other as desired. That a particular feature is not explicitly illustrated or described with respect to each aspect of the present disclosure is not meant to be construed that it cannot be, but it is done for the sake of brevity and conciseness of the description. Thus, the various features of the different aspects may be mixed and matched as desired to form new aspects, whether or not the new aspects are expressly disclosed.

The invention claimed is:

1. A glass comprising a plurality of components, the glass having a composition of the components comprising:
    greater than or equal to 9.0 mol. % and less than or equal to 35.0 mol. % $WO_3$,
    greater than or equal to 0.3 mol. % and less than or equal to 50.0 mol. % $TiO_2$,
    greater than or equal to 0.3 mol. % and less than or equal to 50.0 mol. % $Nb_2O_5$,
    greater than or equal to 0.0 mol. % and less than or equal to 20.0 mol. % $Bi_2O_3$,
    greater than or equal to 0.0 mol. % and less than or equal to 10.0 mol. % $TeO_2$,
    greater than or equal to 0.0 mol. % and less than or equal to 5.0 mol. % PbO,
    greater than or equal to 0.0 mol. % and less than or equal to 3.0 mol. % $MoO_3$,
    greater than or equal to 0.0 mol. % and less than or equal to 1.0 mol. % $V_2O_5$,
    greater than or equal to 0.0 at. % and less than or equal to 5.0 at. % F,
    greater than or equal to 0.0 at. % and less than or equal to 1.0 at. % Cl,
    greater than or equal to 0.0 at. % and less than or equal to 1.0 at. % Br,
    greater than or equal to 0.0 at. % and less than or equal to 1.0 at. % I,
    greater than or equal to 0.6 mol. % and less than or equal to 60.0 mol. % $TiO_2+Nb_2O_5$ and
    optionally comprising one or more components selected from $Al_2O_3$, $B_2O_3$, BaO, CaO, $Gd_2O_3$, $GeO_2$, $K_2O$, $La_2O_3$, $Li_2O$, MgO, $Na_2O$, $P_2O_5$, $SiO_2$, SrO, $Ta_2O_5$, $Y_2O_3$, $Yb_2O_3$, ZnO and $ZrO_2$,
    wherein none of the ranges is modified by the term "about"; and
    wherein the glass has
    a liquidus temperature, $T_{liq}$, that is greater than or equal to 850° C. and less than or equal to 1350° C.,
    and wherein the glass satisfies the conditions:
    $1.92 \leq P_n \leq 2.08$ and
    $P_n - (1.437 + 0.0005 * T_{liq}) > 0.00$, where $P_n$ is a refractive index parameter, calculated from the glass composition in terms of mol. % of the components according to the Formula (II):

$$P_n = -0.0051086*Al_2O_3 - 0.0049247*B_2O_3 - 0.00034289*BaO + 0.0086552*Bi_2O_3 - 0.0014511*CaO + 0.0047429*Gd_2O_3 - 0.0033126*GeO_2 - 0.0049544*K_2O + 0.0045475*La_2O_3 - 0.0023329*Li_2O - 0.0026561*MgO - 0.0035925*Na_2O + 0.0071165*Nb_2O_5 - 0.0075074*P_2O_5 + 0.0015814*PbO - 0.0043959*SiO_2 - 0.00086373*SrO + 0.0045915*Ta_2O_5 - 0.0015272*TeO_2 + 0.0020281*TiO_2 + 0.0012709*WO_3 + 0.0025878*Y_2O_3 + 0.0048156*Yb_2O_3 - 0.00047962*ZnO + 0.00090073*ZrO_2 + 1.955,$$ (II)

where a symbol "*" means multiplication;
and wherein the glass has
a refractive index at 587.56 nm, $n_d$, that is greater than or equal to 1.92 and less than or equal to 2.08 and
wherein the glass satisfies the condition:

$$n_d - (1.437 + 0.0005 * T_{liq}) > 0.00.$$

2. The glass of claim 1, wherein the composition of the components comprises:
   greater than or equal to 0.3 mol. % and less than or equal to 20.0 mol. % $ZrO_2$,
   greater than or equal to 0.0 mol. % and less than or equal to 25.0 mol. % $ZnO$,
   greater than or equal to 0.0 mol. % and less than or equal to 10.0 mol. % $P_2O_5$,
   greater than or equal to 0.0 mol. % and less than or equal to 5.0 mol. % $GeO_2$,
   greater than or equal to 17.0 mol. % $TiO_2 + Nb_2O_5 + ZrO_2$ and
wherein the composition of the components satisfies the condition:

$$0 \leq B_2O_3 + SiO_2 - P_2O_5 \text{ [mol. \%]} \leq 40.$$

3. The glass of claim 1, wherein the composition of the components comprises:
   greater than or equal to 10.0 mol. % and less than or equal to 40.0 mol. % $B_2O_3$,
   greater than or equal to 10.0 mol. % and less than or equal to 25.0 mol. % $La_2O_3$,
   greater than or equal to 9.0 mol. % and less than or equal to 30.0 mol. % $WO_3$,
   greater than or equal to 0.3 mol. % and less than or equal to 30.0 mol. % $TiO_2$,
   greater than or equal to 0.3 mol. % and less than or equal to 20.0 mol. % $Nb_2O_5$,
   greater than or equal to 0.0 mol. % and less than or equal to 15.0 mol. % $SiO_2$,
   greater than or equal to 0.0 mol. % and less than or equal to 10.0 mol. % $Bi_2O_3$,
   greater than or equal to 0.0 mol. % and less than or equal to 10.0 mol. % $Y_2O_3$,
   greater than or equal to 0.0 mol. % and less than or equal to 10.0 mol. % $ZrO_2$,
   greater than or equal to 0.0 mol. % and less than or equal to 7.5 mol. % $CaO$,
   greater than or equal to 0.0 mol. % and less than or equal to 5.0 mol. % $BaO$,
   greater than or equal to 0.0 mol. % and less than or equal to 4.0 mol. % $Li_2O$,
   greater than or equal to 0.0 mol. % and less than or equal to 4.0 mol. % $SrO$,
   greater than or equal to 0.0 mol. % and less than or equal to 3.0 mol. % $Na_2O$ and
   greater than or equal to 0.0 mol. % and less than or equal to 2.0 mol. % $K_2O$.

4. The glass of claim 1, wherein the composition of the components comprises:
   greater than or equal to 23.0 mol. % and less than or equal to 33.0 mol. % $B_2O_3$,
   greater than or equal to 14.5 mol. % and less than or equal to 22.5 mol. % $La_2O_3$,
   greater than or equal to 8.0 mol. % and less than or equal to 20.0 mol. % $TiO_2$,
   greater than or equal to 6.0 mol. % and less than or equal to 16.5 mol. % $Nb_2O_5$,
   greater than or equal to 9.0 mol. % and less than or equal to 23.0 mol. % $WO_3$,
   greater than or equal to 1.75 mol. % and less than or equal to 7.25 mol. % $ZrO_2$,
   greater than or equal to 0.0 mol. % and less than or equal to 11.5 mol. % $SiO_2$,
   greater than or equal to 0.0 mol. % and less than or equal to 7.0 mol. % $Bi_2O_3$,
   greater than or equal to 0.0 mol. % and less than or equal to 5.75 mol. % $Y_2O_3$,
   greater than or equal to 0.0 mol. % and less than or equal to 4.75 mol. % $CaO$,
   greater than or equal to 0.0 mol. % and less than or equal to 4.0 mol. % $BaO$,
   greater than or equal to 0.0 mol. % and less than or equal to 3.2 mol. % $Li_2O$,
   greater than or equal to 0.0 mol. % and less than or equal to 3.2 mol. % $SrO$,
   greater than or equal to 0.0 mol. % and less than or equal to 2.4 mol. % $Na_2O$ and
   greater than or equal to 0.0 mol. % and less than or equal to 1.6 mol. % $K_2O$.

5. The glass of claim 1, wherein the composition of the components comprises:
   greater than or equal to 0.0 mol. % and less than or equal to 5.0 mol. % $Y_2O_3$,
   greater than or equal to 0.0 mol. % and less than or equal to 2.0 mol. % $Ta_2O_5$,
   greater than or equal to 0.0 mol. % and less than or equal to 2.0 mol. % $TeO_2$,
   greater than or equal to 0.0 mol. % and less than or equal to 0.5 mol. % $GeO_2$,
   greater than or equal to 0.0 mol. % and less than or equal to 0.5 mol. % $PbO$,
   greater than or equal to 0.0 mol. % and less than or equal to 0.2 mol. % $As_2O_3$ and
   greater than or equal to 0.0 mol. % and less than or equal to 0.2 mol. % $Sb_2O_3$, and wherein the composition of the components is
substantially free of fluorine and
substantially free of $V_2O_5$.

6. The glass of claim 1, wherein the glass satisfies the conditions:

$$4.5 \leq P_d \leq 5.5 \text{ and}$$

$$1.95 \leq P_n \leq 2.07,$$

where $P_n$ is a refractive index parameter, calculated from the glass composition in terms of mol. % of the components according to the Formula (II):

$$P_n = -0.0051086*Al_2O_3 - 0.0049247*B_2O_3 - 0.00034289*BaO + 0.0086552*Bi_2O_3 - 0.0014511*CaO + 0.0047429*Gd_2O_3 - 0.0033126*GeO_2 - 0.0049544*K_2O +$$

0.0045475*La$_2$O$_3$−0.0023329*Li$_2$O−
0.0026561*MgO−0.0035925*Na$_2$O+
0.0071165*Nb$_2$O$_5$−0.0075074*P$_2$O$_5$+
0.0015814*PbO−0.0043959*SiO$_2$−
0.00086373*SrO+0.0045915*Ta$_2$O$_5$−
0.0015272*TeO$_2$+0.0020281*TiO$_2$+
0.0012709*WO$_3$+0.0025878*Y$_2$O$_3$+
0.0048156*Yb$_2$O$_3$−0.00047962*ZnO+
0.00090073*ZrO$_2$+1.955,        (II)

$P_d$ is a density parameter, calculated from the glass composition in terms of mol. % of the components according to the Formula (III):

$P_d$ (g/cm$^3$)=4.95−0.036300*Al$_2$O$_3$−0.028364*B$_2$O$_3$+
0.010786*BaO+0.077280*Bi$_2$O$_3$−
0.0047086*CaO+0.060989*Er$_2$O$_3$+
0.067356*Gd$_2$O$_3$−0.024973*K$_2$O+
0.050388*La$_2$O$_3$−0.015411*Li$_2$O−
0.014318*Na$_2$O−0.0016283*Nb$_2$O$_5$+
0.078354*Nd$_2$O$_3$−0.045034*P$_2$O$_5$+
0.037463*PbO−0.026153*SiO$_2$−
0.0079191*TeO$_2$−0.015844*TiO$_2$+
0.020220*WO$_3$+0.016362*Y$_2$O$_3$+
0.058765*Yb$_2$O$_3$+0.0086588*ZnO+
0.0043754*ZrO$_2$,        (III)

wherein a symbol "*" means multiplication.

7. The glass of claim 1, wherein when cooled in air from 1100° C. to 500° C. in 2.5 minutes, the glass does not crystallize.

8. The glass of claim 1, wherein the composition of the components comprises:
greater than or equal to 0.0 mol. % and less than or equal to 4.5 mol. % SiO$_2$.

9. The glass of claim 1, wherein the composition of the components comprises:
a sum of RE$_2$O$_3$+ZrO$_2$+TiO$_2$+Nb$_2$O$_5$+WO$_3$ greater than or equal to 45.0 mol. %.

10. A glass comprising a plurality of components, the glass having a composition of the components comprising:
greater than or equal to 7.5 mol. % and less than or equal to 28.0 mol. % TiO$_2$,
greater than or equal to 1.0 mol. % and less than or equal to 40.0 mol. % B$_2$O$_3$,
greater than or equal to 0.3 mol. % and less than or equal to 19.5 mol. % Nb$_2$O$_5$,
greater than or equal to 0.0 mol. % and less than or equal to 35.0 mol. % WO$_3$,
greater than or equal to 0.0 mol. % and less than or equal to 25.0 mol. % La$_2$O$_3$,
greater than or equal to 0.0 mol. % and less than or equal to 25.0 mol. % Gd$_2$O$_3$,
greater than or equal to 0.0 mol. % and less than or equal to 20.0 mol. % Bi$_2$O$_3$,
greater than or equal to 0.0 mol. % and less than or equal to 20.0 mol. % ZrO$_2$,
greater than or equal to 0.0 mol. % and less than or equal to 20.0 mol. % TeO$_2$,
greater than or equal to 0.0 mol. % and less than or equal to 13.5 mol. % SiO$_2$,
greater than or equal to 0.0 mol. % and less than or equal to 10.0 mol. % Al$_2$O$_3$,
greater than or equal to 0.0 mol. % and less than or equal to 10.0 mol. % ThO$_2$,
greater than or equal to 0.0 mol. % and less than or equal to 10.0 mol. % GeO$_2$,
greater than or equal to 0.0 mol. % and less than or equal to 10.0 mol. % Ta$_2$O$_5$,
greater than or equal to 0.0 mol. % and less than or equal to 5.0 mol. % PbO,
greater than or equal to 0.0 mol. % and less than or equal to 1.0 mol. % V$_2$O$_5$,
greater than or equal to 0.0 at. % and less than or equal to 5.0 at. % F,
greater than or equal to 0.0 at. % and less than or equal to 1.0 at. % Cl,
greater than or equal to 0.0 at. % and less than or equal to 1.0 at. % Br,
greater than or equal to 0.0 at. % and less than or equal to 1.0 at. % I,
greater than or equal to 10.0 mol. % RE$_2$O$_3$+ZrO$_2$+TiO$_2$+Nb$_2$O$_5$+WO$_3$,
less than or equal to 40.0 mol. % WO$_3$+TiO$_2$,
less than or equal to 35.0 mol. % TiO$_2$+Nb$_2$O$_5$,
greater than or equal to 0.0 mol. % and less than or equal to 5.0 mol. % R$_2$O+RO and
optionally comprising P$_2$O$_5$,
wherein none of the ranges is modified by the term "about"; and
wherein the composition of the components satisfies the conditions:

TiO$_2$—SiO$_2$ [mol. %]≥7.5 and

B$_2$O$_3$+SiO$_2$—P$_2$O$_5$ [mol. %]≥0.00, and wherein the glass satisfies the conditions:

1.9≤$P_n$≤2.1 and $P_{ref}$−(0.269−0.12*$T_i$)>0.00, where
$T_i$ is a value of transmittance index, calculated from the glass composition in terms of mol. % of the components according to the Formula (I):

$T_i$=(La$_2$O$_3$+Gd$_2$O$_3$+ZrO$_2$+WO$_3$)/(La$_2$O$_3$+Gd$_2$O$_3$+ZrO$_2$+WO$_3$+TiO$_2$+Nb$_2$O$_5$),        (I)

$P_n$ is a refractive index parameter, calculated from the glass composition in terms of mol. % of the components according to the Formula (II):

$P_n$=−0.0051086*Al$_2$O$_3$−0.0049247*B$_2$O$_3$−
0.00034289*BaO+0.0086552*Bi$_2$O$_3$−
0.0014511*CaO+0.0047429*Gd$_2$O$_3$−
0.0033126*GeO$_2$−0.0049544*K$_2$O+
0.0045475*La$_2$O$_3$−0.0023329*Li$_2$O−
0.0026561*MgO−0.0035925*Na$_2$O+
0.0071165*Nb$_2$O$_5$−0.0075074*P$_2$O$_5$+
0.0015814*PbO−0.0043959*SiO$_2$−
0.00086373*SrO+0.0045915*Ta$_2$O$_5$−
0.0015272*TeO$_2$+0.0020281*TiO$_2$+
0.0012709*WO$_3$+0.0025878*Y$_2$O$_3$+
0.0048156*Yb$_2$O$_3$−0.00047962*ZnO+
0.00090073*ZrO$_2$+1.955,        (II)

$P_{ref}$ is a refraction parameter, calculated from the glass composition in terms of mol. % of the components according to the Formula (IV):

$P_{ref}$(cm$^3$/g)=0.000087034*SiO$_2$−0.00012035*B$_2$O$_3$−
0.0012566*La$_2$O$_3$+0.0011411*TiO$_2$−
0.00031654*ZnO+0.000088066*CaO+
0.0020444*Nb$_2$O$_5$−0.00023383*MgO−
0.00086501*BaO−0.0004486*WO$_3$−
0.0014114*Gd$_2$O$_3$−0.00023872*Y$_2$O$_3$−
0.00031575*Ta$_2$O$_5$+0.00011894*Li$_2$O+
0.00027178*Al$_2$O$_3$−0.000099802*Na$_2$O−
0.00028391*GeO$_2$−0.00030531*SrO−
0.00072061*Bi$_2$O$_3$−0.0010964*Yb$_2$O$_3$+
0.00022839*K$_2$O−0.00086617*PbO+
0.00027129*TeO$_2$+0.198,        (IV)

where RE$_2$O$_3$ is a total sum of rare earth metal oxides in trivalent equivalent, R$_2$O is a total sum of monovalent metal oxides, RO is a total sum of divalent metal oxides, and an asterisk (*) means multiplication.

11. The glass of claim 10, wherein the glass has a refractive index at 587.56 nm, $n_d$, that is greater than or equal to 1.9 and less than or equal to 2.1 and wherein the glass satisfies the condition:

$$(n_d-1)/d_{RT}-(0.269-0.12*T_i)>0.00,$$

where
$d_{RT}$ (g/cm$^3$) is a density at room temperature,
$T_i$ is a transmittance index, calculated from the glass composition in terms of mol. % of the components according to the formula:

$$T_i=(La_2O_3+Gd_2O_3+ZrO_2+WO_3)/(La_2O_3+Gd_2O_3+ZrO_2+WO_3+TiO_2+Nb_2O_5).$$

12. The glass of claim 10, wherein the composition of the components comprises:
  greater than or equal to 10.0 mol. % and less than or equal to 40.0 mol. % $B_2O_3$,
  greater than or equal to 10.0 mol. % and less than or equal to 25.0 mol. % $La_2O_3$,
  greater than or equal to 0.0 mol. % and less than or equal to 30.0 mol. % $WO_3$,
  greater than or equal to 0.0 mol. % and less than or equal to 10.0 mol. % $Bi_2O_3$,
  greater than or equal to 0.0 mol. % and less than or equal to 10.0 mol. % $Y_2O_3$,
  greater than or equal to 0.0 mol. % and less than or equal to 10.0 mol. % $ZrO_2$,
  greater than or equal to 0.0 mol. % and less than or equal to 7.5 mol. % CaO,
  greater than or equal to 0.0 mol. % and less than or equal to 5.0 mol. % BaO,
  greater than or equal to 0.0 mol. % and less than or equal to 4.0 mol. % $Li_2O$,
  greater than or equal to 0.0 mol. % and less than or equal to 4.0 mol. % SrO,
  greater than or equal to 0.0 mol. % and less than or equal to 3.0 mol. % $Na_2O$ and
  greater than or equal to 0.0 mol. % and less than or equal to 2.0 mol. % $K_2O$.

13. The glass of claim 10, wherein the composition of the components comprises:
  greater than or equal to 23.0 mol. % and less than or equal to 33.0 mol. % $B_2O_3$,
  greater than or equal to 14.5 mol. % and less than or equal to 22.5 mol. % $La_2O_3$,
  greater than or equal to 8.0 mol. % and less than or equal to 20.0 mol. % $TiO_2$,
  greater than or equal to 6.0 mol. % and less than or equal to 16.5 mol. % $Nb_2O_5$,
  greater than or equal to 5.0 mol. % and less than or equal to 23.0 mol. % $WO_3$,
  greater than or equal to 1.75 mol. % and less than or equal to 7.25 mol. % $ZrO_2$,
  greater than or equal to 0.0 mol. % and less than or equal to 11.5 mol. % $SiO_2$,
  greater than or equal to 0.0 mol. % and less than or equal to 7.0 mol. % $Bi_2O_3$,
  greater than or equal to 0.0 mol. % and less than or equal to 5.75 mol. % $Y_2O_3$,
  greater than or equal to 0.0 mol. % and less than or equal to 4.75 mol. % CaO,
  greater than or equal to 0.0 mol. % and less than or equal to 4.0 mol. % BaO,
  greater than or equal to 0.0 mol. % and less than or equal to 3.2 mol. % $Li_2O$,
  greater than or equal to 0.0 mol. % and less than or equal to 3.2 mol. % SrO,
  greater than or equal to 0.0 mol. % and less than or equal to 2.4 mol. % $Na_2O$ and
  greater than or equal to 0.0 mol. % and less than or equal to 1.6 mol. % $K_2O$.

14. The glass of claim 10, wherein the composition of the components comprises:
  greater than or equal to 0.0 mol. % and less than or equal to 5.0 mol. % $Y_2O_3$,
  greater than or equal to 0.0 mol. % and less than or equal to 2.0 mol. % $Ta_2O_5$,
  greater than or equal to 0.0 mol. % and less than or equal to 2.0 mol. % $TeO_2$,
  greater than or equal to 0.0 mol. % and less than or equal to 0.5 mol. % $GeO_2$,
  greater than or equal to 0.0 mol. % and less than or equal to 0.5 mol. % PbO,
  greater than or equal to 0.0 mol. % and less than or equal to 0.2 mol. % $As_2O_3$ and
  greater than or equal to 0.0 mol. % and less than or equal to 0.2 mol. % $Sb_2O_3$, and wherein the composition of the components is
  substantially free of fluorine and
  substantially free of $V_2O_5$.

15. The glass of claim 10, wherein the glass satisfies the conditions:

$$4.5 \leq P_d \leq 5.5 \text{ and}$$

$$1.95 \leq P_n \leq 2.07,$$

where
$P_d$ is a density parameter, calculated from the glass composition in terms of mol. % of the components according to the Formula (III):

$$P_d \text{ (g/cm}^3\text{)}=4.95-0.036300*Al_2O_3-0.028364*B_2O_3+\\0.010786*BaO+0.077280*Bi_2O_3-\\0.0047086*CaO+0.060989*Er_2O_3+\\0.067356*Gd_2O_3-0.024973*K_2O+\\0.050388*La_2O_3-0.015411*Li_2O-\\0.014318*Na_2O-0.0016283*Nb_2O_5+\\0.078354*Nd_2O_3-0.045034*P_2O_5+\\0.037463*PbO-0.026153*SiO_2-\\0.0079191*TeO_2-0.015844*TiO_2+\\0.020220*WO_3+0.016362*Y_2O_3+\\0.058765*Yb_2O_3+0.0086588*ZnO+\\0.0043754*ZrO_2 \qquad \text{(III)}.$$

16. The glass of claim 10, wherein when cooled in air from 1100° C. to 500° C. in 2.5 minutes, the glass does not crystallize.

17. The glass of claim 10, the composition of the components comprises:
  greater than or equal to 3.0 mol. % and less than or equal to 35.0 mol. % $WO_3$.

18. The glass of claim 10, wherein the composition of the components comprises:
  greater than or equal to 3.0 mol. % and less than or equal to 30.0 mol. % $WO_3$.

19. The glass of claim 10, wherein the composition of the components comprises:
  greater than or equal to 5.0 mol. % and less than or equal to 23.0 mol. % $WO_3$.

20. The glass of claim 10, wherein the composition of the components comprises:
  greater than or equal to 0.0 mol. % and less than or equal to 4.5 mol. % $SiO_2$.

21. The glass of claim 10, wherein the composition of the components comprises:
a sum of $RE_2O_3+ZrO_2+TiO_2+Nb_2O_5+WO_3$ greater than or equal to 40.0 mol. %.

22. The glass of claim 10, wherein the composition of the components comprises:
a sum of $RE_2O_3+ZrO_2+TiO_2+Nb_2O_5+WO_3$ greater than or equal to 45.0 mol. %.

23. The glass of claim 10, wherein the composition of the components satisfies the condition that the $TiO_2$—$SiO_2$ [mol. %] is from 8 mol. % to 16 mol. %.

24. A glass comprising a plurality of components, the glass having a composition of the components comprising:
greater than or equal to 5.0 mol. % and less than or equal to 40.0 mol. % $WO_3$,
greater than or equal to 0.3 mol. % and less than or equal to 20.0 mol. % $ZrO_2$,
greater than or equal to 0.0 mol. % and less than or equal to 40.0 mol. % $B_2O_3$,
greater than or equal to 0.0 mol. % and less than or equal to 35.0 mol. % $La_2O_3$,
greater than or equal to 0.0 mol. % and less than or equal to 35.0 mol. % $Bi_2O_3$,
greater than or equal to 0.0 mol. % and less than or equal to 35.0 mol. % $ZnO$,
greater than or equal to 0.0 mol. % and less than or equal to 25.0 mol. % $Ta_2O_5$,
greater than or equal to 0.0 mol. % and less than or equal to 10.0 mol. % $Al_2O_3$,
greater than or equal to 0.0 mol. % and less than or equal to 10.0 mol. % $ThO_2$,
greater than or equal to 0.0 mol. % and less than or equal to 10.0 mol. % $TeO_2$,
greater than or equal to 0.0 mol. % and less than or equal to 5.0 mol. % $V_2O_5$,
greater than or equal to 10.0 mol. % $RE_2O_3+ZrO_2+TiO_2+Nb_2O_5+WO_3$,
greater than or equal to 0.0 mol. % and less than or equal to 35.0 mol. % $TiO_2+Nb_2O_5$,
greater than or equal to 0.0 mol. % and less than or equal to 4.8 mol. % $SiO_2+GeO_2$ and
optionally comprising one or more components selected from $P_2O_5$, $BaO$, $CaO$, $K_2O$, $Li_2O$, $MgO$, $Na_2O$, $PbO$ and $SrO$, wherein none of the ranges is modified by the term "about"; and
wherein the composition of the components satisfies the condition:

$$B_2O_3+SiO_2—P_2O_5 \text{ [mol. \%]} \geq 0.50,$$

and wherein the glass satisfies the conditions:

$$500° \text{ C.} \leq P_{Tg} \leq 700° \text{ C.,}$$

$$P_d < 6.0 \text{ g/cm}^3 \text{ and}$$

$$P_n - (1.571+0.083*P_d) > 0.00,$$

where
$P_n$ is a refractive index parameter, calculated from the glass composition in terms of mol. % of the components according to the Formula (II):

$$P_n = -0.0051086*Al_2O_3 - 0.0049247*B_2O_3 -$$
$$0.00034289*BaO + 0.0086552*Bi_2O_3 -$$
$$0.0014511*CaO + 0.0047429*Gd_2O_3 -$$
$$0.0033126*GeO_2 - 0.0049544*K_2O +$$
$$0.0045475*La_2O_3 - 0.0023329*Li_2O -$$
$$0.0026561*MgO - 0.0035925*Na_2O +$$
$$0.0071165*Nb_2O_5 - 0.0075074*P_2O_5 +$$
$$0.0015814*PbO - 0.0043959*SiO_2 -$$
$$0.00086373*SrO + 0.0045915*Ta_2O_5 -$$
$$0.0015272*TeO_2 + 0.0020281*TiO_2 +$$
$$0.0012709*WO_3 + 0.0025878*Y_2O_3 +$$
$$0.0048156*Yb_2O_3 - 0.00047962*ZnO +$$
$$0.00090073*ZrO_2 + 1.955, \quad (II)$$

$P_d$ is a density parameter, calculated from the glass composition in terms of mol. % of the components according to the Formula (III):

$$P_d \text{ (g/cm}^3) = 4.95 - 0.036300*Al_2O_3 - 0.028364*B_2O_3 +$$
$$0.010786*BaO + 0.077280*Bi_2O_3 -$$
$$0.0047086*CaO + 0.060989*Er_2O_3 +$$
$$0.067356*Gd_2O_3 - 0.024973*K_2O +$$
$$0.050388*La_2O_3 - 0.015411*Li_2O -$$
$$0.014318*Na_2O - 0.0016283*Nb_2O_5 +$$
$$0.078354*Nd_2O_3 - 0.045034*P_2O_5 +$$
$$0.037463*PbO - 0.026153*SiO_2 -$$
$$0.0079191*TeO_2 - 0.015844*TiO_2 +$$
$$0.020220*WO_3 + 0.016362*Y_2O_3 +$$
$$0.058765*Yb_2O_3 + 0.0086588*ZnO +$$
$$0.0043754*ZrO_2, \quad (III)$$

$P_{Tg}$ is a $T_g$ parameter, calculated from the glass composition in terms of mol. % of the components according to the Formula (V):

$$P_{Tg} \text{ (° C.)} = 595.358 - 0.63217*B_2O_3 - 0.46552*SiO_2 +$$
$$1.1849*TiO_2 + 0.59610*Nb_2O_5 - 1.6293*WO_3 +$$
$$1.3877*ZrO_2 + 4.4090*La_2O_3 + 4.1695*Y_2O_3 -$$
$$5.0756*Bi_2O_3 + 0.55630*CaO - 5.3892*PbO -$$
$$4.2774*TeO_2 + 1.8497*Al_2O_3 - 0.40659*GeO_2 -$$
$$1.7011*ZnO - 4.1520*Li_2O + 3.0777 \text{ Gd}_2O_3, \quad (V)$$

where $RE_2O_3$ is a total sum of rare earth metal oxides in trivalent equivalent, and an asterisk (*) means multiplication.

25. The glass of claim 24, wherein the glass has
a glass transition temperature, $T_g$, that is greater than or equal to 500° C. and less than or equal to 700° C. and
a density at room temperature, $d_{RT}$, that is less than or equal to 6.0 g/cm³ and
wherein the glass satisfies the condition:

$$n_d - (1.571+0.083*d_{RT}) > 0.00,$$

where
$n_d$ is a refractive index at 587.56 nm.

26. The glass of claim 24, wherein the composition of the components comprises:
greater than or equal to 23.0 mol. % and less than or equal to 33.0 mol. % $B_2O_3$,
greater than or equal to 14.5 mol. % and less than or equal to 22.5 mol. % $La_2O_3$,
greater than or equal to 8.0 mol. % and less than or equal to 20.0 mol. % $TiO_2$,
greater than or equal to 6.0 mol. % and less than or equal to 16.5 mol. % $Nb_2O_5$,
greater than or equal to 5.0 mol. % and less than or equal to 23.0 mol. % $WO_3$,
greater than or equal to 1.75 mol. % and less than or equal to 7.25 mol. % $ZrO_2$,
greater than or equal to 0.0 mol. % and less than or equal to 4.8 mol. % $SiO_2$,
greater than or equal to 0.0 mol. % and less than or equal to 7.0 mol. % $Bi_2O_3$,
greater than or equal to 0.0 mol. % and less than or equal to 5.75 mol. % $Y_2O_3$,
greater than or equal to 0.0 mol. % and less than or equal to 4.75 mol. % $CaO$,
greater than or equal to 0.0 mol. % and less than or equal to 4.0 mol. % $BaO$,
greater than or equal to 0.0 mol. % and less than or equal to 3.2 mol. % $Li_2O$, greater than or equal to 0.0 mol. % and less than or equal to 3.2 mol. % SrO, greater than or equal to 0.0 mol. % and less than or equal to 2.4 mol. % $Na_2O$ and greater than or equal to 0.0 mol. % and less than or equal to 1.6 mol. % $K_2O$.

27. The glass of claim 24, wherein the composition of the components comprises:

greater than or equal to 0.0 mol. % and less than or equal to 2.0 mol. % $Ta_2O_5$, greater than or equal to 0.0 mol. % and less than or equal to 2.0 mol. % $TeO_2$, greater than or equal to 0.0 mol. % and less than or equal to 0.5 mol. % $GeO_2$, greater than or equal to 0.0 mol. % and less than or equal to 0.5 mol. % PbO, greater than or equal to 0.0 mol. % and less than or equal to 0.2 mol. % $As_2O_3$ and greater than or equal to 0.0 mol. % and less than or equal to 0.2 mol. % $Sb_2O_3$, and wherein the composition of the components is substantially free of fluorine and substantially free of $V_2O_5$.

28. The glass of claim 24, wherein when cooled in air from 1100° C. to 500° C. in 2.5 minutes, the glass does not crystallize.

29. The glass of claim 24, wherein the composition of the components comprises:

greater than or equal to 5.0 mol. % and less than or equal to 30.0 mol. % $WO_3$.

30. The glass of claim 24, wherein the composition of the components comprises:

greater than or equal to 5.0 mol. % and less than or equal to 23.0 mol. % $WO_3$.

31. The glass of claim 24, wherein the composition of the components comprises:

a sum of $RE_2O_3+ZrO_2+TiO_2+Nb_2O_5+WO_3$ greater than or equal to 20.0 mol. %.

32. The glass of claim 24, wherein the composition of the components comprises:

a sum of $RE_2O_3+ZrO_2+TiO_2+Nb_2O_5+WO_3$ greater than or equal to 30.0 mol. %.

33. The glass of claim 24, wherein the composition of the components comprises:

a sum of $RE_2O_3+ZrO_2+TiO_2+Nb_2O_5+WO_3$ greater than or equal to 40.0 mol. %.

34. The glass of claim 24, wherein the composition of the components satisfies the condition that the $TiO_2$—$SiO_2$ [mol. %] is from 8 mol. % to 16 mol. %.

* * * * *